United States Patent
Bailey et al.

(10) Patent No.: US 12,504,816 B2
(45) Date of Patent: Dec. 23, 2025

(54) WEARABLE DEVICES AND ASSOCIATED BAND STRUCTURES FOR SENSING NEUROMUSCULAR SIGNALS USING SENSOR PAIRS IN RESPECTIVE PODS WITH COMMUNICATIVE PATHWAYS TO A COMMON PROCESSOR

(71) Applicant: Meta Platforms Technologies, LLC, Menlo Park, CA (US)

(72) Inventors: Matthew Bailey, Kitchener (CA); Stephen Lake, Kitchener (CA); Aaron Williams Grant, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/899,580

(22) Filed: Aug. 30, 2022

(65) Prior Publication Data

US 2023/0073303 A1    Mar. 9, 2023

Related U.S. Application Data

(60) Continuation-in-part of application No. 14/461,044, filed on Aug. 15, 2014, now Pat. No. 11,426,123, and
(Continued)

(51) Int. Cl.
*G06F 3/01* (2006.01)
*G04G 17/04* (2006.01)
(Continued)

(52) U.S. Cl.
CPC ............ *G06F 3/014* (2013.01); *G04G 17/04* (2013.01); *G04G 17/06* (2013.01); *G04G 21/025* (2013.01);
(Continued)

(58) Field of Classification Search
CPC ........ G04G 21/08; G04G 17/04; G04G 17/06; G04G 17/08; G04G 21/025; G06F 3/011;
(Continued)

(56) References Cited

U.S. PATENT DOCUMENTS 1,411,995 A    4/1922   Dull
3,408,133 A    10/1968  Lee
(Continued)

FOREIGN PATENT DOCUMENTS

CA    2902045 A1    8/2014
CA    2921954 A1    2/2015
(Continued)

OTHER PUBLICATIONS

Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
(Continued)

*Primary Examiner* — Jason M Mandeville
(74) *Attorney, Agent, or Firm* — Morgan, Lewis & Bockius LLP

(57) ABSTRACT

Wearable devices for sensing neuromuscular signals using a small number of sensor pairs are disclosed. One example wrist-wearable device includes eight pairs of neuromuscular-signal sensors. Each pair of neuromuscular-signal sensors is positioned over a portion of a wrist of a user while the wrist-wearable device is worn by the user. Each pair of neuromuscular-signal sensors further includes a first and second electrodes configured to be used as a differential sensor of neuromuscular signals travelling through the wrist of the user, and electrical signal-processing circuitry configured to amplify and filter neuromuscular signals received from the first and second electrodes to produce processed
(Continued)

neuromuscular signals. The wrist-wearable device also includes a shared ground electrode configured to ground both the first and second electrodes. The processed neuromuscular signals are provided to one or more processors that are configured to analyze the processed neuromuscular signals to detect one or more gestures.

29 Claims, 35 Drawing Sheets

Related U.S. Application Data a continuation-in-part of application No. 15/882,858, filed on Jan. 29, 2018, now Pat. No. 11,644,799, which is a continuation of application No. 14/505,836, filed on Oct. 3, 2014, now abandoned, application No. 17/899,580, filed on Aug. 30, 2022 is a continuation-in-part of application No. 16/899,843, filed on Jun. 12, 2020, now abandoned, which is a continuation of application No. 14/465,194, filed on Aug. 21, 2014, now abandoned, application No. 17/899,580, filed on Aug. 30, 2022 is a continuation-in-part of application No. 16/550,905, filed on Aug. 26, 2019, now abandoned, which is a continuation of application No. 16/137,960, filed on Sep. 21, 2018, now Pat. No. 10,429,928, which is a continuation of application No. 15/799,621, filed on Oct. 31, 2017, now Pat. No. 10,101,809, which is a division of application No. 14/539,773, filed on Nov. 12, 2014, now Pat. No. 10,042,422, application No. 17/899,580, filed on Aug. 30, 2022 is a continuation-in-part of application No. 17/141,646, filed on Jan. 5, 2021, now Pat. No. 11,666,264, which is a continuation of application No. 16/292,609, filed on Mar. 5, 2019, now Pat. No. 10,898,101, which is a continuation of application No. 15/799,628, filed on Oct. 31, 2017, now Pat. No. 10,251,577, which is a division of application No. 14/553,657, filed on Nov. 25, 2014, now Pat. No. 10,188,309.

(60) Provisional application No. 61/866,960, filed on Aug. 16, 2013, provisional application No. 61/887,193, filed on Oct. 4, 2013, provisional application No. 61/887,812, filed on Oct. 7, 2013, provisional application No. 61/891,694, filed on Oct. 16, 2013, provisional application No. 61/897,097, filed on Oct. 29, 2013, provisional application No. 61/903,238, filed on Nov. 12, 2013, provisional application No. 61/909,786, filed on Nov. 27, 2013.

(51) Int. Cl.
*G04G 17/06* (2006.01)
*G04G 21/02* (2010.01)
*G04G 21/08* (2010.01)
*G04G 17/08* (2006.01)
*G06F 3/044* (2006.01)

(52) U.S. Cl.
CPC .............. *G04G 21/08* (2013.01); *G06F 3/011* (2013.01); *G06F 3/015* (2013.01); *G06F 3/017* (2013.01); *G04G 17/08* (2013.01); *G06F 3/044* (2013.01)

(58) Field of Classification Search
CPC .......... G06F 3/014; G06F 3/015; G06F 3/017; G06F 3/044

USPC .......................................................... 368/10
See application file for complete search history.

(56) References Cited

U.S. PATENT DOCUMENTS

| | | |
|---|---|---|
| 3,580,243 A | 5/1971 | Johnson |
| 3,620,208 A | 11/1971 | Wayne et al. |
| 3,712,716 A | 1/1973 | Cornsweet et al. |
| 3,735,425 A | 5/1973 | Hoshall et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 4,978,213 A | 12/1990 | El Hage |
| 5,003,978 A | 4/1991 | Dunseath, Jr. |
| D322,227 S | 12/1991 | Warhol |
| 5,081,852 A | 1/1992 | Cox |
| 5,103,323 A | 4/1992 | Magarinos et al. |
| 5,231,674 A | 7/1993 | Cleveland et al. |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,467,104 A | 11/1995 | Furness, III et al. |
| 5,482,051 A | 1/1996 | Reddy et al. |
| 5,589,956 A | 12/1996 | Morishima et al. |
| 5,596,339 A | 1/1997 | Furness, III et al. |
| 5,605,059 A | 2/1997 | Woodward |
| 5,625,577 A | 4/1997 | Kunii et al. |
| 5,683,404 A | 11/1997 | Johnson |
| 5,742,421 A | 4/1998 | Wells et al. |
| 6,005,548 A | 12/1999 | Latypov et al. |
| 6,008,781 A | 12/1999 | Furness, III et al. |
| 6,009,210 A | 12/1999 | Kang |
| 6,027,216 A | 2/2000 | Guyton et al. |
| 6,032,530 A | 3/2000 | Hock |
| D422,617 S | 4/2000 | Simioni |
| 6,066,794 A | 5/2000 | Longo |
| 6,184,847 B1 | 2/2001 | Fateh et al. |
| 6,236,476 B1 | 5/2001 | Son et al. |
| 6,238,338 B1 | 5/2001 | DeLuca et al. |
| 6,244,873 B1 | 6/2001 | Hill et al. |
| 6,317,103 B1 | 11/2001 | Furness, III et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,639,570 B2 | 10/2003 | Furness, III et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,028,507 B2 | 4/2006 | Rapport |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |

(56) References Cited

U.S. PATENT DOCUMENTS

| | | |
|---|---|---|
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,473,888 B2 | 1/2009 | Wine et al. |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,684,105 B2 | 3/2010 | Lamontagne et al. |
| 7,747,113 B2 | 6/2010 | Mukawa et al. |
| 7,761,390 B2 | 7/2010 | Ford |
| 7,773,111 B2 | 8/2010 | Cleveland et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| D628,616 S | 12/2010 | Yuan |
| 7,850,306 B2 | 12/2010 | Uusitalo et al. |
| 7,870,211 B2 | 1/2011 | Pascal et al. |
| D633,939 S | 3/2011 | Puentes et al. |
| D634,771 S | 3/2011 | Fuchs |
| 7,901,368 B2 | 3/2011 | Flaherty et al. |
| 7,925,100 B2 | 4/2011 | Howell et al. |
| 7,948,763 B2 | 5/2011 | Chuang |
| D640,314 S | 6/2011 | Yang |
| D643,428 S | 8/2011 | Janky et al. |
| D646,192 S | 10/2011 | Woode |
| D649,177 S | 11/2011 | Cho et al. |
| 8,054,061 B2 | 11/2011 | Prance et al. |
| D654,622 S | 2/2012 | Hsu |
| 8,120,828 B2 | 2/2012 | Schwerdtner |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| D667,482 S | 9/2012 | Healy et al. |
| D669,522 S | 10/2012 | Klinar et al. |
| D669,523 S | 10/2012 | Wakata et al. |
| D671,590 S | 11/2012 | Klinar et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,386,025 B2 | 2/2013 | Hoppe |
| 8,389,862 B2 | 3/2013 | Arora et al. |
| 8,421,634 B2 | 4/2013 | Tan et al. |
| 8,427,977 B2 | 4/2013 | Workman et al. |
| D682,343 S | 5/2013 | Waters |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| 8,484,022 B1 | 7/2013 | Vanhoucke |
| D689,862 S | 9/2013 | Liu |
| 8,570,273 B1 | 10/2013 | Smith |
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |
| 8,704,882 B2 | 4/2014 | Turner |
| D704,248 S | 5/2014 | DiChiara |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,042,971 B2 | 5/2015 | Brumback et al. |
| 9,086,687 B2 | 7/2015 | Park et al. |
| 9,092,664 B2 | 7/2015 | Forutanpour et al. |
| D736,664 S | 8/2015 | Paradise et al. |
| 9,107,586 B2 | 8/2015 | Tran |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| D747,759 S | 1/2016 | Ho |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,349,280 B2 | 5/2016 | Baldwin et al. |
| 9,351,653 B1 | 5/2016 | Harrison |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,414,651 B2 | 8/2016 | Proud et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,459,697 B2 | 10/2016 | Bedikian et al. |
| 9,472,956 B2 | 10/2016 | Michaelis et al. |

(56) References Cited

U.S. PATENT DOCUMENTS

| | | | |
|---|---|---|---|
| 9,477,313 B2 | 10/2016 | Mistry et al. |
| D771,735 S | 11/2016 | Lee et al. |
| 9,483,123 B2 | 11/2016 | Aleem et al. |
| 9,529,434 B2 | 12/2016 | Choi et al. |
| D780,828 S | 3/2017 | Bonaventura et al. |
| D780,829 S | 3/2017 | Bonaventura et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,652,047 B2 | 5/2017 | Mullins et al. |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,807,221 B2 | 10/2017 | Bailey et al. |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 9,996,983 B2 | 6/2018 | Mullins |
| 9,999,391 B2 | 6/2018 | Kim et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,185,416 B2 | 1/2019 | Mistry et al. |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,429,928 B2 | 10/2019 | Morun et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 11,426,123 B2 * | 8/2022 | Bailey .................. G06F 3/015 |
| 2001/0033402 A1 | 10/2001 | Popovich |
| 2002/0003627 A1 | 1/2002 | Rieder |
| 2002/0009972 A1 | 1/2002 | Amento et al. |
| 2002/0030636 A1 | 3/2002 | Richards |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0120415 A1 | 8/2002 | Millott et al. |
| 2002/0120916 A1 | 8/2002 | Snider, Jr. |
| 2002/0198472 A1 | 12/2002 | Kramer |
| 2003/0030595 A1 | 2/2003 | Radley-Smith |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0182630 A1 | 9/2003 | Saund et al. |
| 2003/0184544 A1 | 10/2003 | Prudent |
| 2004/0010210 A1 | 1/2004 | Avinash et al. |
| 2004/0024312 A1 | 2/2004 | Zheng |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2005/0179644 A1 | 8/2005 | Alsio et al. |
| 2006/0018833 A1 | 1/2006 | Murphy et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0132705 A1 | 6/2006 | Li |
| 2006/0149338 A1 | 7/2006 | Flaherty et al. |
| 2006/0211956 A1 | 9/2006 | Sankai |
| 2006/0238707 A1 | 10/2006 | Elvesjo et al. |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0078308 A1 | 4/2007 | Daly |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0276270 A1 | 11/2007 | Tran |
| 2007/0279852 A1 | 12/2007 | Daniel et al. |
| 2007/0285399 A1 | 12/2007 | Lund |
| 2008/0001735 A1 | 1/2008 | Tran |
| 2008/0032638 A1 | 2/2008 | Anderson |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0085864 A1 | 4/2009 | Kutliroff et al. |
| 2009/0102580 A1 | 4/2009 | Uchaykin |
| 2009/0109241 A1 | 4/2009 | Tsujimoto |
| 2009/0112080 A1 | 4/2009 | Matthews |
| 2009/0124881 A1 | 5/2009 | Rytky |
| 2009/0147004 A1 | 6/2009 | Ramon et al. |

(56) References Cited

U.S. PATENT DOCUMENTS

| | | |
|---|---|---|
| 2009/0179824 A1 | 7/2009 | Tsujimoto et al. |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0207464 A1 | 8/2009 | Wiltshire et al. |
| 2009/0209878 A1 | 8/2009 | Sanger |
| 2009/0251407 A1 | 10/2009 | Flake et al. |
| 2009/0258669 A1 | 10/2009 | Nie et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0322653 A1 | 12/2009 | Putilin et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0066664 A1 | 3/2010 | Son et al. |
| 2010/0106044 A1 | 4/2010 | Linderman |
| 2010/0113910 A1 | 5/2010 | Brauers et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0025982 A1 | 2/2011 | Takahashi |
| 2011/0054360 A1 | 3/2011 | Son et al. |
| 2011/0065319 A1 | 3/2011 | Oster et al. |
| 2011/0066381 A1 | 3/2011 | Garudadri et al. |
| 2011/0072510 A1 | 3/2011 | Cheswick |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0181527 A1 | 7/2011 | Capela et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224507 A1 | 9/2011 | Banet et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0002256 A1 | 1/2012 | Lacoste et al. |
| 2012/0007821 A1 | 1/2012 | Zaliva |
| 2012/0029322 A1 | 2/2012 | Wartena et al. |
| 2012/0046901 A1* | 2/2012 | Green .................... G06F 3/011 |
| | | 702/141 |
| 2012/0051005 A1 | 3/2012 | Vanfleteren et al. |
| 2012/0052268 A1 | 3/2012 | Axisa et al. |
| 2012/0053439 A1 | 3/2012 | Ylostalo et al. |
| 2012/0066163 A1 | 3/2012 | Balls et al. |
| 2012/0071092 A1 | 3/2012 | Pasquero et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0139817 A1 | 6/2012 | Freeman |
| 2012/0157789 A1 | 6/2012 | Kangas et al. |
| 2012/0157886 A1 | 6/2012 | Tenn et al. |
| 2012/0165695 A1 | 6/2012 | Kidmose et al. |
| 2012/0182309 A1 | 7/2012 | Griffin et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick et al. |
| 2012/0265090 A1 | 10/2012 | Fink et al. |
| 2012/0265480 A1 | 10/2012 | Oshima |
| 2012/0275621 A1 | 11/2012 | Elko |
| 2012/0283526 A1 | 11/2012 | Gommesen et al. |
| 2012/0283896 A1 | 11/2012 | Persaud et al. |
| 2012/0293548 A1 | 11/2012 | Perez et al. |
| 2012/0302858 A1 | 11/2012 | Kidmose et al. |
| 2012/0320532 A1 | 12/2012 | Wang |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0123666 A1 | 5/2013 | Giuffrida et al. |
| 2013/0127708 A1* | 5/2013 | Jung .................... A61B 5/291 |
| | | 345/156 |
| 2013/0131538 A1 | 5/2013 | Gaw et al. |
| 2013/0135223 A1 | 5/2013 | Shai |
| 2013/0135722 A1 | 5/2013 | Yokoyama |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0215235 A1 | 8/2013 | Russell |
| 2013/0217998 A1 | 8/2013 | Mahfouz et al. |
| 2013/0221996 A1 | 8/2013 | Poupyrev et al. |
| 2013/0222384 A1 | 8/2013 | Futterer |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285901 A1 | 10/2013 | Lee et al. |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |

(56) References Cited

U.S. PATENT DOCUMENTS

| | | |
|---|---|---|
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0132512 A1 | 5/2014 | Gomez Sainz-Garcia |
| 2014/0139422 A1 | 5/2014 | Mistry et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0202643 A1 | 7/2014 | Hikmet et al. |
| 2014/0204455 A1 | 7/2014 | Popovich et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0309547 A1 * | 10/2014 | Linderman .......... A61B 5/6825 600/546 |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368424 A1 | 12/2014 | Choi et al. |
| 2014/0368428 A1 | 12/2014 | Pinault |
| 2014/0368474 A1 | 12/2014 | Kim et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0185838 A1 | 7/2015 | Camacho-Perez et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0205126 A1 | 7/2015 | Schowengerdt |
| 2015/0205134 A1 | 7/2015 | Bailey et al. |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242120 A1 | 8/2015 | Rodriguez |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0310766 A1 | 10/2015 | Alshehri et al. |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0362734 A1 | 12/2015 | Moser et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0033771 A1 | 2/2016 | Tremblay et al. |
| 2016/0049073 A1 | 2/2016 | Lee |
| 2016/0050037 A1 | 2/2016 | Webb |

(56) References Cited

U.S. PATENT DOCUMENTS

| | | |
|---|---|---|
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0238845 A1 | 8/2016 | Alexander et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274365 A1 | 9/2016 | Bailey et al. |
| 2016/0274732 A1 | 9/2016 | Bang et al. |
| 2016/0274758 A1 | 9/2016 | Bailey |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0327796 A1 | 11/2016 | Bailey et al. |
| 2016/0327797 A1 | 11/2016 | Bailey et al. |
| 2016/0342227 A1 | 11/2016 | Natzke et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0350973 A1 | 12/2016 | Shapira et al. |
| 2016/0377865 A1 | 12/2016 | Alexander et al. |
| 2016/0377866 A1 | 12/2016 | Alexander et al. |
| 2017/0025026 A1 | 1/2017 | Ortiz Catalan |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068095 A1 | 3/2017 | Holland et al. |
| 2017/0068445 A1 | 3/2017 | Lee et al. |
| 2017/0075426 A1 | 3/2017 | Camacho Perez et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0097753 A1 | 4/2017 | Bailey et al. |
| 2017/0115483 A1 | 4/2017 | Aleem et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0127354 A1 | 5/2017 | Garland et al. |
| 2017/0147077 A1 | 5/2017 | Park et al. |
| 2017/0153701 A1 | 6/2017 | Mahon et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0205876 A1 | 7/2017 | Vidal et al. |
| 2017/0209055 A1 | 7/2017 | Pantelopoulos et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0220923 A1 | 8/2017 | Bae et al. |
| 2017/0237789 A1 | 8/2017 | Harner et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0299956 A1 | 10/2017 | Holland et al. |
| 2017/0301630 A1 | 10/2017 | Nguyen et al. |
| 2017/0308118 A1 | 10/2017 | Ito |
| 2017/0308165 A1 | 10/2017 | Erivantcev et al. |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |

(56) References Cited

U.S. PATENT DOCUMENTS

| | | |
|---|---|---|
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0212817 A1 | 7/2019 | Kaifosh et al. |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0097081 A1 | 3/2020 | Stone et al. |
| 2020/0097083 A1 | 3/2020 | Mao et al. |
| 2020/0111260 A1 | 4/2020 | Osborn et al. |
| 2020/0125171 A1 | 4/2020 | Morun et al. |
| 2020/0142490 A1 | 5/2020 | Xiong et al. |
| 2020/0159322 A1 | 5/2020 | Morun et al. |
| 2020/0163562 A1 | 5/2020 | Neaves |
| 2020/0225320 A1 | 7/2020 | Belskikh et al. |
| 2020/0245873 A1 | 8/2020 | Frank et al. |
| 2020/0249752 A1 | 8/2020 | Parshionikar |
| 2020/0275895 A1 | 9/2020 | Barachant |
| 2020/0301509 A1 | 9/2020 | Liu et al. |
| 2020/0320335 A1 | 10/2020 | Shamun et al. |
| 2021/0064132 A1 | 3/2021 | Rubin et al. |
| 2021/0109598 A1 | 4/2021 | Zhang et al. |
| 2021/0117523 A1 | 4/2021 | Kim et al. |
| 2021/0290159 A1 | 9/2021 | Bruinsma et al. |
| 2025/0013206 A1* | 1/2025 | Bailey .................. G04G 17/04 |

FOREIGN PATENT DOCUMENTS

| | | |
|---|---|---|
| CA | 2939644 A1 | 8/2015 |
| CN | 1838933 A | 9/2006 |
| CN | 102246125 A | 11/2011 |
| CN | 103777752 A | 5/2014 |
| CN | 105190578 A | 12/2015 |
| CN | 106102504 A | 11/2016 |
| CN | 110300542 A | 10/2019 |
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |
| EP | 1345210 A2 | 9/2003 |
| EP | 1408443 B1 | 10/2006 |
| EP | 2198521 B1 | 6/2012 |
| EP | 2541763 A2 | 1/2013 |
| EP | 2733578 A2 | 5/2014 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 2959394 B1 | 5/2021 |
| JP | S61198892 A | 9/1986 |
| JP | H05277080 A | 10/1993 |
| JP | H07248873 A | 9/1995 |
| JP | 3103427 B2 | 10/2000 |
| JP | 2002287869 A | 10/2002 |
| JP | 2003303047 A | 10/2003 |
| JP | 2005095561 A | 4/2005 |
| JP | 2005352739 A | 12/2005 |
| JP | 2008192004 A | 8/2008 |
| JP | 2009050679 A | 3/2009 |
| JP | 2010520561 A | 6/2010 |
| JP | 2013160905 A | 8/2013 |
| JP | 2016507851 A | 3/2016 |
| JP | 2017509386 A | 4/2017 |
| JP | 2019023941 A | 2/2019 |
| JP | 2021072136 A | 5/2021 |
| KR | 20110040165 A | 4/2011 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 101790147 B1 | 10/2017 |
| WO | 9527341 A1 | 10/1995 |
| WO | 2006086504 A2 | 8/2006 |
| WO | 2008109248 A2 | 9/2008 |
| WO | 2009042313 A1 | 4/2009 |
| WO | 2010104879 A2 | 9/2010 |
| WO | 2011011750 A1 | 1/2011 |
| WO | 2011070554 A2 | 6/2011 |
| WO | 2012155157 A1 | 11/2012 |
| WO | 2014130871 A1 | 8/2014 |
| WO | 2014155288 A2 | 10/2014 |
| WO | 2014186370 A1 | 11/2014 |
| WO | 2014194257 A1 | 12/2014 |
| WO | 2014197443 A1 | 12/2014 |
| WO | 2015027089 A1 | 2/2015 |
| WO | 2015063520 A1 | 5/2015 |
| WO | 2015073713 A1 | 5/2015 |
| WO | 2015081113 A1 | 6/2015 |
| WO | 2015100172 A1 | 7/2015 |
| WO | 2015123445 A1 | 8/2015 |
| WO | 2015123775 A1 | 8/2015 |
| WO | 2015184760 A1 | 12/2015 |
| WO | 2015192117 A1 | 12/2015 |
| WO | 2015199747 A1 | 12/2015 |
| WO | 2016041088 A1 | 3/2016 |
| WO | 2017062544 A1 | 4/2017 |
| WO | 2017075611 A1 | 5/2017 |
| WO | 2017092225 A1 | 6/2017 |
| WO | 2017120669 A1 | 7/2017 |
| WO | 2017172185 A1 | 10/2017 |
| WO | 2017208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020047429 A1 | 3/2020 |
| WO | 2020061440 A1 | 3/2020 |
| WO | 2020061451 A1 | 3/2020 |
| WO | 2020072915 A1 | 4/2020 |

OTHER PUBLICATIONS

Kessler D., "Optics of Near to Eye Displays (NEDs)," Presentation—Oasis, Tel Aviv, Feb. 19, 2013, 37 pages.

Kim H., et al., "Real-Time Human Pose Estimation and Gesture Recognition from Depth Images Using Superpixels and SVM Classifier," Sensors, 2015, vol. 15, pp. 12410-12427.

Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages, Retrieved on Oct. 7, 2019 [Jul. 10, 2019] Retrieved from the Internet: URL.

Koerner M.D., "Design and Characterization of the Exo-Skin Haptic Device: A Novel Tendon Actuated Textile Hand Exoskeleton,"

(56) References Cited

OTHER PUBLICATIONS

Abstract of thesis for Drexel University Masters Degree [online], Nov. 2, 2017, 5 pages, Retrieved from the Internet: URL: https://dialog.proquest.com/professional/docview/1931047627?accountid=153692.

Krees B.C., et al., "Diffractive and Holographic Optics as Optical Combiners in Head Mounted Displays," UbiComp, Zurich, Switzerland, Sep. 8-12, 2013, pp. 1479-1482.

Kress B., et al., "A Review of Head-Mounted Displays (HMD) Technologies and Applications for Consumer Electronics," Proceedings of SPIE, 2013, vol. 8720, pp. 87200A-1-87200A-13.

Kress B., "Optical Architectures for See-Through Wearable Displays," Presentation, Bay Area SID Seminar, Apr. 30, 2014, 156 pages.

Lake et al., "Method and Apparatus for Analyzing Capacitive EMG and IMU Sensor Signals for Gesture Control," Amendment filed Aug. 21, 2015, for U.S. Appl. No. 14/186,878, 13 pages.

Lake et al., "Method and Apparatus for Analyzing Capacitive EMG and IMU Sensor Signals for Gesture Control," Office Action dated Jun. 17, 2015, for U.S. Appl. No. 14/186,878, 13 pages.

Lake et al. "Method and Apparatus for Analyzing Capacitive EMG and IMU Sensor Signals for Gesture Control," Preliminary Amendment filed May 9, 2014, for U.S. Appl. No. 14/186,878, 9 pages.

Lake et al., "Method and Apparatus for Analyzing Capacitive EMG and IMU Sensor Signals for Gesture Control," U.S. Appl. No. 14/186,878, filed Feb. 21, 2014, 29 pages.

Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.

Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.

Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.

Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.

Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.

Lee D.C., et al., "Motion and Force Estimation System of Human Fingers," Journal of Institute of Control, Robotics and Systems, 2011, vol. 17 (10), pp. 1014-1020.

Levola T., "7.1: Invited Paper: Novel Diffractive Optical Components for Near to Eye Displays," SID Symposium Digest of Technical Papers, 2006, vol. 37 (1), pp. 64-67.

Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.

Liao C.D., et al., "The Evolution of MEMS Displays," IEEE Transactions on Industrial Electronics, Apr. 2009, vol. 56 (4), pp. 1057-1065.

Lippert T.M., "Chapter 6: Display Devices: RSD™ (Retinal Scanning Display)," The Avionics Handbook, CRC Press, 2001, 8 pages.

Lopes J., et al., "Hand/Arm Gesture Segmentation by Motion Using IMU and EMG Sensing," ScienceDirect, Jun. 27-30, 2017, vol. 11, pp. 107-113.

Majaranta P., et al., "Chapter 3: Eye Tracking and Eye-Based Human-Computer Interaction," Advances in Physiological Computing, Springer-Verlag London, 2014, pp. 39-65.

Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.

Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.

Mcintee S.S., "A Task Model of Free-Space Movement-Based Geastures," Dissertation, Graduate Faculty of North Carolina State University, Computer Science, 2016, 129 pages.

Mendes JR.J.J.A., et al., "Sensor Fusion and Smart Sensor in Sports and Biomedical Applications," Sensors, 2016, vol. 16 (1569), pp. 1-31.

Merriam-Webster, "Radio Frequencies," download date Jul. 12, 2017, 2 pages, Retrieved from the Internet: URL: https://www.merriam-webster.com/table/collegiate/radiofre.htm.

Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.

Morris D., et al., "Emerging Input Technologies for Always-Available Mobile Interaction," Foundations and Trends in Human-Computer Interaction, 2010, vol. 4 (4), pp. 245-316.

Morun C., et al., "Systems, Articles, and Methods for Capacitive Electromyography Sensors," U.S. Appl. No. 16/437,351, filed Jun. 11, 2019, 51 pages.

Naik G.R., et al., "Source Separation and Identification issues in Bio Signals: A Solution using Blind Source Separation," Chapter 4 of Recent Advances in Biomedical Engineering, Intech, 2009, 23 pages.

Naik G.R., et al., "Real-Time Hand Gesture Identification for Human Computer Interaction Based on ICA of Surface Electromyogram," IADIS International Conference Interfaces and Human Computer Interaction, 2007, pp. 83-90.

Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.

Negro F., et al., "Multi-Channel Intramuscular and Surface EMG Decomposition by Convolutive Blind Source Separation," Journal of Neural Engineering, Feb. 29, 2016, vol. 13, 18 Pages.

Non-Final Office Action mailed Mar. 1, 2018 for U.S. Appl. No. 14/553,657, filed Nov. 25, 2014, 29 Pages.

Non-Final Office Action mailed Mar. 2, 2021 for U.S. Appl. No. 15/974,430, filed May 8, 2018, 32 Pages.

Non-Final Office Action mailed May 2, 2018 for U.S. Appl. No. 15/799,628, filed Oct. 31, 2017, 25 Pages.

Non-Final Office Action mailed Sep. 2, 2020 for U.S. Appl. No. 15/882,858, filed Jan. 29, 2018, 66 Pages.

Non-Final Office Action mailed Aug. 3, 2020 for U.S. Appl. No. 16/593,446, filed Oct. 4, 2019, 44 pages.

Non-Final Office Action mailed Jun. 3, 2021 for U.S. Appl. No. 15/816,435, filed Nov. 17, 2017, 32 Pages.

Non-Final Office Action mailed Jun. 5, 2020 for U.S. Appl. No. 15/659,072, filed Jul. 25, 2017, 59 Pages.

Non-Final Office Action mailed Oct. 5, 2022 for U.S. Appl. No. 17/576,815, filed Jan. 14, 2022, 14 pages.

Non-Final Office Action mailed Nov. 6, 2018 for U.S. Appl. No. 16/057,573, filed Aug. 7, 2018, 14 Pages.

Non-Final Office Action mailed Sep. 6, 2019 for U.S. Appl. No. 16/424,144, filed May 28, 2019, 11 Pages.

Non-Final Office Action mailed May 7, 2021 for U.S. Appl. No. 16/899,843, filed Jun. 12, 2020, 24 Pages.

Non-Final Office Action mailed Oct. 7, 2022 for U.S. Appl. No. 17/141,646, filed Jan. 5, 2021, 6 pages.

Non-Final Office Action mailed Feb. 8, 2021 for U.S. Appl. No. 16/557,342, filed Aug. 30, 2019, 11 Pages.

Non-Final Office Action mailed Oct. 8, 2020 for U.S. Appl. No. 16/577,207, filed Sep. 20, 2019, 51 Pages.

International Preliminary Report on Patentability for International Application No. PCT/US2019/054716, mailed on Apr. 15, 2021, 10 pages.

International Preliminary Report on Patentability for International Application No. PCT/US2019/061759, mailed May 27, 2021, 12 pages.

International Preliminary Report on Patentability for International Application No. PCT/US2019/063587, mailed Jun. 10, 2021, 13 pages.

(56) References Cited

OTHER PUBLICATIONS

International Preliminary Report on Patentability for International Application No. PCT/US2020/049274, mailed Mar. 17, 2022, 14 pages.
International Preliminary Report on Patentability for International Application No. PCT/US2020/061392, mailed Jun. 9, 2022, 11 pages.
International Search Report and Written Opinion for International Application No. PCT/US2014/052143, mailed Nov. 21, 2014, 8 Pages.
International Search Report and Written Opinion for International Application No. PCT/US2014/067443, mailed Feb. 27, 2015, 8 pages.
International Search Report and Written Opinion for International Application No. PCT/US2015/015675, mailed May 27, 2015, 9 Pages.
International Search Report and Written Opinion for International Application No. PCT/US2016/018293, mailed Jun. 8, 2016, 17 Pages.
International Search Report and Written Opinion for International Application No. PCT/US2016/018298, mailed Jun. 8, 2016, 14 Pages.
International Search Report and Written Opinion for International Application No. PCT/US2016/018299, mailed Jun. 8, 2016, 12 Pages.
International Search Report and Written Opinion for International Application No. PCT/US2016/067246, mailed Apr. 25, 2017, 10 Pages.
International Search Report and Written Opinion for International Application No. PCT/US2017/043686, mailed Oct. 6, 2017, 9 Pages.
International Search Report and Written Opinion for International Application No. PCT/US2017/043693, mailed Oct. 6, 2017, 7 Pages.
International Search Report and Written Opinion for International Application No. PCT/US2017/043791, mailed Oct. 5, 2017, 10 Pages.
International Search Report and Written Opinion for International Application No. PCT/US2018/056768, mailed Jan. 15, 2019, 8 pages.
International Search Report and Written Opinion for International Application No. PCT/US2018/061409, mailed Mar. 12, 2019, 11 pages.
International Search Report and Written Opinion for International Application No. PCT/US2018/063215, mailed Mar. 21, 2019, 17 Pages.
International Search Report and Written Opinion for International Application No. PCT/US2019/015167, mailed May 21, 2019, 7 Pages.
International Search Report and Written Opinion for International Application No. PCT/US2019/015174, mailed May 21, 2019, 8 pages.
International Search Report and Written Opinion for International Application No. PCT/US2019/015244, mailed May 16, 2019, 8 Pages.
International Search Report and Written Opinion for International Application No. PCT/US2019/020065, mailed May 16, 2019, 10 Pages.
International Search Report and Written Opinion for International Application No. PCT/US2019/028299, mailed Aug. 9, 2019, 12 pages.
International Search Report and Written Opinion for International Application No. PCT/US2019/031114, mailed Dec. 20, 2019, 18 Pages.
International Search Report and Written Opinion for International Application No. PCT/US2019/034173, mailed Sep. 18, 2019, 10 Pages.
International Search Report and Written Opinion for International Application No. PCT/US2019/037302, mailed Oct. 11, 2019, 13 Pages.
International Search Report and Written Opinion for International Application No. PCT/US2019/042579, mailed Oct. 31, 2019, 8 Pages.
International Search Report and Written Opinion for International Application No. PCT/US2019/046351, mailed Nov. 7, 2019, 9 pages.
International Search Report and Written Opinion for International Application No. PCT/US2019/049094, mailed Jan. 9, 2020, 27 Pages.
International Search Report and Written Opinion for International Application No. PCT/US2019/052131, mailed on Dec. 6, 2019, 8 pages.
International Search Report and Written Opinion for International Application No. PCT/US2019/052151, mailed Jan. 15, 2020, 10 pages.
International Search Report and Written Opinion for International Application No. PCT/US2019/054716, mailed Dec. 20, 2019, 11 Pages.
International Search Report and Written Opinion for International Application No. PCT/US2019/061759, mailed Jan. 29, 2020, 12 pages.
International Search Report and Written Opinion for International Application No. PCT/US2019/063587, mailed Mar. 25, 2020, 16 pages.
International Search Report and Written Opinion for International Application No. PCT/US2020/025735, mailed Jun. 22, 2020, 10 pages.
International Search Report and Written Opinion for International Application No. PCT/US2020/025772, mailed Aug. 3, 2020, 11 pages.
International Search Report and Written Opinion for International Application No. PCT/US2020/025797, mailed Jul. 9, 2020, 10 pages.
International Search Report and Written Opinion for International Application No. PCT/US2020/049274, mailed Feb. 1, 2021, 17 pages.
International Search Report and Written Opinion for International Application No. PCT/US2020/061392, mailed Mar. 12, 2021, 12 pages.
International Search Report and Written Opinion for International Application No. PCT/US2017/043792, mailed Oct. 5, 2017, 9 Pages.
International Search Report and Written Opinion for International Application No. PCT/US2019/015134, mailed May 15, 2019, 11 Pages.
International Search Report and Written Opinion for International Application No. PCT/US2019/015180, mailed May 28, 2019, 10 Pages.
International Search Report and Written Opinion for International Application No. PCT/US2019/015183, mailed May 3, 2019, 8 Pages.
International Search Report and Written Opinion for International Application No. PCT/US2019/015238, mailed May 16, 2019, 8 Pages.
Invitation to Pay Additional Fees for International Application No. PCT/US2019/031114, mailed Aug. 6, 2019, 7 pages.
Invitation to Pay Additional Fees for International Application No. PCT/US2019/049094, mailed Oct. 24, 2019, 2 Pages.
Itoh Y., et al., "Interaction-Free Calibration for Optical See-Through Head-Mounted Displays based on 3D Eye Localization," IEEE Symposium on 3D User Interfaces (3DUI), 2014, pp. 75-82.
Janssen C., "Radio Frequency (RF)," 2013, [Retrieved on Jul. 12, 2017], 2 pages, Retrieved from the Internet: URL: https://web.archive.org/web/20130726153946/https://www.techopedia.com/definition/5083/radio-frequency-rf.
Jiang H., "Effective and Interactive Interpretation of Gestures by Individuals with Mobility Impairments," Thesis/ Dissertation Acceptance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," ACTA Informatica Pragensia, vol. 3, Jan. 1, 2014, pp. 104-112, Retrieved from the Internet: URL: https://aip.vse.cz/pdfs/aip/2014/01/08.pdf.

(56) References Cited

OTHER PUBLICATIONS

Corrected Notice of Allowance mailed Mar. 17, 2023 for U.S. Appl. No. 17/141,646, filed Jan. 5, 2021, 2 pages.
Costanza E., et al., "EMG as a Subtle Input Interface for Mobile Computing," Mobile HCI, LNCS 3160, 2004, pp. 426-430.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.
Cui L., et al., "Diffraction From Angular Multiplexing Slanted vol. Hologram Gratings," Optik, 2005, vol. 116, pp. 118-122.
Curatu C., et al., "Dual Purpose Lens for an Eye-Tracked Projection Head-Mounted Display," International Optical Design Conference SPIE-OSA, 2006, vol. 6342, pp. 63420X-1-63420X-7.
Curatu C., et al., "Projection-Based Head-Mounted Display With Eye-Tracking Capabilities," Proceedings of SPIE, 2005, vol. 5875, pp. 58750J-1-58750J-9.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.
Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
Essex D., "Tutorial on Optomechanical Beam Steering Mechanisms," OPTI 521 Tutorial, College of Optical Sciences, University of Arizona, 2006, 8 pages.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, mailed May 9, 2022, 9 pages.
European Search Report for European Application No. 19890394.0, mailed Apr. 29, 2022, 9 pages.
Extended European Search Report for European Application No. 17835111.0, mailed Nov. 21, 2019, 6 pages.
Extended European Search Report for European Application No. 17835112.8, mailed Feb. 5, 2020, 17 pages.
Extended European Search Report for European Application No. 17835140.9, mailed Nov. 26, 2019, 10 Pages.
Extended European Search Report for European Application No. 18869441.8, mailed Nov. 17, 2020, 20 Pages.
Extended European Search Report for European Application No. 18879156.0, mailed Mar. 12, 2021, 11 pages.
Extended European Search Report for European Application No. 19743717.1, mailed Mar. 3, 2021, 12 pages.
Extended European Search Report for European Application No. 19744404.5, mailed Mar. 29, 2021, 11 pages.
Extended European Search Report for European Application No. 19799947.7, mailed May 26, 2021, 10 pages.
Extended European Search Report for European Application No. 19806723.3, mailed Jul. 7, 2021, 13 pages.
Extended European Search Report for European Application No. 19810524.9, mailed Mar. 17, 2021, 11 pages.
Extended European Search Report for European Application No. 19850130.6, mailed Sep. 1, 2021, 14 Pages.
Extended European Search Report for European Application No. 19855191.3, dated Dec. 6, 2021, 11 pages.
Extended European Search Report for European Application No. 19883839.3, mailed Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Fernandez E., et al., "Optimization of a Thick Polyvinyl Alcohol-Acrylamide Photopolymer for Data Storage Using a Combination of Angular and Peristrophic Holographic Multiplexing," Applied Optics, Oct. 10, 2009, vol. 45 (29), pp. 7661-7666.
Final Office Action mailed Jun. 2, 2020 for U.S. Appl. No. 15/882,858, filed Jan. 29, 2018, 127 Pages.
Final Office Action mailed Jun. 2, 2020 for U.S. Appl. No. 16/557,383, filed Aug. 30, 2019, 66 Pages.
Final Office Action mailed Mar. 2, 2023 for U.S. Appl. No. 17/576,815, filed Jan. 14, 2022, 19 pages.
Final Office Action mailed Jan. 3, 2019 for U.S. Appl. No. 14/465,194, filed Aug. 21, 2014, 61 Pages.
Final Office Action mailed Nov. 3, 2020 for U.S. Appl. No. 15/974,430, filed May 8, 2018, 27 Pages.
Final Office Action mailed Feb. 4, 2020 for U.S. Appl. No. 16/577,207, filed Sep. 20, 2019, 76 Pages.
Final Office Action mailed Feb. 4, 2021 for U.S. Appl. No. 15/882,858, filed Jan. 29, 2018, 42 Pages.
Final Office Action mailed Jun. 5, 2020 for U.S. Appl. No. 16/557,427, filed Aug. 30, 2019, 95 Pages.
Final Office Action mailed Oct. 8, 2020 for U.S. Appl. No. 16/557,342, filed Aug. 30, 2019, 73 Pages.
Final Office Action mailed Apr. 9, 2020 for U.S. Appl. No. 15/974,454, filed May 8, 2018, 19 Pages.
Final Office Action mailed Jan. 10, 2018 for U.S. Appl. No. 14/465,194, filed Aug. 21, 2014, 50 Pages.
Final Office Action mailed Dec. 11, 2019 for U.S. Appl. No. 15/974,430, filed May 8, 2018, 30 Pages.
Final Office Action mailed Jan. 13, 2021 for U.S. Appl. No. 16/577,207, filed Sep. 20, 2019, 91 Pages.
Final Office Action mailed Dec. 18, 2019 for U.S. Appl. No. 16/258,279, filed Jan. 25, 2019, 45 Pages.
Final Office Action mailed Nov. 18, 2020 for U.S. Appl. No. 14/461,044, filed Aug. 15, 2014, 14 Pages.
Final Office Action mailed Feb. 19, 2021 for U.S. Appl. No. 16/258,279, filed Jan. 25, 2019, 58 Pages.
Final Office Action mailed Oct. 21, 2021 for U.S. Appl. No. 16/899,843, filed Jun. 12, 2020, 29 Pages.
Shen S., et al., "I Am a Smartwatch and I Can Track My User's Arm," University of Illinois at Urbana-Champaign, MobiSys, Jun. 25-30, 2016, 12 pages.
Silverman N.L., et al., "58.5L: Late-News Paper: Engineering a Retinal Scanning Laser Display with Integrated Accommodative Depth Cues," SID 03 Digest, 2003, pp. 1538-1541.
Son M., et al., "Evaluating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/10.1155/2014/740469.
Takatsuka Y., et al., "Retinal Projection Display Using Diffractive Optical Element," Tenth International Conference on Intelligent Information Hiding and Multimedia Signal Processing, IEEE, 2014, pp. 403-406.

(56) References Cited

OTHER PUBLICATIONS

Torres T., "Myo Gesture Control Armband," PCMag, Jun. 8, 2015, 9 pages, Retrieved from the Internet: URL: https://www.pcmag.com/article2/0,2817,2485462,00.asp.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Urey H., "Diffractive Exit-Pupil Expander for Display Applications," Applied Optics, Nov. 10, 2001, vol. 40 (32), pp. 5840-5851.
Urey H., et al., "Optical Performance Requirements for MEMS-Scanner Based Microdisplays," Conferences on MOEMS and Miniaturized Systems, SPIE, 2000, vol. 4178, pp. 176-185.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages, Retrieved from the Internet: URL: https://www.ncbi.nlm.nih.gov/pmc/articles/PMC3116649/.
Viirre E., et al., "The Virtual Retinal Display: A New Technology for Virtual Reality and Augmented Vision in Medicine," Proceedings of Medicine Meets Virtual Reality, IOS Press and Ohmsha, 1998, pp. 252-257.
Wijk U., et al., "Forearm Amputee's Views of Prosthesis Use and Sensory Feedback," Journal of Hand Therapy, Jul. 2015, vol. 28 (3), pp. 269-278.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.
Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.
Written Opinion for International Application No. PCT/US2014/057029, mailed Feb. 24, 2015, 9 Pages.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.
Zacharaki E.I., et al., "Spike Pattern Recognition by Supervised Classification in Low Dimensional Embedding Space," Brain Informatics, 2016, vol. 3, pp. 73-83.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
Notice of Allowance mailed Nov. 4, 2019 for U.S. Appl. No. 15/974,384, filed May 8, 2018, 39 Pages.
Notice of Allowance mailed Mar. 5, 2019 for U.S. Appl. No. 16/057,573, filed Aug. 7, 2018, 31 Pages.
Notice of Allowance mailed Feb. 6, 2020 for U.S. Appl. No. 16/424,144, filed May 28, 2019, 28 Pages.
Notice of Allowance mailed Feb. 8, 2019 for U.S. Appl. No. 16/023,276, filed Jun. 29, 2018, 15 pages.
Notice of Allowance mailed Mar. 8, 2023 for U.S. Appl. No. 16/899,843, filed Jun. 12, 2020, 11 pages.
Notice of Allowance mailed Feb. 9, 2022 for U.S. Appl. No. 15/882,858, filed Jan. 29, 2018, 9 pages.
Notice of Allowance mailed Nov. 10, 2021 for U.S. Appl. No. 15/882,858, filed Jan. 29, 2018, 6 pages.
Notice of Allowance mailed Mar. 11, 2020 for U.S. Appl. No. 14/465,194, filed Aug. 21, 2014, 29 Pages.
Notice of Allowance mailed Dec. 14, 2022 for U.S. Appl. No. 15/882,858, filed Jan. 29, 2018, 10pages.
Notice of Allowance mailed Jul. 15, 2021 for U.S. Appl. No. 15/882,858, filed Jan. 29, 2018, 2 pages.
Notice of Allowance mailed Jun. 15, 2018 for U.S. Appl. No. 15/799,621, filed Oct. 31, 2017, 27 pages.
Notice of Allowance mailed Dec. 16, 2020 for U.S. Appl. No. 16/593,446, filed Oct. 4, 2019, 44 pages.
Notice of Allowance mailed Jul. 18, 2022 for U.S. Appl. No. 16/550,905, filed Aug. 26, 2019, 7 pages.
Notice of Allowance mailed May 18, 2020 for U.S. Appl. No. 16/258,279, filed Jan. 25, 2019, 42 Pages.
Notice of Allowance mailed May 18, 2022 for U.S. Appl. No. 15/882,858, filed Jan. 29, 2018, 10 pages.
Notice of Allowance mailed Aug. 19, 2020 for U.S. Appl. No. 16/557,427, filed Aug. 30, 2019, 22 Pages.
Notice of Allowance mailed Jul. 19, 2019 for U.S. Appl. No. 16/258,409, filed Jan. 25, 2019, 36 Pages.
Notice of Allowance mailed Apr. 20, 2022 for U.S. Appl. No. 14/461,044, filed Aug. 15, 2014, 08 pages.
Notice of Allowance mailed May 20, 2020 for U.S. Appl. No. 16/389,419, filed Apr. 19, 2019, 28 Pages.
Notice of Allowance mailed Aug. 22, 2022 for U.S. Appl. No. 15/882,858, filed Jan. 29, 2018, 9 pages.
Notice of Allowance mailed Oct. 22, 2021 for U.S. Appl. No. 15/882,858, filed Jan. 29, 2018 , 8 pages.
Notice of Allowance mailed Aug. 23, 2021 for U.S. Appl. No. 15/974,430, filed May 8, 2018, 12 pages.
Notice of Allowance mailed Dec. 23, 2020 for U.S. Appl. No. 15/659,072, filed Jul. 25, 2017, 26 Pages.
Notice of Allowance mailed Mar. 24, 2023 for U.S. Appl. No. 17/141,646, filed Jan. 5, 2021, 4 pages.
Notice of Allowance mailed Sep. 24, 2020 for U.S. Appl. No. 16/292,609, filed Mar. 5, 2019, 20 Pages.
Notice of Allowance mailed Mar. 25, 2022 for U.S. Appl. No. 16/550,905, filed Aug. 26, 2019, 7 pages.
Notice of Allowance mailed Sep. 25, 2018 for U.S. Appl. No. 14/553,657, filed Nov. 25, 2014, 25 Pages.
Notice of Allowance mailed Jan. 28, 2019 for U.S. Appl. No. 16/023,300, filed Jun. 29, 2018, 31 pages.
Notice of Allowance mailed Jun. 28, 2021 for U.S. Appl. No. 15/882,858, filed Jan. 29, 2018, 18 pages.
Notice of Allowance mailed Nov. 3, 2022 for U.S. Appl. No. 16/899,843, filed Jun. 12, 2020, 10 pages.
Notice of Allowance mailed Mar. 30, 2018 for U.S. Appl. No. 14/539,773, filed Nov. 12, 2014, 17 pages.
Notice of Allowance mailed Nov. 30, 2018 for U.S. Appl. No. 15/799,628, filed Oct. 31, 2017, 19 Pages.
Notice of Allowance mailed Jul. 31, 2019 for U.S. Appl. No. 16/257,979, filed Jan. 25, 2019, 22 Pages.
Notice of Allowance received for U.S. Appl. No. 14/155,107, filed Aug. 30, 2019, 16 pages.
Office action for European Application No. 17835112.8, dated Feb. 11, 2022, 11 Pages.
Office Action for European Patent Application No. 19743717.1, mailed Apr. 11, 2022, 10 pages.
Office Action mailed Jan. 20, 2023 for Chinese Application No. 201780059093.7, filed Jul. 25, 2017, 16 pages.
Office Action mailed Sep. 28, 2022 for Chinese Application No. 201780059093.7, filed Jul. 25, 2017, 16 pages.
Partial Supplementary European Search Report for European Application No. 18879156.0, mailed Dec. 7, 2020, 9 pages.
Picard R.W., et al., "Affective Wearables," Proceedings of the IEEE 1st International Symposium on Wearable Computers, ISWC, Cambridge, MA, USA, Oct. 13-14, 1997, pp. 90-97.
Preinterview First Office Action mailed Jun. 24, 2020 for U.S. Appl. No. 16/785,680, filed Feb. 10, 2020, 90 Pages.

(56) References Cited

OTHER PUBLICATIONS

Rekimoto J., "GestureWrist and GesturePad: Unobtrusive Wearable Interaction Devices," ISWC Proceedings of the 5th IEEE International Symposium on Wearable Computers, 2001, 7 pages.
Restriction Requirement mailed Aug. 8, 2017 for U.S. Appl. No. 14/553,657, filed Nov. 25, 2014, 7 Pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Saponas T.S., et al., "Making Muscle-Computer Interfaces More Practical," CHI, Atlanta, Georgia, USA, Apr. 10-15, 2010, 4 pages.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sato M., et al., "Touche: Enhancing Touch Interaction on Humans, Screens, Liquids, and Everyday Objects," CHI, Austin, Texas, May 5-10, 2012, 10 pages.
Sauras-Perez P., et al., "A Voice and Pointing Gesture Interaction System for Supporting Human Spontaneous Decisions in Autonomous Cars," Clemson University, All Dissertations, May 2017, 174 pages.
Schowengerdt B.T., et al., "Stereoscopic Retinal Scanning Laser Display With Integrated Focus Cues for Ocular Accommodation," Proceedings of SPIE-IS&T Electronic Imaging, 2004, vol. 5291, pp. 366-376.
Final Office Action mailed Jul. 23, 2021 for U.S. Appl. No. 14/461,044, filed Aug. 15, 2014, 15 Pages.
Final Office Action mailed Sep. 23, 2020 for U.S. Appl. No. 15/816,435, filed Nov. 17, 2017, 70 Pages.
Final Office Action mailed Jan. 28, 2020 for U.S. Appl. No. 16/557,342, filed Aug. 30, 2019, 15 Pages.
Final Office Action mailed Jul. 28, 2017 for U.S. Appl. No. 14/505,836, filed Oct. 3, 2014, 52 Pages.
Final Office Action mailed Jun. 28, 2021 for U.S. Appl. No. 16/557,342, filed Aug. 30, 2019, 11 Pages.
Final Office Action mailed Nov. 29, 2019 for U.S. Appl. No. 15/659,072, filed Jul. 25, 2017, 36 Pages.
Final Office Action mailed Nov. 29, 2019 for U.S. Appl. No. 16/353,998, filed Mar. 14, 2019, 33 Pages.
Final Office Action received for U.S. Appl. No. 14/155,087 dated Dec. 16, 2016, 32 pages.
Final Office Action received for U.S. Appl. No. 14/155,087 dated Jul. 20, 2015, 27 pages.
Final Office Action received for U.S. Appl. No. 14/155,087 dated Jul. 8, 2016, 27 pages.
Final Office Action received for U.S. Appl. No. 14/155,087 dated Nov. 27, 2017, 40 pages.
Final Office Action received for U.S. Appl. No. 14/155,107 dated Dec. 19, 2016, 35 pages.
Final Office Action received for U.S. Appl. No. 14/155,107 dated Jan. 17, 2019, 46 pages.
Final Office Action received for U.S. Appl. No. 14/155,107 dated Jul. 16, 2015, 28 pages.
Final Office Action received for U.S. Appl. No. 14/155,107 dated Jul. 8, 2016, 31 pages.
Final Office Action received for U.S. Appl. No. 14/155,107 dated Nov. 27, 2017, 44 pages.
First Office Action mailed Nov. 25, 2020, for Canadian Application No. 2921954, filed Aug. 21, 2014, 4 pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hainich R.R., et al., "Chapter 10: Near-Eye Displays," Displays: Fundamentals Applications, AK Peters/CRC Press, 2011, 65 pages.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
Hornstein S., et al., "Maradin's Micro-Mirror—System Level Synchronization Notes," SID Digest, 2012, pp. 981-984.
"IEEE 100 The Authoritative Dictionary of IEEE Standards Terms," Seventh Edition, Standards Information Network IEEE Press, Dec. 2000, 3 pages.
International Search Report and Written Opinion for International Application No. PCT/US2014/017799, mailed May 16, 2014, 9 pages.
International Search Report and Written Opinion for International Application No. PCT/US2014/037863, mailed Aug. 21, 2014, 10 pages.
International Preliminary Report on Patentability for International Application No. PCT/US2014/017799, mailed Sep. 3, 2015, 8 Pages.
International Preliminary Report on Patentability for International Application No. PCT/US2014/037863, mailed Nov. 26, 2015, 8 pages.
International Preliminary Report on Patentability for International Application No. PCT/US2014/052143, mailed Mar. 3, 2016, 7 pages.
International Preliminary Report on Patentability for International Application No. PCT/US2014/067443, mailed Jun. 9, 2016, 7 pages.
International Preliminary Report on Patentability for International Application No. PCT/US2015/015675, mailed Aug. 25, 2016, 8 Pages.
International Preliminary Report on Patentability for International Application No. PCT/US2017/043686, mailed Feb. 7, 2019, 8 pages.
International Preliminary Report on Patentability for International Application No. PCT/US2017/043693, mailed Feb. 7, 2019, 7 Pages.
International Preliminary Report on Patentability for International Application No. PCT/US2017/043791, mailed Feb. 7, 2019, 9 Pages.
International Preliminary Report on Patentability for International Application No. PCT/US2017/043792, mailed Feb. 7, 2019, 8 Pages.
International Preliminary Report on Patentability for International Application No. PCT/US2018/056768, mailed Apr. 30, 2020, 7 pages.
International Preliminary Report on Patentability for International Application No. PCT/US2018/061409, mailed May 28, 2020, 10 pages.
International Preliminary Report on Patentability for International Application No. PCT/US2019/015174, mailed Aug. 6, 2020, 7 pages.
International Preliminary Report on Patentability for International Application No. PCT/US2019/015183, mailed Aug. 6, 2020, 7 pages.

(56) References Cited

OTHER PUBLICATIONS

International Preliminary Report on Patentability for International Application No. PCT/US2019/015238, mailed Aug. 6, 2020, 7 pages.
International Preliminary Report on Patentability for International Application No. PCT/US2019/028299, mailed Dec. 10, 2020, 11 pages.
International Preliminary Report on Patentability for International Application No. PCT/US2019/031114, mailed Nov. 19, 2020, 16 pages.
International Preliminary Report on Patentability for International Application No. PCT/US2019/034173, mailed Dec. 10, 2020, 9 pages.
International Preliminary Report on Patentability for International Application No. PCT/US2019/046351, mailed Feb. 25, 2021, 8 pages.
International Preliminary Report on Patentability for International Application No. PCT/US2019/049094, mailed Mar. 11, 2021, 24 Pages.
International Preliminary Report on Patentability for International Application No. PCT/US2019/052131, mailed on Apr. 1, 2021, 8 pages.
International Preliminary Report on Patentability for International Application No. PCT/US2019/052151, mailed Apr. 1, 2021, 9 pages.
Al-Jumaily A., et al., "Electromyogram(EMG) Driven System based Virtual Reality for Prosthetic and Rehabilitation Devices," Proceedings of the 11th Internationalconference on Information Integration Andweb-Based Applications & Services, Jan. 1, 2009, pp. 582-586.
Al-Mashhadany Y.I., "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages.
Ai-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Amitai Y., "p. 27: A Two-Dimensional Aperture Expander for Ultra-Compact, High-Performance Head-Worn Displays," SID Symposium Digest of Technical Papers, 2005, vol. 36 (1), pp. 360-363.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Ayras P., et al., "Exit Pupil Expander With a Large Field of View Based on Diffractive Optics," Journal of the SID, 2009, vol. 17 (8), pp. 659-664.
Bailey ct al., Wearable Muscle Interface Systems, Devices and Methods That Interact With Content Displayed on an Electronic Display, Office Action mailed Mar. 31, 2015, for U.S. Appl. No. 14/155,107, 17 pages.
Bailey et al., "Muscle Interface Device and Method for Interacting With Content Displayed on Wearable Head Mounted Displays," Amendment filed Aug. 25, 2015, for U.S. Appl. No. 14/155,087, 10 pages.
Bailey et al., "Muscle Interface Device and Method for Interacting With Content Displayed on Wearable Head Mounted Displays," Amendment filed Aug. 9, 2016, for U.S. Appl. No. 14/155,087, 8 pages.
Bailey et al., "Muscle Interface Device and Method for Interacting With Content Displayed on Wearable Head Mounted Displays," Amendment filed May 17, 2016, for U.S. Appl. No. 14/155,087, 13 pages.
Bailey et al., "Muscle Interface Device and Method for Interacting With Content Displayed on Wearable Head Mounted Displays," Office Action dated Feb. 17, 2016, for U.S. Appl. No. 14/155,087, 16 pages.
Bailey et al., "Muscle Interface Device and Method for Interacting With Content Displayed on Wearable Head Mounted Displays," Office Action dated Jul. 20, 2015, for U.S. Appl. No. 14/155,087, 14 pages.
Bailey et al., "Muscle Interface Device and Method for Interacting With Content Displayed on Wearable Head Mounted Displays," Office Action dated Jul. 8, 2016, for U.S. Appl. No. 14/155,087, 16 pages.
Bailey et al., "Muscle Interface Device and Method for Interacting With Content Displayed on Wearable Head Mounted Displays," Office Action dated Mar. 31, 2015, for U.S. Appl. No. 14/155,087, 15 pages.
Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.
Bailey et al., "Wearable Muscle Interface Systems, Devices and Methods That Interact With. Content Displayed on an Electronic Display," Amendment filed Aug. 9, 2016, for U.S. Appl No. 14/155, 107, 8 pages.
Bailey et al., "Wearable Muscle Interface Systems, Devices and Methods That Interact With Content Displayed on an Electronic Display," Amendment filed May 11, 2016, for U.S. Appl. No. 14/155, 107, 15 pages.
Bailey et al., Wearable Muscle Interface Systems, Devices and Methods That Interact With Content Displayed on an Electronic Display/ Office Action mailed Feb. 11, 2016, for U.S. Appl. No. 14/155,107, 20 pages.
Bailey et al., Wearable Muscle Interface Systems, Devices and Methods That Interact With Content Displayed on an Electronic Display, Office Action mailed Jul. 16, 2015, for U.S. Appl. No. 14/155,107, 20 pages.
Bailey et al., Wearable Muscle Interface Systems. Devices and Methods That Interact With Content Displayed on an Electronic Display/ Office Action mailed Jul. 8, 2016, for U.S. Appl. No. 14/155,107, 21 pages.
Bailey., et al., "Wearable Muscle Interface Systems, Devices And Methods That Interact With Content Displayed On An Electronic Display," Office Action mailed Mar. 31, 2015, for U.S. Appl. No. 14/155,107, 17 pages.
Benko H., et al., "Enhancing Input On and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Chellappan K.V., et al., "Laser-Based Displays: A Review," Applied Optics, Sep. 1, 2010, vol. 49 (25), pp. F79-F98.
Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Communication Pursuant to Rule 164(1) EPC, Partial Supplementary European Search Report for European Application No. 14753949. 8, mailed Sep. 30, 2016, 7 pages.
Co-pending U.S. Appl. No. 15/659,072, inventors Patrick; Kaifosh et al., filed on Jul. 25, 2017.
Co-pending U.S. Appl. No. 15/816,435, inventors Ning; Guo et al., filed on Nov. 17, 2017.

(56) References Cited

OTHER PUBLICATIONS

Co-pending U.S. Appl. No. 15/882,858, inventors Stephen; Lake et al., filed on Jan. 29, 2018.
Co-pending U.S. Appl. No. 15/974,430, inventors Adam; Berenzweig et al., filed on May 8, 2018.
Co-pending U.S. Appl. No. 16/353,998, inventors Patrick; Kaifosh et al., filed on Mar. 14, 2019.
Co-pending U.S. Appl. No. 16/557,383, inventors Adam; Berenzweig et al., filed on Aug. 30, 2019.
Co-pending U.S. Appl. No. 16/557,427, inventors Adam; Berenzweig et al., filed on Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Co-Pending U.S. Appl. No. 16/430,299, filed Jun. 3, 2019, 42 Pages.
Corazza S., et al.," A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Non-Final Office Action mailed Apr. 9, 2019 for U.S. Appl. No. 16/258,409, filed Jan. 25, 2019, 71 Pages.
Non-Final Office Action mailed Aug. 11, 2021 for U.S. Appl. No. 16/577,207, filed Sep. 20, 2019, 35 Pages.
Non-Final Office Action mailed Sep. 11, 2019 for U.S. Appl. No. 14/465,194, filed Aug. 21, 2014, 72 Pages.
Non-Final Office Action mailed May 12, 2022 for U.S. Appl. No. 16/899,843, filed Jun. 12, 2020, 34 Pages.
Non-Final Office Action mailed Jun. 13, 2019 for U.S. Appl. No. 16/258,279, filed Jan. 25, 2019, 38 Pages.
Non-Final Office Action mailed Sep. 14, 2017 for U.S. Appl. No. 14/539,773, filed Nov. 12, 2014, 28 pages.
Non-Final Office Action mailed Aug. 15, 2018 for U.S. Appl. No. 14/465,194, filed Aug. 21, 2014, 64 Pages.
Non-Final Office Action mailed Jun. 15, 2020 for U.S. Appl. No. 16/292,609, filed Mar. 5, 2019, 26 Pages.
Non-Final Office Action mailed Jun. 15, 2020 for U.S. Appl. No. 16/557,342, filed Aug. 30, 2019, 46 Pages.
Non-Final Office Action mailed Jan. 16, 2020 for U.S. Appl. No. 16/389,419, filed Apr. 19, 2019, 26 Pages.
Non-Final Office Action mailed May 16, 2019 for U.S. Appl. No. 15/974,384, filed May 8, 2018, 13 Pages.
Non-Final Office Action mailed May 16, 2019 for U.S. Appl. No. 15/974,430, filed May 8, 2018, 12 Pages.
Non-Final Office Action mailed Aug. 17, 2017 for U.S. Appl. No. 14/465,194, filed Aug. 21, 2014, 81 Pages.
Non-Final Office Action mailed Dec. 17, 2018 for U.S. Appl. No. 16/137,960, filed Sep. 21, 2018, 10 pages.
Non-Final Office Action mailed Jan. 18, 2018 for U.S. Appl. No. 15/799,621, filed Oct. 31, 2017, 10 pages.
Non-Final Office Action mailed Nov. 19, 2019 for U.S. Appl. No. 16/577,207, filed Sep. 20, 2019, 32 Pages.
Non-Final Office Action mailed Aug. 20, 2020 for U.S. Appl. No. 15/974,454, filed May 8, 2018, 59 Pages.
Non-Final Office Action mailed Dec. 20, 2019 for U.S. Appl. No. 15/974,454, filed May 8, 2018, 41 Pages.
Non-Final Office Action mailed Jan. 22, 2020 for U.S. Appl. No. 15/816,435, filed Nov. 17, 2017, 35 Pages.
Non-Final Office Action mailed Jun. 22, 2017 for U.S. Appl. No. 14/461,044, filed Aug. 15, 2014, 21 Pages.
Non-Final Office Action mailed Oct. 22, 2019 for U.S. Appl. No. 16/557,342, filed Aug. 30, 2019, 16 Pages.
Non-Final Office Action mailed Dec. 23, 2019 for U.S. Appl. No. 16/557,383, filed Aug. 30, 2019, 53 Pages.
Non-Final Office Action mailed Dec. 23, 2019 for U.S. Appl. No. 16/557,427, filed Aug. 30, 2019, 52 Pages.
Non-Final Office Action mailed Feb. 23, 2017 for U.S. Appl. No. 14/505,836, filed Oct. 3, 2014, 54 Pages.
Non-Final Office Action mailed Jul. 23, 2020 for U.S. Appl. No. 16/593,446, filed Oct. 4, 2019, 28 pages.
Non-Final Office Action mailed May 24, 2019 for U.S. Appl. No. 16/353,998, filed Mar. 14, 2019, 20 Pages.
Non-Final Office Action mailed Feb. 25, 2021 for U.S. Appl. No. 14/461,044, filed Aug. 15, 2014, 17 Pages.
Non-Final Office Action mailed May 26, 2020 for U.S. Appl. No. 16/353,998, filed Mar. 14, 2019, 60 Pages.
Non-Final Office Action mailed Nov. 27, 2020 for U.S. Appl. No. 16/258,279, filed Jan. 25, 2019, 44 Pages.
Non-Final Office Action mailed Aug. 28, 2018 for U.S. Appl. No. 16/023,276, filed Jun. 29, 2018, 10 pages.
Non-Final Office Action mailed Aug. 28, 2018 for U.S. Appl. No. 16/023,300, filed Jun. 29, 2018, 11 pages.
Non-Final Office Action mailed Jun. 28, 2021 for U.S. Appl. No. 16/550,905, filed Aug. 26, 2019, 5 Pages.
Non-Final Office Action mailed Apr. 29, 2019 for U.S. Appl. No. 16/257,979, filed Jan. 25, 2019, 63 Pages.
Non-Final Office Action mailed Apr. 30, 2019 for U.S. Appl. No. 15/659,072, filed Jul. 25, 2017, 99 Pages.
Non-Final Office Action mailed Apr. 30, 2020 for U.S. Appl. No. 15/974,430, filed May 8, 2018, 57 Pages.
Non-Final Office Action mailed Dec. 30, 2019 for U.S. Appl. No. 16/593,446, filed Oct. 4, 2019, 43 pages.
Non-Final Office Action mailed Jun. 30, 2016 for U.S. Appl. No. 14/505,836, filed Oct. 3, 2014, 37 Pages.
Non-Final Office Action mailed Oct. 30, 2019 for U.S. Appl. No. 15/882,858, filed Jan. 29, 2018, 22 Pages.
Non-Final Office Action received for U.S. Appl. No. 14/155,087 dated Aug. 16, 2016, 28 pages.
Non-Final Office Action received for U.S. Appl. No. 14/155,087 dated Aug. 7, 2017, 28 pages.
Non-Final Office Action received for U.S. Appl. No. 14/155,087 dated Feb. 17, 2016, 26 pages.
Non-Final Office Action received for U.S. Appl. No. 14/155,087 dated Mar. 31, 2015, 22 pages.
Non-Final Office Action received for U.S. Appl. No. 14/155,107 dated Aug. 17, 2016, 37 pages.
Non-Final Office Action received for U.S. Appl. No. 14/155,107 dated Aug. 7, 2017, 34 pages.
Non-Final Office Action received for U.S. Appl. No. 14/155,107 dated Feb. 11, 2016, 42 pages.
Non-Final Office Action received for U.S. Appl. No. 14/155,107 dated Jul. 13, 2018, 45 pages.
Non-Final Office Action received for U.S. Appl. No. 14/155,107 dated Mar. 31, 2015, 26 pages.
Notice of Allowance mailed Feb. 1, 2023 for U.S. Appl. No. 17/141,646, filed Jan. 5, 2021, 7 pages.
Notice of Allowance mailed May 1, 2019 for U.S. Appl. No. 16/137,960, filed Sep. 21, 2018, 14 pages.
Notice of Allowance mailed Nov. 2, 2020 for U.S. Appl. No. 15/974,454, filed May 8, 2018, 24 Pages.

(56) References Cited

OTHER PUBLICATIONS

Corrected Notice of Allowance mailed Nov. 14, 2023 for U.S. Appl. No. 17/979,735, filed Nov. 2, 2022, 6 pages.
Notice of Allowance mailed May 30, 2023 for U.S. Appl. No. 17/576, 815, filed Jan. 14, 2022, 8 pages.
Notice of Allowance mailed Oct. 30, 2023 for U.S. Appl. No. 17/979,735, filed Nov. 2, 2022, 11 pages.
Non-Final Office Action mailed May 22, 2025 for U.S. Appl. No. 18/908,662, filed Oct. 7, 2024, 13 pages.
Non-Final Office Action mailed Apr. 30, 2025 for U.S. Appl. No. 18/887,033, filed Sep. 16, 2024, 28 pages.
Gargiulo G., et al., "Giga-Ohm High-Impedance FET Input Amplifiers for Dry Electrode Biosensor Circuits and Systems," Integrated Microsystems: Electronics, Photonics, and Biotechnolgy, Dec. 19, 2017, 41 Pages, Retrieved from the Internet: URL: https://www.researchgate.net/profile/Alistair_Mcewan/publication/255994293_Gigaohm_high_impedance_FETinput_amplifiers_for_dry_electrode_biosensor_circuits_and_systems/links/0f31753a7d0287f5f7000000/Giga-ohm-highimpedance-FET-input-amplifiers-for-dry-electrode-biosensor-circuits-andsystems.pdf.

\* cited by examiner

| Gesture Identification Flag | Function |
|---|---|
| 00000001 | REWIND ⏬ |
| 00000010 | PLAY ▲ |
| 00000011 | STOP ■ |
| 00000100 | FAST FORWARD ⏫ |
| ... | ... |

WEARABLE DEVICES AND ASSOCIATED BAND STRUCTURES FOR SENSING NEUROMUSCULAR SIGNALS USING SENSOR PAIRS IN RESPECTIVE PODS WITH COMMUNICATIVE PATHWAYS TO A COMMON PROCESSOR

CROSS-REFERENCE TO RELATED APPLICATIONS

This application is a continuation-in-part of U.S. patent application Ser. No. 14/461,044, filed on Aug. 15, 2014 (now U.S. Pat. No. 11,426,123), entitled "Systems, Articles And Methods For Signal Routing In Wearable Electronic Devices That Detect Muscle Activity Of A User Using A Set Of Discrete And Separately Enclosed Pod Structures," which claims the benefit of U.S. Provisional Patent Application Ser. No. 61/866,960, filed Aug. 16, 2013, entitled "Systems, Articles And Methods For Signal Routing In Wearable Electronic Devices." Each of these related applications is hereby fully incorporated by reference in its respective entirety.

This application is also a continuation-in part of U.S. patent application Ser. No. 15/882,858, filed on Jan. 29, 2018, entitled "Systems, Articles And Methods For Wearable Electronic Devices Employing Contact Sensors," which is a continuation of U.S. patent application Ser. No. 14/505, 836, filed Oct. 3, 2014, entitled "Systems, Articles And Methods For Wearable Electronic Devices Employing Contact Sensors," which claims the benefit of U.S. Provisional Patent Application Ser. No. 61/887,193, filed Oct. 4, 2013, entitled "Systems, Articles And Methods For Smart Watches"; U.S. Provisional Patent Application Ser. No. 61/887,812, filed Oct. 7, 2013, entitled "Systems, Articles And Methods For Wristwatches With Sensing Capability"; U.S. Provisional Patent Application Ser. No. 61/891,694, filed Oct. 16, 2013, entitled "Systems, Articles And Methods For Wristwatches With Sensing Capability"; and U.S. Provisional Patent Application Ser. No. 61/897,097, filed Oct. 29, 2013, entitled "Systems, Articles And Methods For Wearable Electronic Devices Employing Capacitive Sensors." Each of these related applications is hereby fully incorporated by reference in its respective entirety.

This application is additionally a continuation-in part of U.S. patent application Ser. No. 16/899,843, filed on Jun. 12, 2020, entitled "Systems, Articles, And Methods For Human-Electronics Interfaces," which is a continuation of and claims the benefit of U.S. patent application Ser. No. 14/465, 194, filed Aug. 21, 2014, entitled "Systems, Articles, And Methods For Human-Electronics Interfaces.". Each of these related applications is hereby fully incorporated by reference in its respective entirety.

This application is further a continuation-in part of U.S. patent application Ser. No. 16/550,905, filed on Aug. 26, 2019, entitled "Systems, Articles, And Methods For Capacitive Electromyography Sensors," which is a continuation of U.S. patent application Ser. No. 16/137,960, filed Sep. 21, 2018 (now U.S. Pat. No. 10,429,928), entitled "Systems, Articles, And Methods For Capacitive Electromyography Sensors," which is a continuation of U.S. patent application Ser. No. 15/799,621, filed Oct. 31, 2017 (now U.S. Pat. No. 10,101,809)), entitled "Systems, Articles, And Methods For Capacitive Electromyography Sensors," which is a divisional of U.S. patent application Ser. No. 14/539,773, filed Nov. 12, 2014 (now U.S. Pat. No. 10,042,422), entitled "Systems, Articles, And Methods For Capacitive Electromyography Sensors," which claims the benefit of U.S. Provisional Patent Application Ser. No. 61/903,238, filed Nov. 12, 2013, entitled "Systems, Articles, And Methods For Capacitive Electromyography Sensors." Each of these related applications is hereby fully incorporated by reference in its respective entirety.

This application is as well a continuation-in part of U.S. patent application Ser. No. 17/141,646, filed on Jan. 5, 2021, entitled "Systems, Articles, And Methods For Electromyography Sensors," which is a continuation of U.S. patent application Ser. No. 16/292,609, filed Mar. 5, 2019 (now U.S. Pat. No. 10,898,101), entitled "Systems, Articles, And Methods For Electromyography Sensors," which is a continuation of U.S. patent application Ser. No. 15/799,628, filed Oct. 31, 2017 (now U.S. Pat. No. 10,251,577), entitled "Systems, Articles, And Methods For Capacitive Electromyography Sensors," which is a divisional of U.S. patent application Ser. No. 14/553,657, filed Nov. 25, 2014 (now U.S. Pat. No. 10,188,309), entitled "Systems, Articles, And Methods For Capacitive Electromyography Sensors," which claims the benefit of U.S. Provisional Patent Application Ser. No. 61/909,786, filed Nov. 27, 2013, entitled "Systems, Articles, And Methods For Capacitive Electromyography Sensors." Each of these related applications is hereby fully incorporated by reference in its respective entirety.

This application is related to U.S. patent application Ser. No. 16/696,760, filed on Nov. 26, 2019 (now U.S. Pat. No. 11,009,951), entitled "Wearable Muscle Interface Systems, Devices And Methods That Interact With Content Displayed On An Electronic Display," which is a continuation of U.S. patent application Ser. No. 14/155,107, filed Jan. 14, 2014 (now U.S. Pat. No. 10,528,135), entitled "Wearable Muscle Interface Systems, Devices And Methods That Interact With Content Displayed On An Electronic Display," which claims the benefit of U.S. Provisional Patent Application Ser. No. 61/752,226, filed Jan. 14, 2013, entitled "Muscle Interface Device And Method For Interacting With Content Displayed On Wearable Head Mounted Displays." Each of these related applications is hereby fully incorporated by reference in its respective entirety.

TECHNICAL FIELD

The present systems, articles and methods generally relate to wearable electronic devices and particularly relate to systems, articles and methods for signal routing in wearable electronic devices.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems (except, in some cases, during charging); however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices.

However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hand(s). For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Two exemplary design factors for wearable electronic devices that may be of importance to users are: functionality and affordability. The functionality of a wearable electronic device is, of course, dependent on the electric circuitry (i.e., the electrical/electronic components and the electrical wiring therebetween) that the device employs. Users of wearable electronic devices may desire more sophisticated functionality, but more sophisticated functionality may adversely affect affordability. Affordability is directly tied to manufacturability, and more sophisticated functionality may necessitate more expensive electric circuitry or manufacturing processes that drive up manufacturing costs. There is a need in the art for wearable electronic device designs that provide desired functionality without compromising affordability.

A wearable electronic device may provide direct functionality for a user (such as audio playback, data display, computing functions, etc.) or it may provide electronics to interact with, receive information from, or control another electronic device. For example, a wearable electronic device may include sensors that are responsive to (i.e., detect and provide one or more signal(s) in response to detecting) inputs effected by a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, articles, and methods may be applied to wearable HCIs, but may also be applied to any other form of wearable human-electronics interface.

Human-electronics interfaces that employ EMG, a process for detecting and processing the electrical signals generated by muscle activity, have been proposed in the art. For example, U.S. Pat. Nos. 6,244,873 and 8,170,656 describe such systems. Characteristics that are common to these known proposals will now be described. Typically, such systems (e.g., the two examples listed above) employ a wearable EMG device that exclusively controls specific, pre-defined functions of a specific, pre-defined "receiving" electronic device. The term "pre-defined" here refers to information that is programmed into the wearable EMG device (or with which the wearable EMG device is programmed) in advance of a following interaction with a receiving device. The wearable EMG device typically includes built-in EMG sensors that detect muscle activity of a user and an on-board processor that determines when the detected muscle activity corresponds to a pre-defined gesture. The on-board processor maps each pre-defined gesture to a particular pre-defined function of the pre-defined receiving device. In other words, the wearable EMG device stores and executes pre-defined mappings between detected gestures and receiving device functions. The receiving device function(s) is/are then controlled by one or more "command(s)" that is/are output by the wearable EMG device. Each command that is output by the wearable EMG device has already been formulated to control (and is therefore limited to exclusively controlling) a specific function of a specific receiving device prior to being transmitted by the wearable EMG device.

Additionally, U.S. Pat. Nos. 6,244,873 and 8,170,656 both describe proposals in which a user dons a wearable EMG device and performs physical gestures to control functions of a separate electronic device. In both cases, the separate electronic device is not itself a wearable electronic device, so true hands-free operation of and/or access to the separate electronic device is not achieved. For example, both cases describe using EMG signals to control mobile phones, smart phones, computers, laptop computers, and so on, all of which still typically require the user to use their hand(s) to carry the device and/or to orient the device in such a way that the user may see, access, receive feedback from, and/or generally interact with a display screen on the device.

The wearable EMG devices proposed in the art are hard-coded to map pre-defined gestures to specific, pre-defined commands controlling specific, pre-defined functions of a specific, pre-defined receiving device. The wearable EMG devices proposed in the art are programmed with information about the specific receiving device (and/or about a specific application within the specific receiving device) under their control such that the wearable EMG devices proposed in the art output commands that include instructions that are specifically formulated for the specific receiving device (and/or the specific application within the specific receiving device). Thus, existing proposals for human-electronics interfaces that employ EMG are limited in their versatility because they employ a wearable EMG device that is hard-coded to control a specific electronic device (and/or a specific application within a specific electronic device). For such systems, the wearable EMG device needs to be modified/adapted for each distinct use (e.g., the wearable EMG device needs to be programmed with command signals that are specific to the receiving device and/or specific to the application within the receiving device). Because the outputs (i.e., commands) provided by such wearable EMG devices are hard-coded with information about the function(s) of the receiving device(s), a user cannot use such a wearable EMG device to control any generic electronic device (or any generic application within an electronic device) without reprogramming/reconfiguring the wearable EMG device itself. A user who wishes to control multiple electronic devices (or multiple applications within a single electronic device, either simultaneously or in sequence) must use multiple such wearable EMG devices with each wearable EMG device separately controlling a different electronic device, or the user must re-program a single such wearable EMG device in between uses. There is a need in the art for a human-electronics interface employing EMG that overcomes these limitations.

The concept of a wristwatch with on-board computation capabilities and functionality beyond timekeeping (i.e., a "smart watch") has been around for decades. Seiko and Casio were building digital wristwatches with user-programmable memory and computing capability as far back as in the 1980s. However, at least as a consequence of their limited functionality, the initial designs for smart watches never took off in consumer markets.

Motivated by the availability of more advanced integrated circuit, display, and battery technologies, there has recently been a resurgence in the smart watch industry. Exemplary smart watches that are currently known to be under development include: the Apple Watch, the Samsung Galaxy Gear™, the Sony SmartWatch™, the Qualcomm Toq™, and the Pebble™ by Pebble Technology. Each of these examples provides (or is expected to provide) various functions and capabilities and employs a unique design and geometry. However, all of these designs are fundamentally similar in that they essentially emulate the design of a traditional wristwatch. That is, each design comprises a housing that is physically coupled to a strap or band that fits around the user's wrist, the housing having a display on one side and a back-plate proximate the user's wrist on the side opposite the display. Conforming to this generic arrangement is a design constraint for virtually any smart watch, as most smart watches are designed to resemble the traditional wristwatch as much as possible.

The back-plate that is common to all known wristwatch designs (both traditional and smart watches alike) provides structural support and protects the internal components (circuitry or gears, etc.) of the wristwatch from its environment. Otherwise, the back-plate that is common to all known wristwatch designs does not typically provide or enable other functions and/or capabilities of the wristwatch. Similarly, the strap or band (or similar, hereafter "watchstrap") that is common to virtually all known wristwatch designs (both traditional and smart watches alike) typically serves one purpose: holding the watch in position on the user's wrist. Beyond this, the watchstrap that is common to virtually all known wristwatch designs does not typically impart or enable any functionality or capability in the watch itself.

Solutions to the above-described drawbacks are provided below.

SUMMARY

A wearable electronic device may be summarized as including a set of pod structures that form physically coupled links of the wearable electronic device, wherein each pod structure in the set of pod structures is positioned adjacent and physically coupled to at least one other pod structure in the set of pod structures, and wherein the set of pod structures comprises at least two sensor pods and a processor pod, each of the at least two sensor pods comprising a respective sensor to in use detect inputs effected by a user and provide signals in response to the detected inputs, and the processor pod comprising a processor to in use process signals provided by each of the at least two sensor pods; and a plurality of communicative pathways to in use route signals provided by the at least two sensor pods to the processor pod, wherein each of the at least two sensor pods is communicatively coupled to the processor pod by at least one respective communicative pathway from the plurality of communicative pathways. Each of the at least two sensor pods may include a respective amplification circuit to in use amplify signals provided by the respective sensor.

The processor pod may include at least one analog-to-digital conversion ("ADC") circuit to in use convert analog signals provided by the at least two sensor pods into digital signals. The at least two sensor pods may include a first sensor pod and a second sensor pod, the first sensor pod communicatively coupled to the processor pod by a first communicative pathway from the plurality of communicative pathways and the second sensor pod communicatively coupled to the processor pod by a second communicative pathway from the plurality of communicative pathways, and: the first communicative pathway may include: a first portion to in use route analog signals output by the first sensor pod to the processor pod, and the second communicative pathway may include: a first portion to in use route analog signals output by the second sensor pod to the first sensor pod, and a second portion to in use route analog signals output by the second sensor pod from the first sensor pod to the processor pod. The at least two sensor pods may further include a third sensor pod, the third sensor pod communicatively coupled to the processor pod by a third communicative pathway from the plurality of communicative pathways, and the third communicative pathway may include: a first portion to in use route analog signals output by the third sensor pod to the second sensor pod; a second portion to in use route analog signals output by the third sensor pod from the second sensor pod to the first sensor pod; and a third portion to in use route analog signals output by the third sensor pod from the first sensor pod to the processor pod. The at least two sensor pods may further include a fourth sensor pod, the fourth sensor pod communicatively coupled to the processor pod by a fourth communicative pathway from the plurality of communicative pathways, and the fourth communicative pathway may include: a first portion to in use route analog signals output by the fourth sensor pod to the third sensor pod; a second portion to in use route analog signals output by the fourth sensor pod from the third sensor pod to the second sensor pod; a third portion to in use route analog signals output by the fourth sensor pod from the second sensor pod to the first sensor pod; and a fourth portion to in use route analog signals output by the fourth sensor pod from the first sensor pod to the processor pod.

Each of the at least two sensor pods may include a respective analog-to-digital conversion ("ADC") circuit to in use convert analog signals provided by the respective sensor into digital signals. The wearable electronic device may further include a clock signal line communicatively coupled to each pod structure in the set of pod structures and wherein the plurality of communicative pathways includes a digital signal bus that is communicatively coupled to the processor pod, wherein the at least two sensor pods include a first sensor pod and a second sensor pod, the first sensor pod communicatively coupled to the digital signal bus by a first communicative pathway from the plurality of communicative pathways and the second sensor pod communicatively coupled to the digital signal bus by a second communicative pathway from the plurality of communicative pathways. The at least two sensor pods may further include a third sensor pod, the third sensor pod communicatively coupled to the digital signal bus by a third communicative pathway from the plurality of communicative pathways. The at least two sensor pods may further include a fourth sensor pod, the fourth sensor pod communicatively coupled to the digital signal bus by a fourth communicative pathway from the plurality of communicative pathways.

The plurality of communicative pathways may include at least one power line and at least one ground line.

The wearable electronic device may further include at least one adaptive coupler, wherein each respective pod structure in the set of pod structures is adaptively physically coupled to at least one adjacent pod structure in the set of pod structures by at least one adaptive coupler. For each of the at least two sensor pods, the sensor may include an electromyography sensor to in use detect muscle activity by the user and provide signals in response to the detected muscle activity.

The processor pod may further include: a sensor to in use detect inputs effected by the user and provide analog signals in response to the detected inputs; an amplification circuit to in use amplify analog signals provided by the sensor; and an analog-to-digital conversion ("ADC") circuit to in use convert analog signals into digital signals. Each pod structure in the set of pod structures may include a respective housing formed of a substantially rigid material and having a respective inner volume, and, for each of the at least two sensor pods, the sensor may be positioned on or proximate a surface of the housing, while for the processor pod, the processor may be positioned in the inner volume of the housing, and each communicative pathway in the plurality of communicative pathways may include a respective first portion in the inner volume of the housing of a respective first pod structure in the set of pod structures, a respective second portion in the inner volume of the housing of a respective second pod structure in the set of pod structures, and a respective third portion that extends between the housing of the respective first pod structure in the set of pod structures and the housing of the respective second pod structure in the set of pod structures.

At least one communicative pathway in the plurality of communicative pathways may be selected from the group consisting of: an electrically conductive pathway and an optical pathway. At least one communicative pathway in the plurality of communicative pathways may comprise or be a component of a flexible printed circuit board. Each pod structure in the set of pod structures may be positioned adjacent and in between two other pod structures in the set of pod structures and physically coupled to the two other pod structures in the set of pod structures, and the set of pod structures may form a perimeter of an annular configuration.

A wearable electronic device may be summarized as including: a set of pod structures that form physically coupled links of the wearable electronic device, the set of pod structures comprising a plurality of sensor pods and a processor pod, each sensor pod comprising a respective sensor to in use detect inputs effected by a user and provide signals in response to the detected inputs, and the processor pod comprising a processor to in use process signals provided by the plurality of sensor pods, wherein each pod structure in the set of pod structures is positioned adjacent and physically coupled to at least one other pod structure in the set of pod structures; and a plurality of communicative pathways to in use route signals provided by the plurality of sensor pods to the processor pod, wherein each pod structure in the set of pod structures is communicatively coupled to at least one adjacent pod structure in the set of pod structures by a respective communicative pathway from the plurality of communicative pathways to in use serially route signals provided by each sensor pod to the processor pod via successive ones of adjacent pod structures in the set of pod structures by respective communicative pathways in the plurality of communicative pathways.

The plurality of sensor pods may include: a first sensor pod positioned adjacent and physically coupled to the processor pod; a second sensor pod positioned adjacent and physically coupled to the processor pod; a third sensor pod positioned adjacent and physically coupled to the first sensor pod; and a fourth sensor pod positioned adjacent and physically coupled to the second sensor pod. The first sensor pod may be communicatively coupled to the processor pod by a first communicative pathway in the plurality of communicative pathways to in use route signals provided by the first sensor pod to the processor pod. The second sensor pod may be communicatively coupled to the processor pod by a second communicative pathway in the plurality of communicative pathways to in use route signals provided by the second sensor pod to the processor pod. The third sensor pod may be communicatively coupled to the processor pod by a third communicative pathway in the plurality of communicative pathways to in use route signals output by the third sensor pod from the third sensor pod via the first sensor pod to the processor pod. The fourth sensor pod may be communicatively coupled to the processor pod by a fourth communicative pathway in the plurality of communicative pathways to in use route signals output by the fourth sensor pod from the fourth sensor pod via the second sensor pod to the processor pod. The third communicative pathway may include at least a portion of the first communicative pathway and the fourth communicative pathway may include at least a portion of the second communicative pathway.

The processor pod may further include an analog-to-digital conversion ("ADC") circuit to in use convert analog signals into digital signals. Each sensor pod in the plurality of sensor pods may include a respective analog-to-digital conversion ("ADC") circuit to in use convert analog signals into digital signals. The plurality of communicative pathways may include at least one power line and at least one ground line.

The wearable electronic device may further include: at least one adaptive coupler, wherein each respective pod structure in the set of pod structures is adaptively physically coupled to at least one adjacent pod structure in the set of pod structures by at least one adaptive coupler. For each sensor pod in the plurality of sensor pods: the sensor may include an electromyography sensor to in use detect muscle activity by the user and provide signals in response to the detected muscle activity. The processor pod may include a sensor to in use detect inputs effected by the user and provide signals in response to the detected inputs.

Each pod structure in the set of pod structures may include a respective housing formed of a substantially rigid material and having a respective inner volume, and, for each sensor pod in the plurality of sensor pods, the sensor may be positioned on or proximate a surface of the housing, while for the processor pod, the processor may be positioned in the inner volume of the housing, and each communicative pathway in the plurality of communicative pathways may include a respective first portion in the inner volume of the housing of a respective first pod structure in the set of pod structures, a respective second portion in the inner volume of the housing of a respective second pod structure in the set of pod structures, and a respective third portion that extends between the housing of the respective first pod structure in the set of pod structures and the housing of the respective second pod structure in the set of pod structures.

At least one communicative pathway in the plurality of communicative pathways may be selected from the group consisting of: an electrically conductive pathway and an optical pathway. At least one communicative pathway in the plurality of communicative pathways may include or be a component of a flexible printed circuit board. Each pod structure in the set of pod structures may be positioned adjacent and in between two other pod structures in the set of pod structures and physically coupled to the two other pod structures in the set of pod structures, and the set of pod structures may form a perimeter of an annular configuration.

A method of operating a wearable electronic device that comprises a set of pod structures and a plurality of communicative pathways, the set of pod structures including a plurality of sensor pods and a processor pod, wherein each sensor pod in the plurality of sensor pods comprises a respective sensor and the processor pod comprises a processor, and wherein each pod structure in the set of pod structures is positioned adjacent and physically coupled to at least one other pod structure in the set of pod structures, may be summarized as including: detecting inputs effected by a user by the sensor in at least one sensor pod in the plurality of sensor pods; providing signals in response to the detected inputs by the sensor in the at least one sensor pod in the plurality of sensor pods; serially routing the signals via successive ones of adjacent pod structures in the set of pod structures by respective communicative pathways in the plurality of communicative pathways until the signals are routed to the processor pod; and processing the signals by the processor in the processor pod.

Providing signals in response to the detected inputs by the sensor in the at least one sensor pod in the plurality of sensor pods may include providing analog signals in response to the detected inputs by the sensor in the at least one sensor pod in the plurality of sensor pods. Serially routing the signals via successive ones of adjacent pod structures in the set of pod structures by respective communicative pathways in the plurality of communicative pathways until the signals are routed to the processor pod may include serially routing the analog signals via successive ones of adjacent pod structures in the set of pod structures by respective communicative pathways in the plurality of communicative pathways until the analog signals are routed to the processor pod. The processor pod may include an analog-to-digital conversion ("ADC") circuit, and the method further include converting the analog signals into digital signals by the ADC circuit in the processor pod, wherein processing the signals by the processor in the processor pod includes processing the digital signals by the processor in the processor pod.

Providing signals in response to the detected inputs by the sensor in the at least one sensor pod in the plurality of sensor pods may include providing analog signals in response to the detected inputs by the sensor in the at least one sensor pod in the plurality of sensor pods, and each sensor pod in the plurality of sensor pods may include a respective analog-to-digital conversion ("ADC") circuit, with the method further including: converting the analog signals provided by the sensor in the at least one sensor pod in the plurality of sensor pods into digital signals by the ADC circuit in the at least one sensor pod in the plurality of sensor pods, wherein: serially routing the signals via successive ones of adjacent pod structures in the set of pod structures by respective communicative pathways in the plurality of communicative pathways until the signals are routed to the processor pod includes serially routing the digital signals via successive ones of adjacent pod structures in the set of pod structures by respective communicative pathways in the plurality of communicative pathways until the digital signals are routed to the processor pod, and processing the signals by the processor in the processor pod includes processing the digital signals by the processor in the processor pod.

The respective sensor in each sensor pod in the plurality of sensor pods may include an electromyography sensor, and detecting inputs effected by a user by the sensor in at least one sensor pod in the plurality of sensor pods may include detecting muscle activity of the user by the electromyography sensor in at least one sensor pod in the plurality of sensor pods and providing signals in response to the detected inputs by the sensor in the at least one sensor pod in the plurality of sensor pods may include providing signals in response to muscle activity of the user by the sensor in the at least one sensor pod in the plurality of sensor pods.

In some embodiments, the present systems, articles and methods generally relate to wearable electronic devices having on-board sensors, and particularly relate to wearable electronic devices that incorporate one or more contact sensor(s) of any one or more of a variety of different types.

The human body generates electrical signals that may be non-invasively sensed by sensors that physically contact the user's skin (either directly or through an electrically insulative medium such as a dielectric layer). Such "contact sensors" may couple to these electrical signals through, for example, capacitive coupling or via non-capacitive coupling for instance resistive coupling and/or galvanic coupling. This property is exploited in, for example, electromyography ("EMG") sensors that detect the electrical signals produced by a user's muscles when the user performs a physical gesture. The human body also has a capacitance of its own (i.e., the "body capacitance") that enables it to store charge and act as a capacitor. This property is exploited in some capacitive touch sensing technologies, such as in the capacitive touchscreens of many portable electronic devices today. Capacitive touchscreens employ a conductive screen that is excited by an electrical signal at a single, fixed frequency. When a user touches the screen, the body capacitance of the user causes changes in this signal that are detected by a sensing circuit. Throughout the remainder of this specification and the appended claims, capacitive touch sensors that employ a single electrical frequency are referred to as "single-frequency capacitive touch sensors."

Recently, a new type of touch sensing technology that employs a range of electrical signal frequencies has been developed by Disney Research. Dubbed "Touché," this new type of touch sensing technology takes advantage of the fact that different types of touch events may have different effects at different signal frequencies. The electrical signal that is used to excite the conductive screen is swept over a continuous range of electrical signal frequencies and the sensing circuit monitors changes in the corresponding return signal at various frequencies over the sweep. In this way, a frequency profile of the touch event is established, where each detectably-different type of touch event (e.g., one finger, two finger, pinch, swipe, etc.) produces a unique frequency profile that may be identified using, for example, machine intelligence algorithms, pattern recognition algorithms, and the like. Throughout the remainder of this specification and the appended claims, capacitive touch sensors that sweep over a continuous range of electrical frequencies in this manner are referred to as "swept frequency capacitive touch sensors." Swept frequency capacitive touch sensors are described in, for example, Sato et al., "Touché: Enhancing Touch Interaction on Humans, Screens, Liquids, and Everyday Objects," presented at CHI '12, May 5-10, 2012 and available online: http://www.disneyresearch.com/project/touche-touch-and-gesture-sensing-for-the-real-world/ (last accessed Sep. 29, 2014), which is incorporated by reference herein in its entirety.

Each different type of capacitive sensor described above may be implemented by substantially similar hardware. Essentially, at least one electrically conductive element (such as a plate of electrically conductive material or a conductive screen) is provided as a contact sensor or electrode and is electrically coupled to circuitry (e.g., electrical or electronic circuitry) by at least one electrically communicative pathway. Depending on the implementation, the electrically conductive material of an electrode may be bare and physically contact the skin of the user directly, or the electrically conductive material may be coated with an insulative layer (such as a dielectric layer) that physically couples to the skin of the user. At least one aspect that is unique to each of the different sensor types described above is the nature and function of the circuitry to which the at least one electrically conductive element is coupled.

In general, sensors that are responsive to and detect signals produced, generated, or otherwise effected by the human body are referred to herein as "biometric sensors." Contact sensors are examples of biometric sensors that couple to the user's skin, and capacitive sensors (e.g., capacitive biometric sensors) are examples of contact sensors; however, other forms of contact sensors may couple to the user's skin through other means, such as through resistive coupling.

A wristwatch may be summarized as including: a housing having a top surface that includes a display and an inner cavity that includes a timekeeping device; and a watchstrap that is flexible and carries a set of components and a set of communication pathways, the watchstrap physically coupled to the housing, wherein the set of components includes at least one contact sensor (e.g., at least one biometric contact sensor) and at least one communication terminal, and wherein the at least one communication terminal is communicatively coupled to the at least one contact sensor by at least one communication pathway in the set of communication pathways. The set of components carried by the watchstrap may further include at least one component selected from the group consisting of: a battery, an inductive charging element, an inertial sensor, a pedometer, a compass, a Global Position System unit, an altimeter, a digital processor, and a non-transitory processor-readable storage medium. The set of components carried by the watchstrap may include a digital processor communicatively coupled to the at least one contact sensor and a non-transitory processor-readable storage medium communicatively coupled to the digital processor, and the non-transitory processor-readable storage medium may store processor-executable contact sensing instructions that, when executed by the digital processor, cause the digital processor to process signals received from the at least one contact sensor.

The at least one contact sensor may be carried on a first surface of the watchstrap, the first surface in physical contact with a user when the watchstrap is worn around a wrist of the user. The set of components carried by the watchstrap may include at least one component that is carried on a second surface of the watchstrap, the second surface opposite the first surface. The set of components carried by the watchstrap may include at least one component that is carried within the watchstrap.

The at least one contact sensor may include at least one capacitive biometric sensor selected from the group consisting of: an electromyography sensor, a single-frequency capacitive touch sensor, and a multi-frequency capacitive touch sensor. The display may include at least one of: a window, a digital display screen, and/or a touchscreen. The at least one communication terminal may include a wireless communication terminal.

The at least one communication terminal may include a wired communication terminal. The housing may include circuitry and at least one component in the set of components carried by the watchstrap may be communicatively coupled to the circuitry of the housing through the wired communication terminal.

A composition of the watchstrap may be selected from the group consisting of: a single piece of flexible material, multiple layers of flexible material, a single piece of elastic material, multiple layers of elastic material, and a set of substantially rigid links physically coupled together by at least one adaptive coupler. Communicative coupling between the at least one contact sensor and the at least one communication terminal may be mediated by at least one additional component in the set of components carried by the watchstrap.

A watchstrap for integration into a wristwatch may be summarized as including: a flexible strap; a set of communication pathways carried by the strap; and a set of components carried by the strap, the set of components including at least one contact sensor (e.g., at least one biometric contact sensor) and at least one communication terminal, wherein the at least one communication terminal is communicatively coupled to the at least one contact sensor by at least one communication pathway in the set of communication pathways. The set of components carried by the strap may further include any or all of: a battery communicatively coupled to the at least one contact sensor by at least one communication pathway in the set of communication pathways; an inductive charging element communicatively coupled to the at least one contact sensor by at least one communication pathway in the set of communication pathways; an inertial sensor communicatively coupled to the at least one communication terminal by at least one communication pathway in the set of communication pathways; and/or a pedometer communicatively coupled to the at least one communication terminal by at least one communication pathway in the set of communication pathways.

The set of components carried by the strap may include: a digital processor communicatively coupled to the at least one contact sensor; and a non-transitory processor-readable storage medium communicatively coupled to the digital processor, wherein the non-transitory processor-readable storage medium stores processor-executable contact sensing instructions that, when executed by the digital processor, cause the digital processor to process signals received from the at least one contact sensor.

The at least one contact sensor may include at least one capacitive biometric sensor selected from the group consisting of: an electromyography sensor, a single-frequency capacitive touch sensor, and a multi-frequency capacitive touch sensor. The strap may be sized and dimensioned to mate with a wristwatch housing. The at least one contact sensor may include multiple contact sensors. The at least one communication terminal may include at least one of a wireless communication terminal and/or a wired communication terminal. Communicative coupling between the at least one contact sensor and the at least one communication terminal may be mediated by at least one additional component in the set of components carried by the strap.

The strap may include a first surface and a second surface, and at least one component in the set of components carried by the strap may be carried on the first surface of the strap and at least one component in the set of components carried by the strap may be carried on the second surface of the strap. At least one component in the set of components carried by the strap may be carried within the strap.

A wristwatch may be summarized as including: a wristband; a housing physically coupled to the wristband, the housing comprising: a top surface that includes a display; and a back-plate formed of a substantially rigid material and positioned underneath the top surface, wherein the back-plate and the top surface together define a cavity therebetween, and wherein the back-plate includes a first surface that carries at least one contact sensor (e.g., at least one biometric contact sensor) and a second surface that carries circuitry, the second surface opposite the first surface and the circuitry contained within the cavity and communicatively coupled to the at least one contact sensor; and a digital processor contained within the cavity, the digital processor communicatively coupled to the circuitry. The housing may further comprise at least one sidewall formed of a substantially rigid material, the at least one sidewall providing physical coupling between the top surface and the back-plate, wherein the top surface, the back-plate, and the at least one sidewall form a hollow volume that encompasses the cavity.

The housing may have a geometry with a two-dimensional projection that is selected from the group consisting of: substantially square, substantially rectangular, substantially circular, and substantially polygonal. The housing may be substantially planar.

The housing may further comprise at least one component selected from the group consisting of: a battery contained within the cavity, a wireless transmitter, an inductive charging element contained within the cavity, an inertial sensor contained within the cavity, a pedometer contained within the cavity, and a non-transitory processor-readable storage medium contained within the cavity. The housing may include a non-transitory processor-readable storage medium contained within the cavity, and the non-transitory processor-readable storage medium may store processor-executable contact sensing instructions that, when executed by the digital processor, cause the digital processor to process signals received from the at least one contact sensor. The at least one component may be carried by the second surface of the back-plate.

The at least one contact sensor may include at least one capacitive biometric sensor selected from the group consisting of: an electromyography sensor, a single-frequency capacitive touch sensor, and a multi-frequency capacitive touch sensor. The display may include at least one of: a window, a digital display screen, and/or a touchscreen. The circuitry carried by the second surface of the back-plate may be communicatively isolated from the display, and the circuitry carried by the second surface of the back-plate may include the digital processor and a wireless transmitter communicatively coupled to the digital processor.

A back-plate for integration into a wristwatch may be summarized as including: a plate of substantially rigid material; at least one contact sensor (e.g., at least one biometric contact sensor) carried on a first side of the plate; circuitry carried on a second side of the plate, the second side opposite the first side, wherein the at least one contact sensor is communicatively coupled to the circuitry; and at least one component selected from the group consisting of: a tethered connector port communicatively coupled to the circuitry, the tethered connector port to in use communicatively couple to at least one electrical or electronic component of a wristwatch; and a wireless transmitter communicatively coupled to the circuitry, the wireless transmitter to in use wirelessly transmit data provided by the at least one contact sensor. The back-plate may further include any or all of: a battery carried on the second side of the plate and communicatively coupled to the circuitry; an inductive charging element carried on the second side of the plate and communicatively coupled to the circuitry; an inertial sensor carried on the second side of the plate and communicatively coupled to the circuitry; and/or a pedometer carried on the second side of the plate and communicatively coupled to the circuitry.

The back-plate may include a non-transitory processor-readable storage medium carried on the second side of the plate, wherein the non-transitory processor-readable storage medium stores processor-executable contact sensing instructions that, when executed by a processor, cause the processor to process signals received from the at least one contact sensor. The back-plate may further include a digital processor carried on the second side of the plate and communicatively coupled to both the circuitry and the non-transitory processor-readable storage medium.

The at least one contact sensor may include at least one capacitive biometric sensor selected from the group consisting of: an electromyography sensor, a single-frequency capacitive touch sensor, and a multi-frequency capacitive touch sensor. The plate may be sized and dimensioned to mate with a wristwatch housing and to provide an underside thereof. The at least one contact sensor may include multiple contact sensors. The plate may be substantially planar in geometry.

A wearable electronic device may be summarized as including: at least one EMG sensor responsive to muscle activity corresponding to a gesture performed by a user of the wearable electronic device and to provide signals in response thereto; at least one capacitive touch sensor responsive to physical contact between the user and an object and to provide signals in response thereto; a processor communicatively coupled to the at least one EMG sensor and to the at least one capacitive touch sensor; and a non-transitory processor-readable storage medium communicatively coupled to the processor, the non-transitory processor-readable storage medium storing: processor-executable gesture identification instructions that, when executed by the processor, cause the processor to identify a gesture performed by the user based at least in part on signals provided by the at least one EMG sensor; and processor-executable touch sensing instructions that, when executed by the processor, cause the processor to process signals provided by the at least one capacitive touch sensor. The at least one capacitive touch sensor may include a single-frequency capacitive touch sensor, a multi-frequency capacitive touch sensor, and/or a swept frequency capacitive touch sensor.

The wearable electronic device may further include at least one communication terminal communicatively coupled to the processor, the at least one communication terminal to transmit signals to a receiving device, wherein the signals are based on at least one of: signals provided by the at least one EMG sensor and/or signals provided by the at least one capacitive touch sensor. The wearable electronic device may include at least one inertial sensor communicatively coupled to the processor, the at least one inertial sensor responsive to motion corresponding to the gesture performed by the user of the wearable electronic device and to provide at least one signal in response thereto, wherein the processor-executable gesture identification instructions that, when executed by the processor, cause the processor to identify the gesture performed by the user based at least in part on signals provided by the at least one EMG sensor cause the processor to identify the gesture performed by the user based at least in part on both signals provided by the at least one EMG sensor and at least one signal provided by the at least one inertial sensor.

The wearable electronic device may comprise a set of pod structures that form physically coupled links of the wearable electronic device, wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

In some embodiments, the present systems, articles, and methods generally relate to human-electronics interfaces and particularly relate to electromyographic control of electronic devices.

As mentioned above, EMG is a process for detecting and processing the electrical signals generated by muscle activity. EMG devices employ EMG sensors that are responsive to the range of electrical potentials (typically μV-mV) involved in muscle activity. EMG signals may be used in a wide variety of applications, including: medical monitoring and diagnosis, muscle rehabilitation, exercise and training, prosthetic control, and even in controlling functions of electronic devices (e.g., in human-electronics interfaces).

A wearable EMG device may be summarized as including: at least one EMG sensor to in use detect muscle activity of a user of the wearable EMG device and provide at least one signal in response to the detected muscle activity; a processor communicatively coupled to the at least one EMG sensor, the processor to in use determine a gesture identification flag based at least in part on the at least one signal provided by the at least one EMG sensor; and an output terminal communicatively coupled to the processor to in use transmit the gesture identification flag. The gesture identification flag may be independent of any downstream processor-based device and generic to a variety of end user applications executable by a variety of downstream processor-based devices useable with the wearable EMG device.

The wearable EMG device may further include a non-transitory processor-readable storage medium communicatively coupled to the processor, wherein the non-transitory processor-readable storage medium stores at least a set of gesture identification flags. The non-transitory processor-readable storage medium may store processor-executable instructions that embody and/or produce/effect a mapping between at least one signal provided by the at least one EMG sensor and at least one gesture identification flag and, when executed by the processor, the processor-executable instructions may cause the processor to determine a gesture identification flag in accordance with the mapping. The non-transitory processor-readable storage medium may store processor-executable instructions that, when executed by the processor, cause the processor to determine a gesture identification flag based at least in part on at least one signal provided by the at least one EMG sensor.

The wearable EMG device may further include at least one accelerometer communicatively coupled to the processor, the at least one accelerometer to in use detect motion effected by the user of the wearable EMG device and provide at least one signal in response to the detected motion, and the processor may in use determine the gesture identification flag based at least in part on both the at least one signal provided by the at least one EMG sensor and the at least one signal provided by the at least one accelerometer.

The processor may be selected from the group consisting of: a digital microprocessor, a digital microcontroller, a digital signal processor, a graphics processing unit, an application specific integrated circuit, a programmable gate array, and a programmable logic unit. The at least one EMG sensor may include a plurality of EMG sensors, and the wearable EMG device may further include a set of communicative pathways to route signals provided by the plurality of EMG sensors to the processor, wherein each EMG sensor in the plurality of EMG sensors is communicatively coupled to the processor by at least one communicative pathway from the set of communicative pathways. The wearable EMG device may further include a set of pod structures that form physically coupled links of the wearable EMG device, wherein each pod structure in the set of pod structures is positioned adjacent and physically coupled to at least one other pod structure in the set of pod structures, and wherein the set of pod structures comprises at least two sensor pods and a processor pod, each of the at least two sensor pods comprising a respective EMG sensor from the plurality of EMG sensors and the processor pod comprising the processor. Each pod structure in the set of pod structures may be positioned adjacent and in between two other pod structures in the set of pod structures and physically coupled to the two other pod structures in the set of pod structures, and the set of pod structures may form a perimeter of an annular configuration. The wearable EMG device may further include at least one adaptive coupler, wherein each respective pod structure in the set of pod structures is adaptively physically coupled to at least one adjacent pod structure in the set of pod structures by at least one adaptive coupler.

The output terminal of the wearable EMG device may include at least one of a wireless transmitter and/or a tethered connector port. The at least one EMG sensor may include at least one capacitive EMG sensor.

A method of operating a wearable electromyography ("EMG") device to provide electromyographic control of an electronic device, wherein the wearable EMG device includes at least one EMG sensor, a processor, and an output terminal, may be summarized as including: detecting muscle activity of a user of the wearable EMG device by the at least one EMG sensor; providing at least one signal from the at least one EMG sensor to the processor in response to the detected muscle activity; determining, by the processor, a gesture identification flag based at least in part on the at least one signal provided from the at least one EMG sensor to the processor, wherein the gesture identification flag is independent of the electronic device; and transmitting the gesture identification flag to the electronic device by the output terminal. Detecting muscle activity of a user of the wearable EMG device by the at least one EMG sensor may include detecting muscle activity of the user of the wearable EMG device by a first EMG sensor and by at least a second EMG sensor. Providing at least one signal from the at least one EMG sensor to the processor in response to the detected muscle activity may include providing at least a first signal from the first EMG sensor to the processor in response to the detected muscle activity and providing at least a second signal from the second EMG sensor to the processor in response to the detected muscle activity. Determining, by the processor, a gesture identification flag based at least in part on the at least one signal provided from the at least one EMG sensor to the processor may include determining, by the processor, a gesture identification flag based at least in part on the at least a first signal provided from the first EMG sensor to the processor and the at least a second signal provided from the at least a second EMG sensor to the processor.

The wearable EMG device may further include a non-transitory processor-readable storage medium that stores processor-executable instructions, and determining, by the processor, a gesture identification flag based at least in part on the at least one signal provided from the at least one EMG sensor to the processor may include executing the processor-executable instructions by the processor to cause the processor to determine a gesture identification flag based at least in part on the at least one signal provided from the at least one EMG sensor to the processor.

The wearable EMG device may further include at least one accelerometer, and the method may further include: detecting motion effected by the user of the wearable EMG device by the at least one accelerometer; and providing at least one signal from the at least one accelerometer to the processor in response to the detected motion. Determining a gesture identification flag based at least in part on the at least one signal provided from the at least one EMG sensor to the processor may include determining, by the processor, a gesture identification flag based at least in part on both the at least one signal provided from the at least one EMG sensor to the processor and the at least one signal provided from the at least one accelerometer to the processor. The wearable EMG device may include a non-transitory processor-readable storage medium that stores processor-executable instructions, and determining, by the processor, a gesture identification flag based at least in part on both the at least one signal provided from the at least one EMG sensor to the processor and the at least one signal provided from the at least one accelerometer to the processor may include executing the processor-executable instructions by the processor to cause the processor to determine the gesture identification flag based at least in part on both the at least one signal provided from the at least one EMG sensor to the processor and the at least one signal provided from the at least one accelerometer to the processor.

The output terminal of the wearable EMG device may include a wireless transmitter, and transmitting the gesture identification flag to the electronic device by the output terminal may include wirelessly transmitting the gesture identification flag to the electronic device by the wireless transmitter.

A system that enables electromyographic control of an electronic device may be summarized as including: a wearable electromyography ("EMG") device comprising: at least one EMG sensor to in use detect muscle activity of a user of the wearable EMG device and provide at least one signal in response to the detected muscle activity, a first processor communicatively coupled to the at least one EMG sensor, the first processor to in use determine a gesture identification flag based at least in part on the at least one signal provided by the at least one EMG sensor, and an output terminal communicatively coupled to the first processor, the output terminal to in use transmit the gesture identification flag; and an electronic device comprising: an input terminal to in use receive the gesture identification flag, and a second processor communicatively coupled to the input terminal, the second processor to in use determine a function of the electronic device based at least in part on the gesture identification flag. The gesture identification flag may be independent of the electronic device and generic to a variety of end user applications executable by the electronic device.

The wearable EMG device of the system may further include a non-transitory processor-readable storage medium communicatively coupled to the first processor, wherein the non-transitory processor-readable storage medium stores at least a set of gesture identification flags. The non-transitory processor-readable storage medium of the wearable EMG device may store processor-executable instructions that embody and/or produce/effect a mapping between at least one signal provided by the at least one EMG sensor and at least one gesture identification flag and, when executed by the first processor, the processor-executable instructions may cause the first processor to determine a gesture identification flag in accordance with the mapping.

The wearable EMG device of the system may include a non-transitory processor-readable storage medium communicatively coupled to the first processor, wherein the non-transitory processor-readable storage medium stores processor-executable instructions that, when executed by the first processor, cause the first processor to determine a gesture identification flag based at least in part on the at least one signal provided by the at least one EMG sensor.

The wearable EMG device of the system may include at least one accelerometer communicatively coupled to the first processor, the at least one accelerometer to in use detect motion effected by the user of the wearable EMG device and provide at least one signal in response to the detected motion, and the first processor may in use determine a gesture identification flag based at least in part on both the at least one signal provided by the at least one EMG sensor and the at least on signal provided by the at least one accelerometer.

The electronic device of the system may include a non-transitory processor-readable storage medium communicatively coupled to the second processor, wherein the non-transitory processor-readable storage medium stores at least a set of processor-executable instructions that, when executed by the second processor, cause the second processor to determine a function of the electronic device based at least in part on the gesture identification flag.

The electronic device of the system may include a non-transitory processor-readable storage medium communicatively coupled to the second processor, wherein the non-transitory processor-readable storage medium stores: a first application executable by the electronic device; at least a second application executable by the electronic device; a first set of processor-executable instructions that, when executed by the second processor, cause the second processor to determine a function of the first application based at least in part on a gesture identification flag; and a second set of processor-executable instructions that, when executed by the second processor, cause the second processor to determine a function of the second application based at least in part on a gesture identification flag.

The output terminal of the wearable EMG device may include a first tethered connector port, the input terminal of the electronic device may include a second tethered connector port, and the system may further include a communicative pathway to in use communicatively couple the first tethered connector port to the second tethered connector port and to route the gesture identification flag from the output terminal of the wearable EMG device to the input terminal of the electronic device.

The output terminal of the wearable EMG device may include a wireless transmitter to in use wirelessly transmit the gesture identification flag, the input terminal of the electronic device may include a tethered connector port, and the system may include a wireless receiver to in use communicatively couple to the tethered connector port of the electronic device and to in use wirelessly receive the gesture identification flag from the wireless transmitter of the wearable EMG device.

The output terminal of the wearable EMG device may include a wireless transmitter to in use wirelessly transmit the gesture identification flag and the input terminal of the electronic device may include a wireless receiver to in use wirelessly receive the gesture identification flag from the wireless transmitter of the wearable EMG device.

The electronic device may be selected from the group consisting of: a computer, a desktop computer, a laptop computer, a tablet computer, a mobile phone, a smartphone, a portable electronic device, an audio player, a television, a video player, a video game console, a robot, a light switch, and a vehicle.

A method of electromyographically controlling at least one function of an electronic device by a wearable electromyography ("EMG") device, wherein the wearable EMG device includes at least one EMG sensor, a first processor, and an output terminal and the electronic device includes an input terminal and a second processor, may be summarized as including: detecting muscle activity of a user of the wearable EMG device by the at least one EMG sensor; providing at least one signal from the at least one EMG sensor to the first processor in response to the detected muscle activity; determining, by the first processor, a gesture identification flag based at least in part on the at least one signal provided from the at least one EMG sensor to the first processor, wherein the gesture identification flag is independent of the electronic device; transmitting the gesture identification flag by the output terminal of the wearable EMG device; receiving the gesture identification flag by the input terminal of the electronic device; determining, by the second processor, a function of the electronic device based at least in part on the gesture identification flag; and performing the function by the electronic device. Detecting muscle activity of a user of the wearable EMG device by the at least one EMG sensor may include detecting muscle activity of the user of the wearable EMG device by a first EMG sensor of the wearable EMG device and by at least a second EMG sensor of the wearable EMG device. Providing at least one signal from the at least one EMG sensor to the first processor in response to the detected muscle activity may include providing at least a first signal from the first EMG sensor to the first processor in response to the detected muscle activity and providing at least a second signal from the send EMG sensor to the first processor in response to the detected muscle activity. Determining, by the first processor, a gesture identification flag based at least in part on the at least one signal provided from the at least one EMG sensor to the first processor may include determining, by the first processor, a gesture identification flag based at least in part on the at least a first signal provided from the first EMG sensor to the first processor and the at least a second signal provided from the at least a second EMG sensor to the first processor.

The wearable EMG device may include a non-transitory processor-readable medium that stores processor-executable instructions, and determining, by the first processor, a gesture identification flag based at least in part on the at least one signal provided from the at least one EMG sensor to the first processor may include executing the processor-executable instructions by the first processor to cause the first processor to determine a gesture identification flag based at least in part on the at least one signal provided from the at least one EMG sensor to the first processor.

The wearable EMG device may include at least one accelerometer, and the method may include: detecting motion effected by the user of the wearable EMG device by the at least one accelerometer; and providing at least one signal from the at least one accelerometer to the first processor in response to the detected motion. Determining, by the first processor, a gesture identification flag based at least in part on the at least one signal provided from the at least one EMG sensor to the first processor may include determining, by the first processor, a gesture identification flag based at least in part on the at least one signal provided from the at least one EMG sensor to the first processor and the at least one signal provided by the at least one accelerometer to the first processor.

The output terminal of the wearable EMG device may include a wireless transmitter and the input terminal of the electronic device may include a wireless receiver. Transmitting the gesture identification flag by the output terminal of the wearable EMG device may include wirelessly transmitting the gesture identification flag by the wireless transmitter of the wearable EMG device, and receiving the gesture identification flag by the input terminal of the electronic device may include wirelessly receiving the gesture identification flag by the wireless receiver of the electronic device.

The electronic device may include a non-transitory processor-readable storage medium that stores processor-executable instructions, and determining, by the second processor, a function of the electronic device based at least in part on the gesture identification flag may include executing the processor-executable instructions by the second processor to cause the second processor to determine a function of the electronic device based at least in part on the gesture identification flag.

In some embodiments, the present systems, articles, and methods generally relate to electromyography and particularly relate to capacitive electromyography sensors.

There are two main types of EMG sensors: intramuscular EMG sensors and surface EMG sensors. As the names suggest, intramuscular EMG sensors are designed to penetrate the skin and measure EMG signals from within the muscle tissue, while surface EMG sensors are designed to rest on an exposed surface of the skin and measure EMG signals from there. Intramuscular EMG sensor measurements can be much more precise than surface EMG sensor measurements; however, intramuscular EMG sensors must be applied by a trained professional, are obviously more invasive, and are less desirable from the patient's point of view. The use of intramuscular EMG sensors is generally limited to clinical settings.

Surface EMG sensors can be applied with ease, are much more comfortable for the patient/user, and are therefore more appropriate for non-clinical settings and uses. For example, human-electronics interfaces that employ EMG, such as those proposed in U.S. Pat. Nos. 6,244,873 and 8,170,656, usually employ surface EMG sensors. Surface EMG sensors come in two forms: resistive EMG sensors and capacitive EMG sensors. For both forms of surface EMG sensors, the sensor electrode typically includes a plate of electrically conductive material that is placed against or in very close proximity to the exposed surface of the user's skin. A resistive EMG sensor electrode is typically directly electrically coupled to the user's skin while a capacitive EMG sensor electrode is typically capacitively coupled to the user's skin. That is, for a resistive EMG sensor, the electrode typically comprises a plate of electrically conductive material that is in direct physical contact with the user's skin, while for a capacitive EMG sensor, the electrode typically comprises a plate of electrically conductive material that is electrically insulated from the user's skin by at least one thin intervening layer of dielectric material or cloth. In either case, skin and/or environmental conditions, such as hair density, humidity and moisture levels, and so on, can have a significant impact on the performance of the sensor. These parameters are generally controlled for resistive EMG sensors by preparing the user's skin before applying the sensor electrodes. For example, the region of the user's skin where a resistive electrode is to be placed is usually shaved, exfoliated, and slathered with a conductive gel to establish a suitable and stable environment before the resistive electrode is applied. This obviously limits the appeal of resistive EMG sensors to users, in particular for home and/or recreational use. Capacitive EMG sensors are advantageous because they are generally more robust against some skin and environmental conditions, such as hair density, and are typically applied without the elaborate skin preparation measures (e.g., shaving, exfoliating, and applying a conductive gel) that are employed for resistive sensors. However, capacitive EMG sensors are still very sensitive to moisture and performance can degrade considerably when, for example, a user sweats. There is a need in the art for capacitive EMG sensors with improved robustness against variations in skin and/or environmental conditions.

A capacitive electromyography ("EMG") sensor may be summarized as including a substrate; a first sensor electrode carried by the substrate, wherein the first sensor electrode comprises an electrically conductive plate having a first surface that faces the substrate and a second surface that is opposite the first surface; circuitry communicatively coupled to the first sensor electrode; and a dielectric layer formed of a dielectric material that has a relative permittivity of at least about 10, wherein the dielectric layer coats the second surface of the first sensor electrode. The first sensor electrode may be formed of a material including copper. The circuitry may include at least one circuit selected from the group consisting of: an amplification circuit, a filtering circuit, and an analog-to-digital conversion circuit. At least a portion of the circuitry may be carried by the substrate. The substrate may include a first surface and a second surface, the second surface opposite the first surface across a thickness of the substrate, and the at least a portion of the circuitry may be carried by the first surface of the substrate and the first sensor electrode may be carried by the second surface of the substrate. The dielectric layer may include a ceramic material. The dielectric layer may include an X7R ceramic material. The substrate, the first sensor electrode, and the dielectric layer may constitute a laminate structure. The capacitive EMG sensor may further include an electrically conductive epoxy sandwiched in between the dielectric layer and the first sensor electrode, wherein the dielectric layer is adhered to the first sensor electrode by the electrically conductive epoxy. Alternatively, the capacitive EMG sensor may further include an electrically conductive solder sandwiched in between the dielectric layer and the first sensor electrode, wherein the dielectric layer is adhered to the first sensor electrode by the electrically conductive solder. The dielectric layer may have a thickness of less than about 10 micrometers. The capacitive EMG sensor may be a differential capacitive EMG sensor that further includes a second sensor electrode carried by the substrate, the second sensor electrode comprising an electrically conductive plate having a first surface that faces the substrate and a second surface that is opposite the first surface across a thickness of the second sensor electrode, wherein the second sensor electrode is communicatively coupled to the circuitry, and wherein the dielectric layer coats the second surface of the second sensor electrode. The dielectric layer may comprise a single continuous layer of dielectric material that coats both the second surface of the first sensor electrode and the second surface of the second sensor electrode. The dielectric layer may comprise a first section that coats the second surface of the first sensor electrode and at least a second section that coats the second surface of the second sensor electrode, wherein the first section of the dielectric layer is physically separate from the second section of the dielectric layer. The first sensor electrode and the second sensor electrode may be substantially coplanar. The capacitive EMG sensor may further include a ground electrode carried by the substrate, the ground electrode comprising an electrically conductive plate having a first surface that faces the substrate and a second surface that is opposite the first surface across a thickness of the ground electrode, wherein the ground electrode is communicatively coupled to the circuitry, and wherein the second surface of the ground electrode is exposed and not coated by the dielectric layer. The capacitive EMG sensor may further include at least one additional layer that is sandwiched in between the first sensor electrode and the substrate.

Resistive EMG sensors and capacitive EMG sensors both have relative advantages and disadvantages. For example, the resistive coupling to the skin realized by a resistive EMG sensor provides a relatively low impedance (compared to a capacitive coupling) between the skin and the sensor and this can greatly simplify the circuitry needed to amplify the detected EMG signals; however, because this resistive coupling is essentially galvanic and uninterrupted, it can also undesirably couple DC voltage to the amplification circuitry and/or result in a voltage applied to the skin of the user. Both of these effects potentially impact the quality of the EMG signals detected. On the other hand, the capacitive coupling to the skin realized by a capacitive EMG sensor galvanically isolates the amplification circuitry from the skin and thereby prevents a DC voltage from coupling to the amplification circuitry and prevents a voltage from being applied to the skin; however, this capacitive coupling provides a relatively high impedance between the skin and the sensor and this can complicate the circuitry needed to amplify the detected EMG signals (thus making the amplification circuitry more expensive). The strength of the capacitive coupling can also vary widely from user to user. Clearly, neither type of surface EMG sensor is ideal and there is a need in the art for improved surface EMG sensor designs.

A method of fabricating a capacitive EMG sensor may be summarized as including forming at least a portion of at least one circuit on a first surface of a substrate; forming a first sensor electrode on a second surface of the substrate, the second surface of the substrate opposite the first surface of the substrate across a thickness of the substrate, wherein the first sensor electrode comprises an electrically conductive plate; forming at least one electrically conductive pathway that communicatively couples the first sensor electrode and the at least a portion of at least one circuit; and coating the first sensor electrode with a dielectric layer comprising a dielectric material that has a relative permittivity of at least about 10. Coating the first sensor electrode with a dielectric layer may include coating at least a portion of the second surface of the substrate with the dielectric layer. Coating the first sensor electrode with a dielectric layer may include coating the first sensor electrode with a ceramic material. Coating the first sensor electrode with a dielectric layer may include coating the first sensor electrode with an X7R ceramic material. The capacitive EMG sensor may be a differential capacitive EMG sensor and the method may further include forming a second sensor electrode on the second surface of the substrate, wherein the second sensor electrode comprises an electrically conductive plate; forming at least one electrically conductive pathway that communicatively couples the second sensor electrode and the at least a portion of at least one circuit; and coating the second sensor electrode with the dielectric layer. The method may further include forming a ground electrode on the second surface of the substrate, wherein the ground electrode comprises an electrically conductive plate; and forming at least one electrically conductive pathway that communicatively couples the ground electrode and the at least a portion of at least one circuit. Coating the first sensor electrode with a dielectric layer may include selectively coating the first sensor electrode with the dielectric layer and not coating the ground electrode with the dielectric layer. Coating the first sensor electrode with a dielectric layer may include coating both the first sensor electrode and the ground electrode with the dielectric layer, and the method may further include forming a hole in the dielectric layer to expose the ground electrode. Coating the first sensor electrode with a dielectric layer may include depositing a layer of electrically conductive epoxy on the first sensor electrode; and depositing the dielectric layer on the layer of electrically conductive epoxy. Coating the first sensor electrode with a dielectric layer may include depositing a layer of electrically conductive solder on the first sensor electrode; and depositing the dielectric layer on the layer of electrically conductive solder.

A wearable EMG device may be summarized as including at least one capacitive EMG sensor responsive to (i.e., to detect and provide one or more signal(s) in response to detecting) muscle activity corresponding to a gesture performed by a user of the wearable EMG device, wherein in response to muscle activity corresponding to a gesture performed by a user of the wearable EMG device, the at least one capacitive EMG sensor provides at least one signal, and wherein the at least one capacitive EMG sensor includes: a first sensor electrode comprising an electrically conductive plate; and a dielectric layer formed of a dielectric material that has a relative permittivity of at least about 10, wherein the dielectric layer coats the first sensor electrode; a processor communicatively coupled to the at least one capacitive EMG sensor to in use process signals provided by the at least one capacitive EMG sensor; and an output terminal communicatively coupled to the processor to transmit signals output by the processor. The dielectric layer may include a ceramic material. The ceramic material may include an X7R ceramic material. The wearable EMG device may further include circuitry that mediates communicative coupling between the at least one capacitive EMG sensor and the processor, wherein the circuitry includes at least one circuit selected from the group consisting of: an amplification circuit, a filtering circuit, and an analog-to-digital conversion circuit. The dielectric layer of the at least one capacitive EMG sensor may have a thickness of less than about 10 micrometers. The at least one capacitive EMG sensor may include at least one differential capacitive EMG sensor, and the at least one differential capacitive EMG sensor may further include a second sensor electrode comprising an electrically conductive plate, wherein the dielectric layer coats the second sensor electrode. The at least one capacitive EMG sensor may further include a ground electrode comprising an electrically conductive plate, wherein the ground electrode is exposed and not coated by the dielectric layer.

The present systems, articles, and methods generally relate to electromyography and particularly relate to capacitive electromyography sensors that resistively couple to the user's body.

An electromyography ("EMG") sensor may be summarized as including a first sensor electrode formed of an electrically conductive material; an amplifier; a first electrically conductive pathway that communicatively couples the first sensor electrode and the amplifier; a first capacitor electrically coupled in series between the first sensor electrode and the amplifier in the first electrically conductive pathway; and a first resistor electrically coupled in series between the first sensor electrode and the amplifier in the first electrically conductive pathway. The first capacitor and the first resistor may be electrically coupled in series with one another in the first electrically conductive pathway. The EMG sensor may further include: a second electrically conductive pathway that communicatively couples to ground; a third electrically conductive pathway that communicatively couples the first electrically conductive pathway and the second electrically conductive pathway; a second capacitor electrically coupled in the third electrically conductive pathway in between the first electrically conductive pathway and the second electrically conductive pathway; a fourth electrically conductive pathway that communicatively couples the first electrically conductive pathway and the second electrically conductive pathway; and a second resistor electrically coupled in the fourth electrically conductive pathway in between the first electrically conductive pathway and the second electrically conductive pathway. The EMG sensor may be a differential EMG sensor that further includes: a second sensor electrode formed of an electrically conductive material; a fifth electrically conductive pathway that communicatively couples the second sensor electrode and the amplifier; a third capacitor electrically coupled in series between the second sensor electrode and the amplifier in the fifth electrically conductive pathway; and a third resistor electrically coupled in series between the second sensor electrode and the amplifier in the fifth electrically conductive pathway. The third capacitor and the third resistor may be electrically coupled in series with one another in the fifth electrically conductive pathway. The EMG sensor may further include: a sixth electrically conductive pathway that communicatively couples the fifth electrically conductive pathway and the second electrically conductive pathway; a fourth capacitor electrically coupled in the sixth electrically conductive pathway in between the fifth electrically conductive pathway and the second electrically conductive pathway; a seventh electrically conductive pathway that communicatively couples the fifth electrically conductive pathway and the second electrically conductive pathway; and a fourth resistor electrically coupled in the seventh electrically conductive pathway in between the fifth electrically conductive pathway and the second electrically conductive pathway. The EMG sensor may further include a ground electrode formed of an electrically conductive material and communicatively coupled to the second electrically conductive pathway.

The first sensor electrode may comprise a first layer formed of a first electrically conductive material and a second layer formed of a second electrically conductive material. The first electrically conductive material may include copper. The second electrically conductive material may include at least one material selected from the group consisting of: gold, steel, stainless steel, silver, titanium, electrically conductive rubber, and electrically conductive silicone.

The EMG sensor may further include a housing, wherein the amplifier, the first electrically conductive pathway, the first capacitor, the first resistor, and the first layer of the first sensor electrode are all substantially contained within the housing, the housing including a hole, and wherein at least a portion of the second layer of the first sensor electrode extends out of the housing through the hole. The EMG sensor may further include a substrate having a first surface and a second surface, the second surface opposite the first surface across a thickness of the substrate, wherein the first sensor electrode is carried by the first surface of the substrate and the amplifier, the first capacitor, and the first resistor are all carried by the second surface of the substrate. The first electrically conductive pathway may include at least one via that extends through the substrate. The first electrically conductive pathway may include at least one electrically conductive trace carried by the second surface of the substrate. The first capacitor and the first resistor may include respective discrete electronic components.

A method of fabricating an electromyography ("EMG") sensor may be summarized as including: forming a first sensor electrode on a first surface of a substrate, wherein forming a first sensor electrode on a first surface of a substrate includes depositing at least a first layer of a first electrically conductive material on the first surface of the substrate; depositing an amplifier on a second surface of the substrate, the second surface opposite the first surface across a thickness of the substrate; depositing a first capacitor on the second surface of the substrate; depositing a first resistor on the second surface of the substrate; and forming a first electrically conductive pathway that communicatively couples the first sensor electrode and the amplifier through the first capacitor and the first resistor. Forming the first electrically conductive pathway may include forming a via through the substrate. Depositing at least a first layer of a first electrically conductive material on the first surface of the substrate may include depositing a first layer including copper on the first surface of the substrate, and forming the first sensor electrode may further include depositing a second layer of a second electrically conductive material on the first layer of the first electrically conductive material, the second electrically conductive material including a material selected from the group consisting of: gold, steel, stainless steel, silver, titanium, electrically conductive rubber, and electrically conductive silicone.

The method may further include enclosing the substrate in a housing, wherein the housing includes a hole, and wherein enclosing the substrate in a housing includes enclosing the amplifier, the first capacitor, and the first resistor in the housing and aligning the first sensor electrode with the hole, wherein at least a portion of the second layer of the second electrically conductive material protrudes out of the housing through the hole.

The method may further include forming a ground electrode on the first surface of the substrate; forming a second electrically conductive pathway that communicatively couples to the ground electrode; depositing a second capacitor on the second surface of the substrate; forming a third electrically conductive pathway that communicatively couples the first electrically conductive pathway and the second electrically conductive pathway through the second capacitor; depositing a second resistor on the second surface of the substrate; and forming a fourth electrically conductive pathway that communicatively couples the first electrically conductive pathway and the second electrically conductive pathway through the second resistor. The EMG sensor may be a differential EMG sensor, and the method may further include: forming a second sensor electrode on the first surface of the substrate; depositing a third capacitor on the second surface of the substrate; depositing a third resistor on the second surface of the substrate; and forming a fifth electrically conductive pathway that communicatively couples the second sensor electrode and the amplifier through the third capacitor and the third resistor. The method may further include: depositing a fourth capacitor on the second surface of the substrate; forming a sixth electrically conductive pathway that communicatively couples the fifth electrically conductive pathway and the second electrically conductive pathway through the fourth capacitor; depositing a fourth resistor on the second surface of the substrate; and forming a seventh electrically conductive pathway that communicatively couples the fifth electrically conductive pathway and the second electrically conductive pathway through the fourth resistor.

Depositing the amplifier on the second surface of the substrate may include soldering the amplifier on the second surface of the substrate; depositing the first capacitor on the second surface of the substrate may include soldering the first capacitor on the second surface of the substrate; and/or depositing the first resistor on the second surface of the substrate may include soldering the first resistor on the second surface of the substrate.

A wearable electromyography ("EMG") device may be summarized as including: at least one EMG sensor responsive to (i.e., to detect and provide at least one signal in response to) muscle activity corresponding to a gesture performed by a user of the wearable EMG device, wherein in response to muscle activity corresponding to a gesture performed by a user the at least one EMG sensor provides signals, and wherein the at least one EMG sensor includes: a first sensor electrode formed of an electrically conductive material; an amplifier; a first electrically conductive pathway that communicatively couples the first sensor electrode and the amplifier; a first capacitor electrically coupled in series between the first sensor electrode and the amplifier in the first electrically conductive pathway; and a first resistor electrically coupled in series between the first sensor electrode and the amplifier in the first electrically conductive pathway; a processor communicatively coupled to the at least one EMG sensor to in use process signals provided by the at least one EMG sensor; and an output terminal communicatively coupled to the processor to transmit signals output by the processor. The at least one EMG sensor may further include: a second electrically conductive pathway that communicatively couples to ground; a third electrically conductive pathway that communicatively couples the first electrically conductive pathway and the second electrically conductive pathway; a second capacitor electrically coupled in between the first electrically conductive pathway and the second electrically conductive pathway in the third electrically conductive pathway; a fourth electrically conductive pathway that communicatively couples the first electrically conductive pathway and the second electrically conductive pathway; and a second resistor electrically coupled in between the first electrically conductive pathway and the second electrically conductive pathway in the fourth electrically conductive pathway. The at least one EMG sensor may include at least one differential EMG sensor, and the at least one differential EMG sensor may further include: a second sensor electrode formed of an electrically conductive material; a fifth electrically conductive pathway that communicatively couples the second sensor electrode and the amplifier; a third capacitor electrically coupled in between the second sensor electrode and the amplifier in the fifth electrically conductive pathway; and a third resistor electrically coupled in between the second sensor electrode and the amplifier in the fifth electrically conductive pathway. The at least one EMG sensor may further include a ground electrode formed of an electrically conductive material and communicatively coupled to the second electrically conductive pathway.

The first sensor electrode of the at least one EMG sensor may comprise a first layer formed of a first electrically conductive material and a second layer formed of a second electrically conductive material. The first electrically conductive material may include copper. The second electrically conductive material may include at least one material selected from the group consisting of: gold, steel, stainless steel, silver, titanium, electrically conductive rubber, and electrically conductive silicone. The wearable EMG device may further include: at least one housing that at least partially contains the at least one EMG sensor, wherein the amplifier, the first electrically conductive pathway, the first capacitor, the first resistor, and the first layer of the first sensor electrode are all substantially contained within the at least one housing, the at least one housing including a hole, and wherein at least a portion of the second layer of the first sensor electrode extends out of the at least one housing through the hole.

In some embodiments, a capacitive electromyography ("EMG") sensor may be summarized as including: a first sensor electrode to in use resistively couple to a user's skin, wherein the first sensor electrode includes a plate of electrically conductive material; circuitry communicatively coupled to the first sensor electrode of the capacitive EMG sensor; and a first capacitor to in use galvanically isolate the circuitry from the user's skin, the first capacitor electrically coupled in series between the first sensor electrode and the circuitry. Resistive coupling between the first sensor electrode and the user's skin may include an impedance, and the capacitive EMG sensor may further include a first resistor to in use dominate the impedance of the resistive coupling between the first sensor electrode and the user's skin, wherein the first resistor is electrically coupled in series between the first sensor electrode and the circuitry and wherein the first resistor has a magnitude of at least 1 kQ. The first resistor may have a magnitude of at least 10 kQ. The circuitry may include at least a portion of at least one circuit selected from the group consisting of: an amplification circuit, a filtering circuit, and an analog-to-digital conversion circuit. The capacitive EMG sensor may further include a ground electrode to in use resistively couple to the user's skin, wherein the ground electrode includes a plate of electrically conductive material, and wherein the ground electrode is communicatively coupled to the circuitry. The circuitry may include: a high-pass filter that includes the first capacitor and a second resistor; and a low-pass filter that includes the first resistor and a second capacitor.

The first sensor electrode may comprise: a first layer of a first electrically conductive material; and a second layer of a second electrically conductive material. The first electrically conductive material may include copper. The second electrically conductive material may include at least one material selected from the group consisting of: gold, steel, stainless steel, silver, titanium, electrically conductive rubber, and electrically conductive silicone. The capacitive EMG sensor may further include a housing, wherein the circuitry, the first capacitor, and the first layer of the first sensor electrode are all substantially contained within the housing, the housing including a hole, and wherein at least a portion of the second layer of the first sensor electrode extends out of the housing through the hole. The capacitive EMG sensor may be a differential capacitive EMG sensor that further includes: a second sensor electrode to in use resistively couple to the user's skin, wherein the second sensor electrode includes a plate of electrically conductive material; and a second capacitor to in use galvanically isolate the circuitry from the user's skin, the second capacitor electrically coupled in series between the second sensor electrode and the circuitry.

A wearable electromyography ("EMG") device may be summarized as including: at least one capacitive EMG sensor responsive to (i.e., to detect and provide at least one signal in response to detecting) muscle activity corresponding to a gesture performed by a user of the wearable EMG device, wherein in response to muscle activity corresponding to a gesture performed by a user the at least one capacitive EMG sensor provides signals, and wherein the at least one capacitive EMG sensor includes: a first sensor electrode to in use resistively couple to the user's skin, wherein the first sensor electrode includes a plate of electrically conductive material; circuitry communicatively coupled to the first sensor electrode of the capacitive EMG sensor; and a first capacitor to in use galvanically isolate the circuitry from the user's skin, the first capacitor electrically coupled in series between the first sensor electrode and the circuitry; a processor communicatively coupled to the at least one capacitive EMG sensor to in use process signals provided by the at least one capacitive EMG sensor; and an output terminal communicatively coupled to the processor to transmit signals output by the processor The present systems, devices, and methods relate generally to wearable muscle interfaces, and more specifically to a wearable muscle interface that interacts with content displayed on a wearable head-mounted display As described above, portable electronic devices that include display screens typically require the user to use their hand(s) to carry the device and/or to orient the device so that the user may see, access, receive feedback from, and/or generally interact with the device's display screen. Occupying the user's hand(s) is an inconvenience that can significantly hinder the user's ability to interact with the portable electronic device and/or to interact with other aspects of their environment while operating the portable electronic device. However, this hindrance is at least partially overcome by making the display screen of the portable electronic device wearable. Making the display screen of the portable electronic device wearable enables the user to see, access, and/or receive feedback from the display screen without using their hand(s). In recent years, wearable head-mounted displays have begun to gain wider acceptance, with a number of recently introduced wearable head-mounted display devices having the potential for widespread adoption by consumers.

One such device disclosed in U.S. Pat. No. 8,203,302 issued to Chi et al. utilizes a finger operable input device such as a touch pad built into the wearable head-mounted display (e.g. built into a side-arm of a pair of glasses, with one of the lenses functioning as a display screen) such that a user can interact with and control content appearing on the display screen with positioning and movement of a finger along a surface of the input device. A potential drawback of this approach is that a user is required to conspicuously raise his or her hand to touch the input device each time the user wants to interact with content displayed on the screen. Furthermore, even though the display itself is wearable, it is still controlled by touch and so is not actually hands-free (thus negating part of the benefit of making the display wearable in the first place).

Another such device is disclosed in US 2012/0293548 (Perez et al.) in which a head-mounted display provides users with supplemental information on a display screen provided in at least one of the lenses of a pair of glasses. A processing unit may be connected to the head-mounted display to provide the computing power necessary for its operation. However, the method of user interaction with the display is not specified.

Yet another example of such a device is disclosed in U.S. Pat. No. 8,212,859 issued to Tang et al. in which a source image is projected onto screens built into head-mounted displays worn by a user. Tang et al. focuses on the method and system for projection, and does not specify the manner of user interaction with the head-mounted display device.

U.S. Pat. No. 5,482,051 ('051 patent) describes a human-electronics interface in which a user's EMG signals are detected and used to interact with content that is ultimately displayed on a head-mounted visual display unit. However, the interface described in the '051 patent is not a portable system. The human-electronics interface described in the '051 patent consists of at least three disparate components that are communicatively coupled in series with one another; i) a set of EMG sensors, ii) a stand-alone processing system, and iii) a head-mounted visual display unit. Although the set of EMG sensors and the head-mounted visual display unit are both physically coupled to (i.e., worn by) the user, there is no direct communication between the set of EMG sensors and the head-mounted visual display unit. Detected EMG signals are sent from the set of EMG sensors to the stand-alone processing system (i.e., off the body of the user) where they are processed to achieve some effect, and then signals that represent the effect are sent from the processing system to the head-mounted visual display unit where the effect is displayed to the user. The stand-alone processing system mediates all communication between the set of EMG sensors and the head-mounted visual display unit. The processing system is not worn by the user and is not portable (i.e., it is stationary), and therefore the human-electronics interface described in the '051 patent is limited in that the user must be in close proximity to the stationary processing system in order to use the interface.

What is needed is a completely wearable (i.e., completely portable) user interface that enables a user to see, access and interact with an electronic display in an inconspicuous, hands-free manner.

The present disclosure relates to a muscle interface device and method for interacting with content displayed on wearable head mounted displays.

More generally, the muscle interface device comprises a sensor worn on the forearm of a user, and the sensor is adapted to recognize a plurality of gestures made by a user's hand and or wrist to interact with content displayed on the wearable head mounted display.

In an embodiment, the muscle interface device utilizes a plurality of EMG sensors to detect electrical activity produced by muscles during contraction, and convert the electrical signals for processing. The electrical signals detected from the muscles are interpreted as gestures (e.g. a combination of hand, wrist and arm movements) made by a user which provide a control input to a wearable head mounted display. The control input is preferably provided wirelessly via a wireless communication protocol, such as Near-Field Communication ("NFC") or Bluetooth™, for example.

In another embodiment, various types of sensors may be used alone or in lieu of or in combination with EMG sensors to detect gestures made by a user, for processing as a control input for interacting with a wearable head mounted display. This may be one or more mechanomyographic (MMG) sensors to detect vibrations made by muscles during contraction, or one or more accelerometer sensors to detect larger movements.

In another embodiment, the muscle interface device includes a calibration module with a routine for calibrating the muscle interface device for use with the wearable head mounted display.

Other features and advantages will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

A wearable muscle interface device that in use interacts with content displayed on a wearable head-mounted display may be summarized as including: a plurality of muscle activity sensors to be worn on an arm of a user, the muscle activity sensors responsive to signals generated by muscles in the arm of the user; and a transmitter communicatively coupled to the plurality of muscle activity sensors, wherein in use the transmitter transmits at least one signal from the wearable muscle interface device directly to a receiver on the wearable head-mounted display based on the signals detected by the muscle activity sensors; wherein the at least one signal transmitted, in use, from the wearable muscle interface device directly to the receiver on the wearable head-mounted display effects at least one interaction with content displayed on the wearable head-mounted display. The wearable muscle interface device may further include a processor that in use interprets the signals detected by the muscle activity sensors as a gesture, wherein the processor is communicatively coupled in between the transmitter and the plurality of muscle activity sensors, and wherein the at least one signal that, in use, is transmitted from the wearable muscle interface device may be based on the gesture interpreted by the processor of the wearable muscle interface device. The wearable head-mounted display may include a processor communicatively coupled to the receiver of the wearable head-mounted display, and the at least one signal that, in use, is transmitted from the wearable muscle interface device to the wearable head-mounted display may be interpreted as a gesture by the processor of the wearable head-mounted display.

The wearable muscle interface device may further include a haptic feedback module that in use provides haptic feedback to the user, the haptic feedback module including a vibratory motor. The plurality of muscle activity sensors may include at least one muscle activity sensor selected from the group consisting of: an EMG sensor and a MMG sensor. The wearable muscle interface device may further include at least one accelerometer that in use detects signals generated by motion of the arm of the user, the at least one accelerometer communicatively coupled to the transmitter, and wherein in use the at least one signal transmitted from the transmitter of the wearable muscle interface device directly to the receiver on the wearable head-mounted display may be based on both the signals detected by the muscle activity sensors and the signals detected by the at least one accelerometer. The transmitter may include a wireless transmitter.

A wearable system that in use provides hands-free access to and control of a portable electronic display may be summarized as including: i) a wearable muscle interface device comprising: a plurality of muscle activity sensors to be worn on an arm of a user, the muscle activity sensors responsive to signals generated by muscles in the arm of the user; and a transmitter communicatively coupled to the plurality of muscle activity sensors, wherein in use the transmitter transmits at least one signal from the wearable muscle interface device based on the signals detected by the muscle activity sensors; and ii) a wearable head-mounted display comprising: at least one display screen to be worn on a head of the user, the at least one display screen arranged to be positioned in front of at least one eye of the user when worn on the head of the user; a receiver communicatively coupled to the at least one display screen, wherein in use the receiver directly receives the at least one signal transmitted from the transmitter of the wearable muscle interface device; and a processor communicatively coupled to the receiver and to the at least one display screen, wherein in use the at least one signal received directly from the transmitter of the wearable muscle interface device by the receiver of the wearable head-mounted display effects control of at least one function of the wearable head-mounted display. The transmitter of the wearable muscle interface device may include a wireless transmitter and the receiver of the wearable head-mounted display may include a wireless receiver. The wearable muscle interface device of the wearable system may further include a processor that in use interprets the signals detected by the muscle activity sensors as a gesture, wherein the processor of the wearable muscle interface device is communicatively coupled in between the transmitter and the plurality of muscle activity sensors, and wherein the at least one signal that, in use, is transmitted from the wearable muscle interface device may be based on the gesture interpreted by the processor of the wearable muscle interface device.

The plurality of muscle activity sensors in the wearable muscle interface device of the wearable system may include at least one muscle activity sensor selected from the group consisting of: an electromyographic (EMG) sensor and a mechanomyographic (MMG) sensor. The wearable muscle interface device of the wearable system may further include at least one accelerometer that in use detects signals generated by motion of the arm of the user, the at least one accelerometer communicatively coupled to the transmitter, and wherein in use the at least one signal transmitted by the transmitter of the wearable muscle interface device may be based on both the signals detected by the muscle activity sensors and the signals detected by the at least one accelerometer.

A method of using a wearable system to achieve hands-free access to and control of a portable electronic display, wherein the wearable system includes a wearable muscle interface device and a wearable head-mounted display, may be summarized as including: detecting muscle activity corresponding to a physical gesture performed by a user of the wearable system by at least one muscle activity sensor of the wearable muscle interface device; transmitting at least one signal from the wearable muscle interface device by a transmitter of the wearable muscle interface device based at least in part on the muscle activity detected by at least one muscle activity sensor of the wearable muscle interface device; receiving the at least one signal directly from the wearable muscle interface device by a receiver of the wearable head-mounted display; processing the at least one signal by a processor of the wearable head-mounted display; and effecting at least one interaction between the user and the wearable head-mounted display by the processor of the wearable head-mounted display based on the processing of the at least one signal by the processor of the wearable head-mounted display. The method may further include, in response to detecting muscle activity corresponding to a physical gesture performed by a user of the wearable system by at least one muscle activity sensor of the wearable muscle interface device, processing the detected muscle activity by a processor of the wearable muscle interface device, and transmitting at least one signal from the wearable muscle interface device by a transmitter of the wearable muscle interface device based at least in part on the muscle activity detected by at least one muscle activity sensor of the wearable muscle interface device may include transmitting at least one signal from the wearable muscle interface device by the transmitter of the wearable muscle interface device based at least in part on processing the detected muscle activity by the processor of the wearable muscle interface device.

The method may further include detecting motion of the wearable muscle interface device corresponding to the physical gesture performed by the user of the wearable system by at least one accelerometer of the wearable muscle interface device, and transmitting at least one signal from the wearable muscle interface device by a transmitter of the wearable muscle interface device based at least in part on the muscle activity detected by at least one muscle activity sensor of the wearable muscle interface device may include transmitting at least one signal from the wearable muscle interface device by the transmitter of the wearable muscle interface device based on both the muscle activity detected by at least one muscle activity sensor of the wearable muscle interface device and the motion detected by at least one accelerometer of the wearable muscle interface device. Transmitting at least one signal from the wearable muscle interface device by a transmitter of the wearable muscle interface device may include wirelessly transmitting at least one signal from the wearable muscle interface device by a wireless transmitter of the wearable muscle interface device. Receiving the at least one signal directly from the wearable muscle interface device by a receiver of the wearable head-mounted display may include wirelessly receiving the at least one signal directly from the wearable muscle interface device by a wireless receiver of the wearable head-mounted display.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 18 is a schematic illustration that shows an exemplary mapping between a set of exemplary gesture identification flags and a set of exemplary functions of an electronic device in accordance with the present systems, articles, and methods.

Figure 1:
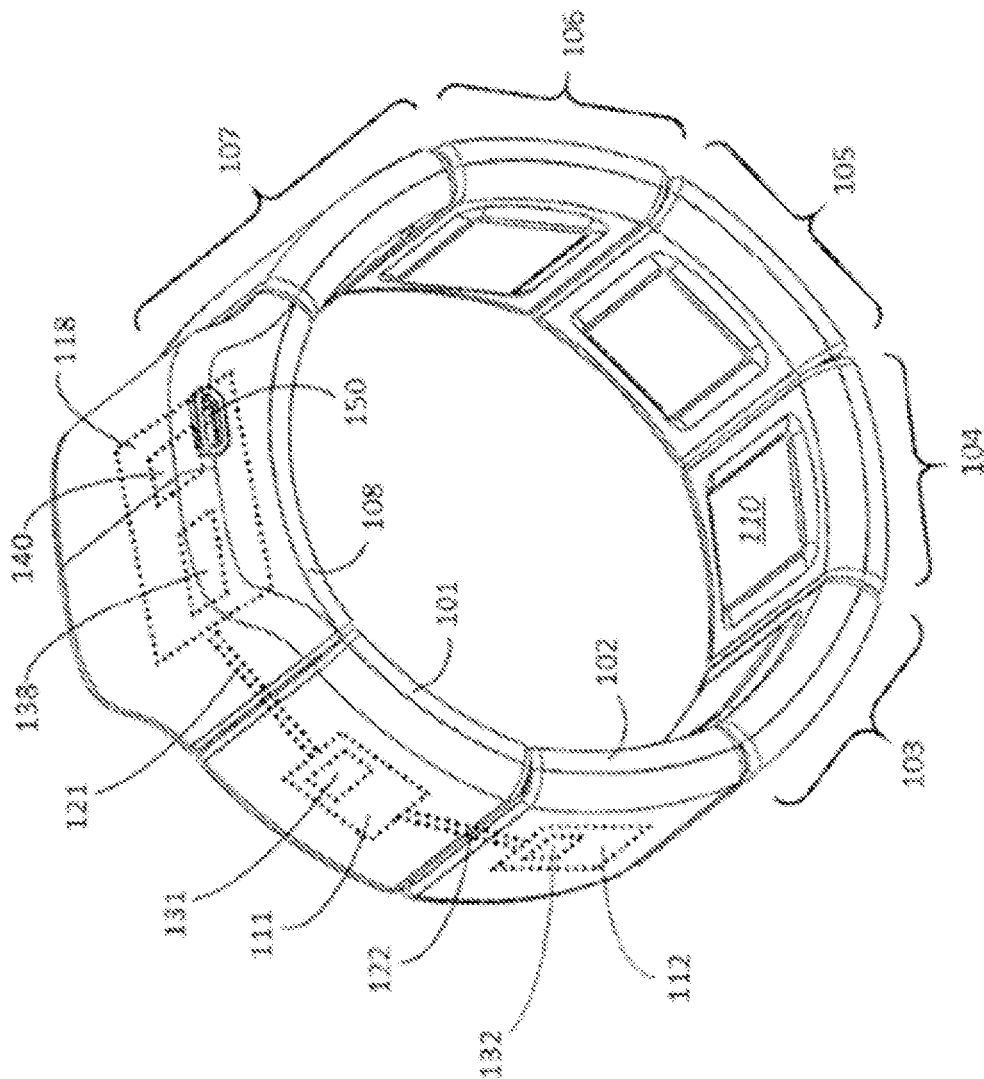
FIG. 1 is a perspective view of an exemplary wearable electronic device that employs signal routing techniques in accordance with the present systems, articles and methods.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Description for Signal Routing in Wearable Electronic Devices

The various embodiments described herein provide systems, articles, and methods for signal routing in wearable electronic devices. Throughout this specification and the appended claims, the term "routing" and its variants, such as "route," "routes," etc., refer to the guided transfer of a signal or signals (including but not limited to electrical signals and/or optical signals) from a first component to a second component, with or without passing over or through any number of intervening components. For example, a signal may be routed directly from component A to component B by one or more communicative pathway(s) that couple(s) component A to component B, or a signal may be routed indirectly from component A to component B via an intervening component C by one or more communicative pathway(s) having a first portion that couples component A to component C and a second portion that couples component C to component B.

Throughout this specification and the appended claims, the term "via" in the context of signal routing is generally used to indicate that a signal is routed, transmitted, or otherwise directed over or through an intervening point or structure en route from a first point or structure to a second point or structure. A signal may be routed from a first point A to a second point B "via" an intervening point C by physically and/or communicatively coupling to one or more component(s) at the intervening point C. For example, a signal may be routed from a first point A to a second point B via an intervening point C by a communicative pathway comprising a first electrically conductive trace that electrically communicatively couples a component at point A to a component at point C and a second electrically conductive trace that electrically communicatively couples the component at point C to a component at point B. However, a signal may also be routed from a first point A to a second point B via an intervening point C by a communicative pathway comprising a single electrically conductive trace that electrically communicatively couples a component at point A to a component at point B and physically extends over or through point C in between points A and B without electrically communicatively coupling to any component(s) at point C.

Throughout this specification and the appended claims, the term "signal" is generally used to refer to information in any format and in any type of tangible, non-transitory medium that stores, represents, or otherwise embodies information and carries that information when transmitted. Exemplary signals that may be employed by and/or that may employ the present systems, articles, and methods include, but are not limited to, electrical signals, magnetic signals and/or optical signals. Similarly, throughout this specification and the appended claims the term "communicative" as in "communicative pathway," "communicative coupling," and in variants such as "communicatively coupled," is generally used to refer to an engineered configuration for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings and/or optical couplings. In general, a "communicative pathway" may include any number of serially-linked portions through which a signal is routed.

As previously described, there are at least two exemplary design factors for a wearable electronic device that influence signal routing: functionality and affordability/manufacturability. These two factors (and potentially many others) may be of great interest to potential users of wearable electronic devices, but they may each be influenced in different ways by signal routing design choices. A typical user may desire sophisticated functionality at minimal cost. The present systems, articles, and methods describe wearable electronic devices that employ signal routing techniques that achieve desired functionality without compromising manufacturability.

FIG. 1 is a perspective view of an exemplary wearable electronic device 100 that employs signal routing techniques in accordance with the present systems, articles and methods. Exemplary device 100 is an armband designed to be worn on the wrist, forearm, or upper arm of a user, though a person of skill in the art will appreciate that the teachings described herein may readily be applied in wearable electronic devices designed to be worn elsewhere on the body of the user (such as on a finger, leg, ankle, neck, or torso of the user). Device 100 includes a set of eight pod structures 101, 102, 103, 104, 105, 106, 107, and 108 that form physically coupled links of the wearable electronic device 100. Each pod structure in the set of eight pod structures 101, 102, 103, 104, 105, 106, 107, and 108 is positioned adjacent and in between two other pod structures in the set of eight pod structures and the set of pod structures forms a perimeter of an annular or closed loop configuration. For example, pod structure 101 is positioned adjacent and in between pod structures 102 and 108 at least approximately on a perimeter of the annular or closed loop configuration of pod structures, pod structure 102 is positioned adjacent and in between pod structures 101 and 103 at least approximately on the perimeter of the annular or closed loop configuration, pod structure 103 is positioned adjacent and in between pod structures 102 and 104 at least approximately on the perimeter of the annular or closed loop configuration, and so on. Each of pod structures 101, 102, 103, 104, 105, 106, 107, and 108 is physically coupled to the two adjacent pod structures by at least one adaptive coupler (not shown in FIG. 1). For example, pod structure 101 is physically coupled to pod structure 108 by an adaptive coupler and to pod structure 102 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 101, 102, 103, 104, 105, 106, 107, and 108 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 100 is depicted in FIG. 1 with the at least one adaptive coupler completely retracted and contained within the eight pod structures 101, 102, 103, 104, 105, 106, 107, and 108 (and therefore the at least one adaptive coupler is not visible in FIG. 1). Further details of adaptive coupling in wearable electronic devices are described in, for example, U.S. Pat. No. 10,152,082, which is incorporated herein by reference in its entirety.

Throughout this specification and the appended claims, the term "pod structure" is used to refer to an individual link, segment, pod, section, structure, component, etc. of a wearable electronic device. For the purposes of the present systems, articles, and methods, an "individual link, segment, pod, section, structure, component, etc." (i.e., a "pod structure") of a wearable electronic device is characterized by its ability to be moved or displaced relative to another link, segment, pod, section, structure component, etc. of the wearable electronic device. For example, pod structures 101 and 102 of device 100 can each be moved or displaced relative to one another within the constraints imposed by the adaptive coupler providing adaptive physical coupling therebetween. The desire for pod structures 101 and 102 to be movable/displaceable relative to one another specifically arises because device 100 is a wearable electronic device that advantageously accommodates the movements of a user and/or different user forms.

Throughout this specification and the appended claims the term "physically coupled" is generally used to encompass both direct and indirect physical coupling. That is, in the present systems, articles, and methods, two objects are considered "physically coupled" if they are in direct physical contact with one another or if they are indirectly physically connected through one or more intervening structures, such as an adaptive coupler.

Device 100 includes eight pod structures 101, 102, 103, 104, 105, 106, 107, and 108 that form physically coupled links of the device 100. The number of pod structures included in a wearable electronic device is dependent on at least the nature, function(s), and design of the wearable electronic device, and the present systems, articles, and methods may be applied to any wearable electronic device employing any number of pod structures, including wearable electronic devices employing more than eight pod structures and wearable electronic devices employing fewer than eight pod structures.

In exemplary device 100 of FIG. 1, each of pod structures 101, 102, 103, 104, 105, 106, 107, and 108 comprises a respective housing having a respective inner volume. Each housing may be formed of substantially rigid material and may be optically opaque. Thus, details of the components contained within the housings (i.e., within the inner volumes of the housings) of pod structures 101, 102, 103, 104, 105, 106, 107, and 108 are not visible in FIG. 1. To facilitate descriptions of exemplary device 100, some internal components are depicted by dashed lines in FIG. 1 to indicate that these components are contained in the inner volume(s) of housings and not actually visible in the view depicted in FIG. 1 (unless an optically transparent or translucent housing material is used). For example, any or all of pod structures 101, 102, 103, 104, 105, 106, 107, and/or 108 may include electric circuitry. In FIG. 1, a first pod structure 101 is shown containing electric circuitry 111 (i.e., electric circuitry 111 is contained in the inner volume of the housing of pod structure 101), a second pod structure 102 is shown containing electric circuitry 112, and a third pod structure 108 is shown containing electric circuitry 118. The electric circuitry in any or all pod structures may be communicatively coupled to the electric circuitry in at least one other pod structure by at least one respective communicative pathway (e.g., by at least one electrically conductive pathway and/or by at least one optical pathway). For example, FIG. 1 shows a first communicative pathway 121 providing communicative coupling between electric circuitry 118 of pod structure 108 and electric circuitry 111 of pod structure 101, and a second communicative pathway 122 providing communicative coupling between electric circuitry 111 of pod structure 101 and electric circuitry 112 of pod structure 102. Communicative coupling between electric circuitries of pod structures in device 100 may include systems, articles, and methods for strain mitigation as described in U.S. patent application Ser. No. 14/335,668), which is incorporated by reference herein in its entirety.

Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

Each individual pod structure within a wearable electronic device may perform a particular function, or particular functions. For example, in device 100, each of pod structures 101, 102, 103, 104, 105, 106, and 107 includes a respective sensor 110 (only one called out in FIG. 1 to reduce clutter) to in use detect inputs effected by a user and to provide electrical signals in response to the detected inputs. Thus, each of pod structures 101, 102, 103, 104, 105, 106, and 107 may be referred to as a respective "sensor pod." Throughout this specification and the appended claims, the term "sensor pod" is used to denote an individual pod structure that includes at least one sensor or transducer to in use detect inputs effected by a user. Each sensor 110 may be any type of sensor that is capable of detecting any kind of signal produced, generated, or otherwise effected by the user, including but not limited to: an electromyography sensor, a magnetomyography sensor, a mechanomyography sensor, a blood pressure sensor, a heart rate sensor, a gyroscope, an accelerometer, a compass, and/or a thermometer. In exemplary device 100, each of sensor pods 101, 102, 103, 104, 105, 106, and 107 includes a respective electromyography sensor 110 (only one called out in FIG. 1 to reduce clutter) to in use detect inputs effected by the user in the form of electrical signals produced by muscle activity. Wearable electromyography device 100 may transmit information based on the detected muscle activity to provide a human-electronics interface (e.g., an HCI). Further details of exemplary wearable electromyography device 100 are described in U.S. Pat. No. 10,528,135, U.S. patent application Ser. No. 14/186,889, and U.S. patent application Ser. No. 14/194,252, each of which is incorporated herein by reference in its entirety. Those of skill in the art will appreciate, however, that a wearable electronic device having electromyography functionality is used only as an example in the present systems, articles, and methods and that the systems, articles and methods for signal routing in wearable electronic devices described herein are in no way limited to wearable electronic devices that employ electromyography sensors unless explicitly recited in a respective claim to such.

Pod structure 108 of device 100 includes a processor 140 that processes the signals provided by the sensors 110 of sensor pods 101, 102, 103 104, 105, 106, and 107 in response to user-effected input(s). Pod structure 108 may therefore be referred to as a "processor pod." Throughout this specification and the appended claims, the term "processor pod" is used to denote an individual pod structure that includes at least one processor to in use process signals. The processor may be any type of processor, including but not limited to: a digital microprocessor or microcontroller, an application-specific integrated circuit, a field-programmable gate array, or the like, that analyzes the signals to determine at least one output, action, or function based on the signals.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 100, processor pod 108 includes a sensor 110 (not visible in FIG. 1) to in use detect inputs effected by a user, so processor pod 108 could be referred to as a sensor pod. However, in exemplary device 100, processor pod 108 is the only pod structure that includes a processor 140, thus processor pod 108 is the only pod structure in exemplary device 100 that can be referred to as a processor pod. In alternative embodiments of device 100, multiple pod structures may include processors, and thus multiple pod structures may serve as processor pods. Similarly, some pod structures may not include sensors.

As previously described, each of pod structures 101, 102, 103, 104, 105, 106, 107, and 108 may include electric circuitry. FIG. 1 depicts electric circuitry 111 inside the inner volume of sensor pod 101, electric circuitry 112 inside the inner volume of sensor pod 102, and electric circuitry 118 inside the inner volume of processor pod 118. Circuitry 111 in sensor pod 101 includes at least component 131, circuitry 112 in sensor pod 102 includes at least component 132, and circuitry 118 in processor pod 108 includes at least components 138 and 140. The components and functions of the electric circuitry in any or all of pod structures 101, 102, 103, 104, 105, 106, 107, and/or 108 depend on the nature of device 100. As previously described, component 140 of circuitry 118 in processor pod 108 may include at least one processor (e.g., at least one microprocessor, digital signal processor (DSP), graphics processing unit (GPU), application specific integrated circuit (ASIC), programmable gate array (PGA) and/or programmable logic unit (PLU)). In the example of device 100 as an electromyography device, each of pod structures 101, 102, 103, 104, 105, 106, 107, and 108 may include a respective amplification circuit to in use amplify electrical signals provided by at least one respective sensor 110. For example, each of components 131, 132, and 138 may include a respective amplification circuit to in use amplify electrical signals provided by at least one respective sensor 110 in each of pod structures 101, 102, and 108. In this way, sensor pod 101 (and similarly sensor pod 102 and processor pod 108) may include an electromyography sensor 110 to provide analog signals in response to muscle activity by a user, and the sensor 110 of sensor pod 101 may be communicatively coupled to an amplification circuit 131 in electric circuitry 111 to amplify the analog signals provided by the sensor 110.

The electric circuitry of any or all of pod structures 101, 102, 103, 104, 105, 106, 107, and/or 108 may include an analog-to-digital conversion ("ADC") circuit to in use convert analog signals into digital signals. Thus, any or all of components 131, 132, and 138 may further include a respective ADC circuit to in use convert analog signals provided by at least one respective sensor 110 in each of pod structures 101, 102, and 108 into digital signals. In this way, sensor pod 101 (and similarly sensor pod 102 and processor pod 108) may include an electromyography sensor 110 to provide analog signals in response to muscle activity by a user, the sensor 110 of sensor pod 101 may be communicatively coupled to an amplification circuit 131 in electric circuitry 111 to amplify the analog signals provided by the sensor 110, and the amplification circuit 131 may be communicatively coupled to an ADC circuit 131 to convert the amplified analog signals into digital signals.

As will be described in more detail later, processor pod 108 may be the only one of pod structures 101, 102, 103, 104, 105, 106, 107, and 108 that includes an ADC circuit 138. In this configuration, amplified analog signals are routed through communicative pathways (e.g., communicative pathways 121 and 122) to processor pod 108. Alternatively, each of pod structures 101, 102, 103, 104, 105, 106, 107, and 108 may include a respective ADC circuit (e.g., 131, 132, and 138) and digital signals may be routed through communicative pathways (e.g., communicative pathways 121 and 122) to processor pod 108.

The electric circuitry (e.g., 111, 112, and/or 118) of any pod structure in device 100 may include other circuits, elements, or components, including but not limited to: filtering circuits, an optical signal generator to convert electrical signals into optical signals, an electrical signal generator to convert optical signals into electrical signals, a battery to provide a portable power source for device 100, a wireless transmitter (e.g., a Bluetooth® transmitter) to send signals to another electronic device based on the muscle activity signals detected by electromyography sensors 110, and/or a tethered connector port 150 (e.g., wired or optical) to provide a direct communicative coupling to another electronic device for the purpose of power transfer (e.g., recharging the battery) and/or data transfer. Connector port 150 is illustrated in FIG. 1 as a micro-Universal Serial Bus port, though a person of skill in the art will appreciate that any connector port may similarly be used, including but not limited to: a Universal Serial Bus port, a mini-Universal Serial Bus port, a SMA port, a THUNDERBOLT® port, and the like.

Signals that are provided by sensors 110 in device 100 are routed to processor pod 108 for processing by processor 140. The various embodiments described herein provide systems, articles, and methods to achieve this signal routing without comprising the manufacturability and/or affordability of device 100. To this end, device 100 employs a plurality of communicative pathways (e.g., 121 and 122) to route the signals that are provided by sensor pods 101, 102, 103, 104, 105, 106, and 107 to processor pod 108. Each respective pod structure 101, 102, 103, 104, 105, 106, 107, and 108 in device 100 is communicatively coupled to at least one other pod structure by at least one respective communicative pathway from the plurality of communicative pathways. Each communicative pathway (e.g., 121 and 122) may include any number of portions (e.g., a single continuous portion or multiple serially-linked portions) realized in any communicative form, including but not limited to: electrically conductive wires or cables, ribbon cables, fiber-optic cables, optical/photonic waveguides, electrically conductive traces carried by a rigid printed circuit board, and/or electrically conductive traces carried by a flexible printed circuit board.

Figure 2:
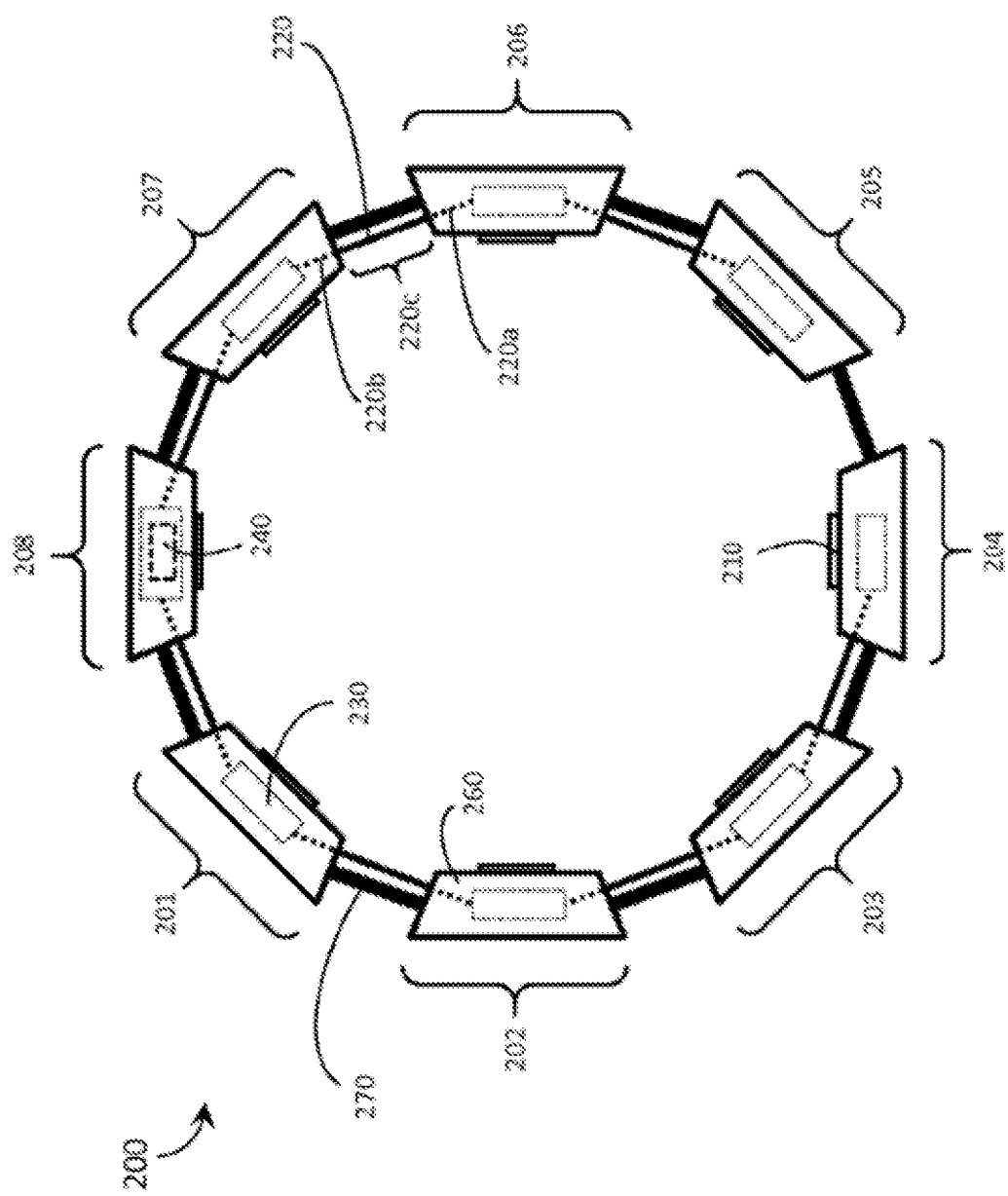
FIG. 2 is a side-elevation view of a wearable electronic device that employs signal routing in accordance with the present systems, articles, and methods.

FIG. 2 is a side-elevation view of a wearable electronic device 200 that employs signal routing in accordance with the present systems, articles, and methods. Device 200 is substantially similar to device 100 from FIG. 1 in that device 200 comprises a set of pod structures comprising sensor pods 201, 202, 203, 204, 205, 206, and 207 and processor pod 208 that form physically coupled links of wearable electronic device 200. Each pod structure is positioned adjacent at least one other pod structure (e.g., adjacent and in between two other pod structures) and the set of pod structures forms a perimeter of an annular or closed loop configuration. FIG. 2 shows device 200 in an expanded annular or closed loop configuration adapted to fit the arm of a larger user than the contracted annular or closed loop configuration of device 100 from FIG. 1. As a result, adaptive couplers 270 (only one called out in FIG. 2) providing adaptive physical coupling between adjacent pairs of pod structures are visible in FIG. 2, whereas such adaptive couplers 270 are not visible in FIG. 1. Each of sensor pods 201, 202, 203, 204, 205, 206, and 207 comprises a respective sensor 210 (only one called out in FIG. 2 to reduce clutter) to in use detect inputs effected by a user (e.g., an electromyography sensor to in use detect muscle activity by a user) and provide signals in response to the detected inputs. Processor pod 208 comprises a similar sensor 210 as well as a processor 240 that processes the signals provided by the respective sensors 210. Signals provided by sensors 210 are routed from each of sensor pods 201, 202, 203, 204, 205, 206, and 207 (in some cases via at least one adjacent sensor pod) to processor pod 208 by communicative pathways 220 (only one called out in FIG. 2 to reduce clutter).

Each of pod structures 201, 202, 203, 204, 205, 206, 207, and 208 comprises a respective housing 260 (only one called out in FIG. 2 to reduce clutter) formed of substantially rigid material and having an inner volume that contains at least a portion of respective electric circuitry 230 (only one called out in FIG. 2 to reduce clutter). Each of sensors 210 is positioned on or proximate a surface of a respective housing 260 and communicatively coupled to the electric circuitry 230 therein. For each of pod structures 201, 202, 203, 204, 205, 206, 207, and/or 208, electric circuitry 230 may include an amplification circuit and/or a filtering circuit and/or an ADC circuit. As previously described, housings 260 may be optically opaque, so some exemplary components within housings 260 (e.g., electrical circuitry 230) are illustrated with dashed lines to indicate that such components may not actually be visible in the view illustrated in FIG. 2. Each communicative pathway 220 provides communicative coupling between the respective electric circuitries 230 in each of two pod structures 201, 202, 203, 204, 205, 206, 207, and 208. Thus, each communicative pathway 220 includes a respective first portion 220a in the inner volume of the housing 260 of a respective first pod structure (e.g., sensor pod 206), a respective second portion 220b in the inner volume of the housing 260 of a respective second pod structure (e.g., sensor pod 207), and a respective third portion 220c that extends between the housing 260 of the respective first pod structure (e.g., sensor pod 206) and the housing 260 of the respective second pod structure (e.g., sensor pod 207).

FIG. 2 shows that communicative pathways 220 provide routes through which signals may be coupled from each of sensor pods 201, 202, 203, 204, 205, 206, and 207 to processor pod 208. Specifically, in accordance with the present systems, articles, and methods, the signals provided by each of sensor pods 201, 202, 203, 204, 205, 206, and 207 are serially routed via successive ones of adjacent pod structures in device 200 by communicative pathways 220 until the signals provided by each sensor pod 201, 202, 203, 204, 205, 206, 207 are routed to processor pod 208. For example, signals provided by a first sensor pod 201 are routed to processor pod 208 through a first communicative pathway 220 that communicatively couples first sensor pod 201 to processor pod 208; signals provided by a second sensor pod 202 are routed to processor pod 208 via first sensor pod 201 by a second communicative pathway 220 that communicatively couples the second sensor pod 202 to processor pod 208; signals provided by a third sensor pod 203 are routed to processor pod 208 via second sensor pod 202 and first sensor pod 201 by a third communicative pathway 220 that communicatively couples the third sensor pod 203 to processor pod 208; and signals provided by a fourth sensor pod 204 are routed to processor pod 208 via third sensor pod 203, second sensor pod 202, and first sensor pod 201 by a fourth communicative pathway 220 that communicatively couples the fourth sensor pod 204 to processor pod 208. Similar communicative pathways route signals from sensor pods 205, 206, and 207 to processor pod 208. Thus, signals from sensor pods 204, 203, 202, and 201 are routed "clockwise" around the annular configuration of device 200 (with respect to the view illustrated in FIG. 2) towards processor pod 208 and signals from sensor pods 205, 206, and 207 are routed "counter-clockwise" around the annular configuration of device 200 towards processor pod 208. The annular configuration of pod structures 201, 202, 203, 204, 205, 206, 207, and 208 allows a communicative "break" or "open" between one pair of adjacent pod structures. For example, device 200 does not include a communicative coupling between sensor pods 204 and 205 because signals from sensor pod 204 are routed to processor pod 208 by "clockwise" serial coupling between sensor pods 204, 203, 202, 201, and 208 while signals from sensor pod 205 are routed to processor pod 208 by "counter-clockwise" serial coupling between sensor pods 205, 206, 207, and 208, though a person of skill in the art will appreciate that, in alternative embodiments, a communicative coupling could be used to couple between sensor pods 204 and 205 and/or the communicative "break" or "open" may occur between any pair of adjacent pod structures in device 200.

As previously described, processor 240 in processor pod 208 may advantageously process digital signals. Analog signals may first be provided by sensors 210 in response to user-effected inputs, and any or all of electric circuitries 230 may include an ADC circuit that in use converts the analog signals into digital signals for processing by processor 240. When only the processor pod 208 includes an ADC circuit in its electric circuitry 230, each of sensor pods 201, 202, 203, 204, 205, 206, and 207 provides analog signals and analog signals are routed over/through/between the sensor pods to processor pod 208. When a respective ADC circuit is included in the electric circuitry 230 of each sensor pod 201, 202, 203, 204, 205, 206, and 207, then each sensor pod provides digital signals and digital signals are routed over/through/between the sensor pods to processor pod 208. The various embodiments described herein provide systems, articles, and methods for routing analog and/or digital signals within a wearable electronic device.

Figure 3:
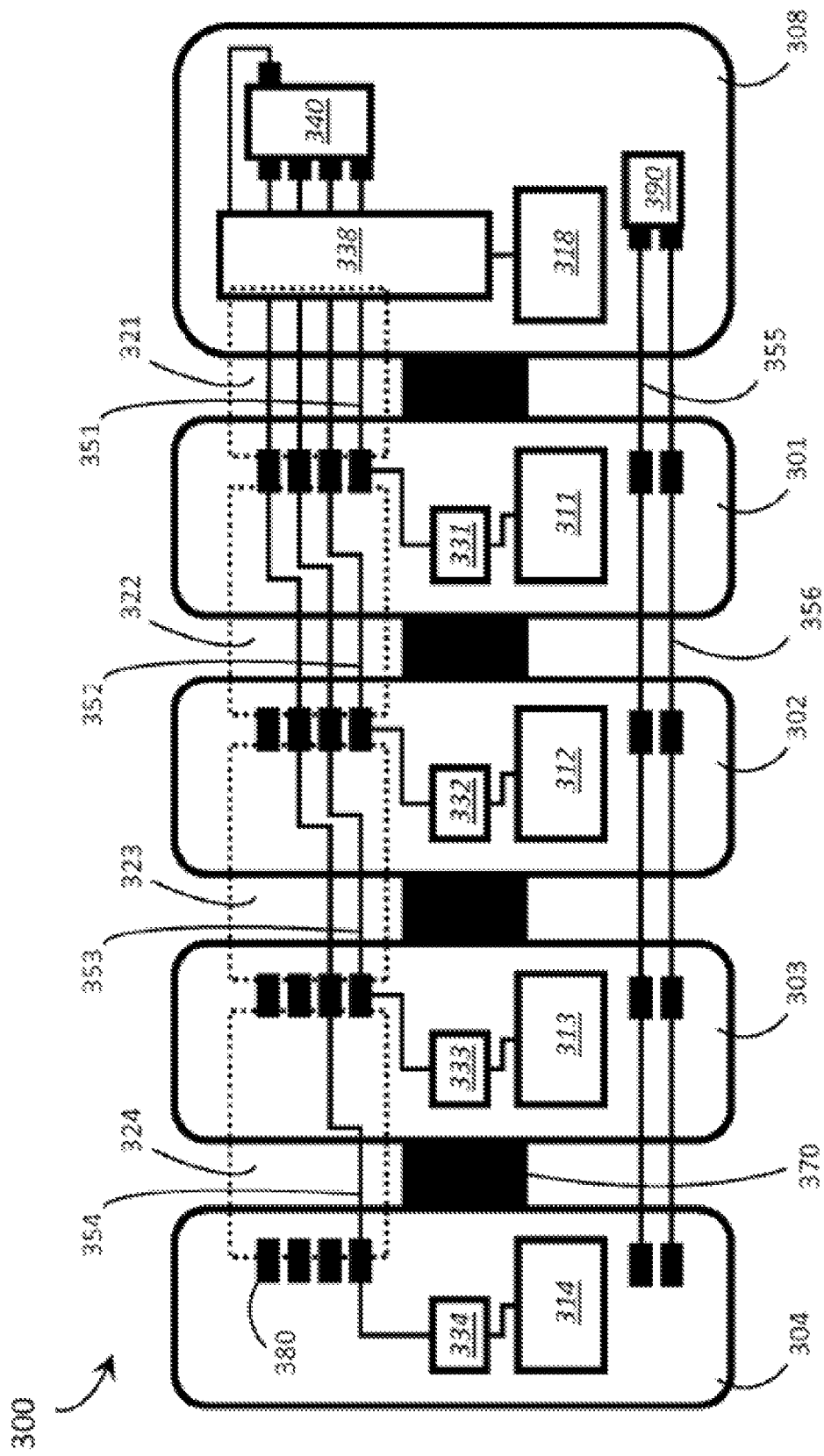
FIG. 3 is an illustrative diagram of a portion of a wearable electronic device showing exemplary routing of analog signals in accordance with the present systems, articles, and methods.

FIG. 3 is an illustrative diagram of a portion of a wearable electronic device 300 showing exemplary routing of analog signals in accordance with the present systems, articles, and methods. Device 300 is substantially similar to device 200 from FIG. 2 (and therefore also similar to device 100 from FIG. 1), though FIG. 3 only depicts a portion of device 300 that comprises four sensor pods 301, 302, 303, and 304 and a processor pod 308, all of which are serially communicatively coupled to route analog signals from sensor pods 301, 302, 303, and 304 to processor pod 308. Sensor pods 301, 302, 303, and 304 and processor pod 308 are all also adaptively physically coupled together by at least one adaptive coupler 370.

Each of sensor pods 301, 302, 303, and 304 comprises a respective sensor (e.g., a respective electromyography sensor) 311, 312, 313, and 314 communicatively coupled to respective electric circuitry 331, 332, 333, and 334. In use, sensors 311, 312, 313, and 314 detect inputs effected by a user and provide analog electrical signals in response to the detected inputs. The analog signals provided by each of sensors 311, 312, 313, and 314 are routed to electric circuitries 331, 332, 333, and 334, respectively. Each of electric circuitries 331, 332, 333, and 334 includes a respective amplification circuit to in use amplify the analog signals, and the amplified analog signals are serially routed via successively adjacent ones of sensor pods 301, 302, 303, and 304 to processor pod 308. Processor pod 308 has electric circuitry 338 that includes an ADC circuit to in use convert the amplified analog signals from sensor pods 301, 302, 303, and 304 into digital signals. The digital signals are routed to a processor 340 within processor pod 308. As previously described, processor 340 may include any type of processor (including but not limited to a digital microprocessor, a digital microcontroller, an FPGA, etc.) that analyzes the digital signals to determine at least one output, action, or function based on the digital signals. Processor 340 may include and/or be coupled to a computer-readable, non-transitory storage medium or memory storing instructions for how to process the digital signals.

In device 300, processor pod 308 also includes a sensor (e.g., an electromyography sensor) 318 to in use detect user-effected inputs and provide analog signals in response to the detected inputs. Sensor 318 is communicatively coupled to electric circuitry 338 in processor pod 308, and electric circuitry 338 includes an amplification circuit to in use amplify the analog signals provided by sensor 318. The amplified analog signals are then converted into digital signals by the ADC circuit in electric circuitry 338 and the digital signals are routed to processor 340.

The portion of device 300 shown in FIG. 3 provides an illustrative example of routing analog signals from a set of sensor pods 301, 302, 303, and 304 to a processor pod 308 within a wearable electronic device. In the illustrative example, analog signals are routed from sensor pods 301, 302, 303, and 304, respectively, through a set of four communicative pathways 351, 352, 353, and 354. Specifically: sensor pod 301 provides amplified analog signals to processor pod 308 via communicative pathway 351, sensor pod 302 provides amplified analog signals to processor pod 308 via communicative pathway 352, sensor pod 303 provides amplified analog signals to processor pod 308 via communicative pathway 353, and sensor pod 304 provides amplified analog signals to processor pod 308 via communicative pathway 354. Each of communicative pathways 351, 352, 353, and 354 may include one or more respective portion(s) depending on the number of intervening pod structures via which each communicative pathway passes en route from the corresponding sensor pod (301, 302, 303, or 304) to processor pod 308. In the illustrated example, communicative pathway 351 routes amplified analog signals from sensor pod 301 to processor pod 308 without passing via any intervening sensor pod(s) (because sensor pod 301 is positioned immediately adjacent processor pod 308), therefore communicative pathway 351 includes only a single portion that extends through region 321 that physically separates sensor pod 301 and processor pod 308. However, communicative pathway 352 routes amplified analog signals via sensor pod 301 en route from sensor pod 302 to processor pod 308, and accordingly, communicative pathway 352 includes a first portion that extends through region 322 that physically separates sensor pod 302 and sensor pod 301 and a second portion that extends through region 321. Depending on the implementation, communicative pathway 352 may or may not electrically couple to one or more component(s) of sensor pod 301 en route from sensor pod 302 to processor pod 308. Similarly, communicative pathway 353 routes amplified analog signals via sensor pod 302 and sensor pod 301 en route from sensor pod 303 to processor pod 308, and accordingly, communicative pathway 353 includes a first portion that extends through region 323 that physically separates sensor pod 303 and sensor pod 302, a second portion that extends through region 322, and a third portion that extends through region 321. Depending on the implementation, communicative pathway 353 may or may not electrically couple to one or more component(s) of sensor pod 302 and/or sensor pod 301 en route from sensor pod 303 to processor pod 308. Likewise, communicative pathway 354 routes amplified analog signals via sensor pod 303, sensor pod 302, and sensor pod 301 en route from sensor pod 304 to processor pod 308, and accordingly, communicative pathway 354 includes a first portion that extends through region 324 that physically separates sensor pod 304 and sensor pod 303, a second portion that extends through region 323, a third portion that extends through region 322, and a fourth portion that extends through region 321. Depending on the implementation, communicative pathway 354 may or may not electrically couple to one or more component(s) of sensor pod 303, sensor pod 302, and/or sensor pod 301 en route from sensor pod 304 to processor pod 308. Processor pod 308 receives amplified analog signals from sensor pods 301, 302, 303, and 304 through communicative pathways 351, 352, 353, and 354 (respectively) and converts the amplified analog signals into digital signals by the ADC circuit in electric circuitry 338. Digital signals are routed within processor pod 308 from electric circuitry 338 to processor 340.

Each of communicative pathways 351, 352, 353, and/or 354 may comprise one or multiple communicative pathways. The portion of device 300 shown in FIG. 3 illustrates each of communicative pathways 351, 352, 353, and 354 as a single respective pathway (some of which comprise multiple portions as described above) to enhance descriptive clarity of device 300 and is not necessarily representative of the number of communicative pathways that may be implemented in practice. For example, in order to streamline manufacturing of device 300, each of regions 321, 322, 323, and 324 may comprise the same number of portions of communicative pathways such that the coupling between each pair of adjacent pod structures in device 300 is substantially the same regardless of the number of signal channels actually coupled therebetween. For example, for the portion of device 300 illustrated in FIG. 3, each of regions 321, 322, 323, and 324 may include four portions of communicative pathways even though only one pathway may be active in region 324 (corresponding to a first portion of pathway 354), only two pathways may be active in region 323 (corresponding to a second portion of pathway 354 and a first portion of pathway 353), and only three pathways may be active in region 322 (corresponding to a third portion of pathway 354, a second portion of pathway 353, and a first portion of pathway 352). Employing the same number of communicative pathways/portions of communicative pathways in each of regions 321, 322, 323, and 324 regardless of the number of actual signal channels being coupled allows substantially the same coupling configuration to be used between each pair of pod structures in device 300, which in turn means that the coupling between each pair of pod structures in device 300 may be manufactured in substantially the same way. In other words, the manufacturing process for device 300 does not need to include pod-specific coupling configurations, pathways, and/or processes. Manufacturing costs are reduced by minimizing the number of steps in the manufacturing process, by minimizing the number of component-specific adaptations required for each manufacturing step, and/or by minimizing the number of distinct components. Thus, employing a single configuration for the coupling in each of regions 321, 322, 323, and 324 means that the coupling between each respective pair of pod structures may be realized by substantially the same physical component(s). Such reduces manufacturing costs by avoiding pod-specific adaptations for each communicative pathway and/or coupling configuration between pod structures.

As previously described, each of communicative pathways 351, 352, 353, and 354 may be physically realized in a variety of different ways, including but not limited to: electrically conductive wires/cables, ribbon cables, fiber-optic cables, optical/photonic waveguides, and/or electrically conductive traces on a printed circuit board. In the case of electrically conductive traces on a printed circuit board, a flexible printed circuit board may be advantageous over a rigid printed circuit board to accommodate the limited motion afforded by adaptive coupler 370. Thus, in some implementations each of communicative pathways 351, 352, 353, and 354 may comprise a respective flexible printed circuit board. In other implementations, each of regions 321, 322, 323, and 324 may include a respective flexible printed circuit board where the number of electrically conductive traces carried by (i.e., carried on and/or within) each respective flexible printed circuit board may be greater than or equal to the number of communicative pathways that include a respective portion in that region. Thus, for example, region 321 may include a flexible printed circuit board having four electrically conductive traces (a first trace corresponding to pathway 351, a second trace corresponding to the second portion of pathway 352, a third trace corresponding to the third portion of pathway 353, and a fourth trace corresponding to the fourth portion of pathway 354) and, as another example, region 324 may include a flexible printed circuit board having either one trace (corresponding to the first portion of pathway 354) or four traces (with a first trace corresponding to the first portion of pathway 354 and the other three traces being unused but included for the purpose of simplifying manufacturing by using the same flexible printed circuit board to couple in between pod structures regardless of the number of pathways/portions of pathway that extend between the pod structures). Each flexible printed circuit board may electrically couple to a respective socket (by, for example hot-bar soldering) in each of two adjacent pod structures in device 300. Such sockets are generally represented by terminals 380 in FIG. 3. Thus, each sensor pod 301, 302, 303, and 304 and processor pod 308 comprises a respective set of four terminals 380 (only one called out in FIG. 3 to reduce clutter). For the purpose of simplicity, each terminal 380 is used in FIG. 3 to embody both an input and an output functionality in device 300, though a person of skill in the art will appreciate that terminals 380 may employ physically separate and/or distinct input and output terminals that are communicatively coupled together through electrical and/or optical circuitry. In alternative embodiments, any or all of pathways 351, 352, 353, and/or 354 may extend via an intervening pod structure (en route to processor pod 308) without electrically coupling to any component thereof.

In device 300, successively adjacent pod structures are effectively daisy-chained together through communicative pathways 351, 352, 353, and 354. The illustrative diagram of FIG. 3 shows that communicative pathways 351, 352, 353, and/or 354 in some or each of regions 321, 322, 323, and 324 may be "staggered," "shifted," or "offset" such that a first input terminal 380 in each sensor pod is communicatively coupled to the corresponding sensor in that sensor pod and a first output terminal 380 in each sensor pod is communicatively coupled to a second input terminal 380 in an adjacent pod structure. For example, sensor pod 302 includes a first terminal 380 that is communicatively coupled to electric circuitry 332 to receive signals from sensor 312 and communicative pathway 352 includes: a first portion (extending through region 322) that communicatively couples between first terminal 380 in sensor pod 302 and a second terminal 380 in sensor pod 301 and a second portion (extending through region 321) that communicatively couples between second terminal 380 in sensor pod 301 and a third terminal 380 in processor pod 308. The shifting/offsetting of communicative connections between terminals 380 may be achieved by/within the communicative pathways themselves (as depicted in FIG. 3) by, for example, a corresponding routing of communicative pathways such as a corresponding layout of conductive traces in a flexible printed circuit board, or this shifting/offsetting may be achieved within each pod structure by, for example, corresponding communicative couplings between terminals 380. For example, in FIG. 3, each terminal 380 includes both an input and an output, though in alternative embodiments electrical and/or optical pathways may route signals between inputs and outputs of terminals 380.

Device 300 includes additional communicative pathways 355 and 356 that provide serial communicative coupling of power and ground lines through sensor pods 301, 302, 303, and 304 and processor pod 308. For example, processor pod 308 includes a battery 390 that is used to power wearable electronic device 300 and power is routed from processor pod 308 to sensor pods 301, 302, 303, and 304 through communicative pathways 355 and 356.

FIG. 3 shows exemplary device 300 that serially routes analog signals from four sensor pods 301, 302, 303, and 304 to one processor pod 308. Each analog signal is routed through a corresponding dedicated signal channel (i.e., a corresponding communicative pathway 351, 352, 353, and 354, respectively). For example, since sensor pod 301 routes amplified analog signals from each of sensor pods 301, 302, 303, and 304 to processor pod 308, at least four analog signal channels couple from sensor pod 301 to processor pod 308 through region 321. As previously described, manufacturing of device 300 can be simplified by providing substantially the same coupling configuration between each pair of adjacent pod structures; therefore, the number of communicative pathways in each of regions 321, 322, 323, and 324 is equal to the number of sensor pods 301, 302, 303, and 304 (i.e., four) that are serially routed to processor pod 308. For this reason, each of regions 321, 322, 323 and 324 may include four communicative pathways and each of sensor pods 301, 302, 303, and 304 may include at least four terminals 380 for electrically coupling to/from corresponding ones of the four communicative pathways.

Routing of analog signals as exemplified by device 300 may be advantageous for some applications, but in accordance with the present systems, articles, and methods, other applications may benefit from routing digital signals instead of analog signals. Routing digital signals may be done using fewer signal channels than routing analog signals, and may provide improved robustness against noise and other forms of signal degradation.

Figure 4:
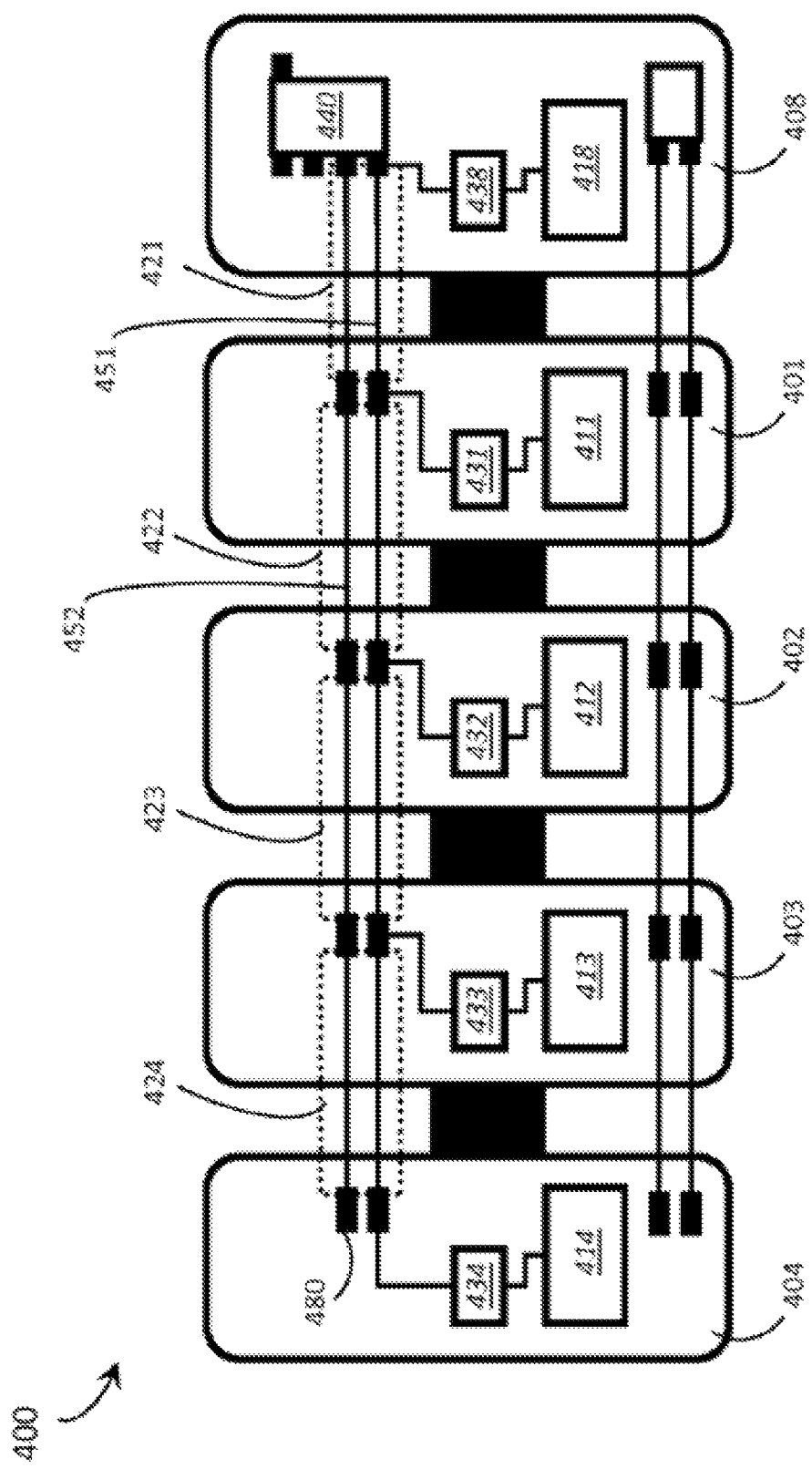
FIG. 4 is an illustrative diagram of a portion of a wearable electronic device showing exemplary routing of digital signals in accordance with the present systems, articles, and methods.

FIG. 4 is an illustrative diagram of a portion of a wearable electronic device 400 showing exemplary routing of digital signals in accordance with the present systems, articles, and methods. Device 400 is substantially similar to device 300 from FIG. 3 (and therefore also similar to device 200 from FIG. 2 and device 100 from FIG. 1) except that device 400 is designed to route digital signals between pod structures as opposed to analog signals. FIG. 4 only depicts a portion of device 400 that comprises four sensor pods 401, 402, 403, and 404 and a processor pod 408, all of which are serially coupled together to route digital signals from sensor pods 401, 402, 403, and 404 to processor pod 408.

Each of sensor pods 401, 402, 403, and 404 comprises a respective sensor (e.g., a respective electromyography sensor) 411, 412, 413, and 414 communicatively coupled to respective electric circuitry 431, 432, 433, and 434. In use, sensors 411, 412, 413, and 414 detect inputs effected by a user and provide analog signals in response to the detected inputs. The analog signals provided by each of sensors 411, 412, 413, and 414 are communicatively routed to electric circuitries 431, 432, 433, and 434, respectively. Each of electric circuitries 431, 432, 433, and 434 includes a respective amplification circuit to, in use, amplify the analog signals. Furthermore, each of electric circuitries 431, 432, 433, and 434 also includes a respective ADC circuit to, in use, convert the amplified analog signals into digital signals. The resulting digital signals are serially routed via successively adjacent ones of sensor pods 401, 402, 403, and 404 to processor pod 408. The digital signals are communicatively routed to a processor 440 within processor pod 408 that, in use, determines at least one output, action, or function based on the digital signals.

In device 400, processor pod 408 also includes a sensor (e.g., an electromyography sensor) 418 to, in use, detect user-effected inputs and provide analog signals in response to the detected inputs. Sensor 418 is communicatively coupled to electric circuitry 438 in processor pod 408, and electric circuitry 438 includes an amplification circuit to, in use, amplify the analog signals provided by sensor 418 and an ADC circuit to, in use, convert the amplified analog signals into digital signals. The digital signals are routed to processor 440 within processor pod 408.

The portion of device 400 shown in FIG. 4 provides an illustrative example of routing digital signals from a set of sensor pods 401, 402, 403, and 404 to a processor pod 408 within a wearable electronic device. In the illustrative example: sensor pod 404 outputs digital signals corresponding to signals provided by sensor 414 towards sensor pod 403 through a first portion of a digital signal bus 451 extending through region 424 that physically separates sensor pod 404 and sensor pod 403; sensor pod 403 receives digital signals from sensor pod 404 through the first portion of digital signal bus 451 and outputs both the digital signals received from sensor pod 404 and digital signals corresponding to signals provided by sensor 413 towards sensor pod 402 through a second portion of digital signal bus 451 extending through region 423 that physically separates sensor pod 403 and sensor pod 402; sensor pod 402 receives digital signals from sensor pod 403 (corresponding to signals provided by sensor 414 and signals provided by sensor 413) through the second portion of digital signal bus 451 and outputs both the digital signals received from sensor pod 403 and digital signals corresponding to signals provided by sensor 412 towards sensor pod 401 through a third portion of digital signal bus 451 extending through region 422 that physically separates sensor pod 402 and sensor pod 401; sensor pod 401 receives digital signals from sensor pod 402 (corresponding to signals provided by sensors 414, 413, and 412) through the third portion of digital signal bus 451 and outputs both the digital signals received from sensor pod 402 and digital signals corresponding to signals provided by sensor 411 towards processor pod 408 through a fourth portion of digital signal bus 451 extending through region 421 that physically separates sensor pod 401 and processor pod 408. Processor pod 408 receives digital signals from sensor pod 401 (corresponding to signals provided by sensors 414, 413, 412, and 411) through the fourth portion of digital signal bus 451 and routes the digital signals to processor 440.

In device 400, a single digital signal bus 451 communicatively couples to and between each of sensor pods 401, 402, 403, and 404 and processor pod 408. Timing and sequencing of respective digital signals in digital signal bus 451 from each of sensor pods 401, 402, 403, and 404 is controlled by a second communicative pathway that communicatively couples to and between each of sensor pods 401, 402, 403, and 404 and processor pod 408: a clock signal line 452. In accordance with the present systems, articles, and methods, digital signals may be routed between pod structures in device 400 using digital signal bus 451 and clock signal line 452 to implement any of a variety of known digital bus protocols, including but not limited to: I2C®, SMBus®, UNI/O®, 1-Wire®, HyperTransport®, etc., and/or using modifications or adaptations thereof.

FIG. 4 shows exemplary device 400 that serially routes digital signals from four sensor pods 401, 402, 403, and 404 to one processor pod 408. Unlike the analog signals routed in device 300, all of the digital signals may be transmitted through a single digital signal bus 451 and time-separated by clock pulses on a single clock line 452. Thus, routing of digital signals between pod structures may not use a corresponding dedicated channel for each digital signal. In device 400, each of regions 421, 422, 423, and 424 includes two communicative pathways: a respective portion of digital signal bus 451 and a respective portion of clock signal line 452, and each of sensor pods 401, 402, 403, and 404 comprises a set of two terminals 480. In accordance with the present systems articles, and methods, routing of digital signals between pod structures can be advantageous over routing of analog signals between pod structures because such allows fewer couplings between adjacent pod structures and because digital signals are inherently more robust against noise and signal degradation compared to analog signals.

A person of skill in the art will appreciate that the illustrative diagrams of FIGS. 3 and 4 show only some simplified electrical circuit and coupling (e.g., wiring) details and many electrical and coupling details are omitted. Any such simplifications and omissions are done solely for the purpose of enhancing clarity in conjunction with the corresponding descriptions in this specification. A person of skill in the art will appreciate that the simplification/omission of any component in any Figure is for the purpose of enhancing illustrative clarity only and in no way indicates the simplified/omitted component is somehow of lesser utility or value to the present systems, articles, and methods.

The present systems, articles, and methods describe routing signals between pod structures in a wearable electronic device comprising pod structures. FIGS. 1, 2, 3, and 4 provide illustrative examples of systems and articles that achieve such routing by implementing, for example, the method described in FIG. 5.

Figure 5:
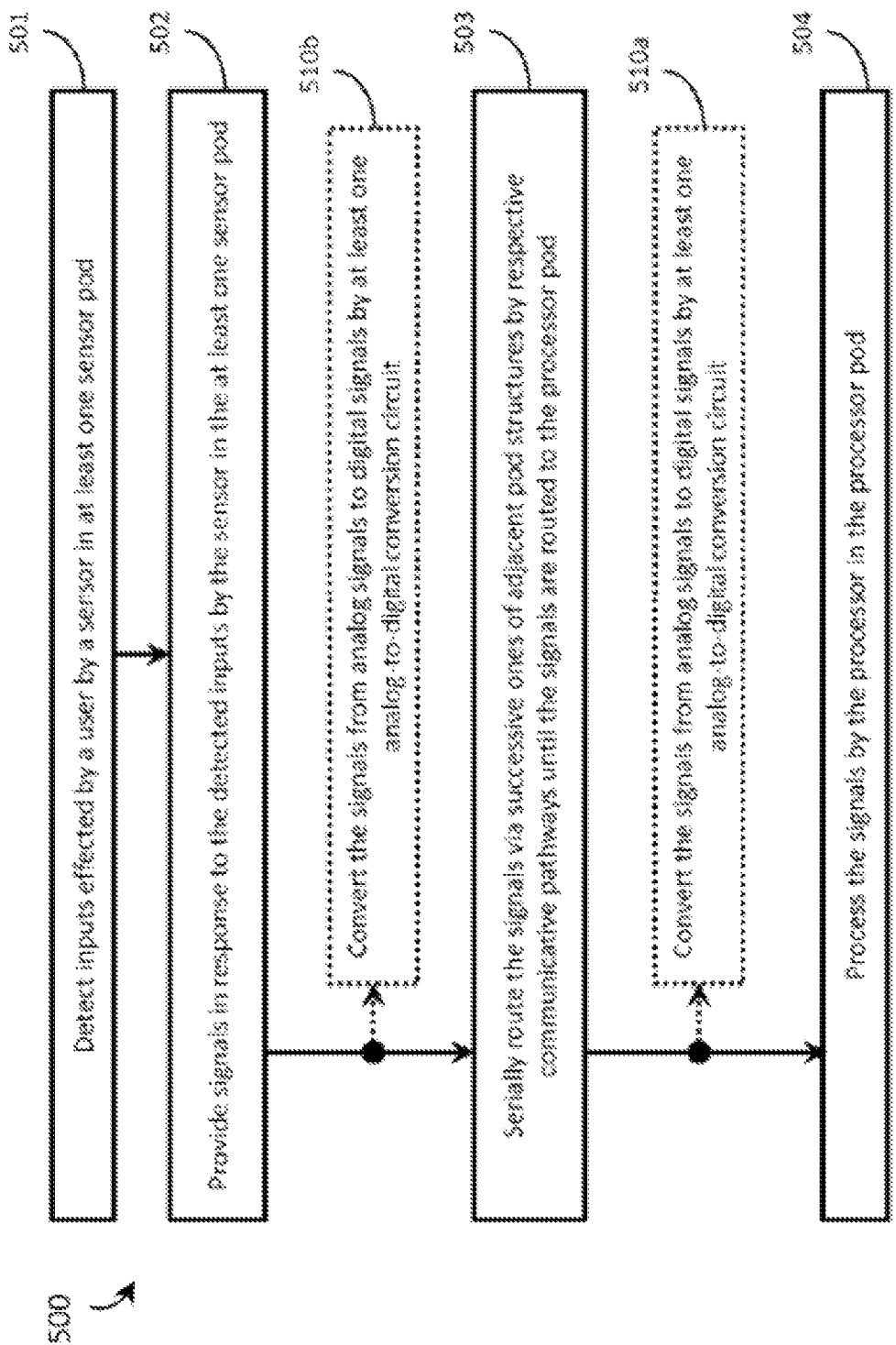
FIG. 5 is a flow-diagram showing a method of routing signals within a wearable electronic device in accordance with the present systems, articles, and methods.

FIG. 5 is a flow-diagram showing a method 500 of routing signals within a wearable electronic device in accordance with the present systems, articles, and methods. The wearable electronic device may include a plurality of pod structures including at least two sensor pods and a processor pod. In other words, the wearable electronic device may be substantially similar to device 100 from FIG. 1, device 200 from FIG. 2, and either device 300 from FIG. 3 or device 400 from FIG. 4. Method 500 includes four acts 501, 502, 503, and 504 and one optional act 510a/b, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 501, inputs effected by a user are detected by a sensor in at least one sensor pod of the wearable electronic device. The sensor may be an electromyography sensor and the inputs effected by the user may be muscle activity corresponding to a gesture performed by the user. The wearable electronic device may include a plurality of sensors distributed among a plurality of sensor pods and the user-effected inputs may be detected by at least one sensor (i.e., by one or more sensors) in at least one sensor pod (i.e., in one or more sensor pods).

At 502, signals are provided by the at least one sensor in the at least one sensor pod in response to the user-effected inputs. The signals may be amplified by at least one amplification circuit and/or filtered by at least one filtering circuit. The signals provided by the at least one sensor may be, for example, electrical signals.

At 503, the signals are serially routed via successive ones of adjacent pod structures in the wearable electronic device by respective communicative pathways until the signals are routed to the processor pod. The signals may be routed in, for example, electrical or optical form.

At 504, the signals are processed by a processor in the processor pod.

As previously described, the signals generated by each sensor may be analog signals and the analog signals may be amplified by a respective amplification circuit within each sensor pod. Method 500 also includes an optional act 510a/b that may be performed either after (i.e., 510a) or before (i.e., 510b) the serial routing of act 503 depending on whether the wearable electronic device routes analog signals or digital signals (i.e., depending on whether the wearable electronic device is substantially similar to device 300 from FIG. 3 or device 400 from FIG. 4).

If the wearable electronic device is substantially similar to device 300 from FIG. 3, then the device routes analog signals between pod structures and the processor pod includes an ADC circuit. In this configuration, method 500 may include act 510a after the serial routing of act 503. At 503, the analog signals are serially routed via successive ones of adjacent pod structures in the wearable electronic device by respective communicative pathways until the analog signals are routed to the processor pod. As described for device 300, analog signal routing may employ a number of communicative pathways that is equal to the number of serially-linked sensor pods. At 510a, the analog signals are converted to digital signals by the ADC circuit in the processor pod. At 504, the digital signals are processed by the processor in the processor pod.

If the wearable electronic device is substantially similar to device 400 from FIG. 4, then each pod structure includes a respective ADC circuit and the device routes digital signals between pod structures. In this configuration, method 500 may include act 510b before the serial routing of act 503. At 502, analog signals are provided by the at least one sensor in the at least one sensor pod in response to the user-effected inputs. At 510b, the analog signals are converted into digital signals by the respective ADC circuits in each sensor pod. At 503, the digital signals are serially routed via successive ones of adjacent pod structures in the wearable electronic device by respective communicative pathways until the digital signals are routed to the processor pod. As described for device 400, digital signal routing may employ two communicative pathways: one digital signal bus and one clock signal line. Digital signal routing may also employ any of a variety of known digital bus protocols, including but not limited to: I2CO3 SMBus®, UNI/O®, 1-Wire®, HyperTransport®, etc., and/or using modifications or adaptations thereof. At 504, the digital signals are processed by the processor in the processor pod.

Description for Wearable Electronic Devices Having On-Board Sensors Including Contact Sensors The various embodiments described herein provide systems, articles, and methods for wearable electronic devices that employ biometric contact sensors. Different types of contact sensors are employed, including without limitation electromyography ("EMG") sensors, single-frequency capacitive touch sensors, and/or swept frequency capacitive touch sensors. Swept frequency capacitive touch sensors are described in, for example, Sato et al.; however, in accordance with the present systems, articles, and methods, the concept of probing multiple electrical frequencies of a capacitive touch sensor may be generalized to implementations that do not actually sweep the electrical frequency over a continuous range, such as implementations that simply probe two or more discrete electrical signal frequencies. Probing multiple discrete signal frequencies without continuously sweeping in between can be advantageous in some applications because such simplifies the electric circuitry involved, simplifies the signal processing involved, and can also be designed to specifically target frequencies that are of particular relevance (e.g., for pattern recognition purposes) to a specific application. Throughout this specification and the appended claims, capacitive touch sensors that implement more than a single, fixed frequency are generally referred to as "multi-frequency capacitive touch sensors," where swept frequency capacitive touch sensors are a subset of multi-frequency capacitive touch sensors, but any implementation of a capacitive touch sensor that is operative to probe multiple distinct electrical signal frequencies (e.g., "bi-frequency capacitive touch sensors" employing two frequencies, "tri-frequency capacitive touch sensors" employing three frequencies, and so on for any number of frequencies) constitutes a multi-frequency capacitive touch sensor herein.

Contact sensors may be incorporated into a dedicated device such as a wearable electronic armband, or they may be incorporated into a device that otherwise provides a different function, such as a wristwatch. For example, the functionality of any wristwatch may be enhanced by incorporating at least one contact sensor into the watchstrap and/or watch housing back-plate. In accordance with the present systems, articles, and methods, a generic watchstrap and/or watch housing back-plate design that includes at least one contact sensor may be adapted to fit to or be used in conjunction with any known wristwatch design, and incorporated into virtually any wristwatch during manufacturing thereof. Such "enhanced" watchstraps and/or back-plates can add capacitive sensing and/or other capabilities to "traditional" watch designs (i.e., non-smart watch designs) to effectively transform the traditional watch into a smart watch, and/or can add new sensing and/or other capabilities to smart watch designs.

In accordance with the present systems, articles, and methods, one or more EMG sensor(s) may be used to detect electrical activity produced by the muscles of a user when the user performs a physical gesture and to enable a wearable electronic device that includes the one or more EMG sensor(s) to transmit gesture-specific signals to a receiving device as part of a human-electronics interface. One or more capacitive touch sensor(s) (such as one or more single-frequency capacitive touch sensor(s) and/or one or more multi-frequency capacitive touch sensor(s)) may be used to detect physical contact between a user and an object (i.e., when and/or how a user physically touches an object), to provide signals in response to the detected physical contact, and to enable a wearable electronic device that includes the one or more capacitive touch sensor(s) to transmit touch-specific signals to a receiving device as part of a human-electronics interface.

Figure 6:
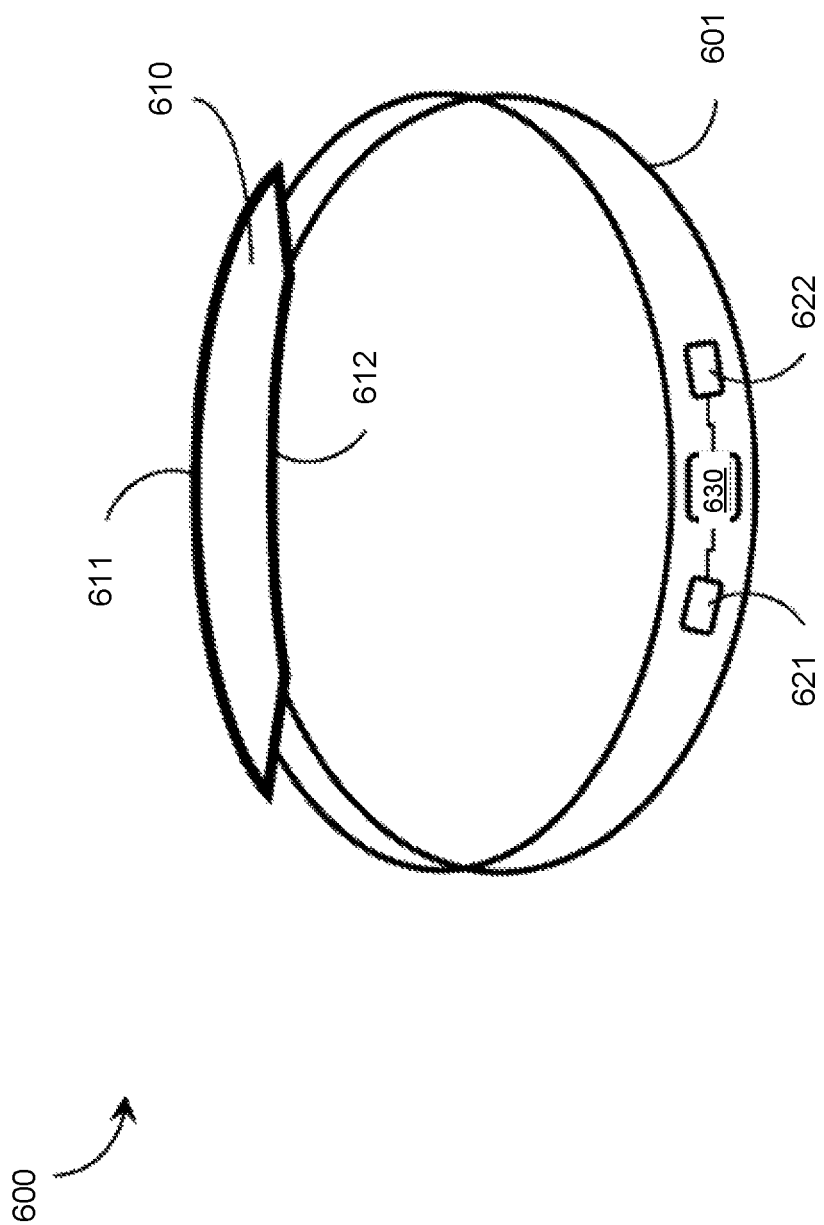
FIG. 6 is a perspective view of an exemplary wristwatch that includes an enhanced watchstrap employing contact sensors in accordance with the present systems, articles, and methods.

FIG. 6 is a perspective view of an exemplary wristwatch 600 that includes an enhanced watchstrap 601 in accordance with the present systems, articles, and methods. Enhanced watchstrap 601 enwraps the wrist of a user to secure wristwatch 600 in position on the user's wrist, in much the same way as any generic watchstrap. Enhanced watchstrap 601 may be elastic, fabric, cloth, leather, formed of serially-coupled links, or any other flexible material and may or may not include a latch, clasp, or other fastening device (not shown in FIG. 6). Wristwatch 600 also includes a housing 610 having a top surface 611 and a back-plate 612. Back-plate 612 may be a simple rigid surface with no further functionality or back-plate 612 may be an enhanced back-plate as described in U.S. patent application Ser. No. 15/882,858 and U.S. patent application Ser. No. 14/505,836, each of which is incorporated herein by reference above.

The top surface 611 of housing 610 includes a window or display that may provide a means of conveying information to a user (such as the time, etc.) and/or an interface through which the user may program and/or control functions of wristwatch 600. For example, wristwatch 600 may be a traditional analog or mechanical watch, in which case the display of the top surface 611 of housing 610 may include a simple sheet of transparent material such as glass or plastic (commonly referred to as the "crystal") forming a window through which the hands of an analog watch face may be seen by the user, or wristwatch 600 may be a traditional digital watch, in which case the display of the top surface 611 of housing 610 may include a digital display screen, or wristwatch 600 may be a smart watch, in which case the display of the top surface 611 of housing 610 may include a touchscreen. Housing 610 may include an inner cavity that contains a timekeeping device, including without limitation: one or more gear(s), one or more clockwork(s), one or more quartz oscillator(s), and/or any other component or device known in the art of timekeeping. In some implementations, the cavity may include circuitry (e.g., electrical and/or electronic circuitry). Wristwatch 600 may be substantially similar to any known wristwatch except that wristwatch 600 includes enhanced watchstrap 101 providing additional functions and/or capabilities in accordance with the present systems, articles, and methods.

Exemplary enhanced watchstrap 601 includes on-board devices 621 622, and 630. In principle, the enhanced watch-straps of the present systems, articles, and methods may include any number of devices. Exemplary devices 621 and 622 are contact sensors or transducers (hereafter "contact sensors") that may be used to detect, measure, monitor, or otherwise sense one or more activity(ies), parameter(s), characteristic(s), and/or other aspect(s) of the user of (i.e., the wearer of) wristwatch 600. Two contact sensors 621 and 622 are illustrated in FIG. 6 for exemplary purposes only. In practice, any number (e.g., one, two, three, or more than three) of contact sensors may be included in watchstrap 601.

Contact sensors 621, 622 may include any type or types of contact sensors, including without limitation one or more EMG sensor(s), one or more single-frequency capacitive touch sensor(s), and/or one or more multi-frequency capacitive touch sensor(s), one or more magnetomyography sensor(s), one or more acoustic myography sensor(s), one or more mechanomyography sensor(s), one or more electro-cardiography sensor(s), one or more blood pressure sensor(s), one or more thermometer(s), and/or one or more skin conductance sensor(s). Contact sensors 621, 622 may include any type or types of biometric sensor(s) that are responsive to signals detected through physical contact with the user's skin. Enhanced watchstrap 601 may, if desired, also include one or more other form(s) of sensor(s), such as one or more pedometer(s), one or more inertial sensor(s) such as one or more accelerometer(s) and/or one or more gyroscope(s), one or more compass(es), one or more location sensor(s) such as one or more Global Positioning System (GPS) unit(s), one or more altimeter(s), and so on.

Exemplary device 630 is circuitry (e.g., electrical and/or electronic circuitry) that is communicatively coupled to contact sensors 621, 622 and may include a wide variety of components depending on the specific implementation. In exemplary wristwatch 600, circuitry 630 includes an amplification circuit to amplify signals provided by contact sensors 621 and 622, a filtering circuit to filter signals provided by contact sensors 621 and 622, an analog-to-digital converter to convert analog signals provided by contact sensors 621 and 622 into digital signals, a digital processor to process the signals provided by contact sensors 621 and 122, and a non-transitory processor-readable storage medium or memory to store processor-executable instructions that, when executed by the digital processor in circuitry 630, cause the digital processor in circuitry 130 to process the signals provided by contact sensors 621 and 622. In other implementations, the circuitry of an enhanced watchstrap in accordance with the present systems, articles, and methods may include other components in addition to or instead of the components included in circuitry 630 of enhanced watchstrap 601, including without limitation: one or more battery(ies), one or more inductive charging elements, and/or one or more communication terminal(s) such as one or more wireless transmitter(s) and/or receiver(s) (either separately or combined as a wireless transceiver) employing a wireless communication protocol such as Bluetooth®, WiFi™, and/or NFC™, one or more tethered connector port(s) (e.g., one or more Universal Serial Bus (USB) port(s), one or more mini-USB port(s), one or more micro-USB port(s), and/or one or more Thunderbolt® port(s)), and/or any other form or forms of communication terminal(s), such as without limitation: one or more socket(s), one or more bonding pad(s), one or more set(s) of pins, and the like.

Any or all of on-board devices 621, 622, and/or 630 may be carried, in whole or in part, on a first surface (i.e., a "contact surface" that is in contact with a user's skin when wristwatch 600 is worn directly on a wrist of the user) of enhanced watchstrap 601. While the electrodes of contact sensors 621 and 621 generally need to contact the user's skin when enhanced watchstrap 601 is worn, further portions of sensors 621, 622 and/or device 630 (in whole or in part), may be carried on a second surface (i.e., a "non-contact surface" that is not in contact with the user's skin when wristwatch 600 is worn directly on the wrist of the user) of enhanced watchstrap 601 and/or carried within enhanced watchstrap 601.

Throughout this specification and the appended claims, the term "inductive charging element" is used to refer to a component of an inductive charging system that is designed to receive power transfer via inductive coupling. A person of skill in the art will appreciate that an inductive charging element may include a coil of conductive wire that receives power transfer when positioned proximate an alternating magnetic field.

Throughout this specification and the appended claims, the term "communication terminal" is generally used to refer to any physical structure that provides a communications link through which a data signal may enter and/or leave a device (or a component of a device, such as enhanced watchstrap 601). A communication terminal represents the end (or "terminus") of communicative signal transfer within a device (or a component of a device) and the beginning of communicative signal transfer with an external device (or a separate component of the device). In the case of a communication terminal in circuitry 630, the term "terminal" means that the communication terminal in circuitry 630 represents the end of communicative signal transfer within/on enhanced watchstrap 601 and the beginning of communicative signal transfer with other components of wristwatch 600 and/or with one or more device(s) separate from wristwatch 600 (e.g., one or more smartphone(s), one or more desktop, laptop, or tablet computer(s), etc.).

Figure 7A:
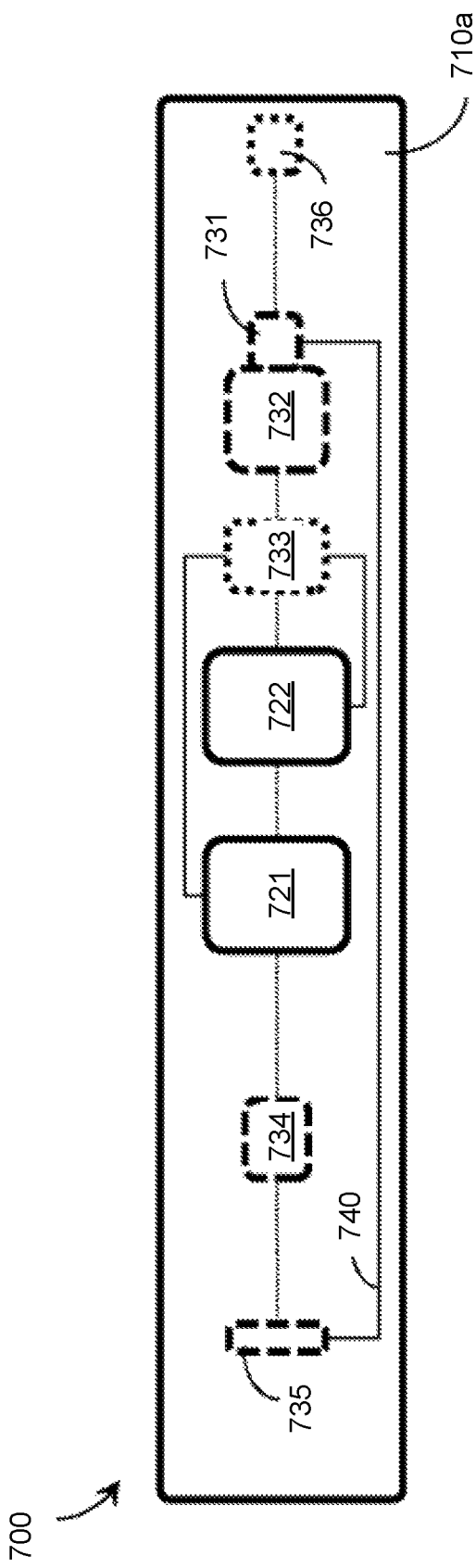
FIG. 7A is a plan view showing a contact surface of an exemplary enhanced watchstrap in accordance with the present systems, articles, and methods.

FIG. 7A is a plan view showing a contact surface 710a of an exemplary enhanced watchstrap 700 in accordance with the present systems, articles, and methods. Watchstrap 700 may be designed and/or adapted to fit or otherwise mate with any wristwatch (e.g., any mechanical, digital, analog, or smart watch housing, not shown in FIG. 7A) in a substantially similar way to that described for enhanced strap 101 of wristwatch 700 from FIG. 1. As FIG. 7A depicts the contact surface 710a of watchstrap 700 (i.e., the surface of strap 700 that contacts the user when strap 700 is worn), the bottom surface of watchstrap 700 is not visible in FIG. 7A; however, some features and devices that are included on the bottom surface of watchstrap 700 and within watchstrap 700 are illustrated in FIG. 7A for discussion purposes but shown in broken, dashed lines in FIG. 7A to indicate that such features and devices may not actually be visible in the plan view of FIG. 7A.

In accordance with the present systems, articles, and methods, a watchstrap for integration with a wristwatch may include at least one contact sensor, and thereby provide enhanced functionality/capability for the wristwatch. Enhanced watchstrap 700 includes contact sensors 721 and 722. Contact sensors 721 and 722 may include, for example, electromyography sensors such as those described in U.S. patent application Ser. No. 14/194,252, U.S. patent application Ser. No. 16/550,905, U.S. Pat. Nos. 10,429,928, 10,101,809, 10,042,422, U.S. patent application Ser. No. 17/141,646, U.S. Pat. Nos. 10,898,101, 10,251,577, and/or 10,188,309, each of which is incorporated by reference above. Either instead of or in addition to EMG sensors, contact sensors 721, 722 may include any type or types of biometric sensor(s) that are responsive to signals detected through physical contact with the user's skin, for example, single-frequency capacitive touch sensors, multi-frequency capacitive touch sensors, magnetomyography sensor(s), and so on (i.e., as described for watchstrap 101 in FIG. 6). In any case, at least an electrode portion of at least one contact sensor 721, 722 is positioned on the contact surface 710a of watchstrap 700 so that the at least one contact sensor 721, 722 may be positioned proximate (e.g., in physical contact with) the skin of the user.

Watchstrap 700 may be sized and dimensioned to mate (e.g., via at least one latch, pin, clasp, connector, or the like) with any wristwatch design to provide a strap or band therefor. The enhanced watchstraps described in the present systems, articles, and methods may comprise a single-piece of material (e.g., elastic material, flexible material, stretchable material, etc.) or multiple segments, links, or sections of material (e.g., rigid or semi-rigid material) adaptively coupled together by at least one adaptive coupler. For ease of illustration, watchstrap 700 in FIG. 7A is formed of a single-piece of flexible material such as fabric, cloth, leather, or similar. Watchstrap 700 may be substantially planar when laid out flat but may generally be curved in use.

The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band.

The plan view of FIG. 7A depicts the contact surface 710a of watchstrap 700 which carries contact sensors 721 and 722. Additional components (i.e., components 731, 732, 734, and 735 illustrated with wide-dashed lines in FIG. 7A) of watchstrap 700 are carried on a non-contact surface thereof (i.e., the surface of watchstrap 700 that is furthest from and does not contact the skin of the user when worn), and still further components (i.e., components 733 and 736 illustrated with dotted lines in FIG. 7A) of watchstrap 700 are carried in an inner volume thereof. Watchstrap 700 includes communication pathways 740 (only one called out in FIG. 7A to reduce clutter) that couple to and between various components of watchstrap 700 to provide communicative coupling therebetween. Portions of communication pathways 740 may be carried on the contact surface 710a, the non-contact surface, and/or in the inner volume of watchstrap 700. In some embodiments, additional components may be carried on the sides or edges of watchstrap 700.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings. Furthermore, the term "communicatively coupled" is generally used throughout this specification and the appended claims to include direct, 1:1 communicative coupling and indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Figure 7B:
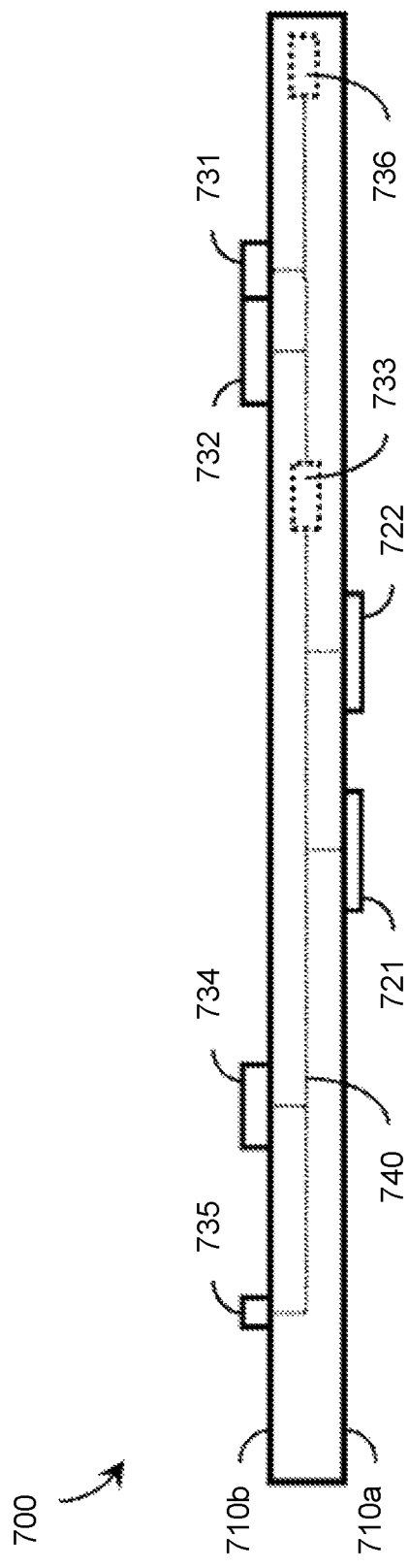
FIG. 7B is a side elevational view of the exemplary enhanced watchstrap from FIG. 7A showing the relative positions of components on the surfaces and in the inner volume thereof, in accordance with the present systems, articles, and methods.

To clarify the spatial arrangement of the components 721, 722, 731, 732, 733, 734, 735, 736, and 740 of watchstrap 700 illustrated in the plan view of FIG. 7A, FIG. 7B provides a side elevational view of the same exemplary watchstrap configuration.

FIG. 7B is a side elevational view of exemplary enhanced watchstrap 700 from FIG. 7A showing the relative positions of components on the surfaces and in the inner volume thereof, in accordance with the present systems, articles, and methods. In the side elevational view of FIG. 7B, both contact surface 710a and non-contact surface 710b of watchstrap 700 are visible. Contact surface 710a carries contact sensors 721 and 722 while non-contact surface 710b carries components 731, 732, 734, and 735. The inner volume of watchstrap 700 carries components 733 and 736, which are illustrated in dotted lines in FIG. 7B to indicate that they might not be visible in the view of FIG. 7B.

Watchstrap 700 provides an illustrative example of an enhanced watchstrap in accordance with the present systems, articles, and methods. In alternative implementations, more or fewer components (including all or no components) may be carried on the contact surface, on the non-contact surface, and/or in the inner volume of an enhanced watchstrap.

With reference to both FIGS. 2A and 2B, watchstrap 700 includes contact sensors 721, 722 that are communicatively coupled by at least one communication pathway 740 to circuitry 733. Circuitry 733 includes at least one of an amplification circuit, a filtering circuit, and/or an analog-to-digital conversion circuit, and is communicatively coupled by at least one communication pathway 740 to an on-board processor 731. Processor 731 is communicatively coupled to a non-transitory processor-readable storage medium or memory 732. Memory 732 stores processor-executable contact sensing instructions that, when executed by processor 731, cause processor 731 to process signals provided by contact sensors 721 and 722. For example, processor-executable contact sensing instructions may, when executed by processor 731, cause processor 731 to perform gesture identification based on EMG sensor signals as described in U.S. patent application Ser. No. 14/494,274 and/or U.S. Provisional Patent Application Ser. No. 61/894,263 (each of which is incorporated by reference herein in its entirety) and/or for processing single-frequency and/or multi-frequency capacitive touch sensor signals. Processor 731 is also communicatively coupled (by respective communication pathways 740) to first and second communication terminals 735 and 736. Communication terminal 735 is a wireless communication terminal (e.g., a Bluetooth® transmitter and/or receiver) that enables information from processor 731 to be sent wirelessly to any receiving device, such as a smartphone, computer, etc. Communication terminal 736 is a wired communication terminal that may, for example, provide a direct communicative coupling point between watchstrap 700 and a housing (e.g., housing 110 from FIG. 6) of a wristwatch, where the housing includes a clock face and other watch/smartwatch elements.

Watchstrap 700 also includes at least one power source 734 that is communicatively coupled to all components of watchstrap 700 that require power. Power source 734 may include at least one battery and/or at least one inductive charging element.

Communication pathways 740 may be implemented in a variety of forms. For example, communication pathways 740 may include electrical wires and/or conductive traces. In the latter case, at least one flexible printed circuit board may be carried on at least one surface 710a, 710b of watchstrap 700 and/or in an inner volume of watchstrap 700 and conductive traces 740 may be carried on and/or in the at least one flexible printed circuit board. Stretchable printed circuit boards may be employed, such as those described in U.S. patent application Ser. No. 14/471,982, which is incorporated by reference herein in its entirety. Elastic conductors may be employed. In some implementations, watchstrap 700 may essentially comprise a flexible printed circuit board that is formed of bio-compatible material. In implementations in which an enhanced watchstrap is formed of a set of rigid or semi-rigid links that are adaptively coupled together by at least one adaptive coupler, at least one rigid or semi-rigid link may comprise and/or include at least one rigid printed circuit board that carries communication pathways.

A person of skill in the art will appreciate that watchstrap 700 includes one type of contact sensor 721, 722 and six components 731, 732, 733, 734, 735, and 736, though in practice an enhanced watchstrap may carry any number of components (including more or fewer than six components) and any number or type of sensors depending on the functionality provided by the watchstrap.

Enhanced watchstrap 700 may be integrated into any known wristwatch design by substituting for the existing strap or band in the design and, optionally, communicatively coupling to circuitry in the existing design (if such circuitry exists) through communication terminal 736.

Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

The various embodiments of enhanced watchstraps described herein are generic in that they can be adapted to integrate with any known wristwatch design (including traditional watches and smart watches) by, for example, sizing and dimensioning the watchstrap to mate with existing wristwatch components (such as the housing or clock face display) and, optionally, communicatively coupling the electrical components of the watchstrap to existing electrical components of the wristwatch (if such circuitry exists) through a dedicated communication terminal (e.g., terminal 736). In this way, the enhanced straps described herein introduce new components and associated functionality/capability into existing wristwatch designs, thereby transforming virtually any traditional wristwatch design into a smart watch and/or enhancing the functions and capabilities of virtually any smart watch design. In implementations in which an enhanced watchstrap is not communicatively coupled to electrical components of a wristwatch (i.e., in implementations in which communication terminal 736 is not used), the enhanced watchstraps described herein may still communicate with other devices (such as a smartphone, computer, etc.) wirelessly (e.g., using communication terminal 735) and thereby provide enhanced, smart watch-like functionality in an otherwise non-smart watch design.

The present systems, articles, and methods may employ the systems, articles, and methods for processing EMG sensor data described in U.S. patent application Ser. No. 14/186,889, U.S. patent application Ser. No. 14/465,194, and/or U.S. Pat. No. 9,372,535, each of which is incorporated by reference herein in its entirety. In the case of contact sensors that are not EMG sensors (e.g., single-frequency capacitive touch sensors and/or multi-frequency capacitive touch sensors), the systems, articles, and methods of U.S. patent application Ser. No. 14/186,889, U.S. patent application Ser. No. 14/465,194, and/or U.S. Pat. No. 9,372,535 may be readily adapted to accommodate non-EMG based contact sensor data.

As previously described, contact sensors and associated circuitry may be on-board or otherwise packaged with a watch housing back-plate, either on its own or in conjunction with contact sensors packaged with a watchstrap as described in FIGS. 1, 2A, and 2B. For example, the various embodiments described herein provide systems, articles, and methods for generic wristwatch back-plates that may be adapted to fit to any known wristwatch design and incorporated into virtually any wristwatch during manufacturing thereof. The back-plates described herein incorporate various types of contact sensors and thereby enhance the functions and/or capabilities of the wristwatch with which they are integrated. In this way, the back-plates described herein can add sensing and/or other capabilities to "traditional" watch designs (i.e., non-smart watch designs) to effectively transform the traditional watch into a smart watch, and/or the back-plates described herein can add new sensing and/or other capabilities to smart watch designs.

Figure 8:
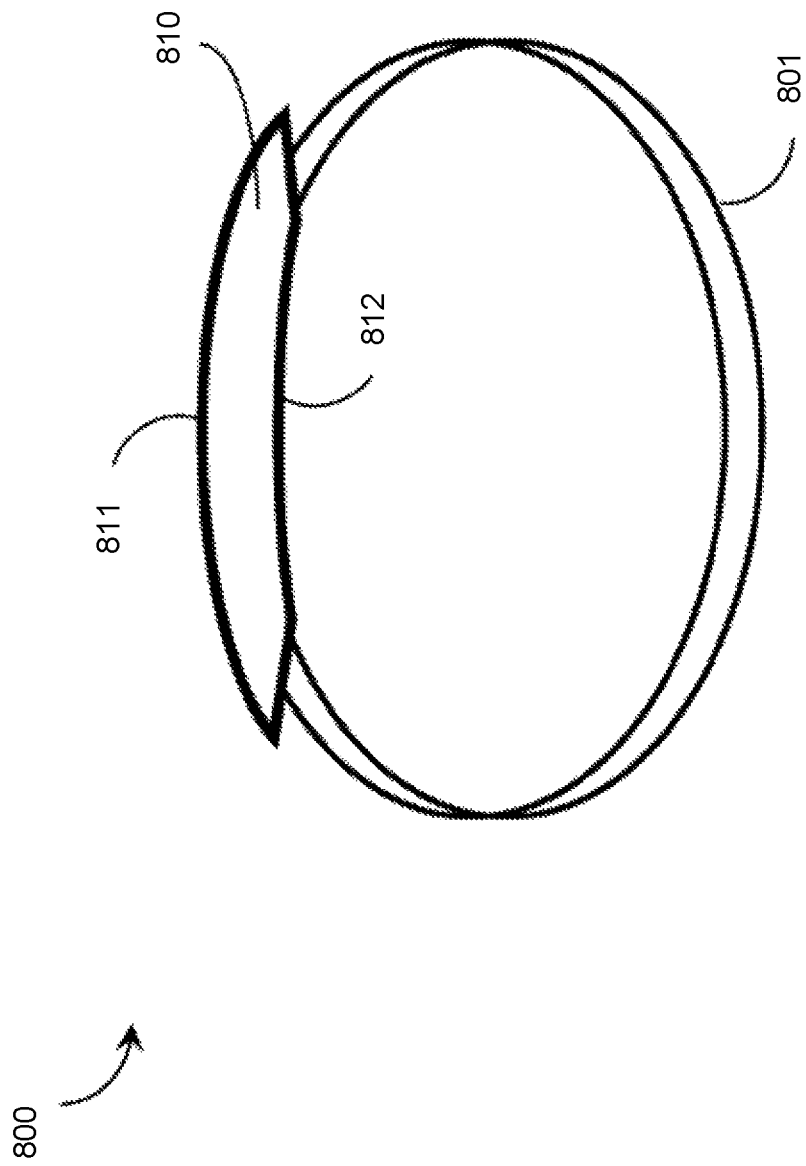
FIG. 8 is a perspective view of an exemplary wristwatch that includes an enhanced back-plate having at least one contact sensor in accordance with the present systems, articles, and methods.

FIG. 8 is a perspective view of an exemplary wristwatch 800 that includes an enhanced back-plate 812 in accordance with the present systems, articles, and methods. Wristwatch 800 includes a wristband 801 that enwraps the wrist of a user to secure wristwatch 800 in position on the user's wrist. Wristband 801 may be elastic, fabric, cloth, leather, or formed of serially-coupled links or any other flexible material and may or may not include a latch, clasp, or other fastening device (not shown in FIG. 8). Wristband 801 may be a traditional watchstrap or an enhanced watchstrap such as watchstrap 101 from FIG. 6, watchstrap 700 from FIGS. 2A and 2B, and/or an enhanced watchstrap as described in U.S. patent application Ser. No. 15/882,858 and U.S. patent application Ser. No. 14/505,836, which are incorporated by reference herein in its entirety. Wristwatch 800 also includes a housing 810 having a top surface 811 and an enhanced back-plate 812 in accordance with the present systems, articles, and methods. Top surface 811 includes a window or display that may provide a means of conveying information to a user (such as the time, etc.) and/or an interface through which the user may program and/or control functions of wristwatch 800. For example, wristwatch 800 may be a traditional analog or mechanical watch, in which case the display of top surface 811 may include a simple sheet of transparent material such as glass or plastic (commonly referred to as the "crystal") forming a window through which the hands of an analog watch face may be seen by the user, or wristwatch 800 may be a traditional digital watch, in which case the display of top surface 811 may include a digital display screen, or wristwatch 800 may be a smart watch, in which case the display of top surface 811 may include a touchscreen. Wristwatch 800 may be substantially similar to any known wristwatch except that wristwatch 800 includes enhanced back-plate 812 providing additional functions and/or capabilities in accordance with the present systems, articles, and methods.

Figure 9:
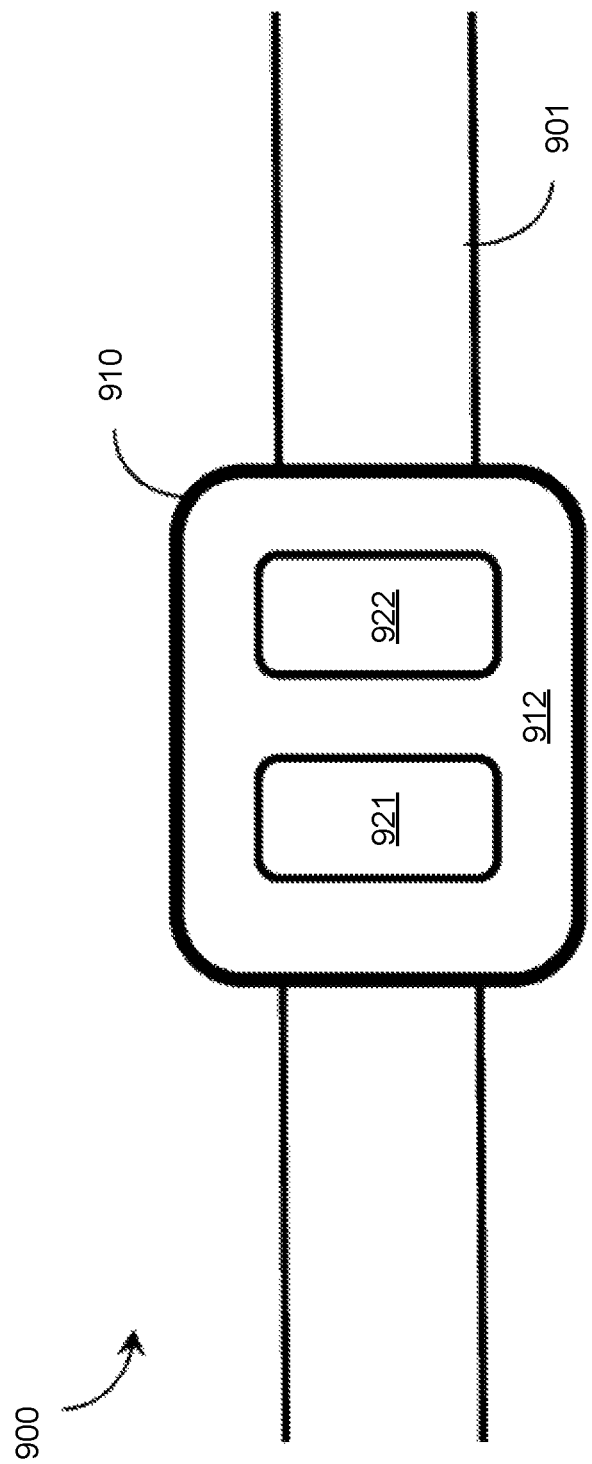
FIG. 9 is a plan view showing an underside of a wristwatch and thereby providing a clearer view (compared to the perspective view of FIG. 8) of a back-plate that is enhanced in accordance with the present systems, articles, and methods.

FIG. 9 is a plan view showing an underside of a wristwatch 900 and thereby providing a clearer view (compared to the perspective view of FIG. 8) of a back-plate 912 that is enhanced in accordance with the present systems, articles, and methods. Wristwatch 900 is substantially similar to wristwatch 800 from FIG. 8 and includes a wristband 901 (similar to wristband 801 from FIG. 8) and a housing 910 (similar to housing 810 from FIG. 8). As FIG. 9 depicts the underside of housing 910, the top surface of housing 910 is not visible in FIG. 9. The top surface of housing 910 may include a window or display, (e.g., an electronic display screen with or without a touchscreen) as seen in virtually all known wristwatch designs.

In accordance with the present systems, articles, and methods, a back-plate for integration with a wristwatch may include at least one contact sensor, and thereby provide enhanced functionality/capability for the wristwatch. Enhanced back-plate 912 includes contact sensors 921 and 922. Contact sensors 921 and 922 may include, for example, EMG sensors, single-frequency capacitive touch sensors, multi-frequency capacitive touch sensors, magnetomyography sensors, acoustic myography sensors, electrocardiography sensors, blood pressure sensors, one or more skin conductance sensor(s), and/or generally any type or types of biometric sensor(s) that are responsive to signals detected through physical contact with the user's skin. In any case, at least one contact sensor (921, 922) is positioned on a first surface of back-plate 912 (i.e., the surface of back-plate 912 that corresponds to the underside of housing 910 in wristwatch 900, hereafter the "contact surface") so that the at least one contact sensor (921, 922) may be positioned proximate (e.g., in physical contact with) the skin of the user.

Back-plate 912 may be sized and dimensioned to mate with any wristwatch design to provide a back-plate therefor and/or an underside thereof. For example, back-plate 912 is illustrated in FIG. 9 as having a substantially square geometry with rounded corners, while in other implementations back-plate 912 may be adapted to provide other geometries, including but not limited to: substantially square, substantially rectangular, substantially circular, and substantially polygonal. Back-plate 912 may be substantially planar (i.e., flat) or, as illustrated in wristwatch 800 of FIG. 8, back-plate 912 may be curved to better accommodate the shape of a user's wrist. In the case of back-plate 912 being curved, a two-dimensional projection of the geometry of back-plate 912 (as seen, for example, in the plan view of FIG. 9) may be any shape designed to accommodate the specifications of a particular wristwatch, including but not limited to: substantially square, substantially rectangular, substantially circular, and substantially polygonal.

The plan view of FIG. 9 depicts the underside of housing 910 in order to show the contact surface of back-plate 912 which carries contact sensors 921 and 922. Back-plate 912 mates with a top surface of housing 910 (either directly, or by mating with at least one sidewall that provides physical coupling between back-plate 912 and a top surface of housing 910) to form a volume having a hollow inner cavity. Additional components of wristwatch 900 (such as, for example, gears, circuitry, a quartz oscillator, a digital processor, and so on) may be included in this inner cavity. In some embodiments, additional components may be carried on a second surface of back-plate 912 that is opposite the first surface (i.e., a "non-contact surface" of back-plate 912 that is at least partially contained within the cavity and does not physically contact the user's skin when worn), such that the additional components carried on the non-contact surface of back-plate 912 are contained in the cavity of housing 910.

Figure 10:
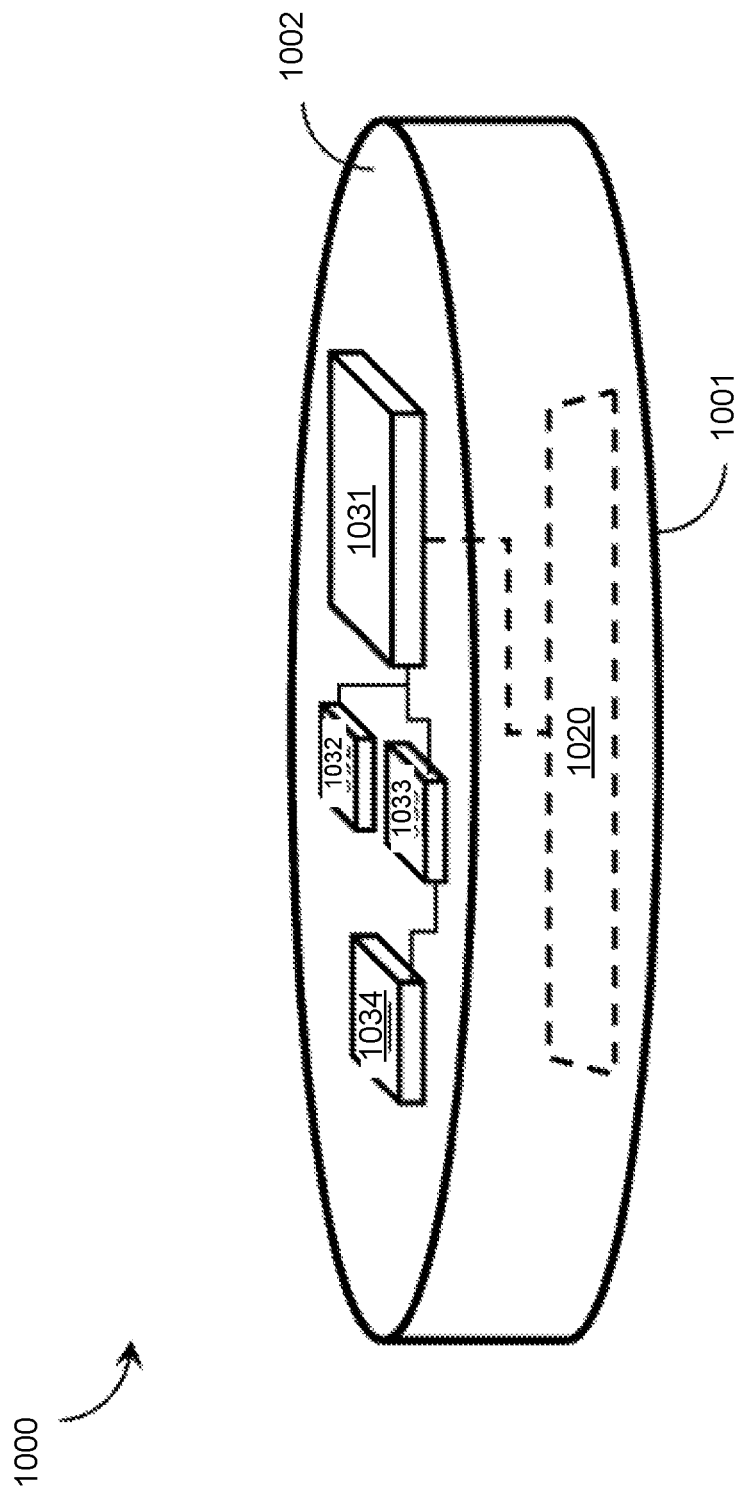
FIG. 10 is a perspective view of an enhanced back-plate for integration into a wristwatch in accordance with the present systems, articles, and methods.

FIG. 10 is a perspective view of a back-plate 1000 for integration into a wristwatch in accordance with the present systems, articles, and methods. Back-plate 1000 comprises a plate of substantially rigid material having a first surface (i.e., a "contact surface") 1001 and a second surface (i.e., a "non-contact surface") 1002 opposite the contact surface. The contact surface 1001 forms the underside of a housing (e.g., housing 810 from FIG. 8 or 910 from FIG. 9) when integrated into a wristwatch and may be immediately proximate (e.g., in physical contact with) the user's skin during use. In accordance with the present systems, articles, and methods, contact surface 1001 includes at least one contact sensor 1020 (or at least, an electrode thereof), shown in dotted lines in FIG. 10 to indicate that this component is not actually visible in the view of FIG. 10. The non-contact surface 1002 of back-plate 1000 carries multiple components 1031, 1032, 1033, and 1034, which may take on a variety of different forms depending on the specific implementation. In general, component 1031 represents circuitry (e.g., electrical and/or electronic). Circuitry 1031 is communicatively coupled to contact sensor 1020 by, e.g., an electrically conductive path that extends through back-plate 1000. Circuitry 1031 may include various circuits, including but not limited to: filtering circuits, amplification circuits, analog-to-digital conversion circuits, routing circuits, and so on. Components 1032, 1033 and 1034 may each include any or all of, for example: a pedometer, an inertial sensor such as an accelerometer and/or a gyroscope, a compass, a GPS unit, a wireless transmitter (on its own or as part of a wireless transceiver) such as Bluetooth™, WiFi™, and/or NFC™, a tethered connector port such as USB, micro-USB, pins or sockets, a battery, a digital processor, and/or an inductive charging element. In applications where one of components 1032, 1033, and 1034 is a wireless transmitter, data may be transmitted from back-plate 1000 (e.g., data provided by contact sensor 1020) to any receiving device, such as to a smartphone, laptop computer, tablet computer, or desktop computer. At least one of components 1032 and/or 1033 may include a non-transitory processor-readable storage medium that stores processor-executable contact sensing instructions that, when executed by a processor (e.g., either a processor on-board back-plate 1000, for example, component 1033, or a processor in a smart watch with which back-plate 1000 is integrated through, for example, a tethered connector port), cause the processor to process signals provided by contact sensor 1020.

Components 1031, 1032, 1033, and 1034 may include at least one of a tethered connector port for communicatively coupling to at least one electrical or electronic component of a wristwatch (e.g., at least one port for galvanically electrically coupling to one or components of the wristwatch with which back-plate 1000 is integrated (i.e., components not carried by back-plate 1000)) and/or a wireless transmitter (e.g., wireless transceiver) for transmitting data provided by the at least one contact sensor 1020 to at least one receiving device, such as a smartphone or other computer. In either case, at least one of components 1031, 1032, 1033, and 1034 provides a means through which data provided by the at least one contact sensor 1020 is transmitted to a data processing system (either on-board or separate from back-plate 1000 or the wristwatch with which back-plate 1000 is integrated) for processing, analysis, and/or storage. In the case of components 1031, 1032, 1033, and 1034 including a wireless transmitter and no tethered connector port for galvanically interfacing with one or more other components of the wristwatch with which back-plate 1000 is integrated, back-plate 1000 and all components thereof (i.e., contact sensor 1020 and components 1031, 1032, 1033, and 1034) may be communicatively isolated from all components of the wristwatch with which back-plate 1000 is integrated.

A person of skill in the art will appreciate that FIG. 10 shows four components 1031, 1032, 1033, and 1034 on the second "non-contact" surface 1002 of back-plate 1000, though in practice a back-plate may carry any number of components (including more or fewer than four components) depending on the functionality provided by the back-plate.

As back-plate 1000 is designed to be integrated into a wristwatch (e.g., as a component of the wristwatch integrated into the wristwatch during manufacturing thereof), the non-contact surface 1002 of back-plate 1000 may include a communication terminal 1034 (such as a tethered connector port) to communicatively couple with other electrical and/or electronic circuitry of the wristwatch. For example, communication terminal 1034 may communicatively couple with an electronic display screen (e.g., a touchscreen) of the wristwatch and/or communication terminal 1034 may communicatively couple with any electrical component contained within the cavity of the housing of the wristwatch. Communication terminal 1034 may include any type of electrical or optical connector, including but not limited to a zero insertion force connector, a socket, a set of pins or bonding pads, a micro-USB connector, and so on. Thus, back-plate 1000 may be integrated into any known wristwatch design by substituting for the existing back-plate in the design and, optionally, communicatively coupling to circuitry in the existing design (if such circuitry does exist) through communication terminal 1034.

The various embodiments of wristwatch back-plates described herein are generic in that they can be adapted to integrate with any known wristwatch design by, for example, sizing and dimensioning the plate to mate with existing wristwatch components (such as the display window or screen with/without associated sidewalls) and, optionally, communicatively coupling the electrical components of the back-plate to existing electrical components of the wristwatch (if such electrical components exist) through a dedicated communication terminal (e.g., terminal 1034). In this way, the enhanced back-plates described herein introduce new components and associated functionality/capability into existing wristwatch designs, thereby transforming virtually any traditional wristwatch design into a smart watch and/or enhancing the functions and capabilities of virtually any smart watch design.

As previously described, in accordance with the present systems, articles, and methods at least one contact sensor may be incorporated into a wearable device that otherwise provides some other functionality (such as a wristwatch) or into a dedicated wearable electronic device that is specifically designed to provide contact sensing functionality. For example, a wearable electronic device may be fitted with multiple EMG sensors that are responsive to muscle activity for the purpose of enabling gesture-based control in a human-electronics interface as described in U.S. Pat. No. 10,528,135, U.S. patent application Ser. No. 14/335,668, and/or U.S. Pat. No. 10,152,082, each of which is incorporated by reference herein in its entirety, and/or in any of the other US Provisional Patent Applications incorporated by reference herein. In accordance with the present systems, articles, and methods, such a wearable EMG device may be adapted to include at least one capacitive touch sensor, such as at least one single-frequency capacitive touch sensor and/or at least one multi-frequency capacitive touch sensor.

Figure 11:
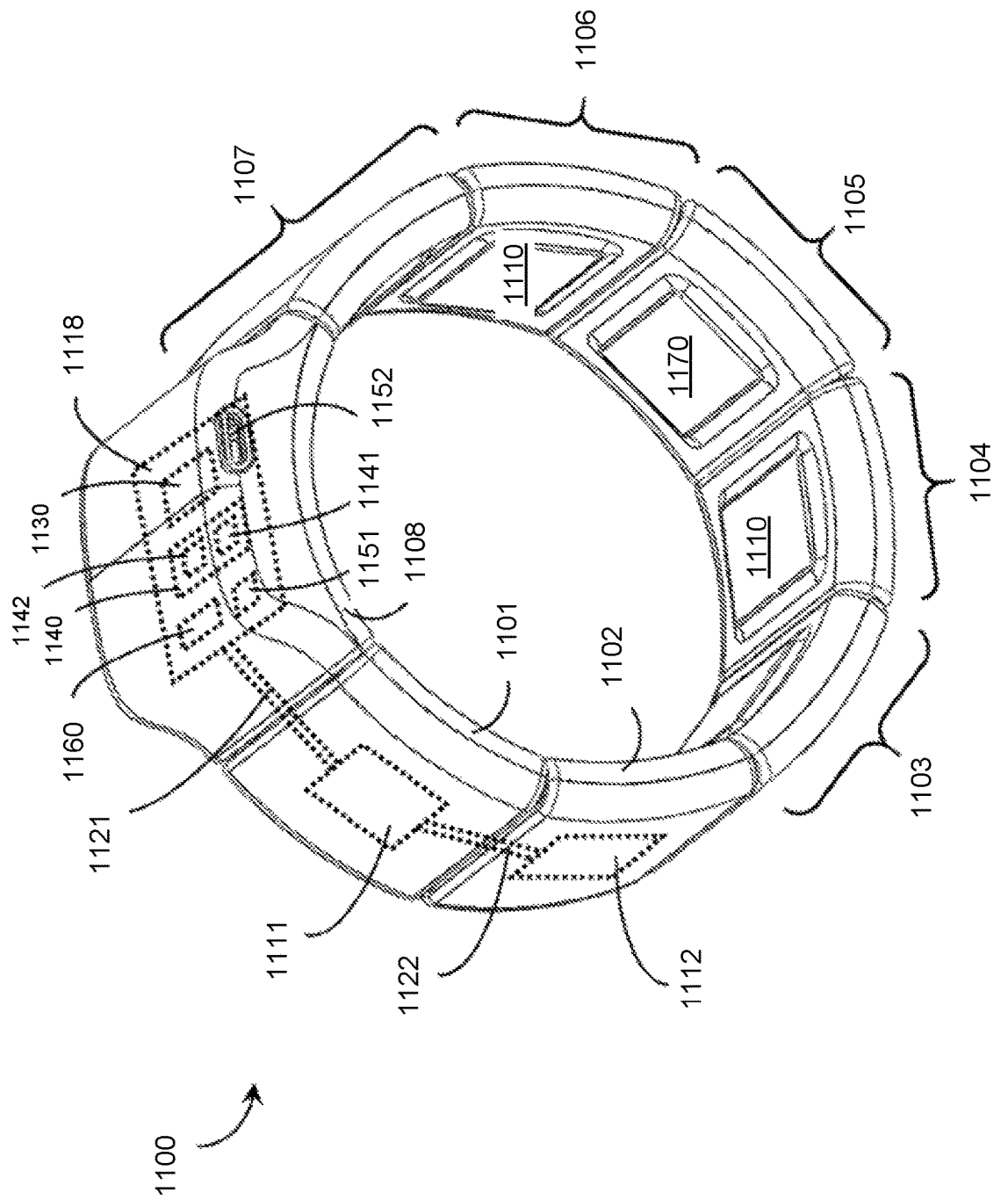
FIG. 11 is a perspective view of an exemplary wearable electromyography ("EMG") device that includes two contact sensor types: a set of capacitive EMG sensors and at least one capacitive touch sensor in accordance with the present systems, articles, and methods.

FIG. 11 is a perspective view of an exemplary wearable EMG device 1100 that includes two contact sensor types: a set of capacitive EMG sensors 1110 (only two called out to reduce clutter) and at least one capacitive touch sensor 1170 in accordance with the present systems, articles, and methods. Exemplary wearable EMG device 1100 may, for example, form part of a human-electronics interface. Exemplary wearable EMG device 1100 is an armband designed to be worn on the forearm of a user, though a person of skill in the art will appreciate that the teachings described herein may readily be applied in wearable EMG devices designed to be worn elsewhere on the body of the user, including without limitation: on the upper arm, wrist, hand, finger, leg, foot, torso, or neck of the user.

Device 1100 includes a set of eight pod structures 1101, 1102, 1103, 1104, 1105, 1106, 1107, and 1108 that form physically coupled links of the wearable EMG device 1100. Each pod structure in the set of eight pod structures 1101, 1102, 1103, 1104, 1105, 1106, 1107, and 1108 is positioned adjacent and in between two other pod structures in the set of eight pod structures such that the set of pod structures forms a perimeter of an annular or closed loop configuration. For example, pod structure 1101 is positioned adjacent and in between pod structures 1102 and 1108 at least approximately on a perimeter of the annular or closed loop configuration of pod structures, pod structure 1102 is positioned adjacent and in between pod structures 1101 and 1103 at least approximately on the perimeter of the annular or closed loop configuration, pod structure 1103 is positioned adjacent and in between pod structures 1102 and 1104 at least approximately on the perimeter of the annular or closed loop configuration, and so on. Each of pod structures 1101, 1102, 1103, 1104, 1105, 1106, 1107, and 1108 is physically coupled to the two adjacent pod structures by at least one adaptive coupler (not visible in FIG. 11). For example, pod structure 1101 is physically coupled to pod structure 1108 by an adaptive coupler and to pod structure 1102 by an adaptive coupler. As described previously, the term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 1101, 1102, 1103, 1104, 1105, 1106, 1107, and 1108 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 1100 is depicted in FIG. 11 with the at least one adaptive coupler completely retracted and contained within the eight pod structures 1101, 1102, 1103, 1104, 1105, 1106, 1107, and 1108 (and therefore the at least one adaptive coupler is not visible in FIG. 11).

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 1101 and 1102 of device 1100 can each be moved or displaced relative to one another within the constraints imposed by the adaptive coupler providing adaptive physical coupling therebetween. The desire for pod structures 1101 and 1102 to be movable/displaceable relative to one another specifically arises because device 1100 is a wearable EMG device that advantageously accommodates the movements of a user and/or different user forms.

Device 1100 includes eight pod structures 1101, 1102, 1103, 1104, 1105, 1106, 1107, and 1108 that form physically coupled links thereof. Wearable EMG devices employing pod structures (e.g., device 1100) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 1100 of FIG. 11, each of pod structures 1101, 1102, 1103, 1104, 1105, 1106, 1107, and 1108 comprises a respective housing having a respective inner volume. Each housing may be formed of substantially rigid material and may be optically opaque. As previously described, throughout this specification and the appended claims, the term "rigid" as in, for example, "substantially rigid material," is used to describe a material that has an inherent tendency to maintain or restore its shape and resist malformation/deformation under the moderate stresses and strains typically encountered by a wearable electronic device.

Details of the components contained within the housings (i.e., within the inner volumes of the housings) of pod structures 1101, 1102, 1103, 1104, 1105, 1106, 1107, and 1108 are not visible in FIG. 11. To facilitate descriptions of exemplary device 1100, some internal components are depicted by dashed lines in FIG. 11 to indicate that these components are contained in the inner volume(s) of housings and may not normally be actually visible in the view depicted in FIG. 11, unless a transparent or translucent material is employed to form the housings. For example, any or all of pod structures 1101, 1102, 1103, 1104, 1105, 1106, 1107, and/or 1108 may include circuitry (i.e., electrical and/or electronic circuitry). In FIG. 11, a first pod structure 1101 is shown containing circuitry 1111 (i.e., circuitry 1111 is contained in the inner volume of the housing of pod structure 1101), a second pod structure 1102 is shown containing circuitry 1112, and a third pod structure 1108 is shown containing circuitry 1118. The circuitry in any or all pod structures may be communicatively coupled to the circuitry in at least one adjacent pod structure by at least one respective communicative pathway (e.g., by at least one electrically conductive pathway and/or by at least one optical pathway). For example, FIG. 11 shows a first set of communicative pathways 1121 providing communicative coupling between circuitry 1118 of pod structure 1108 and circuitry 1111 of pod structure 1101, and a second set of communicative pathways 1122 providing communicative coupling between circuitry 1111 of pod structure 1101 and circuitry 1112 of pod structure 1102. Communicative coupling between circuitries of adjacent pod structures in device 1100 may advantageously include systems, articles, and methods for signal routing as described in U.S. patent application Ser. No. 14/461,044, which is incorporated by reference herein in its entirety.

Each individual pod structure within a wearable EMG device may perform a particular function, or particular functions. For example, in device 1100, each of pod structures 1101, 1102, 1103, 1104, 1105, 1106, and 1107 includes a respective contact sensor 1110 or 1170; thus, each of pod structures 1101, 1102, 1103, 1104, 1105, 1106, and 1107 may be referred to as a respective "sensor pod." Device 1100 employs at least two different types of contact sensors: capacitive EMG sensors 1110 and at least one capacitive touch sensor 1170. In the illustrated example, sensor pods 1101, 1102, 1103, 1104, 1106, and 1107 each include a respective capacitive EMG sensor 1110 responsive to (e.g., to detect) muscle activity of a user that provides electrical signals in response to detected muscle activity, while sensor pod 1105 includes a capacitive touch sensor 1170 (e.g., a single-frequency capacitive touch sensor or a multi-frequency capacitive touch sensor) responsive to (e.g., to detect) physical contact between a user and an object (i.e., when and/or how a user is physically touching an object) and that provides signals in response to detected physical contact. Throughout this specification and the appended claims, the term "sensor pod" is used to denote an individual pod structure that includes at least one contact sensor.

Pod structure 1108 of device 1100 includes a processor 1130 that processes the signals provided by the contact sensors 1110 and 1170 of sensor pods 1101, 1102, 1103, 1104, 1105, 1106, and 1107. Pod structure 1108 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. A person of skill in the art will appreciate that implementations that employ a digital processor (e.g., a digital microprocessor or microcontroller, a DSP, etc.) may advantageously include a non-transitory processor-readable storage medium or memory 1140 communicatively coupled thereto and storing processor-executable instructions that control the operations thereof, whereas implementations that employ an ASIC, FPGA, or analog processor may or may not include a non-transitory processor-readable storage medium.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a contact sensor and performs at least the function(s) of a sensor pod, and the term processor pod is used to refer to any pod structure that includes a processor and performs at least the function(s) of a processor pod. In device 1100, processor pod 1108 includes a capacitive EMG sensor 1110 (not visible in FIG. 11) to sense, measure, transduce or otherwise detect muscle activity of a user, so processor pod 1108 could be referred to as a sensor pod. However, in exemplary device 1100, processor pod 1108 is the only pod structure that includes a processor 1130, thus processor pod 1108 is the only pod structure in exemplary device 1100 that can be referred to as a processor pod. The processor 1130 in processor pod 1108 also processes the EMG signals provided by the capacitive EMG sensor 1110 of processor pod 1108. In alternative embodiments of device 1100, multiple pod structures may include processors, and thus multiple pod structures may serve as processor pods. Similarly, some pod structures may not include contact sensors, and/or some contact sensors and/or processors may be laid out in other configurations that do not involve pod structures.

In device 1100, processor 1130 includes and/or is communicatively coupled to a non-transitory processor-readable storage medium or memory 1140. Memory 1140 stores at least two sets of processor-executable instructions: processor-executable gesture identification instructions 1141 that, when executed by processor 1130, cause processor 1130 to process the EMG signals from capacitive EMG sensors 1110 and identify a gesture to which the EMG signals correspond, and processor-executable touch sensing instructions 1142 that, when executed by processor 1130, cause processor 1130 to process the signals from the at least one capacitive touch sensor 1170. For communicating with a separate electronic device (not shown), wearable EMG device 1100 includes at least one communication terminal. As examples, device 1100 includes a first communication terminal 1151 and a second communication terminal 1152. First communication terminal 1151 includes a wireless transmitter (i.e., a wireless communication terminal) and second communication terminal 1152 includes a tethered connector port 1152. Wireless transmitter 1151 may include, for example, a Bluetooth® transmitter (or similar) and connector port 1152 may include a Universal Serial Bus port, a mini-Universal Serial Bus port, a micro-Universal Serial Bus port, a SMA port, a THUNDERBOLT® port, or the like.

For some applications, device 1100 may also include at least one inertial sensor 1160 (e.g., an inertial measurement unit, or "IMU," that includes at least one accelerometer and/or at least one gyroscope) responsive to (e.g., to detect, sense, or measure) motion effected by a user and that provides signals in response to detected motion. Signals provided by inertial sensor 1160 may be combined or otherwise processed in conjunction with signals provided by capacitive EMG sensors 1110 and/or capacitive touch sensor(s) 1170.

Throughout this specification and the appended claims, the term "provide" and variants such as "provided" and "providing" are frequently used in the context of signals. For example, a contact sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a capacitive EMG sensor may include at least one electrode that capacitively couples to electrical signals from muscle activity. This capacitive coupling induces a change in a charge or electrical potential of the at least one electrode which is then relayed through the sensor circuitry and output, or "provided," by the sensor. Thus, the capacitive EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

As previously described, each of pod structures 1101, 1102, 1103, 1104, 1105, 1106, 1107, and 1108 may include circuitry (i.e., electrical and/or electronic circuitry). FIG. 11 depicts circuitry 1111 inside the inner volume of sensor pod 1101, circuitry 1112 inside the inner volume of sensor pod 1102, and circuitry 1118 inside the inner volume of processor pod 1118. The circuitry in any or all of pod structures 1101, 1102, 1103, 1104, 1105, 1106, 1107 and 1108 (including circuitries 1111, 1112, and 1118) may include any or all of: an amplification circuit to amplify electrical signals provided by at least one contact sensor 1110, 1170; a filtering circuit to remove unwanted signal frequencies from the signals provided by at least one contact sensor 1110, 1170; and/or an analog-to-digital conversion circuit to convert analog signals into digital signals. Device 1100 may also include at least one battery (not shown in FIG. 11) to provide a portable power source for device 1100.

Signals that are provided by contact sensors 1110, 1170 in device 1100 are routed to processor pod 1108 for processing by processor 1130. To this end, device 1100 employs a set of communicative pathways (e.g., 1121 and 1122) to route the signals that are output by sensor pods 1101, 1102, 1103, 1104, 1105, 1106, and 1107 to processor pod 1108. Each respective pod structure 1101, 1102, 1103, 1104, 1105, 1106, 1107, and 1108 in device 1100 is communicatively coupled to, over, or through at least one of the two other pod structures between which the respective pod structure is positioned by at least one respective communicative pathway from the set of communicative pathways. Each communicative pathway (e.g., 1121 and 1122) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 1100 from FIG. 11 represents an example of a wearable EMG device that incorporates at least one capacitive touch sensor 1170 (e.g., at least one single-frequency capacitive touch sensor and/or at least one multi-frequency capacitive touch sensor) in accordance with the teachings of the present systems, articles, and methods, though the teachings of the present systems, articles, and methods are applicable to any wearable electronic device. In most applications, it is advantageous for the wearable device to include an on-board processor for processing contact sensor signals as described herein, but a person of skill in the art will appreciate that at least some of the acts involved in processing contact sensor signals may be performed by a processor that is separate from the wearable device (e.g., a processor in a computer that receives signals from the wearable device).

As previously described, incorporating at least one capacitive touch sensor into a wearable device (such as a wristwatch of a wearable EMG device) can enable the device to detect physical contact between a user and an object (i.e., when and/or how a user is physically interacting with an object) and to provide signals in response to the detected physical contact. Furthermore, at least two capacitive touch sensors worn on different parts of the user's body (e.g., in a first wearable device, such as a wearable EMG device, worn on a first arm of the user and a second wearable device, such as a wristwatch or a second wearable EMG device, worn on a second arm of the user) can be used to detect poses, postures, gestures, and/or other configurations performed by the user as described in Sato et al. Such poses, postures, gestures, and/or other configurations detected by at least two capacitive touch sensors worn on different parts of the user's body (similar to, for example, U.S. Pat. No. 9,372,535) may facilitate gesture identification and/or expand the library of gestures available to a user in, for example, a human-electronics interface employing gesture-based control.

Description for Electromyographic Control of Electronic Devices

The various embodiments described herein provide systems, articles, and methods for human-electronics interfaces employing a generalized wearable EMG device that may be readily implemented in a wide range of applications. The human-electronics interfaces described herein employ a wearable EMG device that controls functions of another electronic device not by outputting "commands" as in the known proposals previously described, but by outputting generic gesture identification signals, or "flags," that are not specific to the particular electronic device being controlled. In this way, the wearable EMG device may be used to control virtually any other electronic device if, for example, the other electronic device (or multiple other electronic devices) is (are) programmed with instructions for how to respond to the gesture identification flags.

Throughout this specification and the appended claims, the term "gesture identification flag" is used to refer to at least a portion of a data signal (e.g., a bit string) that is defined by and transmitted from a wearable EMG device in response to the wearable EMG device identifying that a user thereof has performed a particular gesture. The gesture identification flag may be received by a "receiving" electronic device, but the "gesture identification flag" portion of the data signal does not contain any information that is specific to the receiving electronic device. A gesture identification flag is a general, universal, and/or ambiguous signal that is substantially independent of the receiving electronic device (e.g., independent of any downstream processor-based device) and/or generic to a variety of applications run on any number of receiving electronic devices (e.g., generic to a variety of end user applications executable by one or more downstream processor-based device(s) useable with the wearable EMG device). A gesture identification flag may carry no more information than the definition/identity of the flag itself. For example, a set of three gesture identification flags may include a first flag simply defined as "A," a second flag simply defined as "B," and a third flag simply defined as "C." Similarly, a set of four binary gesture identification flags may include a 00 flag, a 01 flag, a 10 flag, and a 11 flag. In accordance with the present systems, articles, and methods, a gesture identification flag may be defined and output by a wearable EMG device with little to no regard for the nature or functions of the receiving electronic device. The receiving electronic device may be programmed with specific instructions for how to interpret and/or respond to one or more gesture identification flag(s). As will be understood by a person of skill in the art, in some applications a gesture identification flag may be combined with authentication data, encryption data, device ID data (i.e., transmitting electronic device ID data and/or receiving electronic device ID data), pairing data, and/or any other data to enable and/or facilitate telecommunications between the wearable EMG device and the receiving electronic device in accordance with known telecommunications protocols (e.g., Bluetooth®). For greater certainty, throughout this specification and the appended claims, the term "gesture identification flag" refers to at least a portion of a data signal that is defined by a wearable EMG device based (at least in part) on EMG and/or accelerometer data and is substantially independent of the receiving electronic device. For the purposes of transmission, a gesture identification flag may be combined with other data that is at least partially dependent on the receiving electronic device. For example, a gesture identification flag may be a 2-bit component of an 8-bit data byte, where the remaining 6 bits are used for telecommunication purposes, as in: 00101101, where the exemplary first six bits "001011" may correspond to telecommunications information such as transmitting/receiving device IDs, encryption data, pairing data, and/or the like, and the exemplary last two bits "01" may correspond to a gesture identification flag. While a bit-length of two bits is used to represent a gesture identification flag in this example, in practice a gesture identification flag may comprise any number of bits (or other measure of signal length of a scheme not based on bits is employed).

Figure 12:
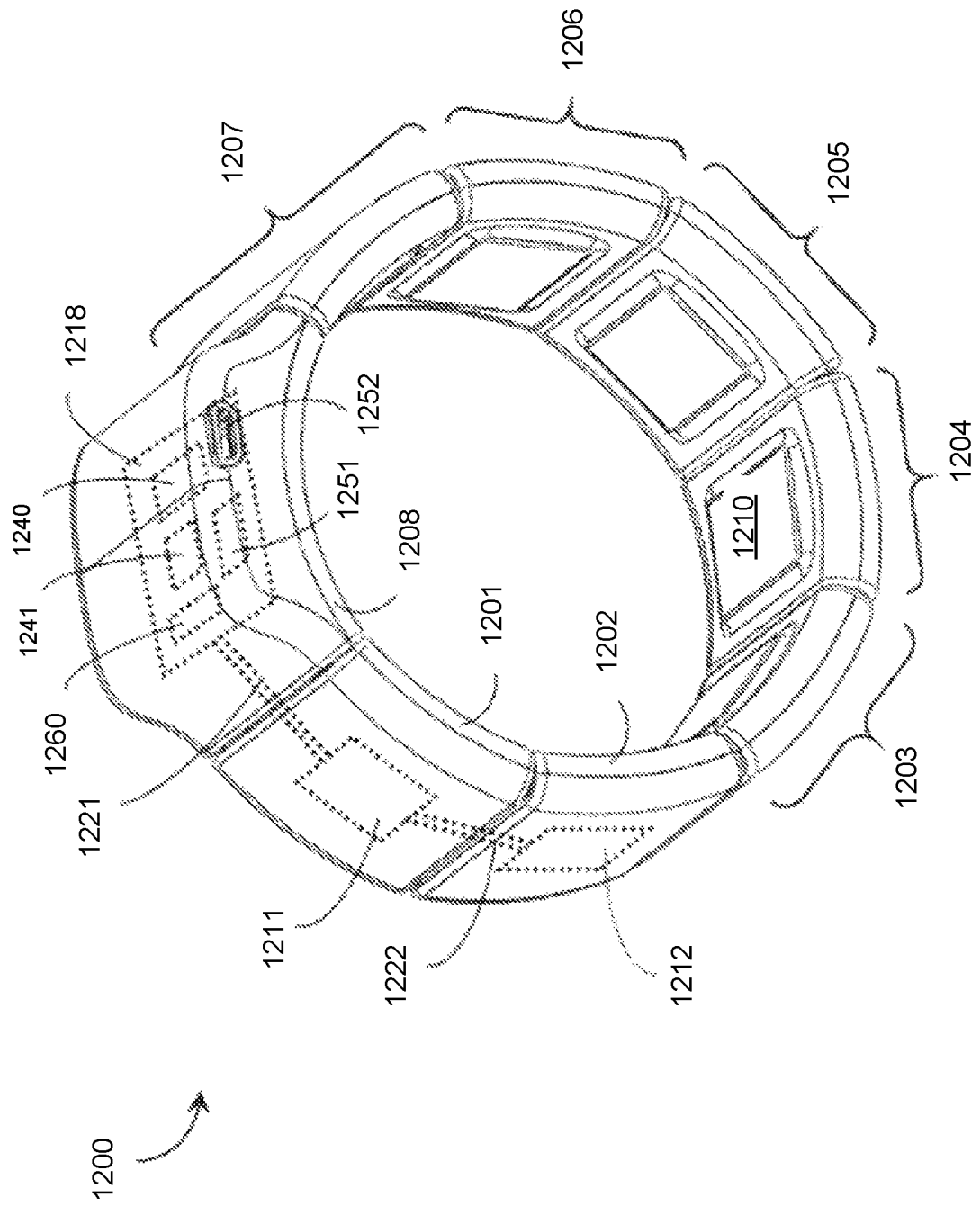
FIG. 12 is a perspective view of an exemplary wearable electromyography device that forms part of a human-electronics interface in accordance with the present systems, articles and methods.

FIG. 12 is a perspective view of an exemplary wearable EMG device 1200 that may form part of a human-electronics interface in accordance with the present systems, articles, and methods. Exemplary device 1200 is an armband designed to be worn on the wrist, forearm, or upper arm of a user, though a person of skill in the art will appreciate that the teachings described herein may readily be applied in wearable EMG devices designed to be worn elsewhere on the body of the user (such as on the finger, leg, ankle, neck, and/or torso of the user). Exemplary details that may be included in exemplary wearable EMG device 1200 are described in at least related U.S. Pat. Nos. 11,009,951 and 10,528,135 incorporated by reference above. As well as, U.S. Non-Provisional patent application Ser. No. 14/186,889 and U.S. Non-Provisional patent application Ser. No. 14/194,252, each of which is incorporated herein by reference in its entirety.

Device 1200 includes a set of eight pod structures 1201, 1202, 1203, 1204, 1205, 1206, 1207, and 1208 that form physically coupled links of the wearable EMG device 1200. Each pod structure in the set of eight pod structures 1201, 1202, 1203, 1204, 1205, 1206, 1207, and 1208 is positioned adjacent and in between two other pod structures in the set of eight pod structures and the set of pod structures forms a perimeter of an annular or closed loop configuration. For example, pod structure 1201 is positioned adjacent and in between pod structures 1202 and 1208 at least approximately on a perimeter of the annular or closed loop configuration of pod structures, pod structure 1202 is positioned adjacent and in between pod structures 1201 and 1203 at least approximately on the perimeter of the annular or closed loop configuration, pod structure 1203 is positioned adjacent and in between pod structures 1202 and 1204 at least approximately on the perimeter of the annular or closed loop configuration, and so on. Each of pod structures 1201, 1202, 1203, 1204, 1205, 1206, 1207, and 1208 is physically coupled to the two adjacent pod structures by at least one adaptive coupler (not visible in FIG. 12). For example, pod structure 1201 is physically coupled to pod structure 1208 by an adaptive coupler and to pod structure 1202 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 1201, 1202, 1203, 1204, 1205, 1206, 1207, and 1208 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 1200 is depicted in FIG. 12 with the at least one adaptive coupler completely retracted and contained within the eight pod structures 1201, 1202, 1203, 1204, 1205, 1206, 1207, and 1208 (and therefore the at least one adaptive coupler is not visible in FIG. 12). Further details of adaptive coupling in wearable electronic devices are described in, for example, U.S. Pat. No. 10,152,082, which is incorporated herein by reference in its entirety.

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 1201 and 1202 of device 1200 can each be moved or displaced relative to one another within the constraints imposed by the adaptive coupler providing adaptive physical coupling therebetween. The desire for pod structures 1201 and 1202 to be movable/displaceable relative to one another specifically arises because device 1200 is a wearable EMG device that advantageously accommodates the movements of a user and/or different user forms.

Device 1200 includes eight pod structures 1201, 1202, 1203, 1204, 1205, 1206, 1207, and 1208 that form physically coupled links thereof. Wearable EMG devices employing pod structures (e.g., device 1200) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 1200 of FIG. 12, each of pod structures 1201, 1202, 1203, 1204, 1205, 1206, 1207, and 1208 comprises a respective housing having a respective inner volume. Each housing may be formed of substantially rigid material and may be optically opaque. Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

Details of the components contained within the housings (i.e., within the inner volumes of the housings) of pod structures 1201, 1202, 1203, 1204, 1205, 1206, 1207, and 1208 are not visible in FIG. 1. To facilitate descriptions of exemplary device 1200, some internal components are depicted by dashed lines in FIG. 12 to indicate that these components are contained in the inner volume(s) of housings and may not normally be actually visible in the view depicted in FIG. 12, unless a transparent or translucent material is employed to form the housings. For example, any or all of pod structures 1201, 1202, 1203, 1204, 1205, 1206, 1207, and/or 1208 may include electric circuitry. In FIG. 12, a first pod structure 1201 is shown containing electric circuitry 1211 (i.e., electric circuitry 1211 is contained in the inner volume of the housing of pod structure 1201), a second pod structure 1202 is shown containing electric circuitry 1212, and a third pod structure 1208 is shown containing electric circuitry 1218. The electric circuitry in any or all pod structures may be communicatively coupled to the electric circuitry in at least one other pod structure by at least one respective communicative pathway (e.g., by at least one electrically conductive pathway and/or by at least one optical pathway). For example, FIG. 12 shows a first set of communicative pathways 12221 providing communicative coupling between electric circuitry 1218 of pod structure 1208 and electric circuitry 1211 of pod structure 1201, and a second set of communicative pathways 1222 providing communicative coupling between electric circuitry 1211 of pod structure 1201 and electric circuitry 1212 of pod structure 1202. Communicative coupling between electric circuitries of pod structures in device 1200 may advantageously include systems, articles, and methods for signal routing as described in U.S. patent application Ser. No. 14/461,044 and/or systems, articles, and methods for strain mitigation as described in U.S. patent application Ser. No. 14/335,668, both of which are incorporated by reference herein in their entirety.

Throughout this specification and the appended claims the term "communicative" as in "communicative pathway," "communicative coupling," and in variants such as "communicatively coupled," is generally used to refer to an engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings and/or optical couplings.

Each individual pod structure within a wearable EMG device may perform a particular function, or particular functions. For example, in device 1200, each of pod structures 1201, 1202, 1203, 1204, 1205, 1206, and 1207 includes a respective EMG sensor 1210 (only one called out in FIG. 12 to reduce clutter) to in use detect muscle activity of a user and to in use provide electrical signals in response to the detected muscle activity. Thus, each of pod structures 1201, 1202, 1203, 1204, 1205, 1206, and 1207 may be referred to as a respective "sensor pod." Throughout this specification and the appended claims, the term "sensor pod" is used to denote an individual pod structure that includes at least one sensor to detect muscle activity of a user. Each EMG sensor may be, for example, a respective capacitive EMG sensor that detects electrical signals generated by muscle activity through capacitive coupling, such as for example the capacitive EMG sensors described in U.S. patent application Ser. No. 14/194,252.

Pod structure 1208 of device 1200 includes a processor 1240 that in use processes the signals provided by the EMG sensors 1210 of sensor pods 1201, 1202, 1203, 1204, 1205, 1206, and 1207 in response to detected muscle activity. Pod structure 1208 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that in use analyzes the signals to determine at least one output, action, or function based on the signals.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 1200, processor pod 1208 includes an EMG sensor 1210 (not visible in FIG. 12) to sense, measure, transduce or otherwise detect muscle activity of a user, so processor pod 1208 could be referred to as a sensor pod. However, in exemplary device 1200, processor pod 1208 is the only pod structure that includes a processor 1240, thus processor pod 1208 is the only pod structure in exemplary device 1200 that can be referred to as a processor pod. In alternative embodiments of device 1200, multiple pod structures may include processors, and thus multiple pod structures may serve as processor pods. Similarly, some pod structures may not include sensors, and/or some sensors and/or processors may be laid out in other configurations that do not involve pod structures.

Processor 1240 includes and/or is communicatively coupled to a non-transitory processor-readable storage medium or memory 1241. As will be described in more detail later, memory 1241 may store, for example, a set of gesture identification flags to be transmitted by device 1200 and/or, for example, processor-executable instructions to be executed by processor 1240. For transmitting gesture identification flags, a wearable EMG device may include at least one output terminal communicatively coupled to processor 1240. Throughout this specification and the appended claims, the term "terminal" is generally used to refer to any physical structure that provides a telecommunications link through which a data signal may enter and/or leave a device. The term "output terminal" is used to describe a terminal that provides at least a signal output link and the term "input terminal" is used to describe a terminal that provides at least a signal input link; however unless the specific context requires otherwise, an output terminal may also provide the functionality of an input terminal and an input terminal may also provide the functionality of an output terminal. In general, a "communication terminal" represents the end (or "terminus") of communicative signal transfer within a device and the beginning of communicative signal transfer to/from an external device (or external devices). As examples, communication terminal 1251 of device 1200 may include a wireless transmitter that implements a known wireless communication protocol, such as Bluetooth®, WiFi®, or Zigbeee, while communication terminal 1252 may include a tethered communication port such as Universal Serial Bus (USB) port, a micro-USB port, a Thunderbolt® port, and/or the like.

For some applications, device 1200 may also include at least one accelerometer 1260 (e.g., an inertial measurement unit, or "IMU," that includes at least one accelerometer and/or at least one gyroscope) communicatively coupled to processor 1240. In use, the at least one accelerometer may detect, sense, and/or measure motion effected by a user and provide signals in response to the detected motion. As will be described in more detail later, signals provided by accelerometer 1260 may be processed together with signals provided by EMG sensors 1210 by processor 1240.

Throughout this specification and the appended claims, the term "accelerometer" is used as a general example of an inertial sensor and is not intended to limit (nor exclude) the scope of any description or implementation to "linear acceleration."

As previously described, each of pod structures 1201, 1202, 1203, 1204, 1205, 1206, 1207, and 1208 may include electric circuitry. FIG. 12 depicts electric circuitry 1211 inside the inner volume of sensor pod 1201, electric circuitry 1212 inside the inner volume of sensor pod 1202, and electric circuitry 1218 inside the inner volume of processor pod 1218. The electric circuitry in any or all of pod structures 1201, 1202, 1203, 1204, 1205, 1206, 1207 and 1208 (including electric circuitries 12221, 1222, and 128) may include any or all of: an amplification circuit to in use amplify electrical signals provided by at least one EMG sensor 1210, a filtering circuit to in use remove unwanted signal frequencies from the signals provided by at least one EMG sensor 1210, and/or an analog-to-digital conversion circuit to in use convert analog signals into digital signals. Device 1200 may also include a battery (not shown in FIG. 12) to in use provide a portable power source for device 1200.

Signals that are provided by EMG sensors 1210 in device 1200 are routed to processor pod 1208 for processing by processor 1240. To this end, device 1200 employs a set of communicative pathways (e.g., 12221 and 1222) to route the signals that are provided by sensor pods 1201, 1202, 1203, 1204, 1205, 1206, and 1207 to processor pod 1208. Each respective pod structure 1201, 1202, 1203, 1204, 1205, 1206, 1207, and 1208 in device 1200 is communicatively coupled to at least one other pod structure by at least one respective communicative pathway from the set of communicative pathways. Each communicative pathway (e.g., 12221 and 1222) may be realized in any communicative form, including but not limited to: electrically conductive wires or cables, ribbon cables, fiber-optic cables, optical/photonic waveguides, electrically conductive traces carried by a rigid printed circuit board, and/or electrically conductive traces carried by a flexible printed circuit board.

The present systems, articles, and methods describe a human-electronics interface in which a wearable EMG device (e.g., device 1200) is used to control another electronic device. The human-electronics interface may be characterized as a system that enables electromyographic control of an electronic device.

Figure 13:
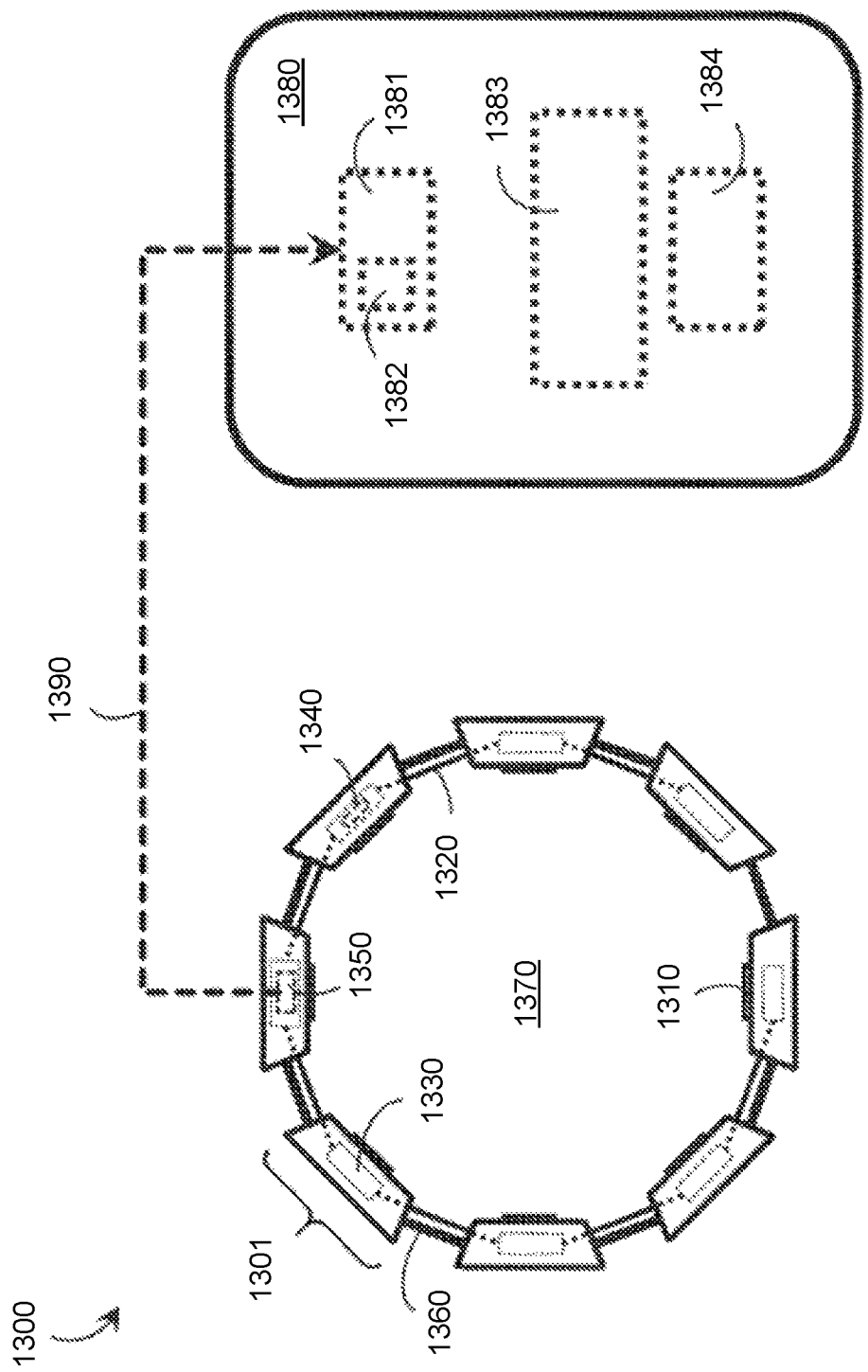
FIG. 13 is an illustrative diagram of a system that enables electromyographic control of an electronic device in accordance with the present systems, articles, and methods.

FIG. 13 is an illustrative diagram of a system 1300 that enables electromyographic control of an electronic device in accordance with the present systems, articles, and methods. System 1300 includes a wearable EMG device 1370 and an unspecified electronic device 1380. Wearable EMG device 1370 may be, as an illustrative example, substantially similar to wearable EMG device 1200 from FIG. 1. That is, exemplary wearable EMG device 1370 includes a set of pod structures 1301 (only one called out in FIG. 13 to reduce clutter) that form physically coupled links of device 1370, where each pod structure 1301 includes a respective EMG sensor 1310 (e.g., a respective capacitive EMG sensor) to in use sense, measure, transduce or otherwise detect muscle activity of a user and provide electrical signals in response to the muscle activity. As previously described, however, the present systems, articles, and methods may be implemented using wearable EMG devices that do not employ pod structures.

Each pod structure 1301 is electrically coupled to at least one adjacent pod structure by at least one respective communicative pathway 1320 to route signals in between pod structures (e.g., to route signals from sensor pods to a processor pod). Each pod structure 1301 is also physically coupled to two adjacent pod structures 1301 by at least one adaptive coupler 1360 and the set of pod structures forms a perimeter of an annular or closed loop configuration. FIG. 13 shows device 1370 in an expanded annular or closed loop configuration adapted to fit the arm of a larger user than the contracted annular or closed loop configuration of device 1200 from FIG. 1. As a result, adaptive couplers 1360 (only one called out in FIG. 13) providing adaptive physical coupling between adjacent pairs of pod structures 1301 are visible in FIG. 13, whereas such adaptive couplers 1360 are not visible in FIG. 1.

Each pod structure 1301 includes respective electric circuitry 1330 and at least one electric circuitry 1330 includes a first processor 1340 (e.g., akin to processor 1240 in device 1200 of FIG. 12). At least one electric circuitry 1330 may include an IMU and/or at least one accelerometer. Device 1370 also includes an output terminal 1350 to in use interface with unspecified electronic device 1380. For example, device 1370 is operative to in use send gesture identification flags to unspecified electronic device 1380 through output terminal 1350.

Unspecified electronic device 1380 may be any electronic device, including but not limited to: a desktop computer, a laptop computer, a tablet computer, a mobile phone, a smartphone, a portable electronic device, an audio player, a television, a video player, a video game console, a robot, a light switch, and/or a vehicle. Electronic device 1380 is denominated as "unspecified" herein to emphasize the fact that the gesture identification flags output by wearable EMG device 1370 are generic to a variety of electronic devices and/or applications executed by the electronic devices. The electronic device 1380, its operating characteristics and/or the operating characteristics of applications executed by the electronic device 1380 may not be a priori known by the EMG device 1370 during use, or even prior to use when a mapping between signals, gesture flags, and/or gestures is initially defined or established. As previously described, a data signal output by device 1370 through output terminal 1350 may include a gesture identification flag as a first portion thereof and may also include at least a second portion to implement known telecommunications protocols (e.g., Bluetooth®). Thus, electronic device 1380 may remain "unspecified" with respect to the gesture identification flag portion(s) of signals output by EMG device 1370 but electronic device 1380 may be "specified" by the telecommunications portion(s) of signals output by EMG device 1370 (if such specification is necessary for signal transfer, e.g., to communicatively "pair" device 1370 and device 1380 if required by the telecommunications protocol being implemented). For example, electronic device 1380 may be and remain "unspecified" while muscle activity is detected by EMG device 1370 and while the processor in EMG device 1370 determines a gesture identification flag based, at least in part, on the detected muscle activity. After a gesture identification flag is determined by the processor in EMG device 1370, electronic device 1380 may become "specified" when the gesture identification flag is combined with telecommunication data and transmitted to electronic device 1380. In this scenario, the gesture identification flag itself does not include any information that is specific to electronic device 1380 and therefore electronic device 1380 is "unspecified" in relation to the gesture identification flag.

Electronic device 1380 includes an input terminal 1381 to in use interface with wearable EMG device 1370. For example, device 1380 may receive gesture identification flags from device 1370 through input terminal 1381. Device 1380 also includes a second processor 1383 to in use process gesture identification flags received from device 1370. Second processor 1383 may include or be communicatively coupled to a non-transitory processor-readable storage medium or memory 1384 that stores processor-executable instructions to be executed by second processor 1383.

Wearable EMG device 1370 and electronic device 1380 are, in use, communicatively coupled by communicative link 1390. More specifically, output terminal 1350 of wearable EMG device 1370 is, in use, communicatively coupled to input terminal 1381 of electronic device 1380 by communicative link 1390. Communicative link 1390 may be used to route gesture identification flags from wearable EMG device 1370 to electronic device 1380. Communicative link 1390 may be established in variety of different ways. For example, output terminal 1350 of wearable EMG device 1370 may include a first tethered connector port (e.g., a USB port, or the like), input terminal 1381 of electronic device 1380 may include a second tethered connector port, and communicative link 1390 may be established through a communicative pathway (e.g., an electrical or optical cable, wire, circuit board, or the like) that communicatively couples the first connector port to the second connector port to route gesture identification flags from output terminal 1350 to input terminal 1381. Alternatively, output terminal 1350 of wearable EMG device 1370 may include a wireless transmitter and communicative link 1390 may be representative of wireless communication between wearable EMG device 1370 and electronic device 1380. In this case, input terminal 1381 of electronic device 1380 may include a wireless receiver to in use wirelessly receive gesture identification flags from the wireless transmitter of wearable EMG device 1370 (using, for example, established wireless telecommunication protocols, such as Bluetooth®); or, input terminal 1381 may be communicatively coupled to a wireless receiver 1382 (such as a USB dongle communicatively coupled to a tethered connector port of input terminal 1381) to in use wirelessly receive gesture identification flags from the wireless transmitter of wearable EMG device 1370.

As previously described, known proposals for human-electronics interfaces that employ a wearable EMG device are limited in their versatility because they involve mapping gestures to functions on-board the wearable EMG device itself. Thus, in known proposals, the wearable EMG device outputs control signals (i.e., "commands") that embody pre-defined instructions to effect pre-defined functions that are specific to a pre-defined receiving device. If a user wishes to use such a wearable EMG device for a different purpose (i.e., to control a different receiving device, or a different application within the same receiving device), then the definitions of the commands themselves must be re-programmed within the wearable EMG device. Conversely, the various embodiments described herein provide systems, articles, and methods for human-electronics interfaces that employ a wearable EMG device that controls functions of another electronic device by outputting generic gesture identification flags that are not specific to the particular electronic device being controlled. The electronic device being controlled may include or may access an Application Programming Interface (i.e., an "API" including instructions and/or data or information (e.g., library) stored in a non-transitory processor-readable storage medium or memory) through which a user may define how gesture identification flags are to be interpreted by the electronic device being controlled (i.e., where the user may define how the electronic device responds to gesture identification flags). The present systems, articles, and methods greatly enhance the versatility of human-electronics interfaces by employing a wearable EMG device that outputs the same gesture identification flags regardless of what it is being used to control, and may therefore be used to control virtually any electronic receiving device. The functions or operations that are controlled by the wearable EMG devices described herein are defined within the receiving device (or within the applications within the receiving device) rather than within the wearable EMG device.

Figure 14:
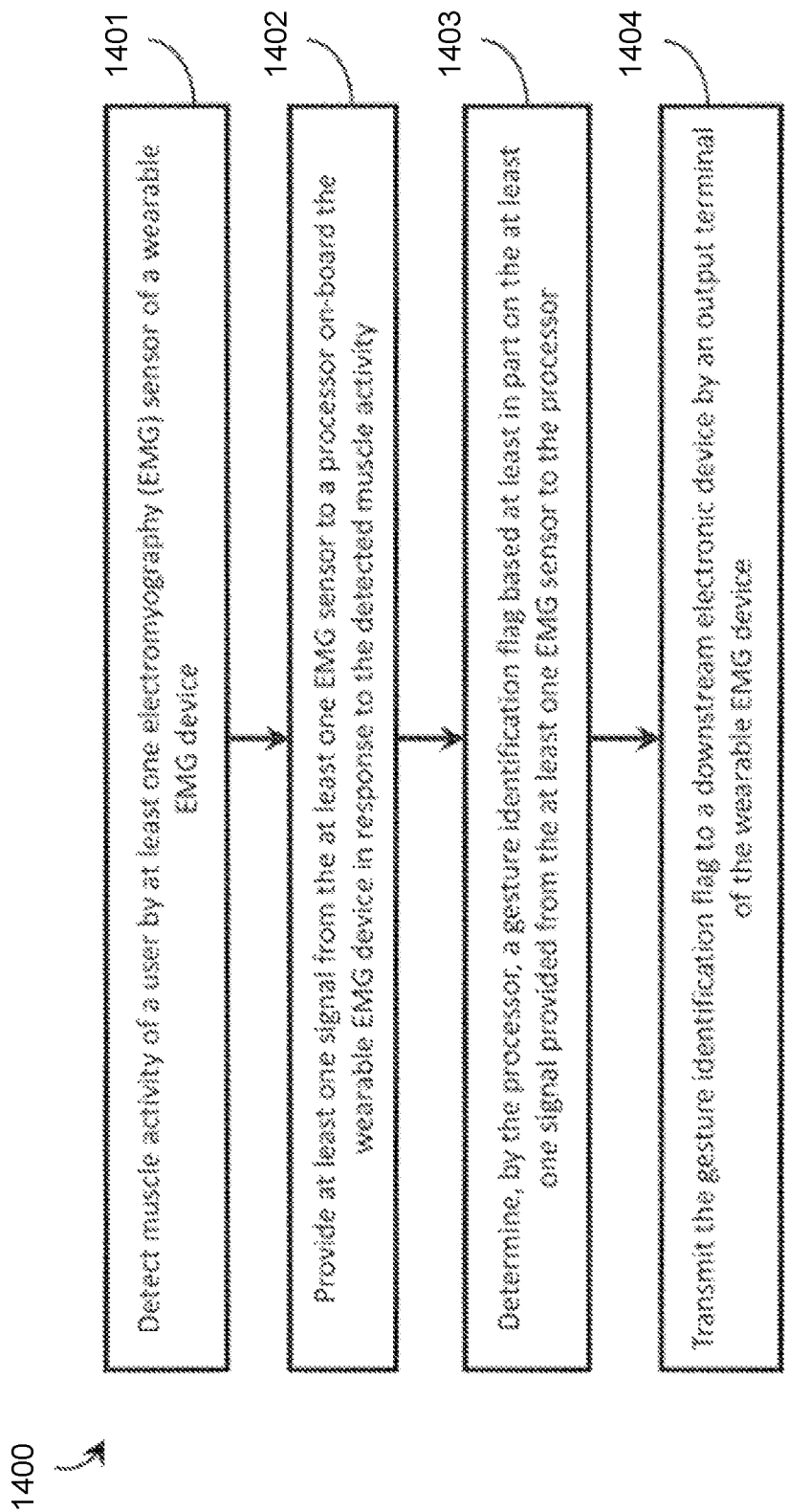
FIG. 14 is a flow-diagram showing a method of operating a wearable electromyography device to provide electromyographic control of an electronic device in accordance with the present systems, articles, and methods.

FIG. 14 is a flow-diagram showing a method 1400 of operating a wearable EMG device to provide electromyographic control of an electronic device in accordance with the present systems, articles, and methods. The electronic device may be any "unspecified" electronic device as described previously. For example, the electronic device may be any downstream processor-based device. The wearable EMG device may include at least one EMG sensor, a processor, and an output terminal (i.e., the wearable EMG device may be substantially similar to wearable EMG device 1200 from FIG. 12 and wearable EMG device 1370 from FIG. 13). Method 1400 includes four acts 1401, 1402, 1403, and 1404, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 1401, muscle activity of a user (i.e., a wearer of the wearable EMG device) is sensed, measured, transduced or otherwise detected by at least one EMG sensor of the wearable EMG device. As previously described, the at least one EMG sensor may be, for example, a capacitive EMG sensor and sensing, measuring, transducing or otherwise detecting muscle activity of the user may include, for example, capacitively coupling to electrical signals generated by muscle activity of the user.

At 1402, at least one signal is provided from the at least one EMG sensor to the processor of the wearable EMG device in response to the sensed, measured, transduced or otherwise detected muscle activity. The at least one signal may be an analog signal that is amplified, filtered, and converted to digital form by electric circuitry within the wearable EMG device. Providing the at least one signal from the at least one EMG sensor to the processor may include routing the at least one signal to the processor through one or more communicative pathway(s) as described previously.

At 1403, a gesture identification flag is determined by the processor of the wearable EMG device, based at least in part on the at least one signal provided from the at least one EMG sensor to the processor. The gesture identification flag is substantially independent of the downstream electronic device. As will be described in more detail later (e.g., with reference to FIG. 16), determining a gesture identification flag by the processor may implement a range of different algorithms, including but not limited to: a look-up table, a mapping, a machine learning algorithm, a pattern recognition algorithm, and the like. In some applications, the wearable EMG device may include a non-transitory processor-readable medium that stores a set of gesture identification flags and/or stores processor-executable instructions that, when executed by the processor of the wearable EMG device, cause the processor to determine a gesture identification flag based at least in part on the at least one signal provided from the at least one EMG sensor to the processor. In such a case, act 1403 may include executing the processor-executable instructions by the processor to cause the processor to determine a gesture identification flag based at least in part on the at least one signal provided from the at least one EMG sensor to the processor.

At 1404, the gesture identification flag is transmitted to the electronic device by the output terminal of the wearable EMG device. As previously described, the output terminal of the wearable EMG device may include a wireless transmitter, and transmitting the gesture identification flag to the electronic device may include wirelessly transmitting the gesture identification flag to the electronic device by the wireless transmitter.

As an example, the at least one EMG sensor may include a first EMG sensor and at least a second EMG sensor, and muscle activity of the user may be sensed, measured, transduced or otherwise detected by the first EMG sensor and by at least the second EMG sensor (at 1401). In this case at least a first signal is provided from the first EMG sensor to the processor of the wearable EMG device in response to the detected muscle activity (at 1402) and at least a second signal is provided from at least the second EMG sensor to the processor of the wearable EMG device in response to the detected muscle activity (at 1402). The processer of the wearable EMG device may then determine (at 1403) a gesture identification flag based at least in part on both the at least a first signal provided from the first EMG sensor to the processor and the at least a second signal provided from at least the second EMG sensor to the processor.

As previously described, in some applications it may be advantageous to combine or otherwise make use of both EMG signals and motion signals sensed, measured or otherwise detected, for example, by an accelerometer. To this end, the wearable EMG device may include at least one accelerometer, and an additional method employing further acts may be combined with acts 1401-1404 of method 1400 to detect and process motion signals.

Figure 15:
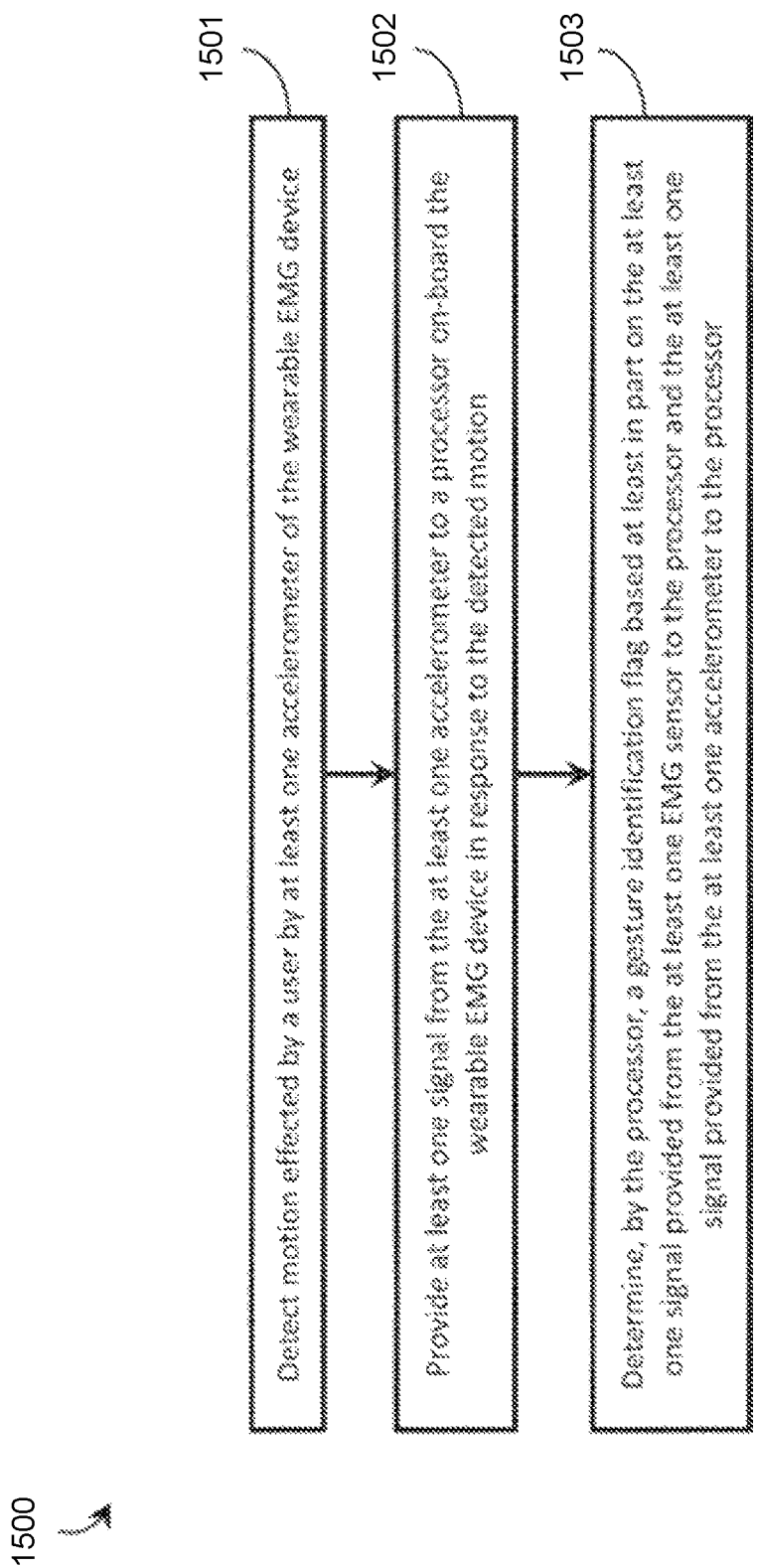
FIG. 15 is a flow-diagram showing a method of operating a wearable electromyography device to provide both electromyographic and motion control of an electronic device in accordance with the present systems, articles, and methods.

FIG. 15 is a flow-diagram showing a method 1500 of operating a wearable EMG device to provide both electromyographic and motion control of an electronic device in accordance with the present systems, articles, and methods. Method 1500 includes three acts 1501, 1502, and 1503, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. Method 1500 is optionally performed in conjunction with method 1400 from FIG. 14 and, if performed, performed using the same wearable EMG device as that used to perform method 1400. For example, while acts 1401 and 1402 of method 1400 are performed by EMG sensors of the wearable EMG device, acts 1501 and 1502 of method 1500 may optionally be performed by at least one accelerometer of the wearable EMG device.

At 1501, motion effected by the user of the wearable EMG device is sensed, measured, transduced or otherwise detected by at least one accelerometer in the wearable EMG device. The at least once accelerometer may be part of an IMU that includes multiple accelerometers (such as an MPU-9150 Nine-Axis MEMS MotionTracking™ Device from InvenSense). The motion effected by the user that may be detected and/or measured may include, e.g., translation in one or multiple spatial directions and/or rotation about one or more axes in one or more spatial directions. The motion(s) may be detected in terms of a presence or absence of translation and/or rotation, and/or measured in terms of a speed of translation and/or rotation and/or acceleration of translation and/or rotation.

At 1502, at least one signal is provided from the at least one accelerometer to the processor in response to the sensed, measured, transduced or otherwise detected motion. The at least one signal may be an analog signal that is amplified, filtered, and converted to digital form by electric circuitry within the wearable EMG device. The at least one signal may be routed to the processor in the wearable EMG device via one or more communicative pathway(s) as described previously.

As previously described, act 1403 of method 1400 involves determining, by a processor of the wearable EMG device, a gesture identification flag based at least in part on the at least one signal provided from the at least one EMG sensor to the processor in response to detected muscle activity. In applications where the wearable EMG device further includes at least one accelerometer and acts 1501 and 1502 of method 1500 are performed, act 1403 of method 1400 may be replaced by act 1503 of method 1500.

At 1503, a gesture identification flag is determined by the processor, based at least in part on the at least one signal provided from the at least one EMG sensor to the processor and the at least one signal provided from the at least one accelerometer to the processor. The wearable EMG device may include a non-transitory processor-readable medium (e.g., memory 1384 of device 1380 from FIG. 13) that stores processor-executable instructions that, when executed by the processor, cause the processor to determine a gesture identification flag based on the at least one signal provided from the at least one EMG sensor to the processor and the at least one signal provided from the at least one accelerometer to the processor (i.e., to perform act 1503). Thus, act 1503 may include executing the processor-executable instructions stored in the non-transitory processor-readable medium.

In some implementations, the at least one signal provided from the at least one accelerometer to the processor (i.e., at act 1502) may be combined with at least one signal provided from at least one EMG sensor to the processor (i.e., at act 1402 of method 1400 from FIG. 14) by the processor of the wearable EMG device. Thus, act 1503 requires that acts 1501 and 1502 from method 1500 and acts 1401 and 1402 from method 1400 all be completed. The at least one signal from the at least one accelerometer and the at least one signal from the at least one EMG sensor may be summed, concatenated, overlaid, or otherwise combined in any way by the processor to produce, provide or output any number of signals, operations, and/or results.

After act 1503, the gesture identification flag may be transmitted or output by an output terminal of the wearable EMG device (i.e., according to act 1404 of method 1400) to any downstream electronic device and interpreted or otherwise processed by the downstream electronic device to cause the downstream electronic device to perform some function(s) or operation(s), or otherwise effect an interaction with or response from the downstream electronic device, in response to the gesture identification flag.

In accordance with the present systems, articles, and methods, at least one signal provided by at least one EMG sensor (either alone or together with one or more signals provided by one or more transducers such as an accelerometer or other motion or acceleration responsive transducers) may represent or be indicative of a gesture performed by a user of a wearable EMG device. Determining a gesture identification flag corresponding to that at least one signal may involve identifying, by a processor, the gesture performed by the user based at least in part on the at least one signal(s) from the EMG and/or other sensors or transducers, and determining, by the processor, a gesture identification flag that corresponds to that determined gesture. Unless the specific context requires otherwise, throughout this specification and the appended claims "a" gesture identification flag should be interpreted in a general, inclusive sense as "at least one" gesture identification flag with the understanding that determining any number of gesture identification flags (e.g., determining one gesture identification flag, or determining multiple gesture identification flags) includes determining "a" gesture identification flag. Each gesture identification flag may include, or be represented by, one or more bits of information. Furthermore, "determining" a gesture identification flag by a processor may be achieved through a wide variety of different techniques. For example, a processor may determine a gesture identification flag by performing or otherwise effecting a mapping between gestures (e.g., between EMG and/or accelerometer signals representative of gestures) and gesture identification flags (e.g., by invoking a stored look-up table or other form of stored processor-executable instructions providing and/or effecting mappings between gestures and gesture identification flags), or a processor may determine a gesture identification flag by performing an algorithm or sequence of data processing acts (e.g., by executing stored processor-executable instructions dictating how to determine a gesture identification flag based at least in part on one or more signal(s) provided by at least one EMG sensor and/or at least one accelerometer).

Figure 16:
FIG. 16 is a schematic illustration that shows an exemplary mapping between a set of exemplary gestures and a set of exemplary gesture identification flags in accordance with the present systems, articles, and methods.

FIG. 16 is a schematic illustration showing an exemplary mapping 1600 between a set of exemplary gestures and a set of exemplary gesture identification flags in accordance with the present systems, articles, and methods. Mapping 1600 may be representative of processor-executable instructions that are defined in advance of determining gesture identification flags based at least in part on at least one EMG signal (and, e.g., executed by a processor to perform the act of determining gesture identification flags based at least in part on at least one EMG signal), or mapping 1600 may be representative of the results (i.e., the mapping that is effected) when gesture identification flags are determined based at least in part on at least one EMG signal. In other words, mapping 1600 characterizes: i) a prescription, embodied in processor-executable instructions, for or definition of how gestures (e.g., EMG and/or accelerometer signals that are representative of gestures) are to be mapped to gesture identification flags by a processor when determining a gesture identification flag based at least in part on at least one signal provided from at least one EMG sensor to the processor; or ii) the end results when a processor performs an algorithm or series of data processing steps to determine a gesture identification flag based at least in part on at least one signal provided from at least one EMG sensor to the processor. In the former characterization (i.e., characterization i)), mapping 1600 may be stored as a look-up table or set of defined processor-executable "mapping instructions" in a non-transitory processor-readable storage medium and invoked/executed by the processor when determining a gesture identification flag. In the latter characterization (i.e., characterization ii)), mapping 1600 may not be stored in a non-transitory processor-readable storage medium itself, but instead processor-executable instructions to perform an algorithm or series of data processing acts may be stored in the non-transitory processor-readable storage medium and mapping 1600 may represent the results of executing the stored processor-executable instructions by the processor when determining a gesture identification flag. In either case, the present systems, articles, and methods provide a framework in which a wearable EMG device is programmed with processor-executable instructions that embody (i.e., in accordance with characterization i)) and/or produce/effect (i.e., in accordance with characterization ii)) a mapping from gestures to gesture identification flags, such as exemplary mapping 1600 from FIG. 16.

As shown in mapping 1600, each gesture identification flag may, for example, comprise a bit string (e.g., an 8-bit data byte as illustrated) that uniquely maps to a corresponding gesture performed by a user. For example, a "gun" or "point" hand gesture may correspond/map to gesture identification flag 00000001 as illustrated, a "thumbs up" gesture may correspond/map to gesture identification flag 00000010 as illustrated, a "fist" gesture may correspond/map to gesture identification flag 00000011 as illustrated, and a "rock on" gesture may correspond/map to gesture identification flag 00000100 as illustrated. A person of skill in the art will appreciate that an 8-bit data byte can be used to represent 256 unique gesture identification flags (corresponding to 256 unique gestures). In practice, gesture identification flags having any number of bits may be used, and if desired, multiple gestures may map to the same gesture identification flag and/or the same gesture may map to multiple gesture identification flags. In accordance with the present systems, articles, and methods, a gesture identification flag contains only information that identifies (i.e., maps to) a gesture performed by a user of a wearable EMG device. A gesture identification flag does not contain any information about a function or operation that the corresponding gesture maybe used to control. A gesture identification flag does not contain any information about any downstream electronic device and/or application that the corresponding gesture may be used to control. A gesture identification flag may be appended, adjoined, supplemented, or otherwise combined with additional data bits as needed for, e.g., the purposes of telecommunications.

Mapping 1600 represents gestures with actual illustrations of hands solely for ease of illustration and description. In practice, a gesture may be represented by any corresponding configuration of signals provided by at least one EMG sensor and/or at least one accelerometer. For example, a gesture may be represented by a particular signal waveform, a particular signal value, or a particular configuration/arrangement/permutation/combination of signal waveforms/values.

The present systems, articles, and methods describe human-electronics interfaces. Methods 1400 and 1500 provide methods of operating a wearable EMG device to control an unspecified electronic device (e.g., methods of operating device 100 from FIG. 12 or device 1370 from FIG. 13). A complete human-electronics interface may involve acts performed by both the controller and the receiver (e.g., methods of operating system 1300 from FIG. 13).

Figure 17:
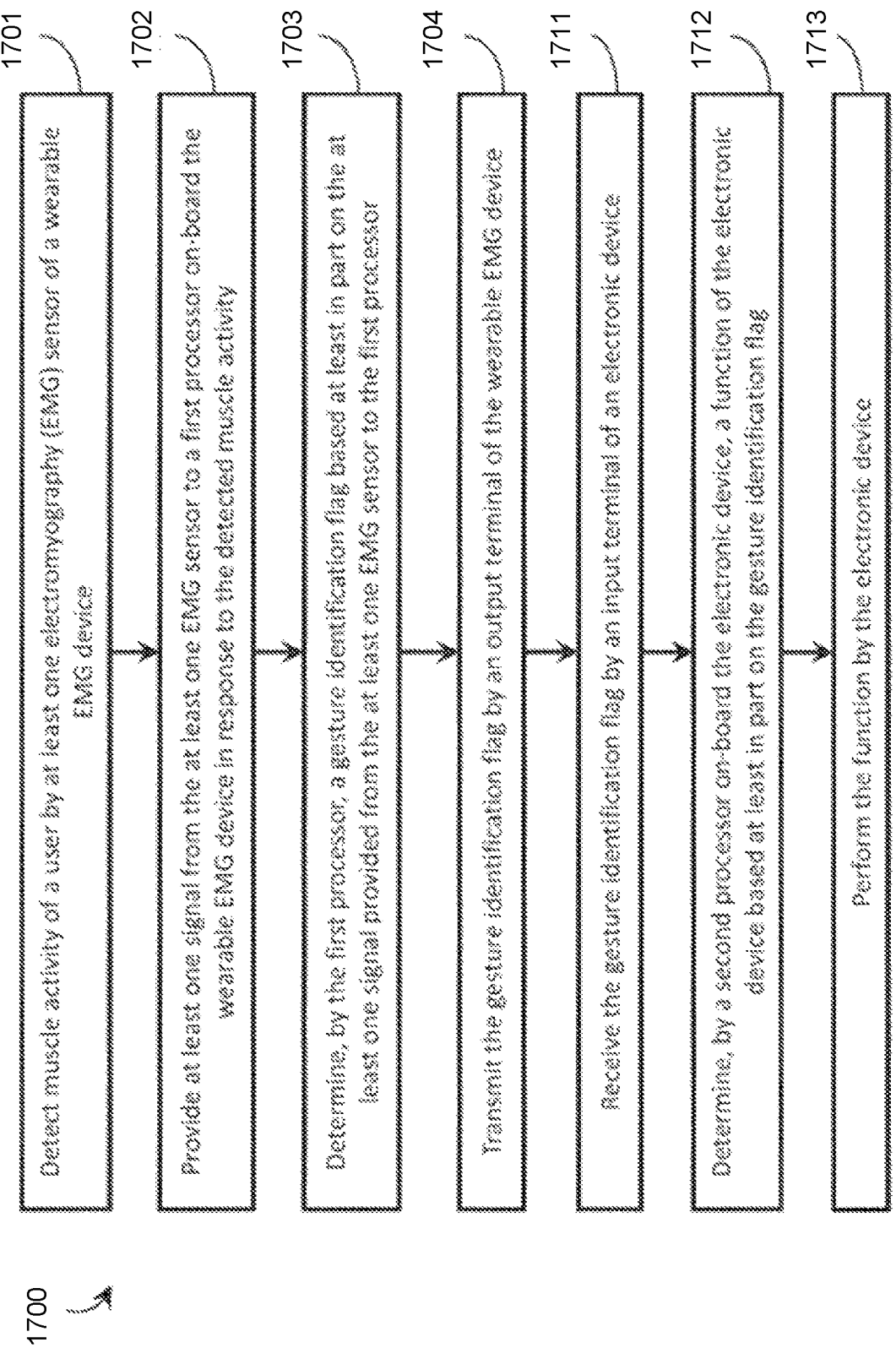
FIG. 17 is a flow-diagram showing a method of electromyographically controlling at least one function of an electronic device by a wearable electromyography device in accordance with the present systems, articles, and methods.

FIG. 17 is a flow-diagram showing a method 1700 of electromyographically controlling at least one function of an electronic device by a wearable EMG device in accordance with the present systems, articles, and methods. The wearable EMG device includes at least one EMG sensor, a first processor, and an output terminal (with the at least one EMG sensor and the output terminal each communicatively coupled to the first processor) and the electronic device includes an input terminal and a second processor (with the input terminal communicatively coupled to the second processor). Method 1700 includes seven acts 1701, 1702, 1703, 1704, 1711, 1712, and 1713, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. Acts 1701, 1702, 1703, and 1704 are performed by the wearable EMG device to produce and transmit signals and acts 1711, 1712, and 1713 are performed by the electronic device to receive and respond to the transmitted signals.

Acts 1701, 1702, 1703, and 1704 are substantially similar to acts 1401, 1402, 1403, and 1404 (respectively) of method 1400 from FIG. 14. At 1701, muscle activity of a user is sensed, measured, transduced or otherwise detected by at least one EMG sensor of the wearable EMG device. At 1702, at least one signal is provided from the at least one EMG sensor to a first processor on-board the wearable EMG device in response to the detected muscle activity. At 1703, the first processor determines a gesture identification flag based at least in part on the at least one signal provided from the at least one EMG sensor to the first processor. At 1704, the gesture identification flag is transmitted by the output terminal of the wearable EMG device. In some applications, the wearable EMG device may include at least one accelerometer and the wearable EMG device may be used to perform method 1500 from FIG. 15. Therefore, act 1703 may comprise determining a gesture identification flag based at least in part on both the at least one signal provided from the at least one EMG sensor to the first processor and the at least one signal provided from the at least one accelerometer to the first processor.

At 1711, the gesture identification flag that is transmitted or output by the output terminal of the wearable EMG device at 1704 is received by the input terminal of the electronic device. As previously described, transmission of gesture identification flags between the wearable EMG device and the electronic device may be through a wired or wireless communicative link (e.g. communicative link 1390 from FIG. 13).

At 1712, a second processor on-board the electronic device determines a function of the electronic device based at least in part on the gesture identification flag received by the input terminal of the electronic device at 1711. As described previously, the electronic device may include a non-transitory processor-readable storage medium or memory that stores an API or other information or data structures (e.g., implemented as one or library(ies)) through which a user may define mappings (i.e., processor-executable instructions that embody and/or produce/effect mappings) between gesture identification flags and functions of the electronic device, and/or the non-transitory processor-readable storage medium may store processor-executable instructions that, when executed by the second processor, cause the second processor to determine a function of the electronic device based at least in part on the gesture identification flag.

At 1713, the function determined at 1712 is performed by the electronic device. The function may be any function or operation of the electronic device. For example, if the electronic device is an audio and/or video player (or a computer running an application that performs audio and/or video playback), then the corresponding function may be a PLAY function that causes the audio/video to play, a STOP function that causes the audio/video to stop, a REWIND function that causes the audio/video to rewind, a FAST FORWARD function that causes the audio/video to fast forward, and so on.

Throughout this specification and the appended claims, reference is often made to "determining a function of an electronic device based at least in part on a gesture identification flag." Unless the specific context requires otherwise, throughout this specification and the appended claims "a" function should be interpreted in a general, inclusive sense as "at least one" function with the understanding that determining any number of functions (e.g., determining one function, or determining multiple functions) includes determining "a" function. Furthermore, "determining" a function by a processor may be achieved through a wide variety of different techniques. For example, a processor may determine a function by employing a defined mapping between gesture identification flags and functions (e.g., by invoking a stored look-up table or other form of stored processor-executable instructions providing defined mappings between gesture identification flags and functions), or a processor may determine a function by performing an algorithm or sequence of data processing steps (e.g., by executing stored processor-executable instructions dictating how to determine a function based at least in part on one or more gesture identification flag(s)).

FIG. 18 is a schematic illustration showing an exemplary mapping 1800 between a set of exemplary gesture identification flags and a set of exemplary functions of an electronic device in accordance with the present systems, articles, and methods. Similar to mapping 1600 from FIG. 16, mapping 1800 may be characterized as: i) a prescription for how gesture identification flags are to be mapped to functions by a processor when determining a function based at least in part on a gesture identification flag received from a wearable EMG device; or ii) the end results when a processor performs an algorithm or series of data processing acts to determine a function based at least in part on a gesture identification flag received from a wearable EMG device. In the former characterization (i.e., characterization i)), mapping 1800 may be stored as a look-up table or set of defined processor-executable "mapping instructions" in a non-transitory processor-readable storage medium and invoked by the processor when determining a function of the electronic device. In the latter characterization (i.e., characterization ii)), mapping 1800 may not be stored in a non-transitory processor-readable storage medium itself, but instead processor-executable instructions to perform an algorithm or series of data processing acts may be stored in the non-transitory processor-readable storage medium and mapping 1800 may represent the results of executing the stored processor-executable instructions by the processor to determine a function of the electronic device. In either case, the present systems, articles, and methods provide a framework in which generic gesture identification flags are output by a wearable EMG device and a receiving device is programmed (and/or programmable through, e.g., an API or other information or data or calls) with processor-executable instructions that embody and/or produce/effect a mapping from gesture identification flags to functions of the electronic device, such as exemplary mapping 1800 from FIG. 18.

For the illustrative example of FIG. 18, the electronic device is an audio player; however, any electronic device may include or be communicatively coupled to (or be adapted to include or be communicatively coupled to) a non-transitory processor-readable storage medium or memory that stores processor-executable instructions that embody and/or produce/effect a mapping such as mapping 1800. As shown in mapping 1800, each gesture identification flag may, for example, be a bit string (e.g., an 8-bit data byte as illustrated) that uniquely maps to a corresponding function of the electronic device. For example, a 00000001 gesture identification flag may map/correspond to a REWIND function of an audio player as illustrated, a 00000010 gesture identification flag may map/correspond to a PLAY function of an audio player as illustrated, a 00000011 gesture identification flag may map/correspond to a STOP function of an audio player as illustrated, and a 00000100 gesture identification flag may map/correspond to a FAST FORWARD function of an audio player as illustrated. A person of skill in the art will appreciate that an 8-bit data byte can be used to represent 256 unique gesture identification flags (corresponding to 256 unique functions). In practice, gesture identification flags having any number of bits may be used, multiple gesture identification flags may be mapped to the same function, and/or a single gesture identification flag may map to multiple functions.

In accordance with the present systems, articles, and methods, processor-executable instructions that embody and/or produce/effect a mapping from gestures to gesture identification flags (e.g., mapping 1600 from FIG. 16) may be stored in a non-transitory processor-readable storage medium or memory on-board a wearable EMG device (e.g., memory 1241 of device 1200 from FIG. 12) and communicatively coupled to a first processor (e.g., processor 1240 of device 1200), and processor-executable instructions that embody and/or produce/effect a mapping from gesture identification flags to functions of an electronic device (e.g., mapping 1800 from FIG. 18) may be stored in a non-transitory processor-readable storage medium or memory on-board an electronic device (e.g., memory 1382 of device 1380 from FIG. 13) and communicatively coupled to a second processor (e.g., processor 1383 of device 1380 in FIG. 13). In this way, gesture identification flags may be determined by the first processor on-board the wearable EMG device based on signals from one or more sensor(s) (e.g., EMG sensors and/or inertial sensors) in accordance with, e.g., mapping 1600 of FIG. 16; the gesture identification flags may be transmitted or output to a receiving device; and then functions of the receiving device may be determined by the second processor on-board the receiving device based on the gesture identification flags in accordance with, e.g., mapping 1800 from FIG. 18. For example, signals corresponding to a "gun" or "point" gesture (e.g., outwardly extended index finger with other fingers curled upon themselves) may be processed by the first processor of the wearable EMG device to determine gesture identification flag 00000001 according to mapping 1600 from FIG. 16, the 00000001 flag may be transmitted to the electronic device (through a wired or wireless communicative link), and the 00000001 flag may be processed by the second processor of the electronic device to determine a REWIND function in accordance with mapping 1800.

In accordance with the present systems, articles, and methods, an electronic device may store multiple mappings (e.g., multiple sets of processor-executable instructions that embody and/or produce/effect mappings) between gesture identification flags and functions of the electronic device, and when the electronic device receives a gesture identification flag it may perform a corresponding function based on the implementation of one of the multiple stored mappings (e.g., one or more of the multiple sets of processor-executable instructions). For example, the electronic device may be a computer such as a desktop computer, a laptop computer, a tablet computer, or the like. The computer may include a non-transitory processor-readable storage medium or memory that stores multiple mappings (e.g., multiple sets of processor-executable instructions that embody and/or produce/effect mappings) between gesture identification flags and functions of the computer (e.g., multiple variants of mapping 1800 from FIG. 18), with each mapping corresponding to and invoked by a different application executed by the computer. For example, the non-transitory processor-readable storage medium may store a first mapping (e.g., a first set of processor-executable instructions that embody and/or produce/effect a first mapping) between gesture identification flags and functions (e.g., a first variant of mapping 1800 from FIG. 18) to be invoked by a first application run on the computer, a second mapping (e.g., a second set of processor-executable instructions that embody and/or produce/effect a second mapping) between gesture identification flags and functions (e.g., a second variant of mapping 1800 from FIG. 18) to be invoked by a second application run on the computer, a third mapping (e.g., a third set of processor-executable instructions that embody and/or produce/effect a third mapping) between gesture identification flags and functions (e.g., a third variant of mapping 1800 from FIG. 18) to be invoked by a third application run on the computer, and so on. Each of the first, second, and third applications may be any application, including but not limited to: an audio/video playback application, a video game application, a drawing or modeling application, a control application, a communication application, a browsing or navigating applications, and so on. As previously described, the non-transitory processor-readable medium of the computer may store an API or other data or information through which a user may program processor-executable instructions that embody and/or produce/effect any mapping(s) between gesture identification flags and functions of any electronic device (including but not limited to the computer itself). For example, a user may use an API executed by a computer to define processor-executable instructions that embody and/or produce/effect mappings between gesture identification flags and functions of the computer itself (e.g., functions of one or multiple applications executed by the computer itself), or the user may use an API executed by a computer to define processor-executable instructions (such as firmware or embedded software instructions) that are then ported to, installed on, loaded in, or otherwise received by a separate electronic device, where the processor-executable instructions embody and/or produce/effect mappings between gesture identification flags and functions of the separate electronic device. In accordance with the present systems, articles, and methods, virtually any application run on a computer or any other electronic device may be adapted to respond to generic gesture identification flags output by a wearable EMG device. Thus, in some cases, method 1700 may include an additional act performed by the electronic device, the additional act being selecting and/or initializing a specific application of the electronic device (e.g., stored in and/or to be executed by the electronic device) to be controlled by the wearable EMG device. Selecting and/or initializing a specific application of the electronic device may include selecting/initializing a first set of processor-executable instructions that embody and/or produce/effect a first mapping from multiple sets of processor-executable instructions that embody and/or produce/effect multiple mappings (e.g., one set of processor-executable instructions that embody and/or produce/effect a particular mapping from a plurality of sets of processor-executable instructions that embody and/or produce/effect a plurality of respective mappings).

In accordance with the present systems, articles, and methods, a wearable EMG device may be used to control multiple electronic devices, or multiple applications within a single electronic device. Such is distinct from known proposals for human-electronics interfaces that employ a wearable EMG device, at least because the known proposals typically store a direct mapping from gestures to functions within the wearable EMG device itself, whereas the present systems, articles, and methods describe an intermediate mapping from gestures (e.g., from EMG and/or accelerometer signals representative of gestures) to gesture identification flags that are stored and executed by the wearable EMG device and then mappings from gesture identification flags to functions that are stored and executed by the downstream electronic device. In accordance with the present systems, articles, and methods, the mapping from gestures to gesture identification flags stored and executed by the wearable EMG device is independent of the downstream electronic device and the same mapping from gestures to gesture identification flags may be stored and executed by the wearable EMG device regardless of the nature and/or function(s) of the downstream electronic device.

The implementation of gesture identification flags as described herein enables users to employ the same wearable EMG device to control a wide range of electronic devices and/or a wide range of applications within a single electronic device. Since the gesture identification flags output by the wearable EMG device are not tied to any specific functions or commands, a user may define their own mappings (including their own techniques for performing mappings) between gesture identification flags and electronic device functions. For example, a user may adapt the human-electronics interfaces described herein to control virtually any functions of virtually any electronic device (e.g., to control virtually any application executed by a computer) by defining processor-executable instructions that embody and/or produce a corresponding mapping between gesture identification flags and electronic device functions (such as mapping 1800 from FIG. 18) and establishing automatic execution of the processor-executable instructions by the electronic device in response to receiving gesture identification flags. The processor-executable instructions may be defined for/within the electronic device itself without making any modifications to the wearable EMG device.

The various embodiments described herein provide human-electronics interfaces in which a wearable EMG device (i.e., a controller) provides generic signal "flags" and a downstream receiving device interprets and responds to the generic flags. The flags provided by the wearable EMG device are substantially independent of any downstream receiving device. In accordance with the present systems, articles, and methods, other forms of controllers (i.e., controllers that are not wearable and/or controllers that do not employ EMG sensors) may similarly be configured to provide generic flags in this way. For example, instead of or in addition to employing EMG sensors and/or accelerometers providing gesture control, a controller that operates in accordance with the present systems, articles, and methods may employ, for example, tactile sensors (e.g., buttons, switches, touchpads, or keys) providing manual control, acoustic sensors providing voice-control, optical/photonic sensors providing gesture control, or any other type(s) of user-activated sensors providing any other type(s) of user-activated control. Thus, the teachings of the present systems, articles, and methods may be applied using virtually any type of controller employing sensors (including gesture-based control devices that do not make use of electromyography or EMG sensors), with the acts described herein as being performed by "at least one EMG sensor" and/or "at least one accelerometer" being more generally performed by "at least one sensor."

Description for Capacitive EMG Sensors with Improved Robustness Against Variations in Skin and/or Environmental Conditions The various embodiments described herein provide systems, articles, and methods for capacitive EMG sensors with improved robustness against variations in skin and/or environmental conditions. In particular, the present systems, articles, and methods describe capacitive EMG sensor designs that employ at least one capacitive electrode having a protective coating that provides a barrier to moisture and a high relative permittivity $\epsilon r$ These capacitive EMG sensor designs may be used in any device or method involving capacitive EMG sensing, though they are particularly well-suited for use in applications involving long-term coupling to a user's body over a range of evolving skin and/or environmental conditions. An example application in a wearable EMG device that forms part of a human-electronics interface is described.

Throughout this specification and the appended claims, the terms "coating" and "coat," and variants thereof, are used both as nouns and as verbs to indicate a relationship (noun) or the formation of a relationship (verb) in which a layer of material overlies, underlies, or generally "covers" at least a portion of a device or component, either directly or through one or more intervening layers.

Figure 19A:
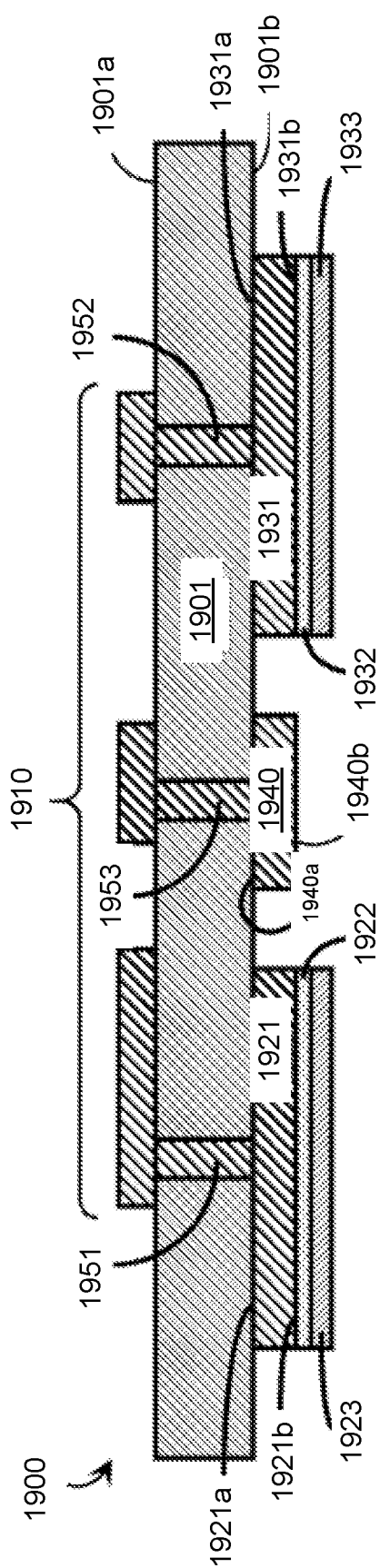
FIG. 19A is a cross-sectional view of an improved capacitive EMG sensor that provides enhanced robustness against variations in skin and/or environmental conditions in accordance with the present systems, articles, and methods.

FIG. 19A is a cross-sectional view of an example of an improved capacitive EMG sensor 1900 that provides enhanced robustness against variations in skin and/or environmental conditions in accordance with the present systems, articles, and methods. Exemplary sensor 1900 is a differential capacitive EMG sensor that includes two capacitive sensor electrodes 1921 and 1931, though the teachings described herein are also applicable to single-ended sensor systems that employ only a single capacitive sensor electrode (i.e., one of sensor electrodes 1921 or 1931). Differential sensor 1900 comprises a substrate 1901 having a first surface 1901a and a second surface 1901b opposite the first surface 1901a across a thickness of substrate 1901. First surface 1901a carries at least a portion of at least one circuit (generally, circuitry 1910) and second surface 1901b carries first sensor electrode 1921, second sensor electrode 1931, and a ground electrode 1940. As will be described in more detail later, circuitry 1910 may include at least a portion of at least one electrical or electronic circuit to process signals provided by first and second sensor electrodes 1921, 1931, including, for example, at least a portion of at least one amplification circuit, at least a portion of at least one filtering circuit, and/or at least a portion of at least one analog-to-digital conversion circuit.

First sensor electrode 1921 includes an electrically conductive plate formed of an electrically conductive material (such as, for example, copper or a material including copper) and has a first surface 1921a and a second surface 1921b, second surface 1921*b* being opposite first surface 1921*a* across a thickness of electrode 1921. First sensor electrode 1921 is carried by second surface 1901*b* of substrate 1901 such that first surface 1921*a* of first sensor electrode 1921 faces second surface 1901*b* of substrate 1901. Throughout this specification and the appended claims, the terms "carries" and "carried by" are generally used to describe a spatial relationship in which a first layer/component is positioned proximate and physically coupled to a surface of a second layer/component, either directly or through one or more intervening layers/components. For example, circuitry 1910 is carried by first surface 1901*a* of substrate 1901 and first sensor electrode 1921 is carried by second surface 1901*b* of substrate 1901. Circuitry 1910 is directly carried by first surface 1901*a* of substrate 1901 because there are no intervening layers/components that mediate the physical coupling between circuitry 1910 and first surface 1901*a* of substrate 1901; however, circuitry 1910 would still be considered "carried by" first surface 1901*a* of substrate 1901 even if the physical coupling between circuitry 1910 and first surface 1901*a* of substrate 1901 was mediated by at least one intervening layer/component. The terms "carries" and "carried by" are not intended to denote a particular orientation with respect to top and bottom and/or left and right.

First sensor electrode 1921 is communicatively coupled to circuitry 1910 by at least one electrically conductive pathway 1951, which in the illustrated example of FIG. 19A is realized by a via connection that extends through substrate 1901.

In accordance with the present systems, articles, and methods, first sensor electrode 1921 is coated by a dielectric layer 1923 formed of a material that has a relative permittivity Er of at least 10, and by an adhesive layer 2122 that is sandwiched in between first sensor electrode 1921 and dielectric layer 1923. Adhesive layer 2122 serves to adhere, affix, or otherwise couple dielectric layer 1923 to the second surface 1921*b* of first sensor electrode 1921, and may comprise, for example, an electrically conductive epoxy or an electrically conductive solder. In other words, adhesive layer 2122 mediates physical and electrical coupling between dielectric layer 1923 and first sensor electrode 1921. Referring back to the definition of the terms "carries" and "carried by," both adhesive layer 2122 and dielectric layer 1923 are considered to be carried by second surface 1901*b* of substrate 1901

Dielectric layer 1923 may comprise any dielectric material that has a large relative permittivity Er (e.g., a relative permittivity of about 10 or more, including a relative permittivity of about 10, about 20, about 50, about 1900, about 19000, etc.). Advantageously, dielectric layer 1923 may comprise a ceramic material, such as an X7R ceramic material. Throughout this specification and the appended claims, the term "X7R" refers to the EIA RS-198 standard three-digit code for temperature ranges and inherent change of capacitance. Specifically, the code "X7R" indicates a material that will operate in the temperature range of −55° C. to +125° C. with a change of capacitance of ±15%. A person of skill in the art will appreciate that the X7R EIA code is substantially equivalent to "2X1" under the IEC/EN 60384-9/22 standard. Dielectric layer 1923 may comprise a resin and/or ceramic powder such as those used in Farad-Flex® products available from Oak-Mitsui Technologies.

Since capacitive EMG sensor 1900 is differential, it includes a second sensor electrode 1931. Second sensor electrode 1931 may be substantially similar to first sensor electrode 1921 in that second sensor electrode 1931 includes an electrically conductive plate formed of an electrically conductive material (e.g., a material including copper) that has a first surface 1931*a* and a second surface 1931*b*, second surface 1931*b* being opposite first surface 1931*a* across a thickness of electrode 1931. Second sensor electrode 1931 is carried by second surface 1901*b* of substrate 1901 such that first surface 1931*a* of second sensor electrode 1931 faces second surface 1901*b* of substrate 1901. Second sensor electrode 1931 is also coated by a dielectric layer 1933 that is substantially similar to dielectric layer 1923, and dielectric layer 1933 is adhered, affixed, or otherwise coupled to second surface 1931*b* of second sensor electrode 1931 by an adhesive layer 1932 that is substantially similar to adhesive layer 2122. Second sensor electrode 1931 is communicatively coupled to circuitry 1910 by at least one electrically conductive pathway 1952, which in the illustrated example of FIG. 19A is realized by a via connection that extends through substrate 1901. As is the case for the illustrated example of FIG. 19A, first sensor electrode 1921 and second sensor electrode 1931 may be substantially coplanar.

Capacitive EMG sensor 1900 also includes a ground electrode 1940. Ground electrode 1940 includes an electrically conductive plate formed of an electrically conductive material (e.g., the same material that makes up first sensor electrode 1921 and second sensor electrode 1931) that has a first surface 141*a* and a second surface 141*b*, second surface 141*b* being opposite first surface 141*a* across a thickness of electrode 1940. Ground electrode 1940 is carried by second surface 1901*b* of substrate 1901 such that first surface 1940*a* of ground electrode 1940 faces second surface 1901*b* of substrate 1901. Ground electrode 1940 is communicatively coupled to circuitry 1910 by at least one electrically conductive pathway 1953, which in the illustrated example of FIG. 19A is realized by a via connection that extends through substrate 1901. Unlike second surface 1921*b* of first sensor electrode 1921 and second surface 1931*b* of second sensor electrode 1931, second surface 1940*b* of ground electrode 1940 is exposed and not coated by a dielectric layer in order that ground electrode 1940 may advantageously provide a directly electrically coupled (i.e., resistively coupled) path to ground.

In use, capacitive EMG sensor 1900 is positioned proximate a user's muscle(s) so that dielectric layers 1923, 1933 and ground electrode 1940 are all in physical contact with the user's skin (or, in some cases, a layer of material such as clothing may mediate physical contact between sensor 1900 and the user's skin). Dielectric layers 1923, 1933 are advantageously formed of a dielectric material that has a high relative permittivity (e.g., ∈r greater than or equal to about 10) in order to enhance the capacitive coupling between sensor electrodes 1921, 1931 and the user's body. For each of first sensor electrode 1921 and second sensor electrode 1931, the respective capacitance that couples the sensor electrode (1921, 1931) to the user's body (e.g., skin) is at least approximately given by equation 1:

$$C = \frac{\epsilon_r \epsilon_0 A}{d} \tag{1}$$

where ∈r is the relative permittivity of the dielectric material that coats the sensor electrode (i.e., dielectric layers 1923, 1933), ∈o is the vacuum permittivity (i.e., a constant value of 8.85211878176×10-12 F/m), A is the area of the sensor electrode, and d is the distance between the sensor electrode and the user's body. Thus, if A and d are held constant, εr (i.e., the relative permittivity of dielectric layers 1923, 1933) directly influences the capacitance between the user's body and each of first sensor electrode 1921 and second sensor electrode 1931. A large εr may enable a capacitive EMG sensor to employ smaller sensor electrode area(s) A and/or greater separation d between the sensor electrode(s) and the user's body.

Dielectric layers 1923, 1933 are advantageously biocompatible (e.g., non-toxic, etc.) and substantially robust against the corrosive effects of sweat and skin oils. Dielectric layers 1923, 1933 are also advantageously non-absorptive and impermeable to water, sweat, and skin oils. Ideally, dielectric layers 1923, 1933 provide hermetic barriers between the user's skin and first and second sensor electrodes 1921, 1931 such that the presence of sweat, water, and/or skin oils does not substantially degrade the performance of capacitive EMG sensor 1900.

Even though dielectric layers 1923, 1933 may protect first sensor electrode 1921 and second sensor electrode 1931 (respectively) from moisture and/or other aspects of the user's skin, such moisture and/or other aspects that may underlie dielectric layers 1923, 1933 (e.g., sweat or skin oils that may mediate coupling between the user's body and dielectric layers 1923, 1933) may still affect the capacitive coupling between the user's body and first and second sensor electrodes 1921, 1931. This is a further reason why it is advantageous for dielectric layers 1923, 1933 to be formed of a dielectric material that has a high relative permittivity (i.e., εr≥10): the larger the relative permittivity of dielectric layers 1923, 1933, the larger the capacitance that couples the user's body to first and second sensor electrodes 1921, 1931 and the smaller the proportionate impact of variations in sweat or skin oil conditions.

Equation 1 shows that the capacitance C that couples the user's body to first and second sensor electrodes 1921, 1931 is directly proportional to the relative permittivity εr and inversely proportional to the thickness d of dielectric layers 1923, 1933. Thus, while it is advantageous for dielectric layers 1923, 1933 to be formed of a dielectric material that has a high relative permittivity εr, it is similarly advantageous for dielectric layers 1923, 1933 to be relatively thin (i.e., for d to be small). In accordance with the present systems, articles, and methods, the thickness of dielectric layers 1923, 1933 may be, for example, approximately 10 μm or less. Approximately 10 μm or less is sufficiently thick to provide an adequate barrier to moisture (e.g., sweat/oil) and electrical insulation, and sufficiently thin to provide an adequate capacitance C as per equation 1.

In accordance with the present systems, articles, and methods, ground electrode 1940 is exposed and not coated by a dielectric layer. This is because it is advantageous for ground electrode 1940 to be resistively coupled to the user's body as opposed to capacitively coupled thereto in order to provide a lower impedance for return currents.

Even though first and second sensor electrodes 1921, 1931 are coated by dielectric layers 1923, 1933 (respectively) and ground electrode 1940 is not coated by a dielectric layer, dielectric layers 1923, 1933 and ground electrode 1940 may all still simultaneously contact a user's skin when capacitive EMG sensor 1900 is positioned on the user. This is because the surface of the user's skin may have a curvature and/or the surface of the user's skin (and/or the flesh thereunder) may be elastic and compressible such that dielectric layers 1923, 1933 can be "pressed" into the user's skin with sufficient depth to enable physical contact between ground electrode 1940 and the user's skin. While not drawn to scale, in the illustrated example of FIG. 19A, dielectric layers 1923, 1933 are still thinner than the electrically conductive plates that form first and second sensor electrodes 1921, 1931. For example, dielectric layers 1923, 1933 may each have a thickness of less than about 10 μm while first and second sensor electrodes 1921, 1931 may each have a thickness of about 30 μm or more.

There are many different ways in which dielectric layers 1923, 1933 may be applied to coat first and second sensor electrodes 1921, 1931 (respectively) and the specific structural configuration of the corresponding capacitive EMG sensor may vary to reflect this. In exemplary capacitive EMG sensor 1900, dielectric layers 1923, 1933 have been individually and separately deposited on first and second sensor electrodes 1921, 1931 (respectively). This may be achieved by, for example, brushing a liquid or fluid form of the dielectric material that constitutes dielectric layers 1923 and 1933 over second surface 1921b of first sensor electrode 1921 and second surface 1931b of second sensor electrode 1931. In this case, dielectric layers 1923, 1933 may subsequently be hardened or cured (and adhesive layers 1922, 1932 may potentially not be required). Alternatively, individual and separate sections of a substantially solid or non-fluid form of the dielectric material that constitutes dielectric layers 1923 and 1933 may be sized and dimensioned to at least approximately match the respective areas of first and second sensor electrodes 1921, 1931 and then respective ones of such sections may be deposited on first and second sensor electrodes 1921 and 1931. For example, a first section of a dielectric material (having a high relative permittivity) may be sized and dimensioned to at least approximately match the area of first sensor electrode 1921 and this first section of the dielectric material may be adhered, affixed, or otherwise coupled to first sensor electrode 1921 by adhesive layer 1922 to form dielectric layer 1923. Likewise, a second section of the dielectric material may be sized and dimensioned to at least approximately match the area of second sensor electrode 1931 and adhered, affixed, or otherwise coupled to second sensor electrode 1931 by adhesive layer 1932 to form dielectric layer 1933.

As an alternative to the above examples of depositing dielectric layers 1921, 1931 as individual, separate sections of dielectric material, a single continuous piece of dielectric material may be deposited over second surface 1901b of substrate 1901, first and second sensor electrodes 1921, 1931, and optionally ground electrode 1940. In this case, substrate 1901, first and second sensors electrodes 1921, 1931, and dielectric layers 1923, 1933 may together constitute a laminate structure. In other words, dielectric layers 1923, 1933 may be applied to first and second sensor electrodes 1921, 1931 as lamination layers using a lamination process. In fabrication processes in which dielectric material coats ground electrode 1940, the portion of dielectric material that coats ground electrode may subsequently be removed (e.g., by an etching process) to expose second surface 1940b of ground electrode 1940.

Figure 19B:
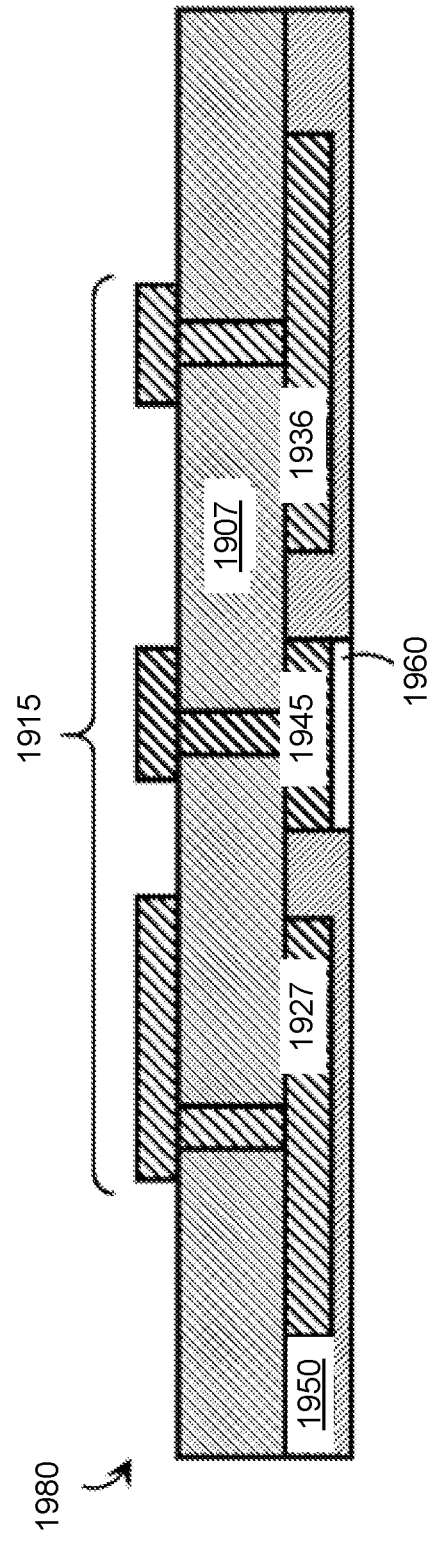
FIG. 19B is a cross-sectional view of a laminate version of an improved capacitive EMG sensor that provides enhanced robustness against variations in skin and/or environmental conditions in accordance with the present systems, articles, and methods.

FIG. 19B is a cross-sectional view of an exemplary laminate version of an improved capacitive EMG sensor 1980 that provides enhanced robustness against variations in skin and/or environmental conditions in accordance with the present systems, articles, and methods. Exemplary sensor 1980 is a differential capacitive EMG sensor that is substantially similar to sensor 1900 from FIG. 19A in that sensor 1980 includes a substrate 1907 (substantially similar to substrate 1901 from sensor 1900), circuitry 1915 (substantially similar to circuitry 1910 from sensor 1900), first and second capacitive sensor electrodes 1927 and 1936 (substantially similar to first and second sensor electrodes 1921 and 1931, respectively, from sensor 1900), and ground electrode 1945 (substantially similar to ground electrode 1940 from sensor 1900). Sensor 1980 also includes a dielectric layer 1950 that coats first and second sensor electrodes 1927, 1936 in a similar way to dielectric layers 1923, 1933 from sensor 1900. Like dielectric layers 1923 and 1933, dielectric layer 1950 is formed of a dielectric material that has a large relative permittivity (i.e., ϵr greater than or equal to about 10). However, unlike dielectric layers 1923 and 1933, dielectric layer 1950 is deposited as a single continuous layer that coats both first and second sensor electrodes 1927, 1936 and also coats at least a portion of substrate 1907. For example, sensor 1980 may be a laminate structure and dielectric layer 1950 may be deposited using a lamination process. The deposition of dielectric layer 1950 may initially coat ground electrode 1945, in which case ground electrode 1945 may subsequently be exposed by forming (e.g., etching) a hole 1960 in dielectric layer 1950. Otherwise, a temporary mask may cover ground electrode 1945 during deposition of dielectric layer 1950 to prevent dielectric layer 1950 from coating ground electrode 1945 and hole 1960 may be left as a result when the mask is subsequently removed.

Dielectric layer 1950 may be deposited to provide a desired thickness of, for example, less than about 10 μm measured from the interface with first and second sensor electrodes 1927, 1936. Though not illustrated in FIG. 19B, an adhesive layer may be used to adhere, affix, or otherwise couple dielectric layer 1950 to any or all of substrate 1907, first electrode 1927, and/or second sensor electrode 1936.

Various methods for fabricating an improved capacitive EMG sensor that includes at least one protective, high-ϵr dielectric barrier have been described. These methods are summarized and generalized in FIG. 20.

Figure 20:
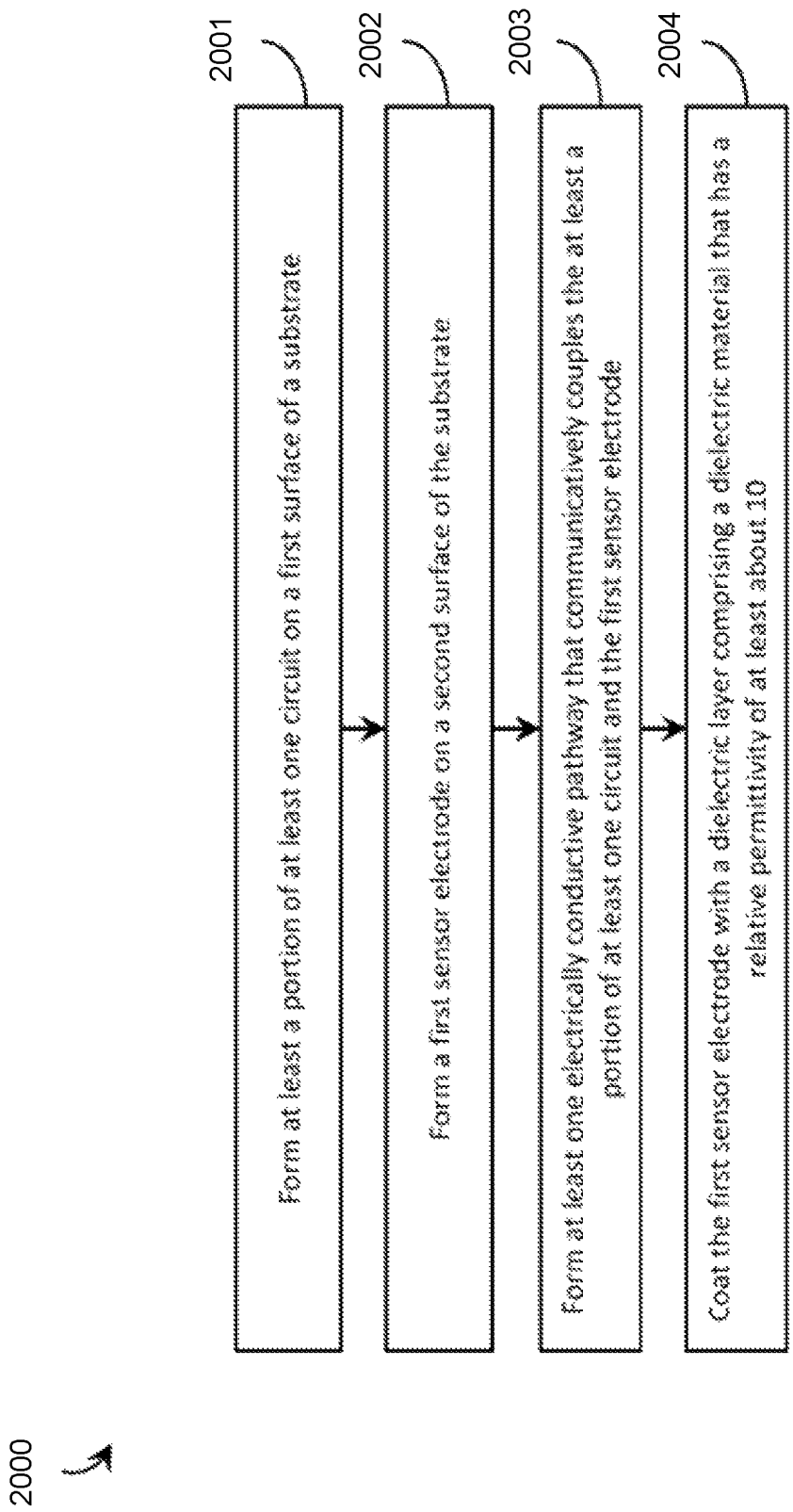
FIG. 20 is a flow-diagram showing a method of fabricating an improved capacitive EMG sensor in accordance with the present systems, articles, and methods.

FIG. 20 is a flow-diagram showing a method 2000 of fabricating an improved capacitive EMG sensor (e.g., sensor 1900 and/or sensor 1980) in accordance with the present systems, articles, and methods. Method 2000 includes four acts 2001, 2002, 2003, and 2004, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 2001, at least a portion of at least one circuit is formed on a first surface of a substrate. The at least a portion of at least one circuit may include one or more conductive traces and/or one or more electrical or electronic circuits, such as one or more amplification circuit(s), one or more filtering circuit(s), and/or one or more analog-to-digital conversion circuit(s). As examples, sensor 1900 from FIG. 19A includes circuitry 1910 and sensor 1980 from FIG. 19B includes circuitry 1915. Forming at least a portion of at least one circuit may include one or more lithography process(es) and/or soldering one or more component(s) to the substrate.

At 2002, a first sensor electrode is formed on a second surface of the substrate. The first sensor electrode may include an electrically conductive plate formed of, for example, a material including copper. As examples, sensor 1900 from FIG. 19A includes first sensor electrode 1921 and sensor 1980 from FIG. 19B includes first sensor electrode 1927. Forming the first sensor electrode may include, for example, one or more lithography process(es). As previously described, the order of the acts of method 2000 may change. For example, in some cases it may be advantageous to form the first sensor electrode per act 2002 prior to forming the at least a portion of circuitry per act 2001.

At 2003, at least one electrically conductive pathway that communicatively couples the at least a portion of at least one circuit and the first sensor electrode is formed. The at least one electrically conductive pathway may include at least one via through the substrate, at least one conductive trace, and/or at least one wiring component. For example, sensor 1900 includes electrically conductive pathway 1951 that communicatively couples circuitry 1910 to first sensor electrode 1921. In some implementations, all or a portion of a via (e.g., a hole or aperture with or without electrically conductive communicative path therethrough) may be formed in the substrate before either or both of acts 2001 and/or 2002.

At 2004, the first sensor electrode is coated with a dielectric layer comprising a dielectric material that has a relative permittivity ϵr of at least 10. As previously described, the coating may be applied in a variety of different ways, including without limitation: brushing or otherwise applying a fluid form of the dielectric material on the first sensor electrode and curing the dielectric material; adhering, affixing, or otherwise coupling a substantially non-fluid form of the dielectric material to the first sensor electrode using, for example, an adhesive layer such as an electrically conductive epoxy or an electrically conductive solder; or depositing a single continuous layer of the dielectric material over both the first sensor electrode and at least a portion of the substrate using a lamination process or other dielectric deposition process. When an adhesive layer is used, coating the first sensor electrode with a dielectric layer may include depositing a layer of electrically conductive epoxy on the first sensor electrode and depositing the dielectric layer on the layer of electrically conductive epoxy, or depositing a layer of electrically conductive solder on the first sensor electrode and depositing the dielectric layer on the layer of electrically conductive solder. As examples, sensor 1900 includes dielectric layer 1923 that is adhered to first sensor electrode 1921 by adhesive layer 2122 and sensor 1980 includes dielectric layer 1950 that is deposited over first sensor electrode 1927 and substrate 1907 to form a laminate structure. The dielectric layer may include a ceramic material, such as an X7R ceramic material.

In addition to acts 2001, 2002, 2003, and 2004, method 2000 may be extended to include further acts in order to, for example, fabricate some of the additional elements and/or features described for sensors 1900 and 1980. For example, method 2000 may include forming a second sensor electrode on the second surface of the substrate, forming at least one electrically conductive pathway that communicatively couples the at least a portion of at least one circuit and the second sensor electrode, and coating the second sensor electrode with the dielectric layer (either with a single continuous dielectric layer or with a separate section of the dielectric layer, as described previously). Either separately or in addition to forming a second sensor electrode, method 2000 may include forming a ground electrode on the second surface of the substrate and forming at least one electrically conductive pathway that communicatively couples the ground electrode and the at least a portion of at least one circuit. In this case, coating the first sensor electrode with a dielectric layer per act 2003 may include selectively coating the first sensor electrode with the dielectric layer and not coating the ground electrode with the dielectric layer, or coating both the first sensor electrode and the ground electrode with the dielectric layer and then forming a hole in the dielectric layer to expose the ground electrode.

The improved capacitive EMG sensors described herein may be implemented in virtually any system, device, or process that makes use of capacitive EMG sensors; however, the improved capacitive EMG sensors described herein are particularly well-suited for use in EMG devices that are intended to be worn by (or otherwise coupled to) a user for an extended period of time and/or for a range of different skin and/or environmental conditions. As an example, the improved capacitive EMG sensors described herein may be implemented in a wearable EMG device that provides gesture-based control in a human-electronics interface. Some details of exemplary wearable EMG devices that may be adapted to include at least one improved capacitive EMG sensor from the present systems, articles, and methods are described in, for example, U.S. patent application Ser. No. 16/550,905, U.S. Pat. Nos. 10,429,928, 10,101,809, 10,042, 422; U.S. patent application Ser. No. 14/186,889, U.S. patent application Ser. No. 14/194,252, U.S. patent application Ser. No. 14/335,668; U.S. Pat. No. 10,152,082; U.S. patent application Ser. No. 14/461,044, U.S. patent application Ser. No. 14/465,194, U.S. Pat. Nos. 9,483,123, and 9,389,694, all of which are incorporated herein by reference in their entirety.

Throughout this specification and the appended claims, the term "gesture" is used to generally refer to a physical action (e.g., a movement, a stretch, a flex, a pose, etc.) performed or otherwise effected by a user. Any physical action performed or otherwise effected by a user that involves detectable muscle activity (detectable, e.g., by at least one appropriately positioned EMG sensor) may constitute a gesture in the present systems, articles, and methods.

Figure 21:
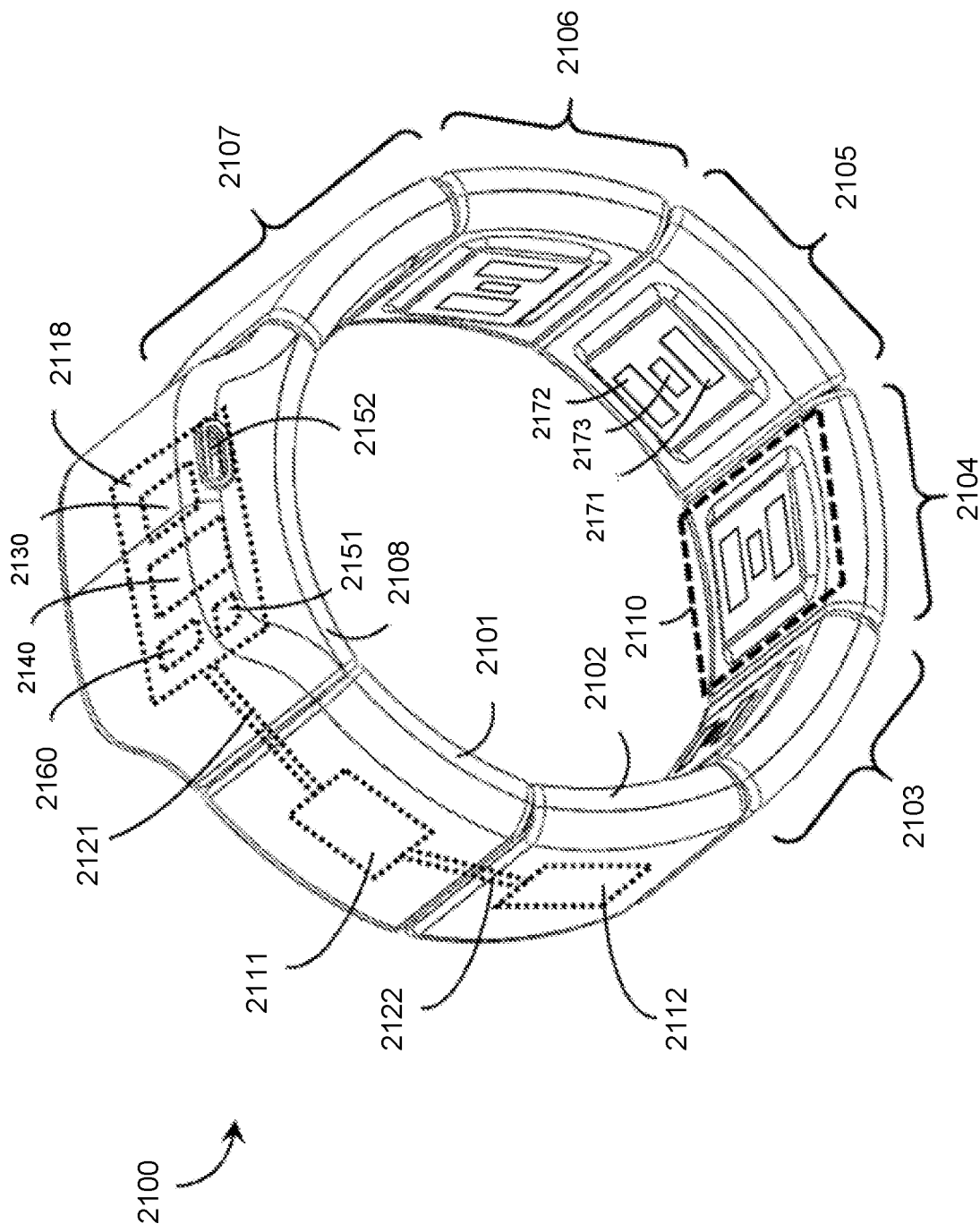
FIG. 21 is a perspective view of an exemplary wearable EMG device that includes improved capacitive EMG sensors in accordance with the present systems, articles, and methods.

FIG. 21 is a perspective view of an exemplary wearable EMG device 2100 that includes improved capacitive EMG sensors in accordance with the present systems, articles, and methods. Exemplary wearable EMG device 2100 may, for example, form part of a human-electronics interface. Exemplary wearable EMG device 2100 is an armband designed to be worn on the forearm of a user, though a person of skill in the art will appreciate that the teachings described herein may readily be applied in wearable EMG devices designed to be worn elsewhere on the body of the user, including without limitation: on the upper arm, wrist, hand, finger, leg, foot, torso, or neck of the user.

Device 2100 includes a set of eight pod structures 2101, 2102, 2103, 2104, 2105, 2106, 2107, and 2108 that form physically coupled links of the wearable EMG device 2100. Each pod structure in the set of eight pod structures 2101, 2102, 2103, 2104, 2105, 2106, 2107, and 2108 is positioned adjacent and in between two other pod structures in the set of eight pod structures such that the set of pod structures forms a perimeter of an annular or closed loop configuration. For example, pod structure 2101 is positioned adjacent and in between pod structures 2102 and 2108 at least approximately on a perimeter of the annular or closed loop configuration of pod structures, pod structure 2102 is positioned adjacent and in between pod structures 2101 and 2103 at least approximately on the perimeter of the annular or closed loop configuration, pod structure 2103 is positioned adjacent and in between pod structures 2102 and 2104 at least approximately on the perimeter of the annular or closed loop configuration, and so on. Each of pod structures 2101, 2102, 2103, 2104, 2105, 2106, 2107, and 2108 is physically coupled to the two adjacent pod structures by at least one adaptive coupler (not visible in FIG. 21). For example, pod structure 2101 is physically coupled to pod structure 2108 by an adaptive coupler and to pod structure 2102 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 2101, 2102, 2103, 2104, 2105, 2106, 2107, and 2108 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 2100 is depicted in FIG. 21 with the at least one adaptive coupler completely retracted and contained within the eight pod structures 2101, 2102, 2103, 2104, 2105, 2106, 2107, and 2108 (and therefore the at least one adaptive coupler is not visible in FIG. 21).

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 2101 and 2102 of device 2100 can each be moved or displaced relative to one another within the constraints imposed by the adaptive coupler providing adaptive physical coupling therebetween. The desire for pod structures 2101 and 2102 to be movable/displaceable relative to one another specifically arises because device 2100 is a wearable EMG device that advantageously accommodates the movements of a user and/or different user forms.

Device 2100 includes eight pod structures 2101, 2102, 2103, 2104, 2105, 2106, 2107, and 2108 that form physically coupled links thereof. Wearable EMG devices employing pod structures (e.g., device 2100) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 2100 of FIG. 21, each of pod structures 2101, 2102, 2103, 2104, 2105, 2106, 2107, and 2108 comprises a respective housing having a respective inner volume. Each housing may be formed of substantially rigid material and may be optically opaque. Throughout this specification and the appended claims, the term "rigid" as in, for example, "substantially rigid material," is used to describe a material that has an inherent tendency to maintain or restore its shape and resist malformation/deformation under the moderate stresses and strains typically encountered by a wearable electronic device.

Details of the components contained within the housings (i.e., within the inner volumes of the housings) of pod structures 2101, 2102, 2103, 2104, 2105, 2106, 2107, and 2108 are not necessarily visible in FIG. 21. To facilitate descriptions of exemplary device 2100, some internal components are depicted by dashed lines in FIG. 21 to indicate that these components are contained in the inner volume(s) of housings and may not normally be actually visible in the view depicted in FIG. 21, unless a transparent or translucent material is employed to form the housings. For example, any or all of pod structures 2101, 2102, 2103, 2104, 2105, 2106, 2107, and/or 2108 may include circuitry (i.e., electrical and/or electronic circuitry). In FIG. 21, a first pod structure 2101 is shown containing circuitry 2111 (i.e., circuitry 2111 is contained in the inner volume of the housing of pod structure 2101), a second pod structure 2102 is shown containing circuitry 2112, and a third pod structure 2108 is shown containing circuitry 2118. The circuitry in any or all pod structures may be communicatively coupled to the circuitry in at least one other pod structure by at least one communicative pathway (e.g., by at least one electrically conductive pathway and/or by at least one optical pathway). For example, FIG. 21 shows a first set of communicative pathways 2121 providing communicative coupling between circuitry 2118 of pod structure 2108 and circuitry 2111 of pod structure 2101, and a second set of communicative pathways 2122 providing communicative coupling between circuitry 2111 of pod structure 2101 and circuitry 2112 of pod structure 2102.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Each individual pod structure within a wearable EMG device may perform a particular function, or particular functions. For example, in device 2100, each of pod structures 2101, 2102, 2103, 2104, 2105, 2106, and 2107 includes a respective improved capacitive EMG sensor 2110 (only one called out in FIG. 21 to reduce clutter) in accordance with the present systems, articles, and methods. Each improved capacitive EMG sensor 2110 is responsive to muscle activity corresponding to a gesture performed by a user of wearable EMG device 2100. Thus, each improved capacitive EMG sensor 2110 is included in device 2100 to detect muscle activity of a user and to provide electrical signals in response to the detected muscle activity. Thus, each of pod structures 2101, 2102, 2103, 2104, 2105, 2106, and 2107 may be referred to as a respective "sensor pod." Throughout this specification and the appended claims, the term "sensor pod" is used to denote an individual pod structure that includes at least one sensor to detect muscle activity of a user.

Pod structure 2108 of device 2100 includes a processor 2130 that processes the signals provided by the improved capacitive EMG sensors 2110 of sensor pods 2101, 2102, 2103, 2104, 2105, 2106, and 2107 in response to detected muscle activity. Pod structure 2108 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. A person of skill in the art will appreciate that implementations that employ a digital processor (e.g., a digital microprocessor or microcontroller, a DSP, etc.) may advantageously include a non-transitory processor-readable storage medium or memory communicatively coupled thereto and storing processor-executable instructions that control the operations thereof, whereas implementations that employ an ASIC, FPGA, or analog processor may or may optionally not include a non-transitory processor-readable storage medium, or may include on-board registers or other non-transitory storage structures.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 2100, processor pod 2108 includes an improved capacitive EMG sensor 2110 (not visible in FIG. 21) responsive to (i.e., to sense, measure, transduce or otherwise detect and provide one or more signal(s) in response to sensing, measuring, transducing, or otherwise detecting) muscle activity of a user, so processor pod 2108 could be referred to as a sensor pod. However, in exemplary device 2100, processor pod 2108 is the only pod structure that includes a processor 2130, thus processor pod 2108 is the only pod structure in exemplary device 2100 that can be referred to as a processor pod. The processor 2130 in processor pod 2108 also processes the EMG signals provided by the improved capacitive EMG sensor 2110 of processor pod 2108. In alternative embodiments of device 2100, multiple pod structures may include processors, and thus multiple pod structures may serve as processor pods. Similarly, some pod structures may not include sensors, and/or some sensors and/or processors may be laid out in other configurations that do not involve pod structures.

In device 2100, processor 2130 includes and/or is communicatively coupled to a non-transitory processor-readable storage medium or memory 2140. Memory 2140 may store processor-executable gesture identification instructions and/or data that, when executed by processor 2130, cause processor 2130 to process the EMG signals from improved capacitive EMG sensors 2110 and identify a gesture to which the EMG signals correspond. For communicating with a separate electronic device (not shown), wearable EMG device 2100 includes at least one communication terminal. Throughout this specification and the appended claims, the term "communication terminal" is generally used to refer to any physical structure that provides a telecommunications link through which a data signal may enter and/or leave a device. A communication terminal represents the end (or "terminus") of communicative signal transfer within a device and the beginning of communicative signal transfer to/from an external device (or external devices). As examples, device 2100 includes a first communication terminal 2151 and a second communication terminal 2152. First communication terminal 2151 includes a wireless transmitter (i.e., a wireless communication terminal) and second communication terminal 2152 includes a tethered connector port 2152. Wireless transmitter 2151 may include, for example, a Bluetooth® transmitter (or similar) and connector port 2152 may include a Universal Serial Bus port, a mini-Universal Serial Bus port, a micro-Universal Serial Bus port, a SMA port, a THUNDERBOLT® port, or the like.

For some applications, device 2100 may also include at least one inertial sensor 2160 (e.g., an inertial measurement unit, or "IMU," that includes at least one accelerometer and/or at least one gyroscope) responsive to (i.e., to detect, sense, or measure and provide one or more signal(s) in response to detecting, sensing, or measuring) motion effected by a user and provide signals in response to the detected motion. Signals provided by inertial sensor 2160 may be combined or otherwise processed in conjunction with signals provided by improved capacitive EMG sensors 2110.

As previously described, each of pod structures 2101, 2102, 2103, 2104, 2105, 2106, 2107, and 2108 may include circuitry (i.e., electrical and/or electronic circuitry). FIG. 21 depicts circuitry 2111 inside the inner volume of sensor pod 2101, circuitry 2112 inside the inner volume of sensor pod 2102, and circuitry 2118 inside the inner volume of processor pod 2118. The circuitry in any or all of pod structures 2101, 2102, 2103, 2104, 2105, 2106, 2107 and 2108 (including circuitries 2111, 2112, and 2118) may include any or all of: an amplification circuit to amplify electrical signals provided by at least one EMG sensor 2110, a filtering circuit to remove unwanted signal frequencies from the signals provided by at least one EMG sensor 2110, and/or an analog-to-digital conversion circuit to convert analog signals into digital signals. Device 2100 may also include at least one battery (not shown in FIG. 21) to provide a portable power source for device 2100.

Each of EMG sensors 2110 includes a respective improved capacitive EMG sensor per the present systems, articles, and methods, such as for example sensor 1900 from FIG. 19A or sensor 1980 from FIG. 2. In particular, each EMG sensor 2110 includes a respective first capacitive sensor electrode 2171 (only one called out to reduce clutter) that is coated with a dielectric layer formed of a dielectric material having a relative permittivity greater than or equal to about 10, a second capacitive sensor electrode 2172 (only one called out to reduce clutter) that is also coated with a dielectric layer formed of a dielectric material having a relative permittivity greater than or equal to about 10, and a ground electrode 2173 (only one called out to reduce clutter) that is exposed and not coated by a dielectric layer. Each the electrodes 2171, 2172, and 2173 of each EMG sensor 2110 may be carried by a respective substrate, and the respective circuitry (e.g., 2111, 2112, and 2118) of each pod structure 2101, 2102, 2103, 2104, 2105, 2106, 2107, and 2108 may be carried by the same substrate. For example, each respective EMG sensor 2110 of each pod structure 2101, 2102, 2103, 2104, 2105, 2106, 2107, and 2108 may include a respective substrate, with the circuitry 2111, 2112, 2118 of each pod structure 2101, 2102, 2103, 2104, 2105, 2106, 2107, and 2108 carried by a first surface of the substrate and the first and second sensor electrodes 2171, 2172 and the ground electrode 2173 carried by a second surface of the substrate, the second surface being opposite the first surface.

The improved capacitive EMG sensors 2110 of wearable EMG device 2100 are differential sensors that each implement two respective sensor electrodes 2171, 2172, though the teachings herein may similarly be applied to wearable EMG devices that employ single-ended improved capacitive EMG sensors that each implement a respective single sensor electrode.

Signals that are provided by improved capacitive EMG sensors 2110 in device 2100 are routed to processor pod 2108 for processing by processor 2130. To this end, device 2100 employs a set of communicative pathways (e.g., 2121 and 2122) to route the signals that are output by sensor pods 2101, 2102, 2103, 2104, 2105, 2106, and 2107 to processor pod 2108. Each respective pod structure 2101, 2102, 2103, 2104, 2105, 2106, 2107, and 2108 in device 2100 is communicatively coupled to, over, or through at least one of the two other pod structures between which the respective pod structure is positioned by at least one respective communicative pathway from the set of communicative pathways. Each communicative pathway (e.g., 2121 and 2122) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 2100 from FIG. 21 represents an example of a wearable EMG device that incorporates the teachings of the present systems, articles, and methods, though the teachings of the present systems, articles, and methods may be applicable to any wearable EMG device that includes at least one EMG sensor.

In accordance with the present systems, articles, and methods, a capacitive EMG sensor may be fabricated directly on a substrate that has a high relative permittivity er, such as on a ceramic substrate. For example, referring back to sensor 1980 of FIG. 19B using this alternative fabrication approach (which results in re-defining some of the labelled elements of FIG. 19B), a capacitive EMG sensor 1980 may comprise: a substrate 1950 that is formed of a material that has a high relative permittivity (i.e., ϵr greater than or equal to about 10) such as a ceramic material including but not limited to an X7R ceramic material, at least one sensor electrode 1927, 1936 deposited on and carried by the substrate 1950, a dielectric layer 1907 deposited on and carried by the at least one sensor electrode 1927, 1936 and the substrate 1950, circuitry 1915 deposited on and carried by the dielectric layer 1907, and one or more electrically conductive pathway(s) (e.g., via(s)) that communicatively couple the circuitry 1915 to the at least one sensor electrode 1927, 1936. In this case, the substrate 1950 may be thin (e.g., with a thickness of about 10 µm or less) and/or the at least one sensor electrode 1927, 1936 may be deposited on the substrate 1950 by first etching a trench into the substrate 1950 (to a depth that leaves a thickness of 10 µm or less of substrate material 1950 beneath the trench) and then filling the trench with the sensor electrode material. If the sensor 1980 further includes a ground electrode 1945, a hole 1960 may be etched in the substrate 1950 to expose the ground electrode 1945.

Description for Improved Capacitive EMG Sensors that Resistively Couple to the User's Body The various embodiments described herein provide systems, articles, and methods for surface EMG sensors that improve upon existing resistive and capacitive EMG sensor designs. The surface EMG sensors described herein may be understood as hybrid surface EMG sensors that incorporate elements from both resistive EMG sensors and capacitive EMG sensors. In particular, the present systems, articles, and methods describe capacitive EMG sensors that employ at least one sensor electrode that resistively couples to the user's body (e.g., skin) and at least one discrete component capacitor that interrupts the signal path between the at least one sensor electrode and the sensor circuitry. In this way, the capacitive element of the capacitive EMG sensor remains but is essentially moved downstream in the sensor circuit, affording many benefits discussed in detail below. An example application in a wearable EMG device that forms part of a human-electronics interface is also described.

Throughout this specification and the appended claims, the term "capacitive EMG sensor" is used to describe a surface EMG sensor in which communicative coupling between the user's body (e.g., skin) and the sensor circuitry is mediated by at least one capacitive element such that the sensor circuitry is galvanically isolated from the body of the user. In the art, this at least one capacitive element is typically realized at the sensor electrode by configuring the sensor electrode to capacitively couple to the user's skin (e.g., by coating the electrically conductive plate of the sensor electrode with a thin layer of dielectric material). In accordance with the present systems, articles, and methods, the at least one capacitive element may be moved downstream in the sensor such that the sensor electrode resistively/galvanically couples to the user's skin but at least one discrete component capacitor mediates communicative coupling between the sensor electrode and the sensor circuitry.

For comparison purposes, the elements of a capacitive EMG sensor that implements a sensor electrode that capacitively couples to the user's skin are first described.

Figure 22:
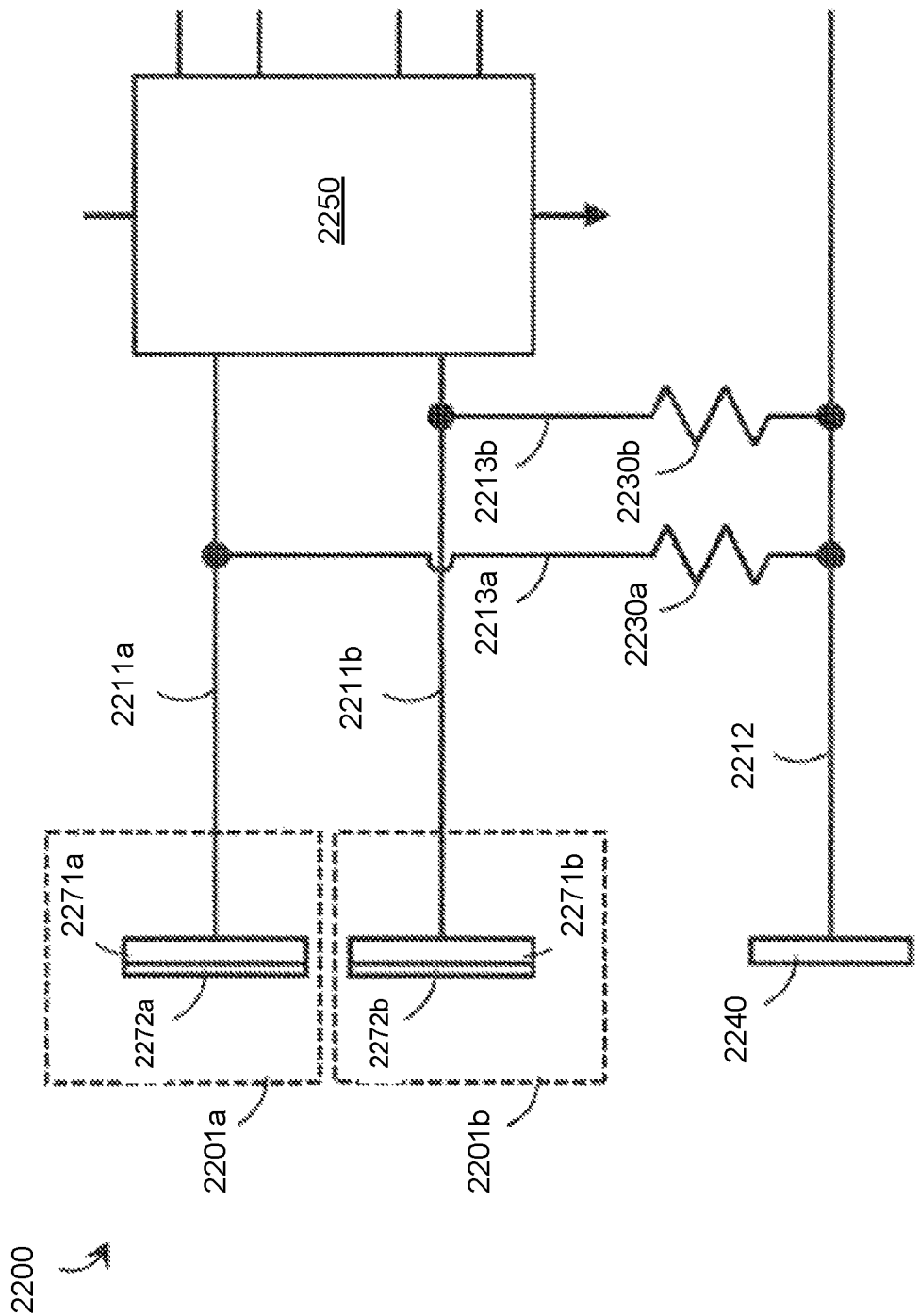
FIG. 22 is a schematic diagram of a capacitive EMG sensor that employs sensor electrodes that are configured to capacitively couple to the skin of a user.

FIG. 22 is a schematic diagram of a capacitive EMG sensor 2200 that employs sensor electrodes 2201 a, 2201 b that are configured to capacitively couple to the skin of a user. Sensor 2200 is a differential capacitive EMG sensor that employs two sensor electrodes 2201 a, 2201 b as described in, for example, U.S. patent application Ser. No. 14/194,252 which is incorporated by reference herein in its entirety. However, a person of skill in the art will appreciate that the basic description of sensor 2200 herein is also applicable to single-ended sensor systems that employ only a single sensor electrode (i.e., one of sensor electrodes 2201 a or 2201 b). Sensor electrodes 2201 a and 2201 b each comprise a respective electrically conductive plate 2271 a, 2271 b coated with a respective layer of dielectric material 2272 a, 2272 b. Sensor 2200 also includes a ground electrode 2240 that comprises an electrically conductive plate that is exposed (i.e., not coated with dielectric material) so that ground electrode 2240 resistively couples to the user's skin as described in U.S. Pat. No. 10,042,422, which is incorporated herein by reference in its entirety.

Sensor 2200 includes circuitry that comprises, at least: electrically conductive pathways 2211 a, 2211 b, 2212, 2213 a, 2213 b; resistors 2230 a, 2230 b; and amplifier 2250. First sensor electrode 2201 a is communicatively coupled to amplifier 2250 through electrically conductive pathway 2211 a and to ground electrode 2240 through a path that comprises electrically conductive pathway 2213 a, resistor 2230 a, and electrically conductive pathway 2212. Second sensor electrode 2201 b is communicatively coupled to amplifier 2250 through electrically conductive pathway 2211 b and to ground electrode 2240 through a path that comprises electrically conductive pathway 2213 b, resistor 2230 b, and electrically conductive pathway 2212.

Sensor 2200 is a capacitive EMG sensor in the traditional sense because it implements sensor electrodes 2201 a, 2201 b that are configured to capacitively couple to the skin of the user. Amplifier 2250 is galvanically isolated from the user's skin by the dielectric layers 2272 a, 2272 b that coat sensor electrodes 2201 a, 2201 b, respectively. As discussed previously, this galvanic isolation is advantageous, at least because it prevents DC voltage(s) from coupling to amplifier 2250 and prevents voltage(s) from being applied to the user's skin. However, the capacitive coupling to the skin through sensor electrodes 2201 a, 2201 b introduces a relatively large impedance between the user's skin and amplifier 2250. This impedance imposes stringent requirements on amplifier 2250 and, ultimately, increases the cost of amplifier 2250 in sensor 2200. Furthermore, the magnitude of the capacitive coupling between sensor electrodes 2201 a, 2201 b and the user's skin is highly dependent on parameters such as skin conductance, skin moisture/sweat levels, hair density, and so on, all of which can vary considerably from user to user (and even in different scenarios for the same user, such as at different levels of physical activity). Thus, even though the galvanic isolation realized by dielectric layers 2272 a and 2272 b is desirable in a surface EMG sensor, capacitive coupling between sensor electrodes 2201 a, 2201 b and the user's skin has undesirable consequences. In accordance with the present systems, articles, and methods, the benefits of galvanically isolating the amplifier (e.g., 2250) from the user's skin may be realized without the drawbacks of capacitively coupling the sensor electrode(s) to the user's skin by a capacitive EMG sensor design in which the capacitive interruption between the user's skin and the amplifier is moved downstream in the sensor circuit and realized by a discrete component capacitor coupled in between a resistive sensor electrode and an amplification circuit.

Figure 23:
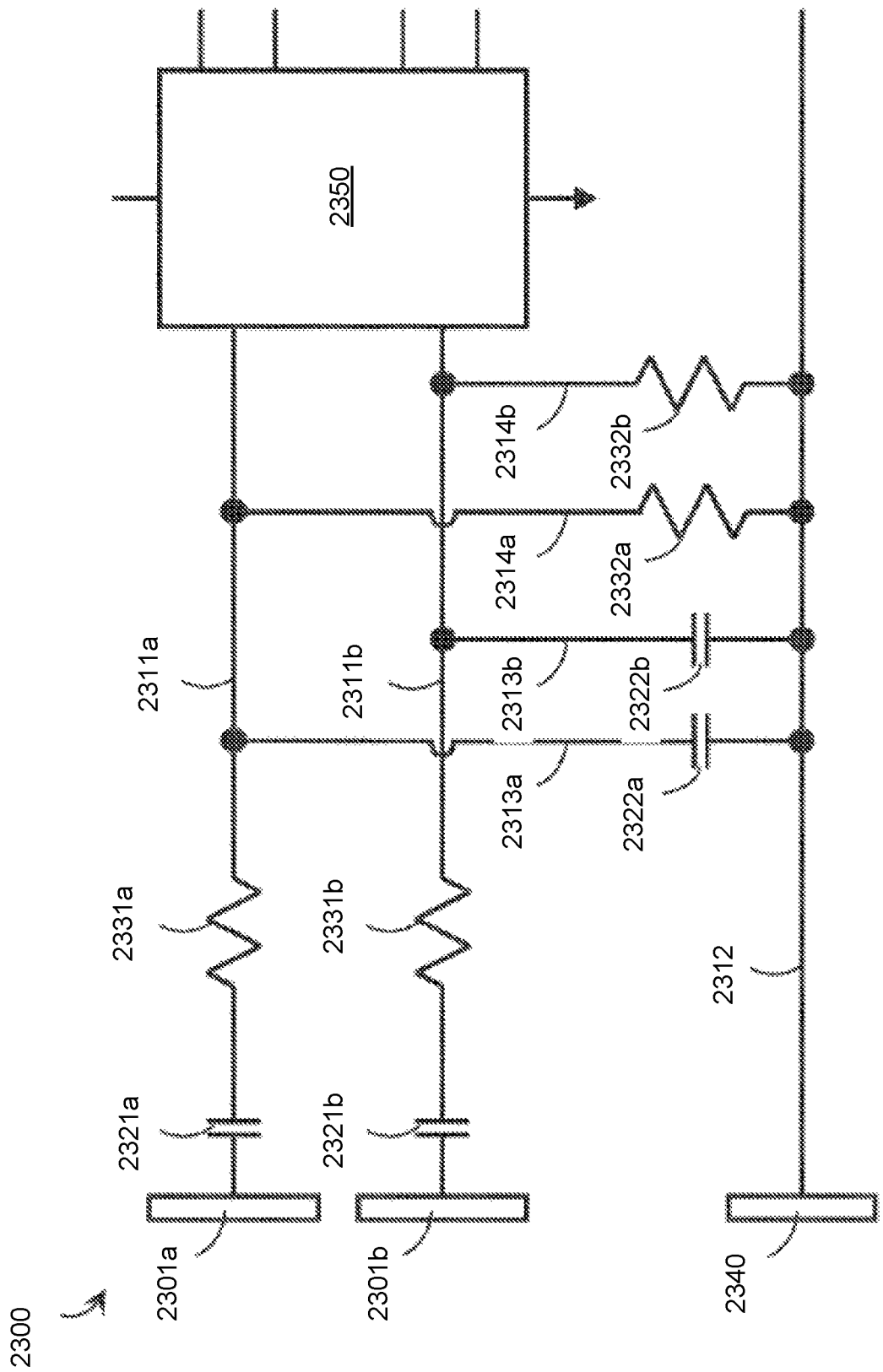
FIG. 23 is a schematic diagram of a capacitive EMG sensor employing sensor electrodes that are adapted to, in use, resistively couple to the skin of a user in accordance with the present systems, articles, and methods.

FIG. 23 is a schematic diagram of a capacitive EMG sensor 2300 employing sensor electrodes 2301 a, 2301 b that are adapted to, in use, resistively couple to the body (e.g., skin) of a user in accordance with the present systems, articles, and methods. Each of sensor electrodes 2301 a and 2301 b comprises a respective plate of electrically conductive material, but unlike electrodes 2201 a and 2201 b from sensor 2200, electrodes 2301 a and 2301 b are not coated with dielectric material. Instead, each of electrodes 2301 a and 2301 b includes a respective bare/exposed electrically conductive surface to directly physically contact the user's skin during use. Thus, capacitive EMG sensor 2300 implements sensor electrodes 2301 a, 2301 b that resemble the sensor electrodes that would typically be found in a resistive EMG sensor. However, in accordance with the present systems, articles, and methods, sensor 2300 is still a capacitive EMG sensor because sensor 2300 includes discrete component capacitors 2321 a and 2321 b that galvanically isolate the rest of the sensor circuitry from the user's body (e.g., skin).

Sensor 2300 is illustrated as a differential capacitive EMG sensor that employs a first sensor electrode 2301 a and a second sensor electrode 2301 b, though a person of skill in the art will appreciate that the description of sensor 2300 herein is also applicable to single-ended sensor systems that employ only a single sensor electrode (i.e., one of sensor electrodes 2301 a or 2301 b).

Sensor 2300 includes an amplification circuit (i.e., an amplifier) 2350. First sensor electrode 2301 a is communicatively coupled to amplifier 2350 by a first electrically conductive pathway 2311 a. A first capacitor 2321 a is electrically coupled in series between first sensor electrode 2301 a and amplifier 2350 in first electrically conductive pathway 2311 a. First capacitor 2321 a galvanically isolates amplifier 2350 from the user's body (e.g., skin) and thereby affords some of the benefits typically associated with a capacitive EMG sensor (i.e., capacitor 2321 a prevents DC voltage(s) from coupling to amplifier 2350 and prevents voltage(s) from being applied to the user's skin). While a traditional capacitive EMG sensor achieves this galvanic isolation by capacitively coupling to the user's skin at the sensor electrode (e.g., as per sensor electrode 2201 *a* from sensor 2200), in sensor 2300 electrode 2301 *a* is resistively coupled to the user's skin and galvanic isolation is moved downstream to discrete component capacitor 2321 *a*. As previously described, resistive coupling to the user's skin as per electrode 2301 *a* from sensor 2300 provides a lower impedance between the user's skin and amplifier 2350 than capacitive coupling to the user's skin as in electrode 2201 a from sensor 2200, and this lower impedance simplifies and lowers the cost of amplifier 2350 in sensor 2300 compared to amplifier 2250 in sensor 2200. Furthermore, because capacitor 2321 *a* is a discrete component, the magnitude of its capacitance can be selected and will remain essentially constant from user to user, regardless of variations such as skin conductance, moisture/sweat levels, hair density, and so on. An example implementation may employ, as capacitors 2321 *a* (and similarly as capacitor 2321 *b*), a discrete component capacitor having a magnitude of about 2200 nF. Typical capacitive coupling between a dielectric-coated cEMG sensor and a user's skin is significantly less than this, thus 2200 nF may dominate the range of variations in skin:electrode capacitance typically seen in cEMG across different users and/or use conditions. The incorporation of a discrete component capacitor 2321 *a* in lieu of condition-dependent capacitive coupling between the electrode and the user's skin is very easy and inexpensive to manufacture and provides an essentially fixed capacitance to which the rest of the sensor circuitry may be tuned for improved performance.

In addition to first capacitor 2321 *a*, sensor 2300 also includes a first resistor 2331 *a* that is electrically coupled in series between first sensor electrode 2301 *a* and amplifier 2350 in first electrically conductive pathway 2311 *a*. Similar to first capacitor 2321 *a*, first resistor 2331 *a* may be a discrete electronic component with a magnitude that can be selected, accurately embodied, and held substantially constant during use. In the illustrated example of FIG. 23, first capacitor 2321 *a* and first resistor 2331 *a* are electrically coupled in series with one another in first electrically conductive pathway 2311 *a*. First resistor 2331 *a* is included, at least in part, to dominate the impedance between electrode 2301 *a* and the user's skin such that variations in the impedance between electrode 2301 *a* and the user's skin due to fluctuations in skin and/or environmental conditions (e.g., skin conductance, moisture/sweat levels, hair density, etc.) are rendered essentially negligible. For example, fluctuations in skin and/or environmental conditions may cause the impedance between electrode 2301 *a* and the user's skin to vary by a magnitude of on the order of 1Ω, 10Ω, 100Ω, or 1000Ω, but first resistor 2331 *a* may be selected to have a resistance of on the order of at least 1 kΩ, at least 10 kΩ, at least 100 kΩ, or more such that the impedance of first resistor 2331 *a* dominates the impedance (and, more specifically, dominates variations in the impedance) between sensor electrode 2301 *a* and the user's skin. The sensor circuitry, including amplifier 2350, may be tuned to accommodate the relatively large impedance of first resistor 2331 *a* such that the relatively small variations in the impedance between sensor electrode 2301 *a* and the user's skin from user to user (and/or under different use conditions for the same user) have a diminished effect on the performance of sensor 2300. First resistor 2331 *a* also serves to limit current into amplifier 2350 and thereby improves the ESD protection of amplifier 2350.

The amplifier(s) used in the capacitive EMG sensors described herein may include one or more of various types of amplifier(s), including one or more instrumentation amplifier(s) and/or one or more single or dual operational amplifier(s), depending, for example, on whether the EMG sensor is single-ended or differential. As sensor 2300 is differential, amplifier 2350 may include a dual operational amplifier (e.g., a "two-op-amp instrumentation amplifier") such as the MAX9916 or the MAX9917, both available from Maxim Integrated, or any of various other amplifier configurations, including but not limited to amplifiers embodied in integrated circuits. A person of skill in the art will appreciate that the output(s) and/or some of the inputs of amplifier 2350 may be connected through various resistor configurations for at least the purpose of determining the gain of amplifier 2350.

Sensor 2300 includes a second electrically conductive pathway 2312 that communicatively couples to ground through a ground electrode 2340. Ground electrode 2340 comprises a plate of electrically conductive material that resistively couples to the user's skin. As sensor 2300 is differential, ground electrode 2340 may not necessarily be used as a reference potential but may primarily provide a path for electrical currents to return to the user's body (e.g., skin). Using second electrically conductive pathway 2312, together with first capacitor 2321 *a* and first resistor 2331 *a*, circuitry connected to first sensor electrode 2301 *a* also includes both a low-pass filtering configuration and a high-pass filtering configuration "in front of" or upstream of amplifier 2350 in a direction in which signals pass. Specifically, sensor 2300 includes a third electrically conductive pathway 2313 *a* that communicatively couples first electrically conductive pathway 2311 *a* and second electrically conductive pathway 2312. Third electrically conductive pathway 2313 *a* includes a second capacitor 2322 *a* electrically coupled in between first electrically conductive pathway 2311 *a* and second electrically conductive pathway 2312. The configuration of first resistor 2331 *a* and second capacitor 2322 *a* (with respect to sensor electrode 2301 *a*, amplifier 2350, and ground electrode 2340) forms a low-pass filtering circuit. As an example, when first resistor 2331 *a* has a magnitude of about 100 kΩ, second capacitor 2322 *a* may have a magnitude of about 10 pF in order to provide desirable low-pass filtering performance. Similarly, sensor 2300 includes a fourth electrically conductive pathway 2314 *a* that communicatively couples first electrically conductive pathway 2311 *a* and second electrically conductive pathway 2312. Fourth electrically conductive pathway 2314 *a* includes a second resistor 2332 *a* electrically coupled in between first electrically conductive pathway 2311 *a* and second electrically conductive pathway 2312. The configuration of first capacitor 2321 *a* and second resistor 2332 *a* (with respect to sensor electrode 2301 *a*, amplifier 2350, and ground electrode 2340) forms a high-pass filtering circuit.

In comparing sensor 2300 from FIG. 23 to sensor 2200 from FIG. 22, second resistor 2332 *a* in sensor 2300 is similar in position and function to resistor 2230 *a* in sensor 2200. The magnitude of a resistor in this position (i.e., the magnitude of second resistor 2332 *a* in sensor 2300 or resistor 2230 *a* in sensor 2200) directly influences the filtering performance of the corresponding high-pass filter; however, as the magnitude of a resistor in this position increases, the stability of the circuit may degrade and more noise may appear. This introduces a further benefit of first capacitor 2321 *a* in sensor 2300: first capacitor 2321 *a* compensates for a decrease in the magnitude of second resistor 2332 *a* and thereby allows a lower-magnitude resistor to be used for second resistor 2332 *a* in sensor 2300 compared to resistor 2230 *a* in sensor 2200. The lower magnitude of second resistor 2332 *a* in sensor 2300 compared to resistor 2230 *a* in sensor 2200 results in both reduced noise and enhanced stability in sensor 2300 compared to sensor 2200. As an example, second resistor 2332 *a* may have a magnitude of about 10 MO or less (e.g., about 1 MO) and first capacitor 2321 *a* may have a magnitude of about 2200 nF.

As previously described, the illustrated example in FIG. 23 of capacitive EMG sensor 2300 is a differential capacitive EMG sensor. To this end, sensor 2300 includes: a second sensor electrode 2301 *b* that is substantially similar to first sensor electrode 2301 *a*; a fifth electrically conductive pathway 2311 *b* (analogous to first electrically conductive pathway 2311 *a*) that communicatively couples second sensor electrode 2301 *b* to amplifier 2350; a third capacitor 2321 *b* (analogous to first capacitor 2321 *a*) electrically coupled in series between second sensor electrode 2301 *b* and amplifier 2350 in fifth electrically conductive pathway 2311 *b*; and a third resistor 2331 *b* (analogous to first resistor 2331 *a*) electrically coupled in series between second sensor electrode 2301 *b* and amplifier 2350 in fifth electrically conductive pathway 2311 *b*. In the illustrated example of FIG. 23, third capacitor 2321 *b* and third resistor 2331 *b* are electrically coupled in series with one another in fifth electrically conductive pathway 2311 *b*. Third capacitor 2321 *b* may be substantially similar to first capacitor 2321 *a* and third resistor 2331 *b* may be substantially similar to first resistor 2331 *a*. Sensor 2300 also includes: a sixth electrically conductive pathway 2313 *b* (analogous to third electrically conductive pathway 2313 *a*) that communicatively couples fifth electrically conductive pathway 2311 *b* and second electrically conductive pathway 2312; a fourth capacitor 2322 *b* (analogous to third capacitor 2322 *a*) electrically coupled in sixth electrically conductive pathway 2313 *b* in between fifth electrically conductive pathway 2311 *b* and second electrically conductive pathway 2312; a seventh electrically conductive pathway 2314 *b* (analogous to fourth electrically conductive pathway 2314 *a*) that communicatively couples fifth electrically conductive pathway 2311 *b* and second electrically conductive pathway 2312; and a fourth resistor 2332 *b* (analogous to second resistor 2332 *a*) electrically coupled in seventh electrically conductive pathway 2314 *b* in between fifth electrically conductive pathway 2311 *b* and second electrically conductive pathway 2312. Third capacitor 2321 *b* and fourth resistor 2332 *b* form a high-pass filter configuration with respect to sensor electrode 2301 *b*, amplifier 2350, and ground electrode 2340 while third resistor 2331 *b* and fourth capacitor 2322 *b* form a low-pass filter configuration with respect to sensor electrode 2301 *b*, amplifier 2350, and ground electrode 2340. Fourth capacitor 2322 *b* may be substantially similar to second capacitor 2322 *a* and fourth resistor 2332 *b* may be substantially similar to second resistor 2332 *a*.

The various examples of capacitive EMG sensors described herein, including sensor 2300 from FIG. 23, may be formed as a printed circuit board, formed as an integrated circuit, or otherwise carried by a substrate. In this case, one or more electrically conductive pathways (e.g., electrically conductive pathways 2311 *a*, 2311 *b*, 2312, 2313 *a*, 2313 *b*, 2314 *a*, and/or 2314 *b*) may be embodied by one or more electrically conductive trace(s) carried by a substrate and formed using one or more lithography process(es).

Figure 24:
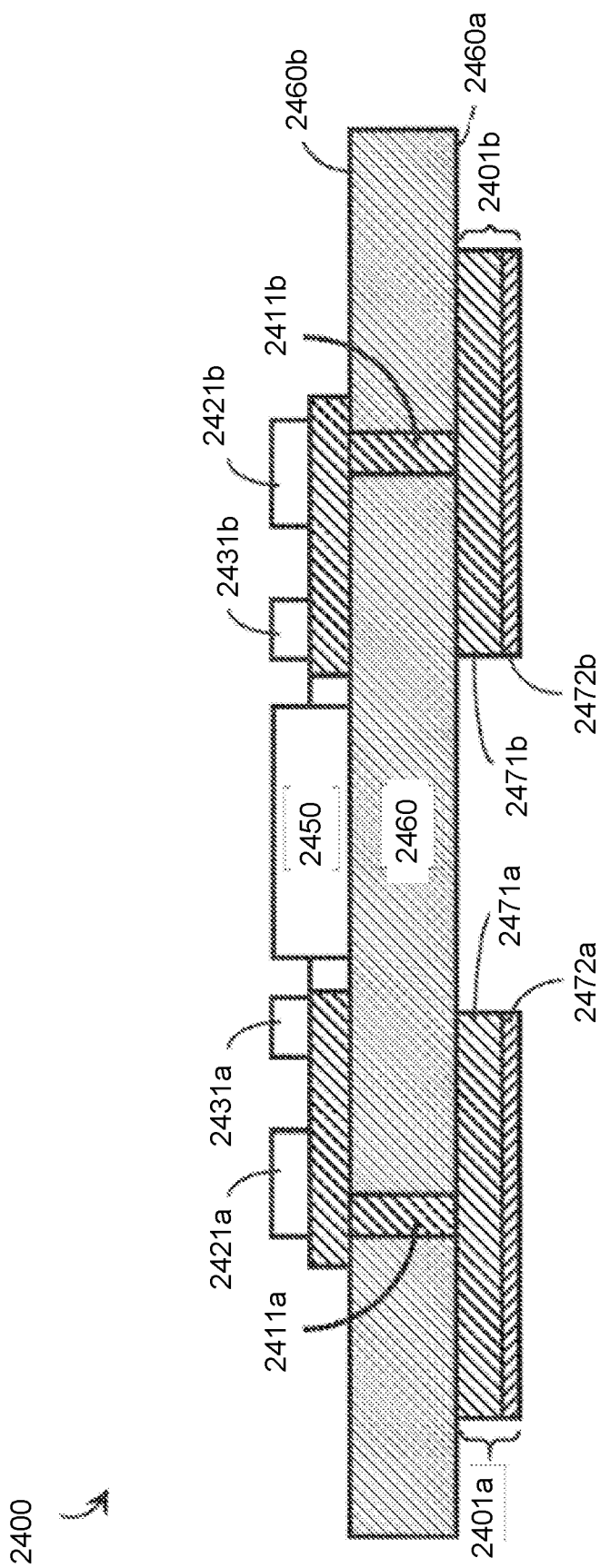
FIG. 24 is a cross sectional view of a capacitive EMG sensor that resistively couples to the user's skin in accordance with the present systems, articles, and methods.

FIG. 24 is a cross sectional view of a capacitive EMG sensor 2400 that resistively couples to the user's skin in accordance with the present systems, articles, and methods.

Sensor 2400 is an example of a physical embodiment of the schematic diagram for sensor 2300 shown in FIG. 23. Sensor 2400 includes elements of sensor 2300 and, in general, the descriptions of the elements of sensor 2300 apply to the analogous elements in sensor 2400 and vice versa.

Sensor 2400 includes a substrate 2460 formed of an insulating material (e.g., FR-4) and having a first surface 2460 *a* and a second surface 2460 *b*. Second surface 2460 *b* is opposite first surface 2460 *a* across a thickness of substrate 2460. Sensor 2400 is a differential EMG sensor comprising two sensor electrodes 2401 *a*, 2401 *b* (analogous to sensor electrodes 2301 *a*, 2301 *b* of sensor 2300), both carried by first surface 2460 *a* of substrate 2460. The circuitry that comprises the other elements of sensor 2400 (e.g., an amplifier 2450 analogous to amplifier 2350 of sensor 2300, capacitors 2421 *a*, 2421 *b* analogous to capacitors 2321 *a*, 2321 *b* of sensor 2300, and resistors 2431 *a*, 2431 *b* analogous to resistors 2331 *a*, 2331 *b* of sensor 2300) is carried by second surface 2460 *b* of substrate 2460 and communicatively coupled to electrodes 2401 *a*, 2401 *b* by electrically conductive pathways 2411 *a*, 2411 *b* (analogous to electrically conductive pathways 2311 *a*, 2311 *b* of sensor 2300), which include via portions that extend through the thickness of substrate 2460 and electrically conductive trace portions that are carried by second surface 2460 *b* of substrate 2460.

Throughout this specification and the appended claims, the terms "carries" and "carried by" are generally used to describe a spatial relationship in which a first layer/component is positioned proximate and physically coupled to a surface of a second layer/component, either directly or through one or more intervening layers/components. For example, electrode 2401 *a* is carried by first surface 2460 *a* of substrate 2460 and amplifier 2450 is carried by second surface 2460 *b* of substrate 2460. Amplifier 2450 is directly carried by second surface 2460 *b* of substrate 2460 because there are no intervening layers/components that mediate the physical coupling between amplifier 2450 and second surface 2460 *b* of substrate 2460; however, amplifier 2450 would still be considered "carried by" second surface 2460 *b* of substrate 2460 even if the physical coupling between amplifier 2450 and second surface 2460 *b* of substrate 2460 was mediated by at least one intervening layer/component. The terms "carries" and "carried by" are not intended to denote a particular orientation with respect to top and bottom and/or left and right.

Each resistive sensor electrode of the capacitive EMG sensors described herein (e.g., electrodes 2401 *a*, 2401 *b* of sensor 2400) comprises a respective electrically conductive plate that physically and electrically (i.e., galvanically/resistively) couples to the user's skin during use. For each such sensor electrode, the electrically conductive plate may be formed of, for example, a material that includes copper (such as pure elemental copper or a copper alloy), deposited and etched in accordance with established lithography techniques. While copper is an excellent material from which to form sensor electrodes 2401 *a*, 2401 *b* from a manufacturing point of view (because lithography techniques for processing copper are very well established in the art), an exposed surface of pure copper will ultimately form an insulating oxide layer and/or react with the skin of a user in other undesirable ways. This effect may be acceptable for traditional capacitive sensor electrodes that capacitively couple to the user because, as described previously, such electrodes are typically coated with an insulating dielectric layer anyway. However, the formation of such an insulating layer can undesirably effect the operation of a sensor electrode that resistively couples to the user's skin. In some cases, a user's skin may even react with copper, resulting in a rash or other discomfort for the user. For at least these reasons, in accordance with the present systems, articles, and methods it can be advantageous to form each of sensor electrodes 2401 *a*, 2401 *b* (and likewise electrodes 2301 *a* and 2301 *b* of FIG. 23) as a respective multilayer (e.g., bi-layer) structure comprising a first layer 2471 *a*, 2471 *b* formed of a first electrically conductive material (e.g., copper or a material including copper) and at least a second layer 2472 *a*, 2472 *b* formed of a second electrically conductive material. In accordance with the present systems, articles, and methods, the second electrically conductive material may be an inert, non-reactive, and/or biocompatible material. For example, the second electrically conductive material may include: gold, steel (e.g., a stainless steel such as a 316 stainless steel or a low-nickel stainless steel to mitigate dermatological nickel allergies, such as 430 stainless steel), silver, titanium, electrically conductive rubber, and/or electrically conductive silicone.

The use of multilayer (e.g., bi-layer) structures for sensor electrodes 2401 *a*, 2401 *b* is advantageous because it enables the first layer 2471 *a*, 2471 *b* to be formed of copper using established lithography techniques and the second layer 2472 *a*, 2472 *b* to be subsequently applied in order to protect the copper from exposure to the user/environment and to protect the user from exposure to the copper. Furthermore, an EMG sensor (e.g., sensor 2400) may be packaged in a housing for both protective and aesthetic purposes, and a second layer 2472 *a*, 2472 *b* of electrically conductive material may be used to effectively increase the thickness of sensor electrodes 2401 *a*, 2401 *b* such that they protrude outwards from the housing to resistively couple to the user's skin during use.

Figure 25:
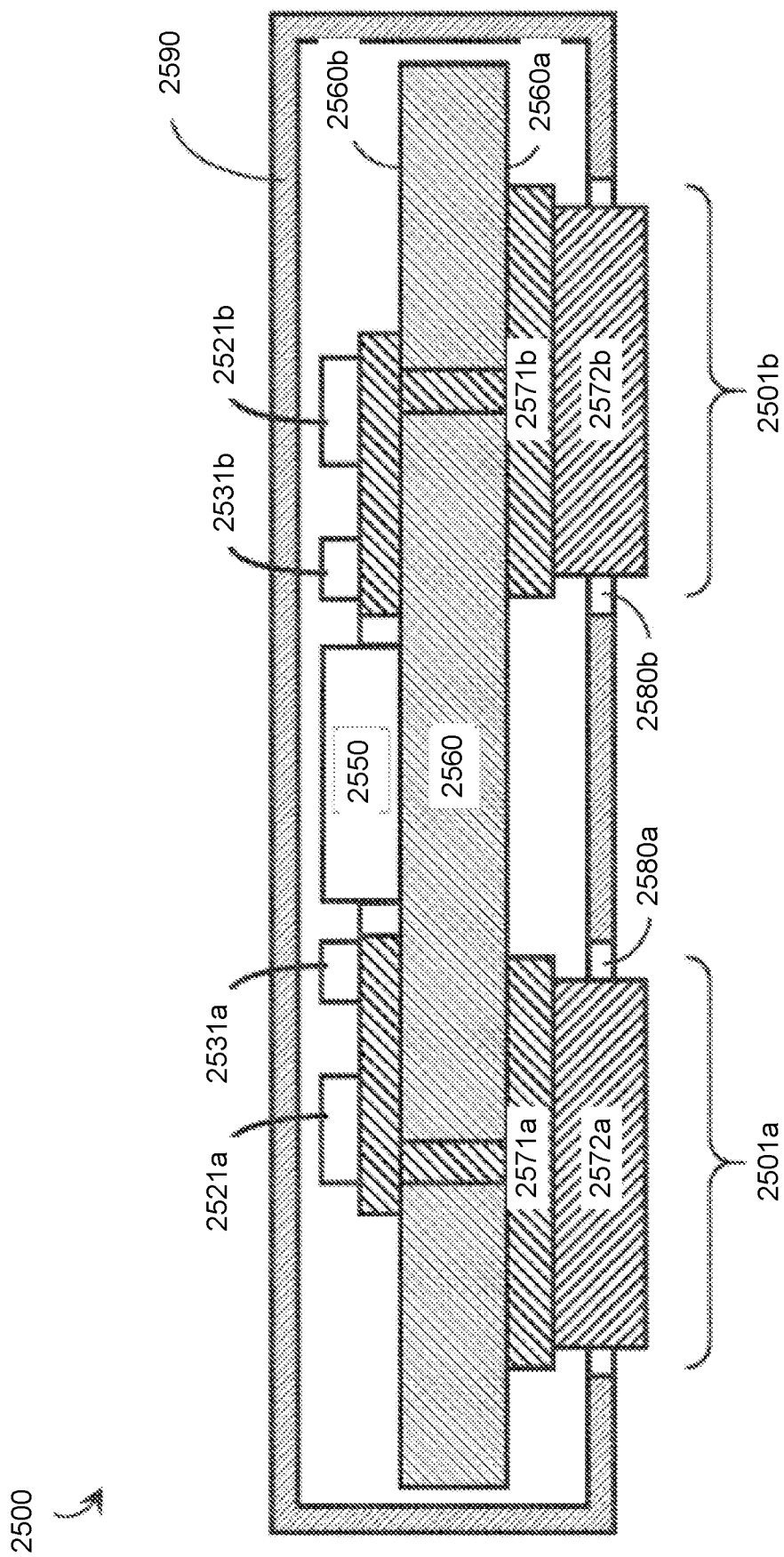
FIG. 25 is a cross sectional view of a capacitive EMG sensor packaged in a housing and employing bi-layer sensor electrodes that protrude from the housing in order to physically contact and electrically couple to a user's skin in accordance with the present systems, articles, and methods.

FIG. 25 is a cross sectional view of a capacitive EMG sensor 2500 packaged in a housing 2590 and employing bi-layer sensor electrodes 2501 *a*, 2501 *b* that protrude from the housing in order to physically contact and electrically (i.e., resistively/galvanically) couple to a user's skin in accordance with the present systems, articles, and methods. Sensor 2500 is substantially similar to sensor 2400 from FIG. 24 and includes the same or similar elements (e.g., a substrate 2560 having a first surface 2560 *a* and a second surface 2560 *b*, where first surface 2560 *a* carries first and second sensor electrodes 2501 *a*, 2501 *b* and second surface 2560 *b* carries an amplifier 2550, first and second capacitors 2521 *a*, 2521 *b*, first and second resistors 2531 *a*, 2531 *b*, etc.), all at least partially contained within the inner volume of a housing 2590. Housing 2590 may be formed of substantially rigid material. Throughout this specification and the appended claims, the term "rigid" as in, for example, "substantially rigid material," is used to describe a material that has an inherent tendency to maintain or restore its shape and resist malformation/deformation under, for example, the moderate stresses and strains typically encountered by a wearable electronic device.

Bi-layer sensor electrodes 2501 *a*, 2501 *b* are similar to bi-layer sensor electrodes 2401 *a*, 2401 *b* of sensor 2400 in that they each comprise a respective first layer a2571 *a*, 2571 *b* formed of a first electrically conductive material (e.g., copper, or a material including copper) and a respective second layer 2572 *a*, 2572 *b* formed of a second electrically conductive material (e.g., gold, steel, stainless steel, conductive rubber, etc.); however, in sensor 2500 the respective second layer 2572 *a*, 2572 *b* of each of electrodes 2501 *a*, 2501 *b* is substantially thicker than the respective first layer a2571 *a*, 2571 *b* of each of electrodes 2501 *a*, 2501 *b*. At least two holes 2580 *a*, 2580 *b* in housing 2590 provide access to the inner volume of housing 2590, and the thickness of second layers 2572 *a*, 2572 *b* of electrodes 2501 *a*, 2501 *b* (respectively) is sufficient such that at least respective portions of second layers 2572 *a*, 2572 *b* protrude out of housing 2590 through holes 2580 *a*, 2580 *b*. More specifically, first sensor electrode 2501 *a* includes a first layer a2571 *a* and a second layer 2572 *a*, housing 2590 includes a first hole 2580 *a*, and at least a portion of second layer 2572 *a* of first sensor electrode 2501 *a* extends out of housing 2590 through first hole 2580 *a*. Likewise, second sensor electrode 2501 *b* includes a first layer 2571 *b* and a second layer 2572 *b*, housing 2590 includes a second hole 2580 *b*, and at least a portion of second layer 2572 *b* of second sensor electrode 2501 *b* extends out of housing 2590 through second hole 2580 *b*. In this way, housing 2590 protects sensor 2500 from the elements and affords opportunities to enhance aesthetic appeal, while the protruding portions of second layers 2572 *a*, 2572 *b* of sensor electrodes 2501 *a*, 2501 *b* are still able to resistively couple to the skin of the user during use. Housing 2590 also helps to electrically insulate electrodes 2501 *a*, 2501 *b* from one another. In some applications, it can be advantageous to seal any gap between the perimeter of first hole 2580 *a* and the protruding portion of second layer 2572 *a* of first electrode 2501 *a* (using, e.g., a gasket, an epoxy or other sealant or, in the case of electrically conductive rubber or electrically conductive silicone as the material forming second layer 2572 *a* of first electrode 2501 *a*, a tight interference fit between the perimeter of first hole 2580 *a* and the protruding portion of second layer 2572 *a* of first electrode 2501 *a*) to prevent moisture or contaminants from entering housing 2590. Likewise, it can be advantageous to seal any gap between the perimeter of second hole 2580 *b* and the protruding portion of second layer 2572 *b* of second electrode 2501 *b*.

As previously described, the various embodiments of capacitive EMG sensors described herein may include at least one ground electrode. For example, sensor 2300 from FIG. 23 depicts ground electrode 2340. Sensor 2400 from FIG. 24 and sensor 2500 from FIG. 25 each do not illustrate a ground electrode for two reasons: a) to reduce clutter; and b) because in various embodiments, a ground electrode may or may not be carried by the same substrate as the sensor electrode(s). Sensor electrodes (such as electrodes 2301 *a*, 2301 *b*, 2401 *a*, 2401 *b*, and 2501 *a*, 2501 *b*) are advantageously positioned near muscle groups in order to detect EMG signals therefrom, but in some applications it is advantageous for ground electrodes (such as electrode 2340) to be positioned distant from the sensor electrodes and/or near bone instead of near muscle groups. For this reason, one or more ground electrode(s) may, in some applications, be separate from the substrate which carries the sensor electrodes but still communicatively coupled to the sensor circuitry by one or more electrically conductive pathways (e.g., electrical wires). However, in some applications one or more ground electrode(s) may be carried by the same substrate that carries the sensor electrodes, at least in part because doing so greatly simplifies the design and manufacture of the EMG sensor. For example, sensor 2400 from FIG. 24 may further include a ground electrode carried by first surface 2460 *a* of substrate 2460 and/or sensor 2500 from FIG. 25 may further include a ground electrode carried by first surface 2560 *a* of substrate 2560. In either case, the ground electrode may comprise a first layer formed of a first electrically conductive material (e.g., copper, or a material including copper) and a second layer formed of a second electrically conductive material (e.g., gold, steel, stainless steel, electrically conductive rubber, etc.). In applications that employ a housing, such as housing 2590 of sensor 2500, the housing may include a hole (e.g., a third hole) and at least a portion of the second layer of the ground electrode may protrude through the hole to physically contact and electrically (i.e., resistively/galvanically) couple to the skin of the user during use.

In accordance with the present systems, articles, and methods, multilayer (e.g., bi-layer) electrodes, including multilayer sensor electrodes and/or multilayer ground electrodes, may be formed by, for example: electroplating a second layer of electrically conductive material on a first layer of electrically conductive material; depositing a second layer of electrically conductive material on a first layer of electrically conductive material using deposition or growth techniques such as chemical vapor deposition, physical vapor deposition thermal oxidation, or epitaxy; adhering a second layer of electrically conductive material to a first layer of electrically conductive material using, for example, an electrically conductive epoxy or an electrically conductive solder; pressing a second layer of electrically conductive material against a first layer of electrically conductive material using, for example, an interference fit, one or more spring(s), or one or more elastic band(s); or otherwise generally bonding a second electrically conductive material to a first electrically conductive material in such a way that the second electrically conductive material is electrically coupled to the first electrically coupled material.

Figure 26:
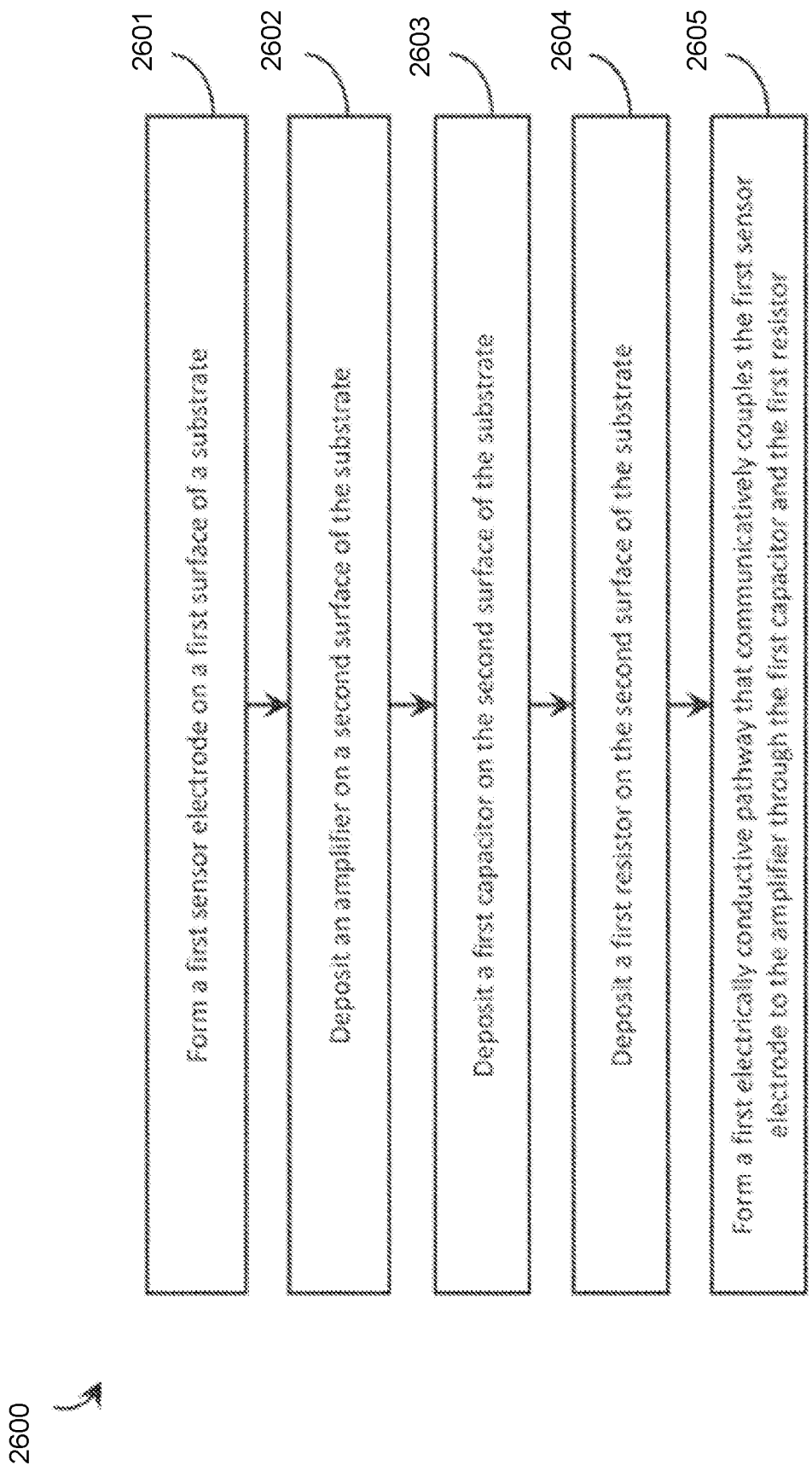
FIG. 26 is a flow-diagram of a method of fabricating an EMG sensor in accordance with the present systems, articles, and methods.

FIG. 26 is a flow-diagram of a method 2600 of fabricating an EMG sensor in accordance with the present systems, articles, and methods. Method 2600 includes five acts 2601, 2602, 2603, 2604, and 2605, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 2601, a first sensor electrode is formed on a first surface of a substrate. The first sensor electrode may comprise an electrically conductive plate such as for example electrode 2401 *a* of sensor 2400 or electrode 2501 *a* of sensor 2500, formed using, as an example, lithography techniques. The first sensor electrode may include a single layer of electrically conductive material or multiple (i.e., at least two) layers of one or more electrically conductive material(s). Forming the first sensor electrode may therefore include depositing at least a first layer of a first electrically conductive material (e.g., copper) on the first surface of the substrate. Where, in accordance with the present systems, articles, and methods, it is desirable for the first sensor electrode to comprise multiple layers, forming the first sensor electrode may further include depositing a second layer of a second electrically conductive material (e.g., gold, steel, stainless steel, electrically conductive rubber, etc.) on the first layer of the first electrically conductive material (either directly by, for example, a plating process or indirectly by, for example, employing an intervening adhesive layer such as an electrically conductive epoxy or an electrically conductive solder).

At 2602, an amplifier (e.g., amplifier 2350 of sensor 2300, amplifier 2450 of sensor 2400, or amplifier 2550 of sensor 2500) is deposited on a second surface of the substrate. The amplifier may include an amplification circuit and/or one or more discrete electronic component amplifier(s), such as for example on or more operational amplifier(s), differential amplifier(s), and/or instrumentation amplifier(s). Depositing the amplifier on the second surface of the substrate may include soldering a discrete component amplifier to one or more electrically conductive trace(s) and/or bonding pad(s) carried by the second surface of the substrate (i.e., soldering the amplifier on the second surface of the substrate using, for example, a surface-mount technology, or "SMT," process).

At 2603, a first capacitor (e.g., capacitor 2321 *a* of sensor 2300, capacitor 2421 *a* of sensor 2400, or capacitor 2521 *a* of sensor 2500) is deposited on the second surface of the substrate. The first capacitor may include a discrete electronic component capacitor and depositing the first capacitor on the second surface of the substrate may include soldering the first capacitor to one or more electrically conductive trace(s) and/or bonding pad(s) carried by the second surface of the substrate (i.e., soldering the first capacitor on the second surface of the substrate using, for example, a SMT process).

At 2604, a first resistor (e.g., resistor 2331 *a* of sensor 2300, resistor 2431 *a* of sensor 2400, or resistor 2531 *a* of sensor 2500) is deposited on the second surface of the substrate. The first resistor may include a discrete electronic component resistor and depositing the first resistor on the second surface of the substrate may include soldering the first resistor to one or more electrically conductive trace(s) and/or bonding pad(s) carried by the second surface of the substrate (i.e., soldering the first resistor on the second surface of the substrate using, for example, a SMT process).

As described previously, a person of skill in the art will appreciate that the order of the acts in method 2600, and in particular the order of acts 2601, 2602, 2603, and 2604, is provided as an example only and in practice acts 2601, 2602, 2603, and 2604 may be carried out in virtually any order or combination, and any/all of acts 2601, 2602, 2603, and 2604 may be carried out substantially concurrently or even simultaneously (in, for example, an SMT process).

At 2605, a first electrically conductive pathway (e.g., pathway 2311 *a* of sensor 2300 or pathway 2411 *a* of sensor 2400) that communicatively couples the first sensor electrode to the amplifier through the first capacitor and the first resistor is formed. The first electrically conductive pathway may include one or more section(s) of electrically conductive trace carried by the second surface of the substrate and at least one via that electrically couples at least one of the one or more section(s) of electrically conductive trace to the first sensor electrode carried by the first surface of the substrate. Thus, forming the first electrically conductive pathway may employ established lithography techniques to form the one or more section(s) of electrically conductive trace and to form a via through the substrate.

As previously described, the EMG sensor may include or otherwise be packaged in a housing, such as housing 2590 of sensor 2500. In this case, method 2600 may be extended to include enclosing the substrate in a housing. Enclosing the substrate in the housing includes enclosing the amplifier, the first capacitor, and the first resistor in the housing. The housing may include a hole providing access to the inner volume thereof, and enclosing the substrate in the housing may include aligning the first sensor electrode with the hole so that at least a portion of the first senor electrode protrudes out of the housing through the hole. For implementations in which the first sensor electrode comprises a first layer and a second layer, aligning the first sensor electrode with the hole may include aligning the first sensor electrode with the hole so that at least a portion of the second layer protrudes out of the housing through the hole.

As previously described, the EMG sensor may include a ground electrode. For example, sensor 2300 from FIG. 23 includes ground electrode 2340. In order to include a ground electrode (2340) and associated circuitry in an EMG sensor, method 2600 may be extended to include: forming the ground electrode (2340) on the first surface of the substrate; forming a second electrically conductive pathway (2312) that communicatively couples to the ground electrode (2340); depositing a second capacitor (2322 *a*) on the second surface of the substrate; forming a third electrically conductive pathway (2313 *a*) that communicatively couples the first electrically conductive pathway (2311 *a*) and the second electrically conductive pathway (2312) through the second capacitor (2322 *a*); depositing a second resistor (2332 *a*) on the second surface of the substrate; and forming a fourth electrically conductive pathway (2314 *a*) that communicatively couples the first electrically conductive pathway (2311 *a*) and the second electrically conductive pathway (2312) through the second resistor (2332 *a*). Forming the ground electrode and the second, third, and fourth electrically conductive pathways may employ established lithography processes. Depositing the second capacitor and the second resistor may involve soldering discrete circuit components on the substrate (e.g., using a SMT process).

With or without a ground electrode (2340), the EMG sensor may be differential. For example, sensor 2300 from FIG. 23 includes second sensor electrode 2301 *b*. In order to include a second sensor electrode (2301 *b*) and associated circuitry in an EMG sensor, method 2600 may be extended to include: forming a second sensor electrode (2301 *b*) on the first surface of the substrate; depositing a third capacitor (2321 *b*) on the second surface of the substrate; depositing a third resistor (2331 *b*) on the second surface of the substrate; and forming a fifth electrically conductive pathway (2311 *b*) that communicatively couples the second sensor electrode (2301 *b*) and the amplifier (2350) through the third capacitor (2321 *b*) and the third resistor (2331 *b*). Forming the second sensor electrode and the fifth electrically conductive pathway may employ established lithography processes. Depositing the third capacitor and the third resistor may involve soldering discrete circuit components on the substrate (e.g., using a SMT process). For a differential EMG sensor that includes a ground electrode (e.g., as in sensor 2300 from FIG. 23), method 2600 may be extended to include: depositing a fourth capacitor (2322 *b*) on the second surface of the substrate; forming a sixth electrically conductive pathway (2313 *b*) that communicatively couples the fifth electrically conductive pathway (2311 *b*) and the second electrically conductive pathway (2312) through the fourth capacitor (2322 *b*); depositing a fourth resistor (2332 *b*) on the second surface of the substrate; and forming a seventh electrically conductive pathway (2314 *b*) that communicatively couples the fifth electrically conductive pathway (2311 *b*) and the second electrically conductive pathway (2312) through the fourth resistor (2332 *b*). Forming the sixth and seventh electrically conductive pathways may employ established lithography processes. Depositing the fourth capacitor and the fourth resistor may involve soldering discrete circuit components on the substrate (e.g., using a SMT process).

Capacitive EMG sensors having sensor electrodes that resistively couple to the user's skin as described herein may be implemented in virtually any system, device, or process that makes use of capacitive EMG sensors; however, the capacitive EMG sensors described herein are particularly well-suited for use in EMG devices that are intended to be worn by (or otherwise coupled to) a user for an extended period of time and/or for a range of different skin and/or environmental conditions. As an example, the capacitive EMG sensors described herein may be implemented in a wearable EMG device that provides gesture-based control in a human-electronics interface. Some details of exemplary wearable EMG devices that may be adapted to include at least one capacitive EMG sensor from the present systems, articles, and methods are described in, for example, U.S. patent application Ser. No. 14/186,889; U.S. patent application Ser. No. 14/335,668; U.S. Pat. No. 10,152,082, U.S. patent application Ser. No. 14/461,044, U.S. patent application Ser. No. 14/465,194, U.S. Pat. Nos. 9,483,123, and 9,389,694, all of which are incorporated herein by reference in their entirety.

Throughout this specification and the appended claims, the term "gesture" is used to generally refer to a physical action (e.g., a movement, a stretch, a flex, a pose, etc.) performed or otherwise effected by a user. Any physical action performed or otherwise effected by a user that involves detectable muscle activity (detectable, e.g., by at least one appropriately positioned EMG sensor) may constitute a gesture in the present systems, articles, and methods.

Figure 27:
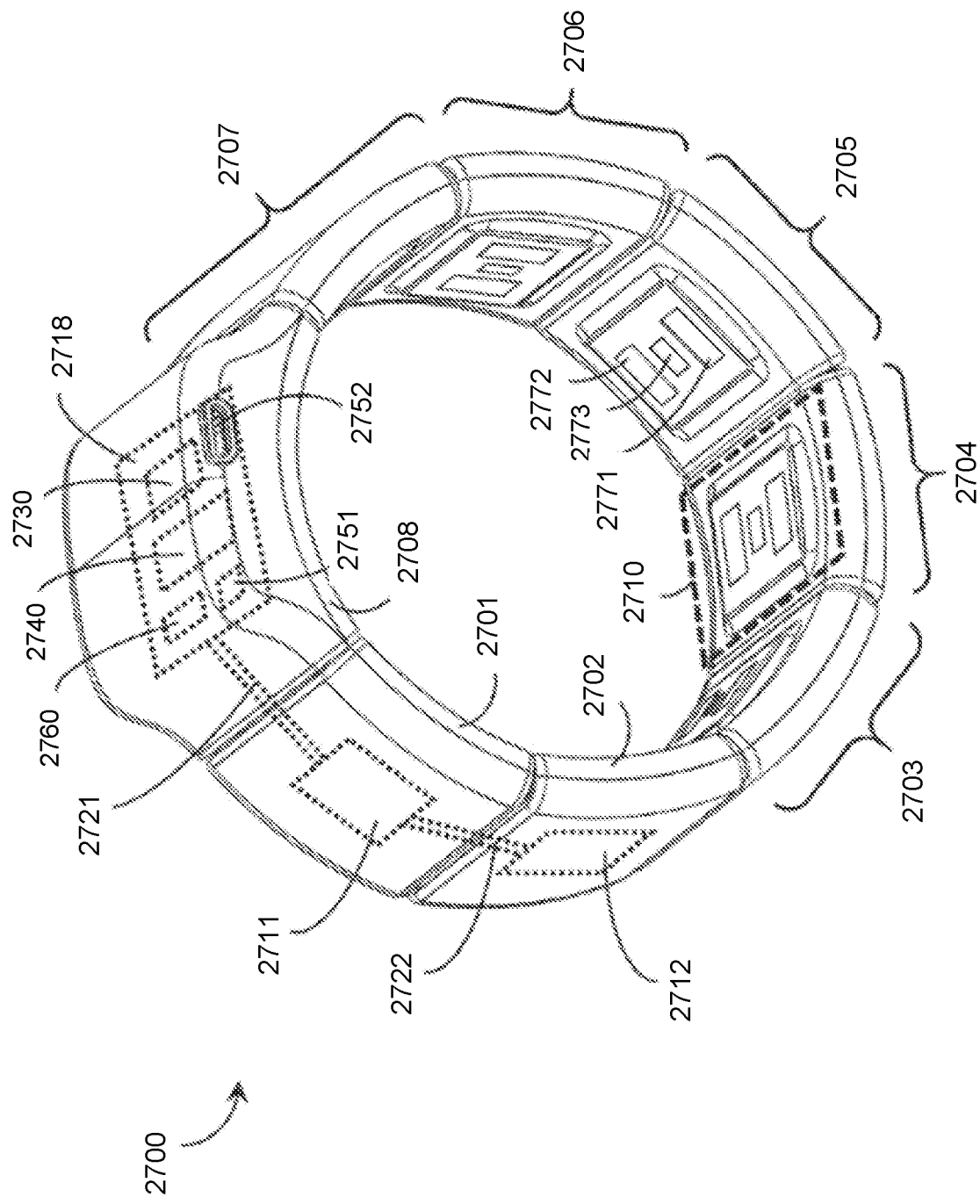
FIG. 27 is a perspective view of an exemplary wearable EMG device that includes capacitive EMG sensors adapted to, in use, resistively couple to the user's skin in accordance with the present systems, articles, and methods.

FIG. 27 is a perspective view of an exemplary wearable EMG device 2700 that includes capacitive EMG sensors adapted to, in use, resistively couple to the user's skin in accordance with the present systems, articles, and methods. Exemplary wearable EMG device 2700 may, for example, form part of a human-electronics interface. Exemplary wearable EMG device 2700 is an armband designed to be worn on the forearm of a user, though a person of skill in the art will appreciate that the teachings described herein may readily be applied in wearable EMG devices designed to be worn elsewhere on the body of the user, including without limitation: on the upper arm, wrist, hand, finger, leg, foot, torso, or neck of the user.

Device 2700 includes a set of eight pod structures 2701, 2702, 2703, 2704, 2705, 2706, 2707, and 2708 that form physically coupled links of the wearable EMG device 2700. Each pod structure in the set of eight pod structures 2701, 2702, 2703, 2704, 2705, 2706, 2707, and 2708 is positioned adjacent and in between two other pod structures in the set of eight pod structures such that the set of pod structures forms a perimeter of an annular or closed loop configuration. For example, pod structure 2701 is positioned adjacent and in between pod structures 2702 and 2708 at least approximately on a perimeter of the annular or closed loop configuration of pod structures, pod structure 2702 is positioned adjacent and in between pod structures 2701 and 2703 at least approximately on the perimeter of the annular or closed loop configuration, pod structure 2703 is positioned adjacent and in between pod structures 2702 and 2704 at least approximately on the perimeter of the annular or closed loop configuration, and so on. Each of pod structures 2701, 2702, 2703, 2704, 2705, 2706, 2707, and 2708 is physically coupled to the two adjacent pod structures by at least one adaptive coupler (not visible in FIG. 27). For example, pod structure 2701 is physically coupled to pod structure 2708 by an adaptive coupler and to pod structure 2702 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 2701, 2702, 2703, 2704, 2705, 2706, 2707, and 2708 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 2700 is depicted in FIG. 27 with the at least one adaptive coupler completely retracted and contained within the eight pod structures 2701, 2702, 2703, 2704, 2705, 2706, 2707, and 2708 (and therefore the at least one adaptive coupler is not visible in FIG. 27).

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 2701 and 2702 of device 2700 can each be moved or displaced relative to one another within the constraints imposed by the adaptive coupler providing adaptive physical coupling therebetween. The desire for pod structures 2701 and 2702 to be movable/displaceable relative to one another specifically arises because device 2700 is a wearable EMG device that advantageously accommodates the movements of a user and/or different user forms. As described in more detail later on, each of pod structures 2701, 2702, 2703, 2704, 2705, 2706, 2707, and 2708 may correspond to a respective housing (e.g., housing 2590 of sensor 2500) of a respective capacitive EMG sensor adapted to, in use, resistively couple to the user's skin in accordance with the present systems, articles, and methods.

Device 2700 includes eight pod structures 2701, 2702, 2703, 2704, 2705, 2706, 2707, and 2708 that form physically coupled links thereof. Wearable EMG devices employing pod structures (e.g., device 2700) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 2700 of FIG. 27, each of pod structures 2701, 2702, 2703, 2704, 2705, 2706, 2707, and 2708 comprises a respective housing, with each housing being akin to a respective one of housing 2590 from sensor 2500. Each housing may comprise substantially rigid material that encloses a respective inner volume. Details of the components contained within the housings (i.e., within the inner volumes of the housings) of pod structures 2701, 2702, 2703, 2704, 2705, 2706, 2707, and 2708 are not necessarily visible in FIG. 27 (e.g., the housings may be formed of material that is optically opaque). To facilitate descriptions of exemplary device 2700, some internal components are depicted by dashed lines in FIG. 27 to indicate that these components are contained in the inner volume(s) of housings and may not normally be actually visible in the view depicted in FIG. 27, unless a transparent or translucent material is employed to form the housings. For example, any or all of pod structures 2701, 2702, 2703, 2704, 2705, 2706, 2707, and/or 2708 may include circuitry (i.e., electrical and/or electronic circuitry). In FIG. 27, a first pod structure 2701 is shown containing circuitry 2711 (i.e., circuitry 2711 is contained in the inner volume of the housing of pod structure 2701), a second pod structure 2702 is shown containing circuitry 2712, and a third pod structure 2708 is shown containing circuitry 2718. The circuitry in any or all pod structures may be communicatively coupled to the circuitry in at least one other pod structure by at least one communicative pathway (e.g., by at least one electrically conductive pathway and/or by at least one optical pathway). For example, FIG. 27 shows a first set of communicative pathways 2721 providing communicative coupling between circuitry 2718 of pod structure 2708 and circuitry 2711 of pod structure 2701, and a second set of communicative pathways 2722 providing communicative coupling between circuitry 2711 of pod structure 2701 and circuitry 2712 of pod structure 2702.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Each individual pod structure within a wearable EMG device may perform a particular function, or particular functions. For example, in device 2700, each of pod structures 2701, 2702, 2703, 2704, 2705, 2706, and 2707 includes a respective capacitive EMG sensor 2710 (akin to sensor 2300 from FIG. 23, sensor 2400 from FIG. 24, and/or sensor 2500 from FIG. 25; only one called out in FIG. 27 to reduce clutter) adapted to, in use, resistively couple to the user's skin in accordance with the present systems, articles, and methods. Each capacitive EMG sensor 2710 is responsive to muscle activity of the user, meaning that each capacitive EMG sensor 2710 included in device 2700 to detect muscle activity of a user and to provide electrical signals in response to the detected muscle activity. Thus, each of pod structures 2701, 2702, 2703, 2704, 2705, 2706, and 2707 may be referred to as a respective "sensor pod." Throughout this specification and the appended claims, the term "sensor pod" is used to denote an individual pod structure that includes at least one sensor responsive to (i.e., to detect and provide at least one signal in response to) muscle activity of a user.

Pod structure 2708 of device 2700 includes a processor 2730 that processes the signals provided by the capacitive EMG sensors 2710 of sensor pods 2701, 2702, 2703, 2704, 2705, 2706, and 2707 in response to detected muscle activity. Pod structure 2708 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. A person of skill in the art will appreciate that implementations that employ a digital processor (e.g., a digital microprocessor or microcontroller, a DSP, etc.) may advantageously include a non-transitory processor-readable storage medium or memory communicatively coupled thereto and storing data and/or processor-executable instructions that control the operations thereof, whereas implementations that employ an ASIC, FPGA, or analog processor may or may optionally not include a non-transitory processor-readable storage medium, or may include on-board registers or other non-transitory storage structures.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 2700, processor pod 2708 includes a capacitive EMG sensor 2710 (not visible in FIG. 27) adapted to, in use, resistively couple to the user's skin in order to sense, measure, transduce or otherwise detect muscle activity of the user, so processor pod 2708 could be referred to as a sensor pod. However, in exemplary device 2700, processor pod 2708 is the only pod structure that includes a processor 2730, thus processor pod 2708 is the only pod structure in exemplary device 2700 that can be referred to as a processor pod. The processor 2730 in processor pod 2708 also processes the EMG signals provided by the capacitive EMG sensor 2710 of processor pod 2708. In alternative embodiments of device 2700, multiple pod structures may include processors, and thus multiple pod structures may serve as processor pods. Similarly, some pod structures may not include sensors, and/or some sensors and/or processors may be laid out in other configurations that do not involve pod structures.

In device 2700, processor 2730 includes and/or is communicatively coupled to a non-transitory processor-readable storage medium or memory 2740. Memory 2740 may store processor-executable gesture identification instructions that, when executed by processor 2730, cause processor 2730 to process the EMG signals from capacitive EMG sensors 2710 and identify a gesture to which the EMG signals correspond. For communicating with a separate electronic device (not shown), wearable EMG device 2700 includes at least one communication terminal. Throughout this specification and the appended claims, the term "communication terminal" is generally used to refer to any physical structure that provides a telecommunications link through which a data signal may enter and/or leave a device. A communication terminal represents the end (or "terminus") of communicative signal transfer within a device and the beginning of communicative signal transfer to/from an external device (or external devices). As examples, device 2700 includes a first communication terminal 2751 and a second communication terminal 2752. First communication terminal 2751 includes a wireless transmitter (i.e., a wireless communication terminal) and second communication terminal 2752 includes a tethered connector port 2752. Wireless transmitter 2751 may include, for example, a Bluetooth® transmitter (or similar) and connector port 2752 may include a Universal Serial Bus port, a mini-Universal Serial Bus port, a micro-Universal Serial Bus port, a SMA port, a THUNDERBOLT® port, or the like.

For some applications, device 2700 may also include at least one inertial sensor 2702760 (e.g., an inertial measurement unit, or "IMU," that includes at least one accelerometer and/or at least one gyroscope) responsive to (i.e., to detect, sense, or measure and provide at least one signal in response to detecting, sensing, or measuring) motion effected by a user. Signals provided by inertial sensor 2702760 may be combined or otherwise processed in conjunction with signals provided by capacitive EMG sensors 2710.

As previously described, each of pod structures 2701, 2702, 2703, 2704, 2705, 2706, 2707, and 2708 may include circuitry (i.e., electrical and/or electronic circuitry). FIG. 27 depicts circuitry 2711 inside the inner volume of sensor pod 2701, circuitry 2712 inside the inner volume of sensor pod 2702, and circuitry 2718 inside the inner volume of processor pod 2718. The circuitry in any or all of pod structures 2701, 2702, 2703, 2704, 2705, 2706, 2707 and 2708 (including circuitries 2711, 2712, and 2718) may include any or all of: an amplification circuit to amplify electrical signals provided by at least one EMG sensor 2710, a filtering circuit to remove unwanted signal frequencies from the signals provided by at least one EMG sensor 2710, and/or an analog-to-digital conversion circuit to convert analog signals into digital signals. The circuitry in any or all of pod structures 2701, 2702, 2703, 2704, 2705, 2706, 2707, and 2708 may include one or more discrete component capacitor(s), resistor(s), and/or amplifier(s) in the configuration(s) previously described for sensors 2300, 2400, and/or 2500. Device 2700 may also include at least one battery (not shown in FIG. 27) to provide a portable power source for device 2700.

Each of EMG sensors 2710 includes a respective capacitive EMG sensor responsive to muscle activity corresponding to a gesture performed by the user, wherein in response to muscle activity corresponding to a gesture performed by the user each of EMG sensors 2710 provides signals. EMG sensors 2710 are capacitive EMG sensors that are adapted to, in use, resistively couple to the user's skin per the present systems, articles, and methods, as described for sensor 2300 from FIG. 23, sensor 2400 from FIG. 24, or sensor 2500 from FIG. 25. In particular, each EMG sensor 2710 includes a respective first resistive sensor electrode 2771 (only one called out to reduce clutter) that is communicatively coupled to an amplifier (not visible in FIG. 27, but similar to amplifier 2350 of sensor 2300) through a discrete component capacitor (not visible in FIG. 27, but akin to first capacitor 2321 *a* of sensor 2300) and a discrete component resistor (also not visible in FIG. 27, but akin to first resistor 2331 *a* of sensor 2300), a second resistive sensor electrode 2772 (only one called out to reduce clutter) that is also communicatively coupled to the amplifier through a discrete component capacitor (not visible in FIG. 27, but akin to third capacitor 2321 *b* of sensor 2300) and a discrete component resistor (also not visible in FIG. 27, but akin to third resistor 2331 *b* of sensor 2300), and a ground electrode 2773 (only one called out to reduce clutter). Each of the electrodes 2771, 2772, and 2773 of each EMG sensor 2710 may be carried by a respective substrate, and the respective circuitry (e.g., 2711, 2712, and 2718) of each pod structure 2701, 2702, 2703, 2704, 2705, 2706, 2707, and 2708 may be carried by the same substrate and include the communicative pathway, amplifier, capacitor, and resistor elements previously described for sensors 2300, 2400, and 2500. For example, each respective EMG sensor 2710 of each pod structure 2701, 2702, 2703, 2704, 2705, 2706, 2707, and 2708 may include a respective substrate, with the first and second sensor electrodes 2771, 2772 and the ground electrode 2773 of each pod structure 2701, 2702, 2703, 2704, 2705, 2706, 2707, and 2708 carried by a first surface of the substrate and circuitry 2711, 2712, 2718 carried by a second surface of the substrate, the second surface being opposite the first surface across a thickness of the substrate. For each sensor 2710, the circuitry respectively includes at least an amplifier (e.g., 2350, 2450, 2550), a first electrically conductive pathway (e.g., 2311 *a*, 2411 *a*, 411 *a*) that communicatively couples the first sensor electrode 2771 and the amplifier, a first capacitor (e.g., 2321 *a*, 2421 *a*, 2521 *a*) electrically coupled in series between the first sensor electrode 2771 and the amplifier in the first electrically conductive pathway, and a first resistor (e.g., 2331 *a*, 2431 *a*, 2531 *a*) electrically coupled in series between the first sensor electrode and the amplifier in the first electrically conductive pathway.

The capacitive EMG sensors 2710 of wearable EMG device 2700 are differential sensors that each implement two respective sensor electrodes 2771, 2772 and a respective ground electrode 2773, though the teachings herein may similarly be applied to wearable EMG devices that employ single-ended capacitive EMG sensors that each implement a respective single sensor electrode and/or capacitive EMG sensors that share a common ground electrode.

Signals that are provided by capacitive EMG sensors 2710 in device 2700 are routed to processor pod 2708 for processing by processor 2730. To this end, device 2700 employs a set of communicative pathways (e.g., 2721 and 2722) to route the signals that are output by sensor pods 2701, 2702, 2703, 2704, 2705, 2706, and 2707 to processor pod 2708. Each respective pod structure 2701, 2702, 2703, 2704, 2705, 2706, 2707, and 2708 in device 2700 is communicatively coupled to, over, or through at least one of the two other pod structures between which the respective pod structure is positioned by at least one respective communicative pathway from the set of communicative pathways. Each communicative pathway (e.g., 2721 and 2722) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 2700 from FIG. 27 represents an example of a wearable EMG device that incorporates the teachings of the present systems, articles, and methods, though the teachings of the present systems, articles, and methods may be applicable to any wearable EMG device that includes at least one EMG sensor.

Description for Improved Wearable Muscle Interfaces

The below disclosure relates to muscle interface systems, devices and methods that enable a user to access and interact with content displayed on an electronic display in an inconspicuous, hands-free manner.

In an aspect, a wearable system includes a wearable muscle interface device comprising a plurality of muscle activity sensors worn on an arm of a user. The plurality of muscle activity sensors are responsive to signals generated by muscles in the arm of the user. For example, when the user performs a physical gesture that involves one or more muscle(s) in the arm upon which the muscle interface device is worn, at least one of the muscle activity sensors may detect signals generated by the one or more muscle(s). The wearable muscle interface device is adapted to recognize gestures made by the user and to interact with content displayed on a wearable head-mounted display in response to the recognized gestures. To this end, the wearable system further includes a wearable head-mounted display and the wearable muscle interface device includes a transmitter communicatively coupled to the plurality of muscle activity sensors. In use, the transmitter of the wearable muscle interface device transmits at least one signal from the wearable muscle interface device directly to a receiver on the wearable head-mounted display based on the signals detected by the muscle activity sensors. The at least one signal transmitted from the wearable muscle interface device directly to the receiver on the wearable head-mounted display effects at least one interaction with content displayed on the wearable head-mounted display.

In another aspect, a muscle interface method comprises processing at least one signal based on one or more gesture(s) made by a user's hand, wrist and/or arm movements to interact with content displayed on the wearable head-mounted display.

The plurality of muscle activity sensors in and/or on-board the wearable muscle interface device may include electromyography (EMG) sensors and/or mechanomyography (MMG) sensors to detect electrical signals and/or vibrations, respectively, produced by muscles in the user's arm and to provide one or more signal(s) in response to the detected electrical signals and/or vibrations. The electrical signals and/or vibrations detected from the muscles are interpreted as gestures made by the user which provide a direct control input to a wearable head-mounted display.

The control input is provided directly from the wearable muscle interface device to the wearable head-mounted display. Preferably, the control input is provided wirelessly from the wearable muscle interface device directly to the wearable head-mounted display via a wireless communication protocol, such as NFC or Bluetooth™, for example. However, it will be appreciated that other types of wireless communications may be used, including any wireless communication protocol developed for smart phones and similar devices. In some applications, a direct wire connection between the wearable muscle interface device and the wearable head-mounted display may be used.

In addition to EMG and/or MMG sensors, various other types of sensors may be used to detect gestures made by the user. For example, inertial sensors such as accelerometers and/or gyroscopes may be used to detect signals generated by motion of the arm of the user in response to the user performing the physical gesture. The wearable muscle interface device may include one or more accelerometer sensors that, in use, detect signals generated by motion of the arm of the user and/or measure characteristics of gestures made by the user, including gestures involving the elbow or even the shoulders of the user. When used together with EMG and/or MMG sensors for detecting gestures, the accelerometer sensors may be utilized to increase the variety of control inputs that may be generated for direct interaction with a wearable head-mounted display.

An illustrative example will now be described with reference to the drawings.

Figure 28:
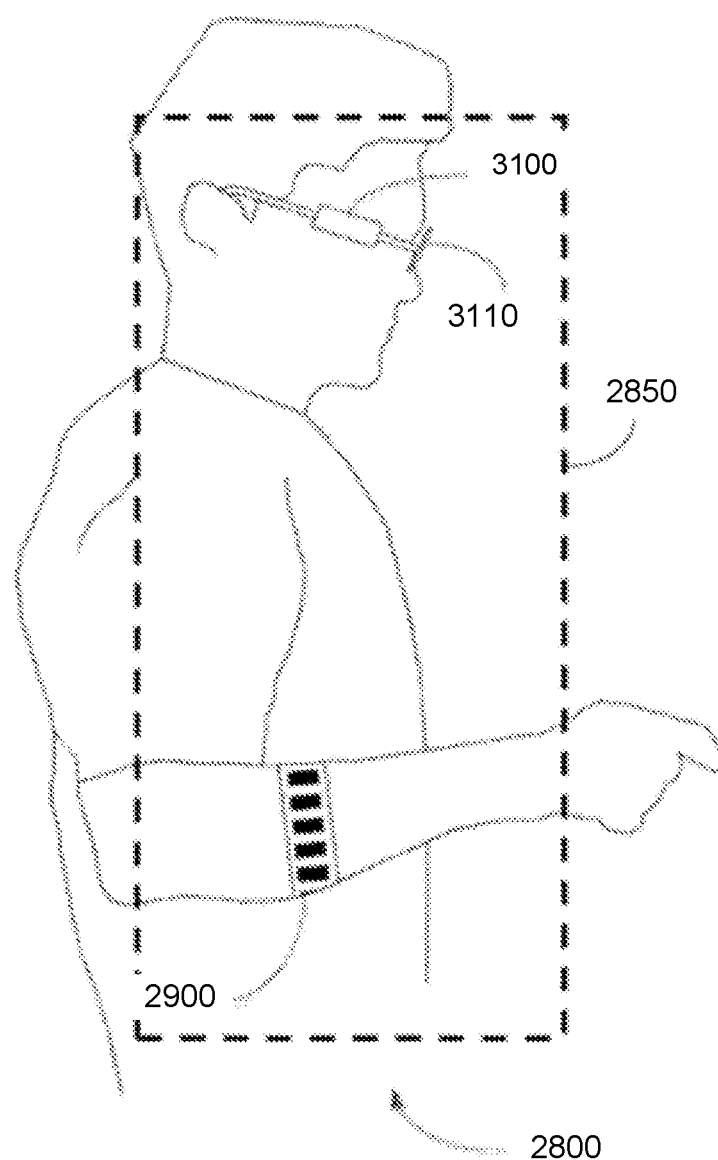
FIG. 28 is a side plan view that illustrates a user wearing a head mounted display and a muscle interface device in accordance with the present systems, devices, and methods.

Shown in FIG. 28 is an illustrative user 2800 wearing a wearable system 2850 that in use provides hands-free access to and control of a portable electronic display 3110 in accordance with the present systems, devices, and methods. Wearable system 2850 includes a wearable head-mounted display 3110 with on-board display control 300, and a wearable muscle interface device 2900 having a plurality of muscle activity sensors in accordance with the present systems, devices, and methods. In this illustrative example, wearable muscle interface device 2900 is a flexible, stretchable band that may be worn on the arm (e.g., the forearm) of user 2800 as shown. As discussed in more detail herein, wearable muscle interface device 2900 includes a transmitter (e.g., a wireless transmitter) and wearable head-mounted display 3110 includes a receiver (e.g., a wireless receiver) such that at least one signal may be transmitted from wearable muscle interface device 2900 directly to wearable head-mounted display 3110 (i.e., without being received and re-transmitted by any intervening device, such as a stationary, non-portable intervening device) in response to signals detected by the muscle activity sensors of wearable muscle interface device 2900 in order to effect interactions with and/or control of content displayed on or by wearable head-mounted display 3110.

Figure 29:
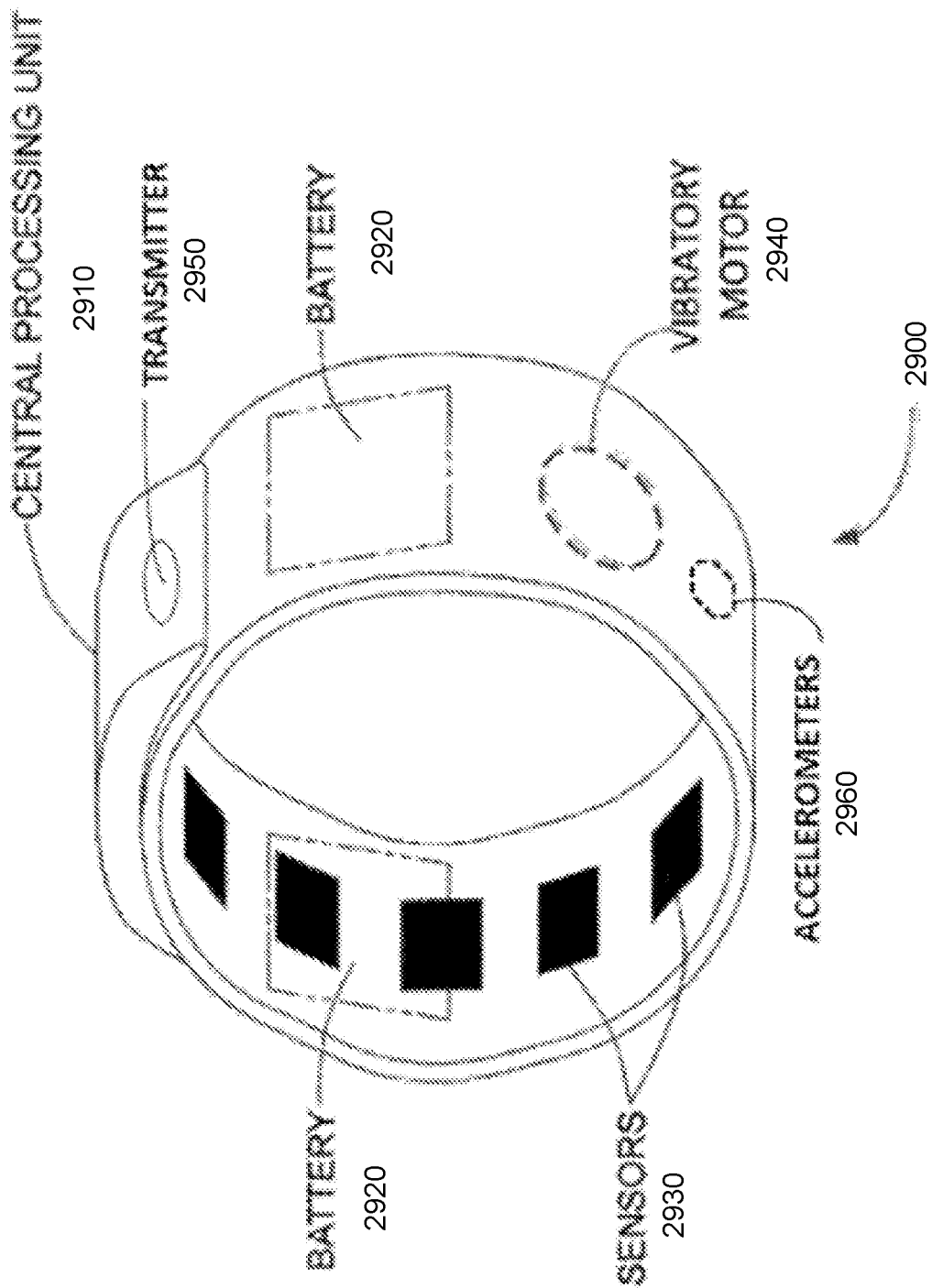
FIG. 29 is an isometric view that illustrates a detailed view of a muscle interface device in accordance with the present systems, devices, and methods.

FIG. 29 illustrates a detailed view of wearable muscle interface device 2900 from wearable system 2850 of FIG. 28 in accordance with the present systems, devices, and methods. As shown, wearable muscle interface device 2900 may comprise a processor 2910 (e.g., a central processing unit, a digital microcontroller, a digital signal processor, or similar), and one or more batteries 2920, which may be rechargeable, and which may be utilized concurrently or sequentially in conventional manner. As shown, wearable muscle interface device 2900 is a band to be worn on an arm of a user (e.g., a forearm of a user) and includes a plurality of muscle activity sensors 2930 which may be positioned radially around the circumference of the band, such that the sensors 2930 can, when in use, detect signals generated by muscles in the arm of user 2800 in response to user 2800 performing a physical gesture. Wearable muscle interface device 2900 may further include transmitter 2950 (e.g., a wireless transmitter) communicatively coupled to the plurality of muscle activity sensors 2930 which, in use, transmits at least one signal from wearable muscle interface device 2900 directly to a receiver on a wearable head-mounted display 3110 based on the signals detected by muscle activity sensors 2930. Wearable muscle interface device 2900 may include a feedback mechanism (e.g., a haptic feedback module) such as a vibratory motor 2940 to provide haptic feedback as described further below.

Wearable muscle interface device 2900 may be calibrated when first worn, prior to operation, such that muscle interface device 2900 may perform reliable gesture identification regardless of the exact positioning of the muscle activity sensors 2930 on the user's arm.

Figure 30:
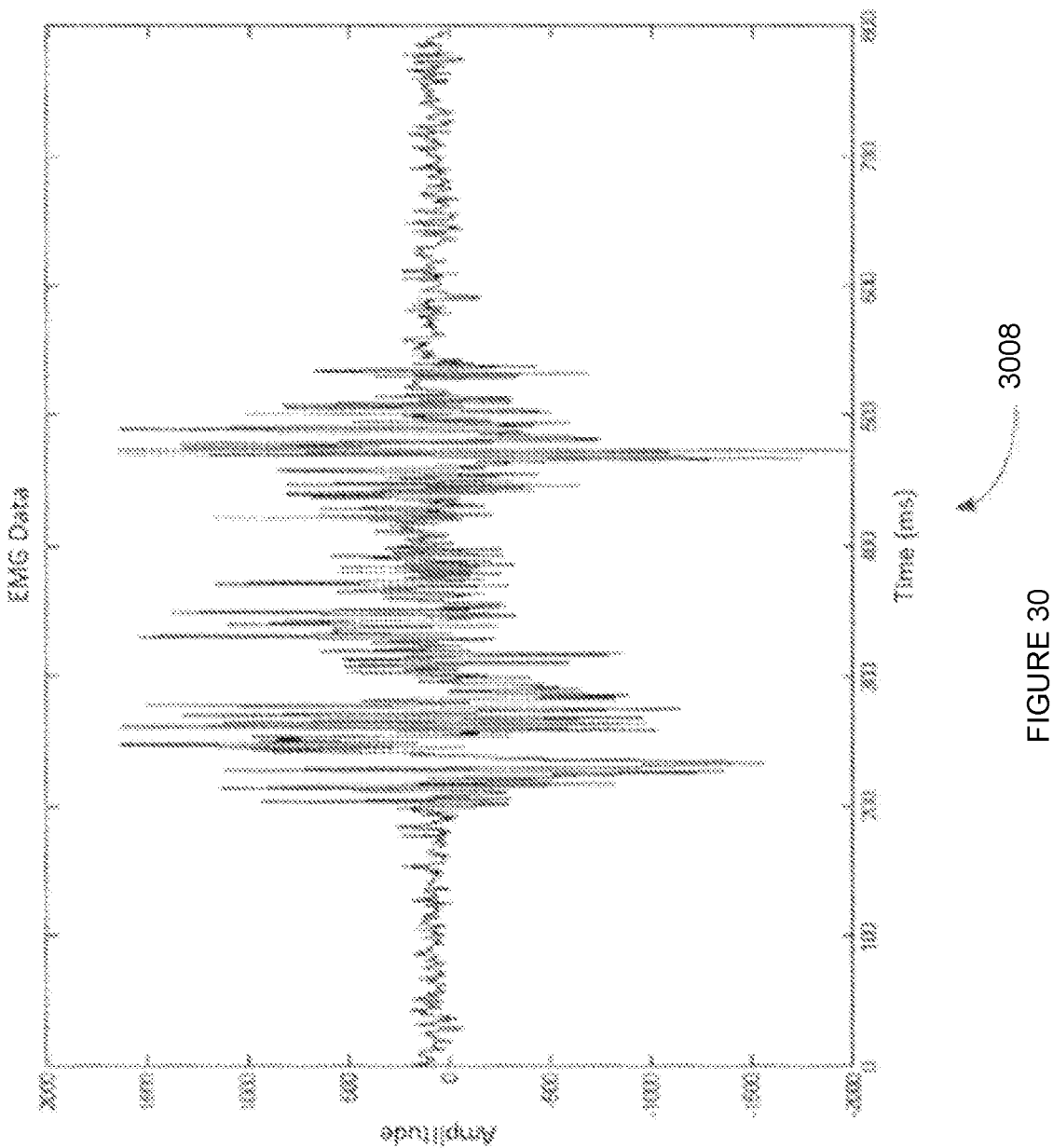
FIG. 30 is a data graph that illustrates an electrical signal detected by an EMG sensor.

By way of example, muscle activity sensors 2930 may include one or more EMG sensor(s), each of which may provide a respective EMG signal in the form of an oscillating waveform that varies in both frequency and amplitude. A majority of signal information that is needed for reliable gesture identification may be contained within a limited bandwidth of such an oscillating waveform, such as in the 5 Hz to 250 Hz frequency band. An illustrative example of an EMG signal 2900B is shown in FIG. 30.

As previously described, the plurality of muscle activity sensors 2930 may include one or more MMG sensor(s) comprising piezoelectric sensors, which may be used to measure the vibrations at the surface of the skin produced by the underlying muscles when contracted. By way of example, the MMG signal generated may be an oscillating waveform that varies in both frequency and amplitude, and a majority of signal information that is needed for reliable gesture identification may be contained within a limited bandwidth, such as in the 5 Hz to 250 Hz frequency band.

Because the MMG signal is acquired via mechanical means, electrical variations like skin impedance may not have a significant effect on the signal. The MMG signal may be very similar to the illustrative example of EMG signal 2900B shown in FIG. 30.

As previously described, wearable muscle interface device 2900 may include one or more accelerometer sensor(s) 2960 that, in use, detect additional aspects of gestures made by user 2800 in, for example, three degrees of freedom. For example, at least one accelerometer 2960 may be communicatively coupled to transmitter 2950 of wearable muscle interface device 2900 and, in use, the at least one signal transmitted from transmitter 2950 directly to the receiver on the wearable head-mounted display 3110 may be based on both the signals detected by muscle activity sensors 2930 and the signals detected by the at least one accelerometer 2960. An accelerometer signal may, for example, consist of three digital channels of data, each representing the acceleration in a respective one of three orthogonal directions (e.g., the x, y, and z directions). The signal may be representative of all of the accelerations that the user's arm is subject to, and may further represent motion of the body as a whole.

Figure 31:
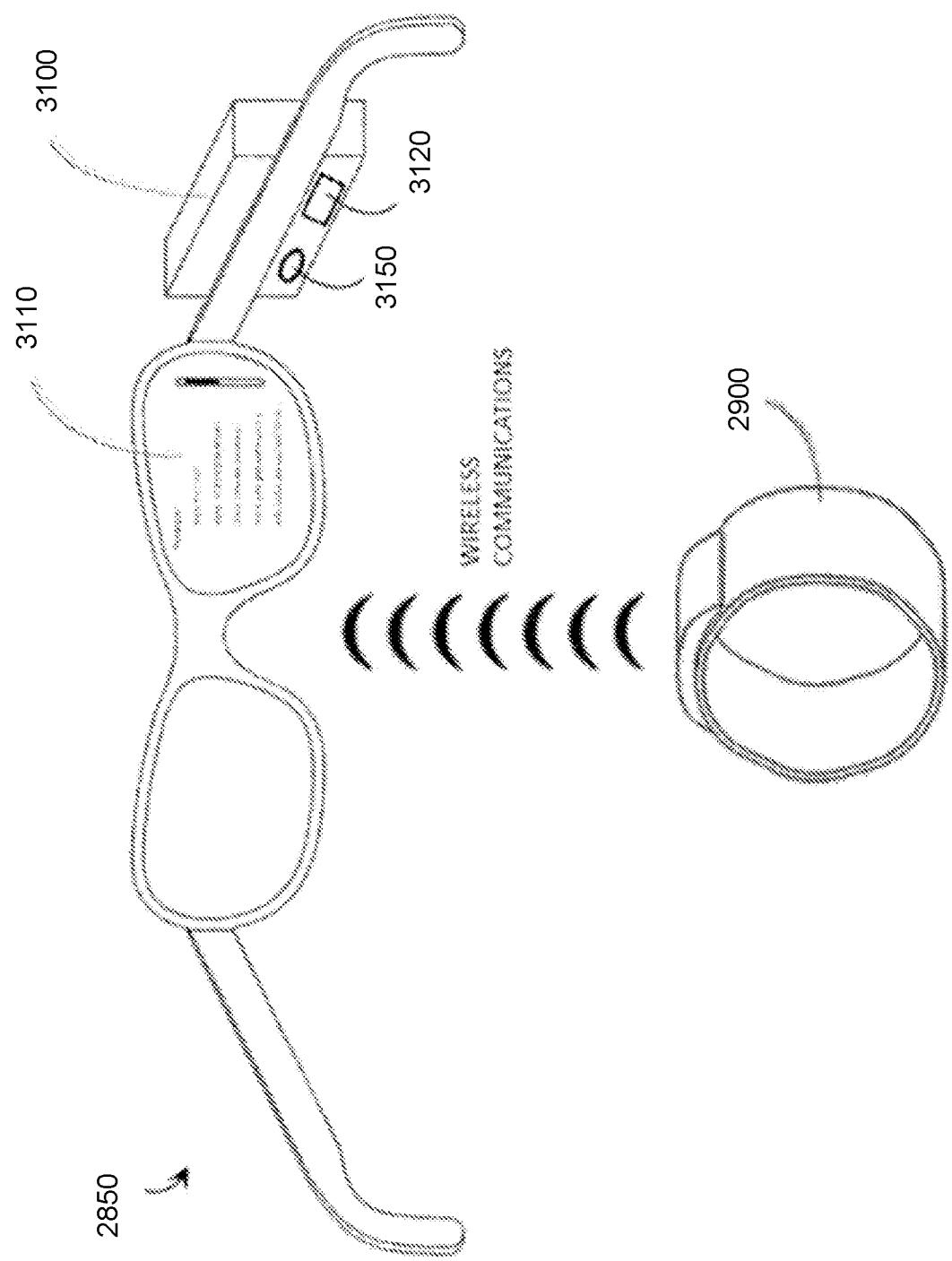
FIG. 31 is a schematic view that illustrates wireless communication between a head mounted display and a muscle interface device in accordance with the present systems, devices, and methods.

Now referring to FIG. 31, shown is wearable system 2850 from FIG. 28 with an illustration of direct wireless communication (e.g., Bluetooth™, NFC, etc.) between wearable muscle interface device 2900 and wearable head-mounted display 3110 in accordance with the present systems, devices, and methods. This wireless communication is utilized to transmit one or more signal(s) from wearable muscle interface device 2900 directly to wearable head-mounted display 3110 (e.g., to a wireless receiver 3150 located in or on display control 300 of wearable head-mounted display 3110) without any intervening communicative couplings or links. In this way, the user 2800 may access and control or otherwise interact with a portable electronic display in an inconspicuous and hands-free manner. User 2800 does not need to use his or her hand(s) to position or orient the portable electronic display of wearable head-mounted display 3110 in order to be able to see, access, receive feedback from, or otherwise interact with the portable electronic display of wearable head-mounted display 3110 because wearable head-mounted display 3110 is arranged such that at least one display screen is positioned in front of at least one eye of user 2800 at all times while wearable head-mounted display 3110 is worn on user 2800's head, regardless of the direction that user 2800 is facing. Furthermore, wearable muscle interface device 2900 enables user 2800 to control or otherwise interact with content displayed on wearable head-mounted display 3110 in an inconspicuous manner by using touchless gestures.

Figure 32:
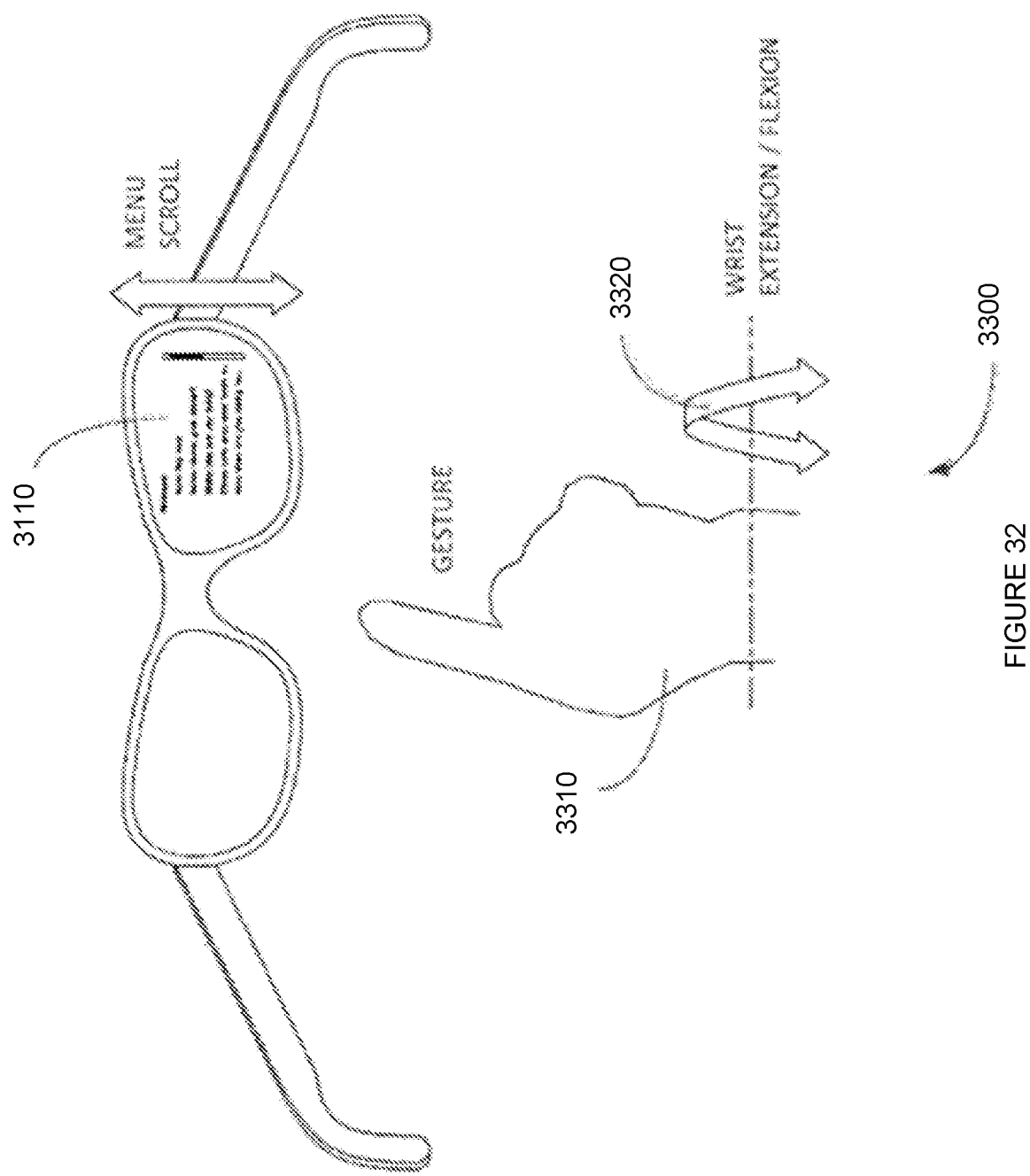
FIG. 32 is a schematic view that illustrates a user's hand and wrist gesture processed as a control signal by the muscle interface device for interacting with content displayed on the head mounted display.

Inconspicuous gesture-based control of and/or interactions with wearable head-mounted display 3110 is illustrated by way of example in FIG. 32, in which user 2800's hand and wrist gesture is detected and processed by wearable muscle interface device 2900 and transmitted directly from transmitter 2950 to receiver 3150 of wearable head-mounted display 3110 for interacting with content displayed thereon.

In this particular example, a gesture 3210 made by the user (2800) extending an index finger, and making a wrist flexion motion 3120 is detected by the muscle activity sensors 2930 (and/or accelerometer sensors 2960 if included) of wearable muscle interface device 2900 (not visible in FIG. 32). Signals provided by the muscle activity sensors 2930 in response to the detected gesture 3210 are processed by processor 2910 (FIG. 29) which interprets the signals to identify gesture 3210 performed by user 2800. A corresponding signal is produced based on the gesture 3210 interpreted by the processor 2910 and the signal is transmitted from transmitter 2950 directly to receiver 3150 of wearable head-mounted display 3110, which causes a menu appearing on wearable head-mounted display 3110 to scroll downwards.

As another example, a similar gesture in which user 2800 extends the index finger and makes a wrist extension motion may be detected by muscle activity sensors 2930 (and/or accelerometer sensors 2960 if included) of wearable muscle interface device 2900 and processed by processor 2910 (FIG. 29). Processor 2910 may interpret the detected muscle activity to identify the gesture performed, and a corresponding signal may be transmitted from transmitter 2950 directly to receiver 3150 of wearable head-mounted display 3110 to cause a menu appearing on wearable head-mounted display 3110 to scroll upwards.

As yet another example, a gesture in which user 2800 extends the index finger and makes a poking motion involving a slight movement of the elbow and shoulder may be detected by muscle activity sensors 2930 (and/or accelerometer sensors 2960 if included) of wearable muscle interface device 2900 and processed by processor 2910 (FIG. 29). Processor 2910 may interpret the detected muscle activity to identify the gesture performed, and a corresponding signal may be transmitted from transmitter 2950 directly to receiver 3150 of wearable head-mounted display 3110 to cause a highlighted menu item appearing on wearable head-mounted display 3110 to be selected.

If the user extends a different finger other than the index finger, muscle activity sensors 2930 may detect this, a different gesture may be identified by wearable muscle interface device 2900, and a different signal may be transmitted directly to wearable head-mounted display 3110 to effect a different interaction or function thereof. For example, extending the little finger or "pinky" finger instead of the index finger may cause wearable system 2850 to interpret the user's gestures with functions analogous to clicking a right mouse button rather than a left mouse button in a conventional mouse user interface. Extending both the index and pinky fingers at the same time may cause wearable system 2850 to interpret the user's gestures with yet other functions analogous to clicking a third mouse button in a conventional mouse user interface.

Thus, wearable muscle interface device 2900 may be adapted and/or calibrated to recognize a wide range of gestures made by a user 2800, based on measurements from a plurality of muscle activity sensors 2930 (and, in some implementations, one or more accelerometer sensor(s) 2960) in the wearable muscle interface device 2900.

Wearable muscle interface device 2900 may itself be operative to interpret the gestures from the detected signals as described above by, for example, using an on-board processor 2910 to process the EMG signals and interpret the EMG signals as a gesture via a gesture identification process (e.g., by invoking data and/or instructions stored in an on-board non-transitory computer-readable storage medium that, when executed by processor 2910, cause processor 2910 to identify the gesture performed by user 2800). Wearable muscle interface device 2900 may then transmit one or more signal(s) from transmitter 2950 directly to receiver 3150 of wearable head-mounted display 3110 in order to effect some interaction with wearable head-mounted display 3110 based on the interpreted gesture. In this example, the processor 2910 may be communicatively coupled in between the transmitter 2950 and the plurality of muscle activity sensors 2930 such that transmitter 2950 transmits one or more signal(s) provided by processor 2910 (e.g., corresponding to an interpreted gesture) based at least in part on the signals provided by muscle activity sensors 2930.

However, in an alternative implementation, the detected EMG signals may be transmitted directly to the receiver 3150 of wearable head-mounted display 3110 from transmitter 2950 (e.g., without being processed by processor 2910, which may or may not be included in device 2900 in this example) and wearable head-mounted display 3110 may include a processor 320 (e.g., a central processing unit, a digital microcontroller, a digital signal processor, or similar, located in or on display control 300) communicatively coupled to receiver 3150 to process the EMG signals and interpret the EMG signals as a gesture via a gesture identification process (e.g., by invoking data and/or instructions stored in an on-board non-transitory computer-readable storage medium that, when executed by processor 320, cause processor 320 to identify the gesture performed by user 2800). Wearable head-mounted display 3110 may then effect some interaction with content displayed thereon based on the interpreted gesture. Whether the detected EMG signals are interpreted at the device 2900 or at the display 3110, the detected EMG signals are first interpreted as a recognized gesture in order to interact with content displayed on the display 3110.

Wearable muscle interface device 2900 may include a haptic feedback module to provide feedback that a gesture has been recognized. This haptic feedback may provide a user 2800 with confirmation that the user 2800's gesture has been recognized, and successfully converted to a signal to interact with content displayed on wearable head-mounted display 3110. The haptic feedback module may comprise, for example, a vibrating mechanism such as a vibratory motor 2940 built into the wearable muscle interface device 2900.

Alternatively, rather than haptic feedback provided by the wearable muscle interface device 2900, confirmation of recognition of a gesture may be provided by auditory feedback, either generated by a speaker on the wearable muscle interface device 2900, or operatively connected to the wearable head-mounted display 3110.

As another alternative, confirmation of recognition of a gesture may be provided visually on the wearable head-mounted display 3110 itself. If there is more than one possible gesture that may be interpreted from the detected signals, rather than providing a possibly erroneous signal, the wearable muscle interface device 2900 and/or the wearable head-mounted display 3110 may provide a selection of two or more possible gestures as possible interpretations, and the user may be prompted to select from one of them to confirm the intended gesture and corresponding control.

Figure 33:
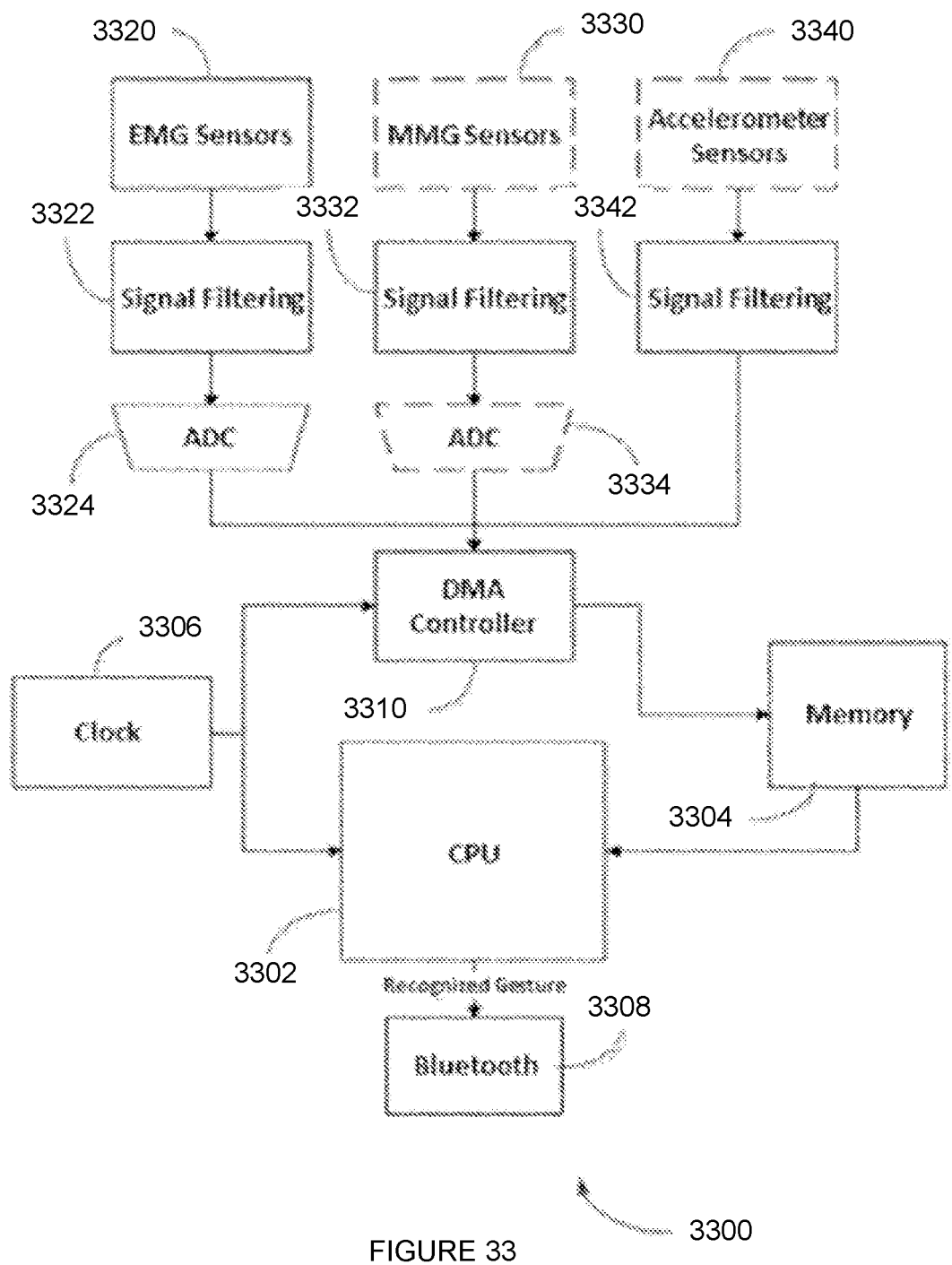
FIG. 33 is a schematic view of a system architecture of a muscle interface device in accordance with the present systems, devices, and methods.

Now referring to FIG. 33, shown is an illustrative schematic system architecture 3300 of the wearable muscle interface device 2900 component of a wearable system 2850 providing inconspicuous and hands-free access to and control of a portable electronic display in accordance with the present systems, device, and methods. As shown, system architecture 3300 includes a CPU 3302 (e.g., a processor, such as a digital microprocessor or microcontroller), non-transitory computer-readable memory 3304, system clock 3306, a wireless communication module 3308 (e.g., Bluetooth™, NFC, or the like), and a direct memory access (DMA) controller 33110. As shown, DMA controller 33110 is adapted to receive inputs from various sensors on-board the wearable muscle interface device 2900, including one or more EMG sensors 3320, MMG sensors 3330 and/or accelerometer sensors 3340.

In the illustrative example of system architecture 3300, detected signals from one or more EMG sensors 3320 are processed through signal filter 3322 and converted from analog to digital signals by ADC 3324. If one or more MMG sensors 3330 are used (either in addition to or instead of EMG sensors 3320), then the detected signals from the MMG sensors 3330 are processed through signal filter 3332 and converted from analog to digital signals by ADC 3334. Digital signals from one or more accelerometer sensors 3340 may also be processed through signal filter 3342 and received by DMA controller 33110.

The data from the various types of sensors 3320, 3330, 3340 may be acquired through an analog filtering chain. The data may be band-passed through filters 3322, 3332 between about 10 Hz to about 500 Hz, and amplified (e.g. by a total of about 28000 times). This filtering and amplification can be altered to whatever is required to be within software parameters. A notch filter at 60 Hz, or at any other relevant frequency, may also be used to remove powerline noise.

Data from the sensors 3320, 3330 may be converted to, e.g., 12-bit digital data by ADCs 3324, 3334, and then clocked into onboard memory 3304 using clock 3306 by the DMA controller 33110 to be processed by the CPU 3302.

Figure 34:
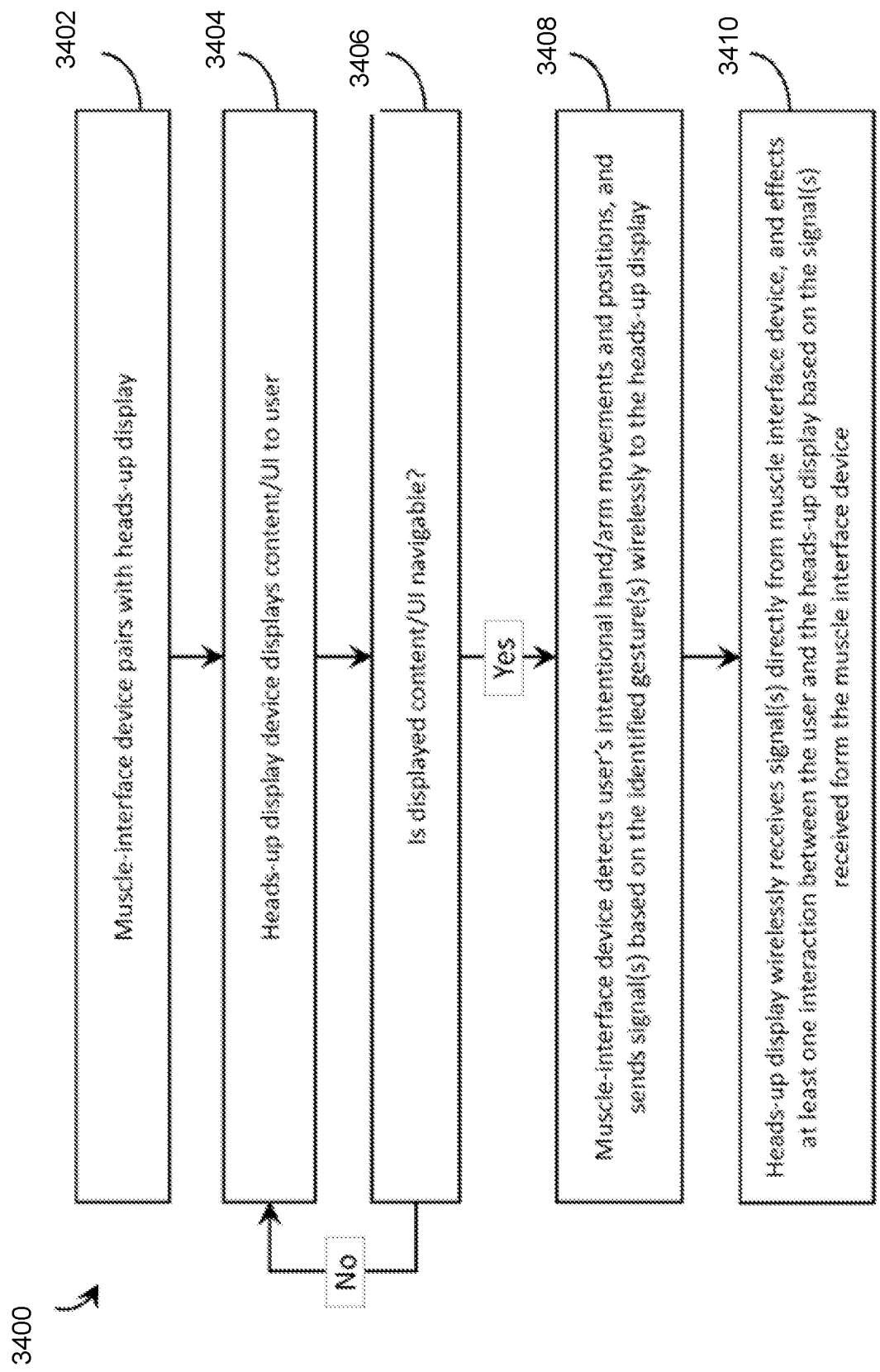
FIG. 34 is a flow chart of a method of using a wearable system to achieve hands-free access to and control of a portable electronic display in accordance with the present systems, devices, and methods.

Now referring to FIG. 34, shown is a schematic flow chart of a method 3400 of using a wearable system (e.g., 2850) to achieve hands-free access to and control of a portable electronic display in accordance with the present systems, devices, and methods. As shown, method 3400 begins at block 3402, where method 3400 pairs a wearable muscle interface device 2900 with a wearable head-mounted display 3110. Method 3400 then proceeds to block 3404, where content and/or user interface (UI) is displayed on the wearable head-mounted display 3110.

Method 3400 then proceeds to block 3406, where method 3400 determines if the displayed content and/or UI is navigable. If no, method 3400 returns to block 3404. If yes, method 3400 proceeds to block 3408, where the wearable muscle interface device 2900 detects muscle activity corresponding to a physical gesture performed by a user of the wearable system 2850 (i.e., at least one muscle activity sensor 2930 of the wearable muscle interface device 2900 detects the user's intentional hand/arm movements and positions), and wirelessly sends/transmits at least one signal corresponding to an identified gesture from the wearable muscle interface device 2900 to the wearable head-mounted display 3110. The at least one signal may be sent by a transmitter 2950 of the wearable muscle interface device 2900 based on the muscle activity detected by at least one muscle activity sensor 2930 of the wearable muscle interface device 2900.

Method 3400 then proceeds to block 33210, where a receiver 3150 on the wearable head-mounted display 3110 receives the at least one signal directly from the transmitter 2950 of the wearable muscle interface device 2900. A processor 320 of the wearable head-mounted display 3110 processes the at least one signal, and effects at least one interaction between the user 2800 and the wearable head-mounted display 3110 based on the processing of the at least one signal by processor 320 of the wearable head-mounted display 3110.

Figure 35:
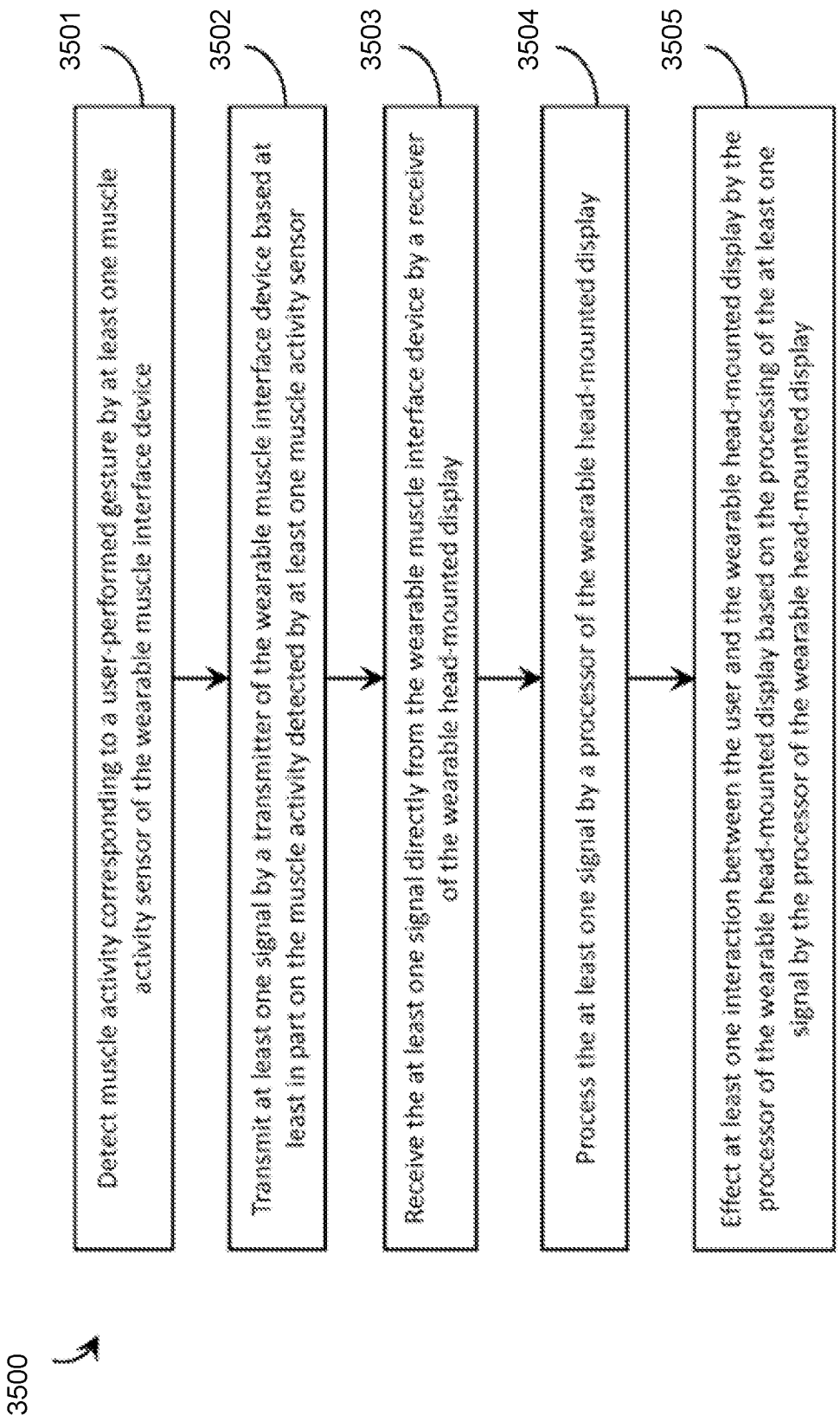
FIG. 35 is a flow-diagram showing a method of using wearable system to achieve hands-free access to and control of a portable electronic display in accordance with the present systems, devices, and methods.

Another example of a method employing a wearable system in accordance with the present systems, devices, and methods is illustrated in FIG. 35. FIG. 35 is a flow-diagram showing a method 3500 of using wearable system 2850 to achieve hands-free access to and control of a portable electronic display. The wearable system 2850 includes a wearable muscle interface device 2900 and a wearable head-mounted display 3110. Method 3500 includes five acts 3501, 3502, 3503, 3504, and 3505, although those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 3500, the term "user" refers to a person that is wearing both the wearable muscle interface device 2900 (e.g., worn on at least one of the user's arms) and the wearable head-mounted display 3110 of the wearable system 2850 (e.g., worn on the user's head).

At 3501, the user performs a physical gesture and muscle activity corresponding to the physical gesture is detected by at least muscle activity sensor 2930 of the wearable interface device 2900. The muscle activity sensors 2930 may include at least one EMG sensor that detects electrical signals generated by the muscle activity and/or at least one MMG sensor that detects vibrations generated by the muscle activity. In addition to muscle activity, motion of the wearable muscle interface device 2900 corresponding to the physical gesture may be detected by at least one accelerometer 2960 on-board the wearable muscle interface device 2900.

At 3502, at least one signal is transmitted by a transmitter 2950 of the wearable muscle interface device 2900 based at least in part on the muscle activity detected at 3501. As previously described, transmitter 2950 may be a wireless transmitter such that transmitting at least one signal by transmitter 2950 includes wirelessly transmitting the at least one signal by transmitter 2950. In implementations in which motion of the wearable muscle interface device 2900 is also detected by at least one accelerometer 2960, transmitting at least one signal by transmitter 2950 based at least in part on the muscle activity detected at 3501 may include transmitting at least one signal by transmitter 2950 based on both the muscle activity detected by at least one muscle activity sensor 2930 and the motion detected by at least one accelerometer 2960.

In response to detecting muscle activity corresponding to a physical gesture performed by the user at 3501, method 3500 may include processing the detected muscle activity by a processor 2910 communicatively coupled in between the muscle activity sensors 2930 and the transmitter 2950 (e.g., to interpret the signals provided by the muscle activity sensors 2930 and/or to identify the user-performed gesture). In this case, transmitting at least one signal by transmitter 2950 based at least in part on the muscle activity detected at 3501 may include transmitting at least one signal by transmitter 2950 based at least in part on processing the detected muscle activity by the processor 2910 of the wearable muscle interface device 2900.

At 3503, the at least one signal is received directly from transmitter 2950 by a receiver 3150 of the wearable head-mounted display 3110. In implementations where transmitter 2950 is a wireless transmitter, receiver 3150 may include a wireless receiver such that receiving the at least one signal by receiver 3150 includes wirelessly receiving the at least one signal by receiver 3150. The at least one signal is transmitted directly from transmitter 2950 to receiver 3150 without routing through any intervening devices or systems.

At 3504, the at least one signal received by receiver 3150 is processed by a processor 320 of the wearable head-mounted display 320. Processing the at least one signal by the processor 320 of the wearable head-mounted display may include, for example, mapping or otherwise associating the at least one signal to/with one or more function(s) of the wearable head-mounted display 3110 based on data and/or instructions stored in a non-transitory computer-readable storage medium on-board the wearable head-mounted display 3110 (data and/or instructions which, when executed by the processor 320 of the wearable head-mounted display 3110, cause the processor 320 of the wearable head-mounted display to effect one or more function(s) of the wearable head-mounted display 3110).

At 3505, at least one interaction between the user and the wearable head-mounted display 3110 is effected by the processor 320 of the wearable head-mounted display 3110 based on the processing of the at least one signal at 3504. The at least one interaction may include any function or operation that prompts, modifies, changes, elicits, or otherwise involves visual information provided to the user by the wearable head-mounted display 3110, including without limitation: interacting with visual material such as a photograph or video, navigating a menu, interacting with visually displayed elements such as a map or an element of a video game, and so on. Depending on the specific application, elements displayed on the wearable head-mounted display 3110 may or may not accommodate or otherwise take into account aspects of the user's environment that may be visible to the user. For example, elements displayed on the wearable head-mounted display 3110 may obscure, overlay, augment, highlight, block, be superimposed on, and/or semi-transparently project in front of elements of the user's environment.

As will be appreciated, the systems, devices, and methods that enable a user to access and interact with content displayed on an electronic display in an inconspicuous, hands-free manner described herein may be used for interaction with a portable electronic display in a wide range of applications, in virtually any application in which portable electronic displays are contemplated. By providing a discreet method of interacting with a wearable head-mounted display, a user is able to interact with such a display in any operating environment, including situations where overt gesturing (e.g. raising the hand to touch an input device provided on the wearable head-mounted display itself) is not desirable.

While various embodiments and illustrative examples have been described above, it will be appreciated that these embodiments and illustrative examples are not limiting, and the scope of the invention is defined by the following claims.

The various embodiments described herein provide, at least, a wearable system (e.g., 2850) including a wearable muscle interface device (e.g., 2900) that, in use, is to be worn on an arm of a user in order to enable hands-free access to, and control of, a wearable head-mounted display (e.g., 3110). As described previously, the singular forms "a," "an," and "the" used in this specification and the appended claims include plural referents unless the content clearly dictates otherwise. In some applications, it can be advantageous or otherwise desirable for such a wearable system (2850) to employ two or more wearable muscle interface devices (e.g., two or more wearable muscle interface devices 2900) worn on both of the user's arms (e.g., at least a respective wearable muscle interface device 2900 worn on each of the user's arms) as described in U.S. Pat. No. 9,372,535. Such may enable a greater number and/or diversity of gestures to be used to interact with content displayed on the wearable head-mounted display (e.g., 3110). Furthermore, in various embodiments the gesture-based interaction systems, devices, and methods described herein may be combined with other forms of touchless control, including without limitation: voice/speech-based control techniques such as Siri®, control techniques based on eye/vision tracking and/or blinking, electroencephalography (EEG), or the like.

Throughout this specification and the appended claims, the terms "head-mounted display" and "heads-up display" are used substantially interchangeably to refer to an electronic display that is worn on the head of a user and arranged so that at least one electronic display is positioned in front of at least one eye of the user when the head-mounted/heads-up display is worn on the head of the user. For greater clarity, "positioned in front of at least one eye of the user" means that the content displayed on or by the electronic display is displayed, projected, or otherwise provided generally in front of at least one eye of the user and is visible by that at least one eye regardless of the orientation or position of the user's head. An electronic display that is "positioned in front of at least one eye of the user" may correspond to a projection, reflection, refraction, diffraction, or direct display of optical signals and may be located in the user's direct line of sight or may be located off of the user's direct line of sight such that the user may or may not need to deliberately direct one or more eye(s), without necessarily moving their head, towards the electronic display in order to see (i.e., access) the content displayed thereby.

Throughout this specification and the appended claims, the term "gesture" is used to generally refer to a physical action (e.g., a movement, a stretch, a flex, a pose) performed or otherwise effected by a user. Any physical action performed or otherwise effected by a user that involves detectable muscle activity (detectable, e.g., by at least one appropriately positioned muscle activity sensor) and/or detectable motion (detectable, e.g., by at least one appropriately positioned inertial sensor, such as an accelerometer and/or a gyroscope) may constitute a gesture in the present systems, articles, and methods.

Throughout this specification and the appended claims the term "communicative" as in "communicative pathway," "communicative coupling," and in variants such as "communicatively coupled," is generally used to refer to any arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, the term "provide" and variants such as "provided" and "providing" are frequently used in the context of signals. For example, a muscle activity sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a surface EMG sensor may include at least one electrode that resistively or capacitively couples to electrical signals from muscle activity. This coupling induces a change in a charge or electrical potential of the at least one electrode which is then relayed through the sensor circuitry and output, or "provided," by the sensor. Thus, the surface EMG sensor may "provide" an electrical signal by relaying an electrical signal from a muscle (or muscles) to an output (or outputs).

In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

Throughout this specification and the appended claims, "identifying" or "interpreting signals as" a gesture means associating a set of signals provided by one or more sensors (e.g., neuromuscular-signal sensors, such as EMG sensors, MMG sensors, muscle activity sensor(s), etc.) with a particular gesture. In the various embodiments described herein, "identifying" or "interpreting signals as" a gesture includes determining which gesture in a gesture library is most probable (relative to the other gestures in the gesture library) of being the gesture that a user has performed or is performing in order to produce the signals upon which the gesture identification is at least partially based. The wearable muscle interface devices described herein are generally not operative to identify any arbitrary gesture performed by a user. Rather, the wearable muscle interface devices described herein are operative to identify when a user performs one of a specified set of gestures, and that specified set of gestures is referred to herein as a gesture library. A gesture library may include any number of gestures, though a person of skill in the art will appreciate that the precision/accuracy of gesture identification may be inversely related to the number of gestures in the gesture library. A gesture library may be expanded by adding one or more gesture(s) or reduced by removing one or more gesture(s). Furthermore, in accordance with the present systems, articles, and methods, a gesture library may include a "rest" gesture corresponding to a state for which no activity is detected and/or an "unknown" gesture corresponding to a state for which activity is detected but the activity does not correspond to any other gesture in the gesture library.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 14/505,836, U.S. Provisional Patent Application Ser. No. 61/897,097, U.S. Pat. No. 10,528,135, U.S. patent application Ser. No. 14/186,889, U.S. patent application Ser. No. 14/194,252, U.S. patent application Ser. No. 14/335,668, U.S. Pat. No. 10,152,082, U.S. patent application Ser. No. 14/461,044, U.S. patent application Ser. No. 14/465,194, U.S. Pat. Nos. 9,372,535, 9,788,789, 9,483,123, U.S. Provisional Patent Application Ser. No. 61/894,263, U.S. Provisional Patent Application Ser. No. 61/887,193, U.S. Provisional Patent Application Ser. No. 61/887,812, U.S. Pat. Nos. 10,101,809, 10,042,422, 9,389,694, 10,188,309, U.S. Provisional Patent Application Ser. No. 61/822,740, U.S. Pat. No. 10,188,309, U.S. Provisional Patent Application Ser. No. 61/915,338, and U.S. Provisional Patent Application Ser. No. 61/891,694, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wrist-wearable device for sensing neuromuscular signals, comprising:
    pairs of neuromuscular-signal sensors each in a respective pod, including a first pair of neuromuscular-signal sensors in a first pod and a second pair of neuromuscular-signal sensors in a second pod, each respective pair of neuromuscular-signal sensors in each respective pod having:
        (i) a position over a distinct portion of a wrist of a user while the wrist-wearable device is worn by the user,
        (ii) a first electrode and a second electrode, the first and second electrodes configured to be used as a sensor of neuromuscular signals travelling through the wrist of the user, and
        (iii) electrical signal-processing circuitry configured to amplify and filter neuromuscular signals received from the first electrode and the second electrode to produce processed neuromuscular signals; and
    a shared ground electrode configured to provide a reference voltage and communicatively coupled to the first electrode, the second electrode, and the electrical signal-processing circuitry,
    wherein:
        the first pair in the first pod is configured to be communicatively coupled to one or more processors via a first communicative pathway and the second pair in the second pod is configured to be communicatively coupled to the one or more processors via a second communicative pathway that includes the first pod,
        the processed neuromuscular signals are configured to be provided to the one or more processors, via one or both of the first communicative pathway and the second communicative pathway, the processed neuromuscular signals including signals from the second pair of neuromuscular-signal sensors that are configured to be provided to the one or more processors using the second communicative pathway that includes the first pod, and
        the one or more processors are configured to analyze the processed neuromuscular signals to detect one or more gestures, including gestures that are detected due to movements of a thumb of the user that are indicated by at least some of the processed neuromuscular signals.

2. The wrist-wearable device of claim 1, wherein the pairs of neuromuscular signal-sensors include at least six neuromuscular signal-sensing channels, each channel of the at least six neuromuscular signal-sensing channels including at least a respective first electrode and at least a respective second electrode.

3. The wrist-wearable device of claim 2, further comprising:
    a band structure including a layer of material, the band structure at least partially enclosing respective first electrodes, respective second electrodes, and respective shared ground electrodes for each neuromuscular signal-sensing channel of the at least six neuromuscular signal-sensing channels.

4. The wrist-wearable device of claim 3, wherein the layer of material is a fabric material.

5. The wrist-wearable device of claim 3, wherein the layer of material mediates physical contact between each respective electrode and the user's skin.

6. The wrist-wearable device of claim 3, wherein the layer of material fully encloses the first electrode and the second electrode.

7. The wrist-wearable device of claim 2, wherein the at least six neuromuscular signal-sensing channels are eight neuromuscular signal-sensing channels.

8. The wrist-wearable device of claim 1, wherein respective portions of the first electrode and the second electrode are configured to be in direct physical contact with the user's skin.

9. The wrist-wearable device of claim 8, wherein the respective portions of the first electrode and the second electrode are coated with a dielectric layer.

10. The wrist-wearable device of claim 1, wherein the shared ground electrode is configured to be resistively coupled to the user's body and the first and second electrodes are configured to be capacitively coupled to the user's body.

11. The wrist-wearable device of claim 1, wherein each of the pairs of neuromuscular-signal sensors is an electromyographic (EMG) sensor.

12. The wrist-wearable device of claim 1, wherein neuromuscular signals from the second pair, sent via the second communicative pathway that includes the first pod, pass through a portion of the first pod before reaching the one or more processors.

13. The wrist-wearable device of claim 1, wherein the first pod is able to be moved or displaced relative to the second pod.

14. The wrist-wearable device of claim 1, wherein the band structure flexibly connects the first pod to the second pod, such that the first pod and the second pod are capable of moving or displacing relative to one another.

15. The wrist-wearable device of claim 1, wherein the processed neuromuscular signals from the second pair of neuromuscular-signal sensors are serially routed to the one or more processors through the first pod via the second communication pathway.

16. A band structure for a wearable device for sensing neuromuscular signals, the band structure including:
    pairs of neuromuscular-signal sensors each in a respective pod, including a first pair of neuromuscular-signal sensors in a first pod and a second pair of neuromuscular-signal sensors in a second pod, each respective pair of neuromuscular-signal sensors in each respective pod having:
        (i) a position over a distinct portion of a wrist of a user while the wrist-wearable device is worn by the user,
        (ii) a first electrode and a second electrode, the first and second electrodes configured to be used as a sensor of neuromuscular signals travelling through the wrist of the user, and
        (iii) electrical signal-processing circuitry configured to amplify and filter neuromuscular signals received from the first electrode and the second electrode to produce processed neuromuscular signals; and
a shared ground electrode configured to provide a reference voltage and communicatively coupled to the first electrode, the second electrode, and the electrical signal-processing circuitry,
wherein:
the first pair in the first pod is configured to be communicatively coupled to one or more processors via a first communicative pathway and the second pair in the second pod is configured to be communicatively coupled to the one or more processors via a second communicative pathway that includes the first pod,
the processed neuromuscular signals are configured to be provided to the one or more processors, via one or both of the first communicative pathway and the second communicative pathway, the processed neuromuscular signals including signals from the second pair of neuromuscular-signal sensors that are configured to be provided to the one or more processors using the second communicative pathway that includes the first pod, and
the one or more processors are configured to analyze the processed neuromuscular signals to detect one or more gestures, including gestures that are detected due to movements of a thumb of the user that are indicated by at least some of the processed neuromuscular signals.

17. The band structure of claim 16, further comprising:
a layer of material, the band structure at least partially enclosing respective first electrodes, respective second electrodes, and the shared ground electrode for each neuromuscular signal-sensing channel of at least six neuromuscular signal-sensing channels.

18. The band structure of claim 17, wherein the layer of material is a fabric material.

19. The band structure of claim 17, wherein the layer of material mediates physical contact between each respective electrode and the user's skin.

20. The band structure of claim 17, wherein the layer of material fully encloses the first electrode and the second electrode.

21. The band structure of claim 16, wherein the first pod is able to be moved or displaced relative to the second pod.

22. The band structure of claim 16, wherein the band structure flexibly connects the first pod to the second pod, such that the first pod and the second pod are capable of moving or displacing relative to one another.

23. The band structure of claim 16, wherein the processed neuromuscular signals from the second pair of neuromuscular-signal sensors are serially routed to the one or more processors through the first pod via the second communication pathway.

24. A wearable device for sensing neuromuscular signals, comprising:
pairs of neuromuscular-signal sensors each in a respective pod, including a first pair of neuromuscular-signal sensors in a first pod and a second pair of neuromuscular-signal sensors in a second pod, each respective pair of neuromuscular-signal sensors in each respective pod having:
(i) a position over a distinct portion of a user's body while the wearable device is worn by the user,
(ii) a first electrode and a second electrode, the first and second electrodes configured to be used as a sensor of neuromuscular signals travelling through the wrist of the user, and
(iii) electrical signal-processing circuitry configured to amplify and filter neuromuscular signals received from the first electrode and the second electrode to produce processed neuromuscular signals; and
a shared ground electrode configured to provide a reference voltage and communicatively coupled to the first electrode, the second electrode, and the electrical signal-processing circuitry,
wherein:
the first pair in the first pod is configured to be communicatively coupled to one or more processors via a first communicative pathway and the second pair in the second pod is configured to be communicatively coupled to the one or more processors via a second communicative pathway that includes the first pod, and
the processed neuromuscular signals are configured to be provided to the one or more processors, via one or both of the first communicative pathway and the second communicative pathway, and the one or more processors are configured to analyze the processed neuromuscular signals to detect one or more gestures, including gestures that are detected due to movements of a thumb of the user that are indicated by at least some of the processed neuromuscular signals.

25. The wearable device of claim 24, wherein the pairs of neuromuscular signal-sensors include at least six neuromuscular signal-sensing channels, each channel of the at least six neuromuscular signal-sensing channels including at least a respective first electrode and at least a respective second electrode.

26. The wearable device of claim 25, further comprising a band structure including a layer of material, wherein the band structure at least partially enclosing respective first electrodes, respective second electrodes, and respective ground electrodes for each of at least six neuromuscular signal-sensing channels.

27. The wearable device of claim 24, wherein the first pod is able to be moved or displaced relative to the second pod.

28. A wrist-wearable device for sensing neuromuscular signals, comprising:
pairs of neuromuscular-signal sensors including a first pair of neuromuscular-signal sensors and a second pair of neuromuscular-signal sensors, each respective pair of neuromuscular-signal sensors having:
(i) a position over a distinct portion of a wrist of a user while the wrist-wearable device is worn by the user,
(ii) a first electrode and a second electrode, the first and second electrodes configured to be used as a sensor of neuromuscular signals travelling through the wrist of the user, and
(iii) electrical signal-processing circuitry configured to amplify and filter neuromuscular signals received from the first electrode and the second electrode to produce processed neuromuscular signals; and
a shared ground electrode configured to provide a reference voltage and communicatively coupled to the first electrode, the second electrode, and the electrical signal-processing circuitry,
wherein:
each respective pair of neuromuscular signal sensors is daisy-chained together via a plurality of communicative pathways for providing the processed neuromuscular signals to the one or more processors, the processed neuromuscular signals including signals from the first pair of neuromuscular-signal sensors that are configured to be provided to the one or more processors via a first communicative pathway and signals from the second pair of neuromuscular-signal sensors that are configured to be provided to the one or more processors using a second communicative pathway different from the first communicative pathway and including the first communicative pathway, and the one or more processors are configured to analyze the processed neuromuscular signals to detect one or more gestures, including gestures that are detected due to movements of a thumb of the user that are indicated by at least some of the processed neuromuscular signals.

29. A wrist-wearable device for sensing neuromuscular signals, comprising:

pairs of neuromuscular-signal sensors each in a respective pod, including a first pair of neuromuscular-signal sensors in a first pod and a second pair of neuromuscular-signal sensors in a second pod, each respective pair of neuromuscular-signal sensors in each respective pod having:

(i) a position over a distinct portion of a wrist of a user while the wrist-wearable device is worn by the user, (ii) a first electrode and a second electrode, the first and second electrodes configured to be used as a sensor of neuromuscular signals travelling through the wrist of the user, and (iii) electrical signal-processing circuitry configured to amplify and filter neuromuscular signals received from the first electrode and the second electrode to produce processed neuromuscular signals; and a shared ground electrode configured to provide a reference voltage and communicatively coupled to at least one of the first electrode, the second electrode, and the electrical signal-processing circuitry, wherein:

the first pair in the first pod is configured to be communicatively coupled to one or more processors via a first communicative pathway and the second pair in the second pod is configured to be communicatively coupled to the one or more processors via a second communicative pathway that includes the first pod, the processed neuromuscular signals are configured to be provided to the one or more processors, via one or both of the first communicative pathway and the second communicative pathway, the processed neuromuscular signals including signals from the second pair of neuromuscular-signal sensors that are configured to be provided to the one or more processors using the second communicative pathway that includes the first pod, and the one or more processors are configured to analyze the processed neuromuscular signals to detect one or more gestures, including gestures that are detected due to movements of a thumb of the user that are indicated by at least some of the processed neuromuscular signals.

* * * * *